(12) United States Patent
Smith et al.

(10) Patent No.: US 9,545,960 B2
(45) Date of Patent: Jan. 17, 2017

(54) REAR-MOUNTED AERODYNAMIC STRUCTURE FOR TRUCK CARGO BODIES

(71) Applicant: STEMCO LP, Charlotte, NC (US)

(72) Inventors: Andrew F. Smith, Signal Mountain, TN (US); Charles M. Horrell, Solana Beach, CA (US); Jeffrey J. Grossmann, San Francisco, CA (US); Jonathan R. Feldman, Roslyn Heights, NY (US); Alexander R. Bruccoleri, Glastonbury, CT (US)

(73) Assignee: STEMCO LP, Charlotte, NC (US)

( * ) Notice: Subject to any disclaimer, the term of this patent is extended or adjusted under 35 U.S.C. 154(b) by 0 days.

(21) Appl. No.: 14/710,568

(22) Filed: May 12, 2015

(65) Prior Publication Data
US 2015/0291231 A1    Oct. 15, 2015

Related U.S. Application Data

(63) Continuation of application No. 13/752,368, filed on Jan. 28, 2013, now Pat. No. 9,039,069, which is a
(Continued)

(51) Int. Cl.
*B62D 35/00*    (2006.01)
(52) U.S. Cl.
CPC .................................. *B62D 35/001* (2013.01)
(58) Field of Classification Search
CPC ................................................... B62D 35/001
(Continued)

(56) References Cited

U.S. PATENT DOCUMENTS

| 227,401 A | 5/1880 | Charles et al. |
| 609,789 A | 8/1898 | George |

(Continued)

FOREIGN PATENT DOCUMENTS

| CA | 2166495 A1 | 7/1997 |
| CA | 2171398 A1 | 9/1997 |

(Continued)

OTHER PUBLICATIONS

Notification of Transmittal of the International Search Report and the Written Opinion of the International Searching Authority, or the Declaration relating to PCT Application No. PCT/US06/24642 (Jul. 27, 2007).

(Continued)

*Primary Examiner* — Jason S Morrow
(74) *Attorney, Agent, or Firm* — Perkins Coie LLP

(57) ABSTRACT

This invention provides an aerodynamic structure attached to the rear cargo body, having doors that swing open, or a single, full-width door, which rolls upwardly. The embodiments provide an aerodynamic structure attached to the rear in a manner that would obscure access to the door(s) in a deployed position, in which the structure reduces drag, yet enables access to the door(s) in a folded position. The folded position allows access to the rear for loading and unloading, and in the case of swinging, hinged doors, allows the doors to be folded through a 270-degree arc, with a minimal sideways projection. The various embodiments also enable relatively rapid and easy transition between the folded position and the deployed position using actuators and/or linkages that tie the folding and deployment of panels of the structure together. This allows selective folding and deployment of the structure without undue effort or strength.

19 Claims, 94 Drawing Sheets

Related U.S. Application Data continuation of application No. 13/343,288, filed on Jan. 4, 2012, now Pat. No. 8,360,510, which is a continuation of application No. 12/122,645, filed on May 16, 2008, now Pat. No. 8,100,461.

(60) Provisional application No. 61/039,411, filed on Mar. 25, 2008, provisional application No. 60/938,697, filed on May 17, 2007.

(58) Field of Classification Search
USPC .............................. 296/180.4, 180.5, 181.5
See application file for complete search history.

(56) References Cited

U.S. PATENT DOCUMENTS

| | | |
|---|---|---|
| 797,077 A | 8/1905 | Angus et al. |
| 891,537 A | 6/1908 | Graff |
| 1,352,679 A | 9/1920 | Myers |
| 1,364,053 A | 12/1920 | Quintin |
| 1,390,793 A | 9/1921 | Kyle et al. |
| 1,517,365 A | 12/1924 | Kleine |
| 1,543,877 A | 6/1925 | Saunders |
| 1,584,275 A | 5/1926 | Chalkley |
| 1,714,609 A | 5/1929 | Massey |
| 1,871,390 A | 8/1932 | Reynolds |
| 1,871,396 A | 8/1932 | Stalker |
| 1,875,276 A | 8/1932 | Steigert |
| 1,879,594 A | 9/1932 | Trey |
| 1,912,138 A | 5/1933 | Hoover |
| 1,913,169 A | 6/1933 | Martin |
| 2,037,942 A | 4/1936 | Stalker |
| 2,199,883 A | 5/1940 | Ishiwata |
| 2,208,075 A | 7/1940 | Jabelmann |
| 2,237,141 A | 4/1941 | Gale et al. |
| 2,338,533 A | 1/1944 | Pash et al. |
| 2,344,515 A | 3/1944 | Massey |
| 2,547,528 A | 4/1951 | Lewis |
| 2,569,354 A | 9/1951 | Tracy et al. |
| 2,569,983 A | 10/1951 | Favre |
| 2,737,411 A | 3/1956 | Potter |
| 2,772,624 A | 12/1956 | Carnes |
| 2,780,980 A | 2/1957 | Kennedy |
| 2,887,243 A | 5/1959 | Murdock, Sr. |
| 2,933,344 A | 4/1960 | Shumaker |
| 2,938,680 A | 5/1960 | Greene et al. |
| 2,964,352 A | 12/1960 | Werner |
| 3,010,754 A | 11/1961 | Shumaker et al. |
| 3,016,700 A | 1/1962 | Werner |
| 3,053,351 A | 9/1962 | Fulcher et al. |
| 3,074,079 A | 1/1963 | Isaacson et al. |
| 3,112,135 A | 11/1963 | Salomonson et al. |
| 3,178,131 A | 4/1965 | Laing |
| 3,214,215 A | 10/1965 | Hansen |
| 3,276,811 A | 10/1966 | Schmidt |
| 3,342,523 A | 9/1967 | Lutgen |
| 3,346,186 A | 10/1967 | Fulton et al. |
| 3,415,566 A | 12/1968 | Kerrigan |
| 3,425,740 A | 2/1969 | Vaughn |
| 3,455,594 A | 7/1969 | Mrlik et al. |
| 3,496,687 A | 2/1970 | Greenberg et al. |
| 3,526,365 A | 9/1970 | Ursery et al. |
| 3,711,146 A | 1/1973 | Madzsar et al. |
| 3,743,343 A | 7/1973 | Grote et al. |
| 3,791,468 A | 2/1974 | Bryan, Jr. |
| 3,807,787 A | 4/1974 | Gotz |
| 3,834,752 A | 9/1974 | Friedenfeld et al. |
| 3,934,922 A | 1/1976 | MacCready et al. |
| 3,941,334 A | 3/1976 | Cole |
| 3,951,445 A | 4/1976 | Tatom et al. |
| 3,960,402 A | 6/1976 | Keck et al. |
| 3,971,586 A | 7/1976 | Saunders |
| 3,977,716 A | 8/1976 | Whited et al. |
| 3,994,451 A | 11/1976 | Cole |
| 3,994,452 A | 11/1976 | Cole et al. |
| 3,999,797 A | 12/1976 | Kirsch et al. |
| 4,006,932 A | 2/1977 | McDonald et al. |
| 4,021,069 A | 5/1977 | Hersh et al. |
| 4,035,013 A | 7/1977 | Abbott et al. |
| 4,053,124 A | 10/1977 | Cole et al. |
| 4,113,299 A | 9/1978 | Johnson et al. |
| 4,117,900 A | 10/1978 | Amick et al. |
| 4,126,974 A | 11/1978 | Hardin et al. |
| 4,142,755 A | 3/1979 | Keedy et al. |
| 4,154,149 A | 5/1979 | Holford et al. |
| 4,174,863 A | 11/1979 | Gotz et al. |
| 4,210,354 A | 7/1980 | Canning |
| 4,214,787 A | 7/1980 | Chain et al. |
| 4,236,745 A | 12/1980 | Davis |
| 4,248,103 A | 2/1981 | Halsall et al. |
| 4,257,641 A | 3/1981 | Keedy |
| 4,269,444 A | 5/1981 | Emory et al. |
| 4,300,797 A | 11/1981 | Whitley et al. |
| 4,316,630 A | 2/1982 | Evans et al. |
| 4,320,920 A | 3/1982 | Goudey et al. |
| 4,349,155 A | 9/1982 | Donguy |
| 4,357,045 A | 11/1982 | Kinford et al. |
| 4,375,898 A | 3/1983 | Stephens et al. |
| 4,379,582 A | 4/1983 | Miwa et al. |
| 4,383,407 A | 5/1983 | Inman et al. |
| 4,384,630 A | 5/1983 | Steiner et al. |
| 4,386,801 A | 6/1983 | Chapman et al. |
| 4,421,354 A | 12/1983 | Lemaster et al. |
| 4,433,865 A | 2/1984 | Crompton, Jr. |
| RE31,565 E | 4/1984 | Beaulieu |
| 4,451,074 A | 5/1984 | Scanlon |
| D274,322 S | 6/1984 | Hayes et al. |
| 4,457,550 A | 7/1984 | Gielow et al. |
| 4,458,936 A | 7/1984 | Mulholland |
| 4,458,937 A | 7/1984 | Beckmann et al. |
| 4,462,628 A | 7/1984 | Gregg et al. |
| 4,486,046 A | 12/1984 | Whitney et al. |
| 4,489,889 A | 12/1984 | Inman et al. |
| 4,508,380 A | 4/1985 | Sankrithi |
| 4,518,188 A | 5/1985 | Witten et al. |
| 4,525,123 A | 6/1985 | Curci et al. |
| 4,601,508 A | 7/1986 | Kerian |
| 4,611,847 A | 9/1986 | Sullivan |
| 4,640,541 A | 2/1987 | FitzGerald et al. |
| 4,653,788 A | 3/1987 | Di Giusto et al. |
| 4,678,118 A | 7/1987 | Fukami et al. |
| 4,682,808 A | 7/1987 | Bilanin |
| 4,688,841 A | 8/1987 | Moore |
| 4,702,509 A | 10/1987 | Elliot, Sr |
| 4,706,910 A | 11/1987 | Walsh et al. |
| 4,722,500 A | 2/1988 | Bray |
| 4,741,569 A | 5/1988 | Sutphen |
| 4,746,160 A | 5/1988 | Wiesemeyer |
| 4,773,692 A | 9/1988 | Schleicher et al. |
| 4,784,429 A | 11/1988 | Hodges et al. |
| 4,810,022 A | 3/1989 | Takagi et al. |
| 4,818,015 A | 4/1989 | Scanlon |
| 4,944,550 A | 7/1990 | Drown et al. |
| 4,951,994 A | 8/1990 | Miwa et al. |
| 4,976,349 A | 12/1990 | Adkins |
| 4,978,162 A | 12/1990 | Labbe |
| 5,000,508 A | 3/1991 | Woods et al. |
| 5,058,945 A | 10/1991 | Elliott, Sr. et al. |
| 5,108,145 A | 4/1992 | Harris et al. |
| 5,156,195 A | 10/1992 | Wehler et al. |
| 5,190,342 A | 3/1993 | Marlowe et al. |
| 5,199,762 A | 4/1993 | Scheele et al. |
| 5,236,347 A | 8/1993 | Andrus |
| 5,237,887 A | 8/1993 | Appleberry et al. |
| 5,240,306 A | 8/1993 | Flemming |
| 5,280,990 A | 1/1994 | Rinard |
| 5,317,880 A | 6/1994 | Spears et al. |
| 5,332,280 A | 7/1994 | DuPont et al. |
| 5,348,366 A | 9/1994 | Baker et al. |
| 5,375,903 A | 12/1994 | Lechner |
| 5,498,059 A | 3/1996 | Switlik |
| 5,570,924 A | 11/1996 | Few et al. |
| 5,609,384 A | 3/1997 | Loewen et al. |
| 5,823,610 A | 10/1998 | Ryan et al. |

(56) References Cited

U.S. PATENT DOCUMENTS

| | | |
|---|---|---|
| 5,842,734 A | 12/1998 | Lechner |
| 5,857,648 A | 1/1999 | Dailey et al. |
| 5,902,000 A | 5/1999 | Wold et al. |
| 5,908,217 A | 6/1999 | Englar et al. |
| 5,947,548 A | 9/1999 | Carper et al. |
| 6,045,095 A | 4/2000 | Parrish et al. |
| 6,092,861 A | 7/2000 | Whelan |
| 6,170,904 B1 | 1/2001 | Schaedlich et al. |
| 6,205,772 B1 | 3/2001 | Perrier et al. |
| 6,257,654 B1 | 7/2001 | Boivin et al. |
| 6,286,892 B1 | 9/2001 | Bauer et al. |
| 6,286,894 B1 | 9/2001 | Kingham |
| 6,309,010 B1 | 10/2001 | Whitten |
| 6,375,126 B1 | 4/2002 | Sakurai et al. |
| 6,382,708 B1 | 5/2002 | Erdelitsch et al. |
| 6,409,252 B1 | 6/2002 | Andrus |
| 6,418,710 B1 | 7/2002 | Perrier et al. |
| 6,428,084 B1 | 8/2002 | Liss et al. |
| 6,457,766 B1 | 10/2002 | Telnack |
| 6,467,833 B1 | 10/2002 | Travers |
| 6,485,087 B1 | 11/2002 | Roberge et al. |
| 6,561,575 B2 | 5/2003 | Fairburn et al. |
| 6,565,112 B2 | 5/2003 | Hanson et al. |
| 6,595,578 B1 | 7/2003 | Calsoyas et al. |
| 6,616,218 B2 | 9/2003 | Bauer et al. |
| 6,644,720 B2 | 11/2003 | Long et al. |
| 6,666,498 B1 | 12/2003 | Whitten |
| 6,669,270 B1 | 12/2003 | Card et al. |
| 6,742,616 B2 | 6/2004 | Leban et al. |
| 6,779,834 B1 | 8/2004 | Keller |
| 6,789,839 B1 | 9/2004 | Samuelson |
| 6,799,791 B2 | 10/2004 | Reiman et al. |
| 6,846,035 B2 | 1/2005 | Wong et al. |
| 6,854,788 B1 | 2/2005 | Graham |
| 6,877,793 B2 | 4/2005 | Cory |
| 6,886,882 B2 | 5/2005 | Farlow et al. |
| 6,915,611 B2 | 7/2005 | Reiman et al. |
| 6,959,958 B2 | 11/2005 | Basford |
| 6,974,178 B2 | 12/2005 | Ortega et al. |
| 7,008,004 B2 | 3/2006 | Ortega et al. |
| 7,008,005 B1 | 3/2006 | Graham |
| 7,118,164 B2 | 10/2006 | Frank et al. |
| 7,147,270 B1 | 12/2006 | Andrus et al. |
| 7,192,077 B1 | 3/2007 | Hilleman et al. |
| 7,207,620 B2 | 4/2007 | Cosgrove et al. |
| 7,240,958 B2 | 7/2007 | Skopic et al. |
| 7,243,980 B2 | 7/2007 | Vala |
| 7,374,229 B1 | 5/2008 | Noll et al. |
| 7,374,230 B2 | 5/2008 | Breidenbach et al. |
| 7,380,868 B2 * | 6/2008 | Breidenbach ........ B62D 35/001 296/180.1 |
| 7,404,592 B2 | 7/2008 | Reiman et al. |
| 7,431,381 B2 | 10/2008 | Wood et al. |
| 7,484,791 B1 | 2/2009 | Chen et al. |
| 7,549,695 B2 | 6/2009 | Royer et al. |
| 7,578,541 B2 | 8/2009 | Layfield et al. |
| 7,618,086 B2 | 11/2009 | Breidenbach et al. |
| 7,625,034 B1 | 12/2009 | Fitzgerald et al. |
| 7,641,262 B2 | 1/2010 | Nusbaum et al. |
| 7,712,821 B2 | 5/2010 | Gómez et al. |
| 7,740,304 B1 | 6/2010 | Breu et al. |
| 7,748,771 B2 | 7/2010 | Distel et al. |
| 7,748,772 B2 | 7/2010 | Boivin et al. |
| 7,780,224 B2 | 8/2010 | Roush et al. |
| 7,784,854 B2 | 8/2010 | Breidenbach et al. |
| 7,789,412 B2 | 9/2010 | Algüera et al. |
| 7,789,453 B2 | 9/2010 | Roush et al. |
| 7,794,011 B2 | 9/2010 | Kjellgren et al. |
| 7,806,464 B2 | 10/2010 | Cardolle et al. |
| 7,845,708 B2 | 12/2010 | Breidenbach |
| 7,850,224 B2 | 12/2010 | Breidenbach et al. |
| 7,854,468 B2 | 12/2010 | Vogel et al. |
| 7,857,376 B2 | 12/2010 | Breidenbach |
| 7,862,102 B1 | 1/2011 | Benton et al. |
| 7,887,120 B2 | 2/2011 | Boivin et al. |
| 7,938,475 B2 | 5/2011 | Boivin et al. |
| 7,942,467 B2 | 5/2011 | Boivin et al. |
| 7,942,468 B2 | 5/2011 | Boivin et al. |
| 7,942,469 B2 | 5/2011 | Boivin et al. |
| 7,942,470 B2 | 5/2011 | Boivin et al. |
| 7,942,471 B2 | 5/2011 | Boivin et al. |
| 7,950,720 B2 | 5/2011 | Skopic et al. |
| 7,976,096 B2 | 7/2011 | Holubar et al. |
| 7,992,923 B2 | 8/2011 | Dayton et al. |
| D649,090 S | 11/2011 | Boivin et al. |
| 8,079,634 B2 | 12/2011 | Visser et al. |
| 8,100,461 B2 | 1/2012 | Smith et al. |
| 8,177,287 B2 | 5/2012 | Vogel et al. |
| 8,251,436 B2 | 8/2012 | Henderson et al. |
| 8,272,680 B2 | 9/2012 | Breidenbach |
| 8,292,351 B2 | 10/2012 | Boivin et al. |
| 8,360,509 B2 | 1/2013 | Grossmann et al. |
| 8,360,510 B2 | 1/2013 | Smith et al. |
| 8,449,017 B2 | 5/2013 | Boivin et al. |
| 8,480,162 B2 | 7/2013 | Breidenbach et al. |
| 8,590,961 B2 | 11/2013 | Breidenbach |
| 8,608,228 B2 | 12/2013 | Visentin et al. |
| 8,622,461 B2 | 1/2014 | Breidenbach et al. |
| 8,678,474 B1 | 3/2014 | Boivin et al. |
| 8,708,398 B2 | 4/2014 | Breidenbach |
| 8,708,399 B2 | 4/2014 | Grossmann et al. |
| 8,845,007 B2 | 9/2014 | Tuerk et al. |
| 8,876,191 B2 | 11/2014 | Breidenbach |
| 9,039,069 B2 | 5/2015 | Smith et al. |
| 9,126,638 B2 | 9/2015 | Breidenbach |
| 9,145,177 B2 | 9/2015 | Smith et al. |
| 9,180,919 B2 | 11/2015 | Breidenbach |
| 2002/0005655 A1 | 1/2002 | Bauer et al. |
| 2002/0021023 A1 | 2/2002 | Leban et al. |
| 2002/0030384 A1 | 3/2002 | Basford et al. |
| 2003/0057736 A1 | 3/2003 | Long et al. |
| 2003/0205913 A1 | 11/2003 | Leonard et al. |
| 2003/0227194 A1 | 12/2003 | Farlow et al. |
| 2004/0118055 A1 | 6/2004 | Reiman et al. |
| 2004/0119319 A1 | 6/2004 | Reiman et al. |
| 2004/0256885 A1 | 12/2004 | Bui et al. |
| 2004/0261335 A1 | 12/2004 | Eungard |
| 2005/0040637 A1 | 2/2005 | Wood et al. |
| 2005/0146161 A1 | 7/2005 | Uland et al. |
| 2005/0159075 A1 | 7/2005 | Isobe et al. |
| 2005/0204681 A1 | 9/2005 | Zeigler et al. |
| 2006/0157623 A1 | 7/2006 | Voglsinger et al. |
| 2006/0252361 A1 | 11/2006 | Henderson et al. |
| 2006/0273625 A1 | 12/2006 | Andrus et al. |
| 2007/0001481 A1 | 1/2007 | Breidenbach |
| 2007/0120397 A1 | 5/2007 | Layfield et al. |
| 2007/0126261 A1 | 6/2007 | Breidenbach |
| 2007/0200390 A1 | 8/2007 | Lotarev et al. |
| 2007/0228772 A1 | 10/2007 | Froeschle et al. |
| 2007/0246969 A1 | 10/2007 | Smith et al. |
| 2008/0048468 A1 | 2/2008 | Holubar et al. |
| 2008/0061597 A1 | 3/2008 | Reiman et al. |
| 2008/0061598 A1 | 3/2008 | Reiman et al. |
| 2008/0093886 A1 | 4/2008 | Nusbaum et al. |
| 2008/0184835 A1 | 8/2008 | Breidenbach et al. |
| 2008/0217957 A1 | 9/2008 | Schoon et al. |
| 2008/0272617 A1 | 11/2008 | Roush et al. |
| 2008/0290686 A1 | 11/2008 | Royer et al. |
| 2008/0303310 A1 | 12/2008 | Breidenbach et al. |
| 2008/0309122 A1 | 12/2008 | Smith et al. |
| 2009/0096250 A1 | 4/2009 | Kohls et al. |
| 2009/0140542 A1 | 6/2009 | Breidenbach et al. |
| 2009/0146453 A1 | 6/2009 | Ortega et al. |
| 2009/0179456 A1* | 7/2009 | Holubar ............... B62D 35/001 296/180.4 |
| 2009/0200834 A1* | 8/2009 | Vogel .................. B62D 35/001 296/180.3 |
| 2009/0212594 A1 | 8/2009 | Breidenbach et al. |
| 2009/0212595 A1 | 8/2009 | Heppel et al. |
| 2009/0212596 A1 | 8/2009 | Reiman et al. |
| 2009/0230726 A1 | 9/2009 | Reiman et al. |
| 2009/0236872 A1 | 9/2009 | Wood et al. |
| 2010/0066123 A1 | 3/2010 | Ortega et al. |
| 2010/0106380 A1 | 4/2010 | Salari et al. |

(56) References Cited

U.S. PATENT DOCUMENTS

| | | |
|---|---|---|
| 2010/0164249 A1 | 7/2010 | Nusbaum et al. |
| 2010/0201153 A1 | 8/2010 | Pesotini et al. |
| 2010/0222671 A1 | 9/2010 | Cohen et al. |
| 2010/0225143 A1 | 9/2010 | Skopic et al. |
| 2011/0037291 A1 | 2/2011 | Pickering et al. |
| 2011/0068605 A1 | 3/2011 | Domo et al. |
| 2011/0084516 A1 | 4/2011 | Smith et al. |
| 2011/0084517 A1 | 4/2011 | Vogel et al. |
| 2011/0095564 A1 | 4/2011 | Chen et al. |
| 2011/0095565 A1 | 4/2011 | Chen et al. |
| 2011/0095566 A1 | 4/2011 | Chen et al. |
| 2011/0115254 A1 | 5/2011 | Skopic et al. |
| 2011/0175394 A1 | 7/2011 | Breidenbach et al. |
| 2011/0210578 A1 | 9/2011 | Breidenbach et al. |
| 2011/0304173 A1 | 12/2011 | Breidenbach et al. |
| 2012/0001451 A1 | 1/2012 | Breidenbach et al. |
| 2012/0086233 A1 | 4/2012 | Visser et al. |
| 2012/0086234 A1 | 4/2012 | Visser et al. |
| 2012/0104792 A1 | 5/2012 | Smith et al. |
| 2012/0223544 A1 | 9/2012 | Benton et al. |
| 2012/0235441 A1 | 9/2012 | Dayton et al. |
| 2012/0299330 A1 | 11/2012 | Breidenbach et al. |
| 2013/0038086 A1 | 2/2013 | Breidenbach et al. |
| 2013/0057019 A1 | 3/2013 | Breidenbach et al. |
| 2013/0076064 A1 | 3/2013 | Smith et al. |
| 2013/0106136 A1 | 5/2013 | Smith et al. |
| 2013/0175824 A1 | 7/2013 | Smith et al. |
| 2013/0249241 A1 | 9/2013 | Baker et al. |
| 2014/0117713 A1 | 5/2014 | Baker et al. |
| 2014/0217775 A1 | 8/2014 | Breidenbach et al. |
| 2014/0319870 A1 | 10/2014 | Breidenbach et al. |
| 2014/0346807 A1 | 11/2014 | Breidenbach |
| 2015/0266520 A1 | 9/2015 | Breidenbach |

FOREIGN PATENT DOCUMENTS

| | | |
|---|---|---|
| CA | 2221593 A1 | 7/1999 |
| CA | 2311204 A1 | 1/2001 |
| CA | 2281064 A1 | 2/2001 |
| CA | 2315339 A1 | 2/2001 |
| CA | 2316584 A1 | 2/2001 |
| CA | 2450243 A1 | 12/2002 |
| CA | 2510464 A1 | 7/2004 |
| CA | 2361224 C | 2/2006 |
| DE | 2911084 A1 | 9/1980 |
| DE | 2922130 A1 | 12/1980 |
| DE | 3817497 A1 | 12/1988 |
| DE | 19524825 A1 | 1/1997 |
| DE | 19640965 A1 | 4/1997 |
| DE | 29705882 U1 | 7/1997 |
| DE | 29623407 U1 | 7/1998 |
| DE | 10228658 A1 | 1/2004 |
| DE | 10240504 A1 | 3/2004 |
| DE | 10316105 A1 | 10/2004 |
| EP | 1870321 A1 | 12/2007 |
| FR | 2623155 A1 | 5/1989 |
| GB | 2207398 A | 2/1989 |
| JP | 06016157 A | 1/1994 |
| WO | 2007079306 A2 | 7/2007 |
| WO | 2007005344 | 10/2007 |
| WO | 2008024386 A2 | 2/2008 |
| WO | 2008124573 A1 | 10/2008 |
| WO | 2008144025 A3 | 1/2009 |
| WO | 2014011886 A1 | 1/2014 |

OTHER PUBLICATIONS

Clarkson University, Kenneth Visser, 2 pages, http://www.clarkson.edu/mae/faculty_pages/visser.html.

International Search Report and Written Opinion of the International Searching Authority of the European Patent Office for PCT/US2012/056365, mailed Feb. 27, 2013. 10 pages.

International Search Report and Written Opinion of the International Searching Authorityof the European Patent Office for PCT/US2008/006374, mailed Nov. 14, 2008. 14 pages.

International Search Report and Written Opinion of the International Searching Authorityof the European Patent Office for PCT/US2011/055758, mailed Mar. 2, 2012. 13 pages.

International Search Report and Written Opinion of the International Searching Authorityof the European Patent Office for PCT/US2013/050083, mailed Oct. 24, 2013. 9 pages.

International Search Report and Written Opinion of the International Searching Authorityof the United States Patent Office for PCT/US12/62237, mailed Jan. 15, 2013. 8 pages.

International Search Report and Written Opinion, Mailed Apr. 6, 2015 for PCT/US14/49201. 8 pages.

Ken Visser, "Drag Reduction of Tractor Trailers", Clarkson University, Nov. 2005, 4 pages.

Machine translation of DE19524825 printed from the internet Nov. 3, 2010.

McCallen, et al., "Progress in Reducing Aerodynamic Drag for Higher Efficiency of Heavy Duty Trucks (Class 7-8)", Lawrence Livermore National Laboratory, Apr. 1999, 14 pages.

Ogburn, et al., "Truck Efficiency and GHG Reduction Opportunities in the Canadian Truck Fleet", Rocky Mountain Institute, 13 pages.

Ortega, et al., "An Experimental Study of Drag Reduction Devices for a Trailer Underbody and Base", Lawrence Livermore National Laboratory, Jun. 4, 2004, 17 pages.

Randal Scott Funderburk, "An Investigation of a Drag Reducing Device for Tractor-Trailers", A Thesis in Mechanical Engineering, May 1996, 128 pages.

Randall L. Peterson, "Drag Reduction Obtained by the Addition of a Boattail to a Box Shaped Vehicle", NASA Contractor Report 163113, Aug. 1981, 32 pages.

Salari, "Heavy Vehicle Drag Reduction Devices: Computational Evaluation & Design", DOE Heavy Vehicle Systems Review, Apr. 2006, 24 pages.

Smith, et al., "U.S. Appl. No. 61/600,579, Rear-Mounted Retractable Aerodynamic Structure for Cargo Bodies", Published in: US.

U.S. Department of Energy, "Heavy Vehicle Systems Optimization", FreedomCAR and Vehicle Technologies Program, 2004 Annual Progress Report, Feb. 2005, 206 pages.

U.S. Appl. No. 60/927,614, titled "Aerodynamic Trailer With Sliding Rear Door", filed May 4, 2007 by Mark Roush.

U.S. Appl. No. 60/938,697, titled "Rear-Mounted Aerodynamic Structure for Truck Cargo Bodies", filed May 17, 2007 by Andrew F. Smith et al.

U.S. Appl. No. 61/039,411, titled "Rear-Mounted Aerodynamic Structure for Truck Cargo Bodies", filed Mar. 25, 2008 by Andrew F. Smith et al.

U.S. Appl. No. 61/065,490, titled "Self-Deploying Drag Reducing Device", filed Feb. 12, 2008 by Lee Telnack, et al.

U.S. Appl. No. 61/070,669, titled "Rounded Cargo Doors for Trailers and Trucks", filed Mar. 25, 2008 by Mark Roush.

U.S. Appl. No. 61/070,670, titled "Drag Reduction Arrangement for Cargo Trucks and Trailers", filed Mar. 25, 2008 by Mark Roush.

* cited by examiner

TO CONTROLLER

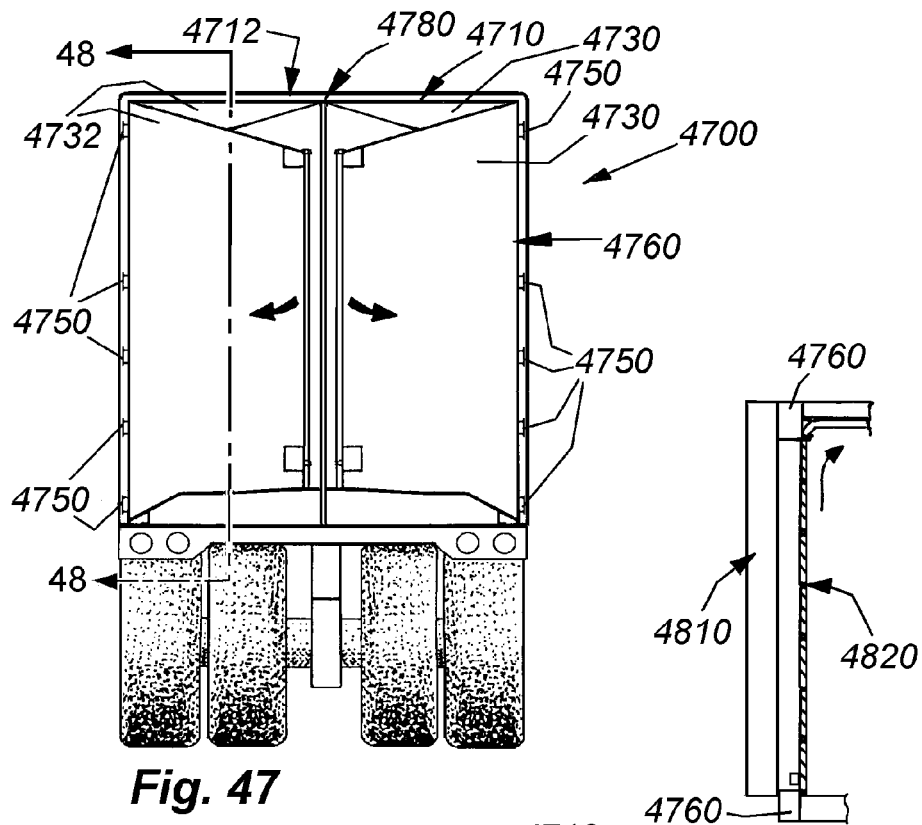
Fig. 47
FIG. 48
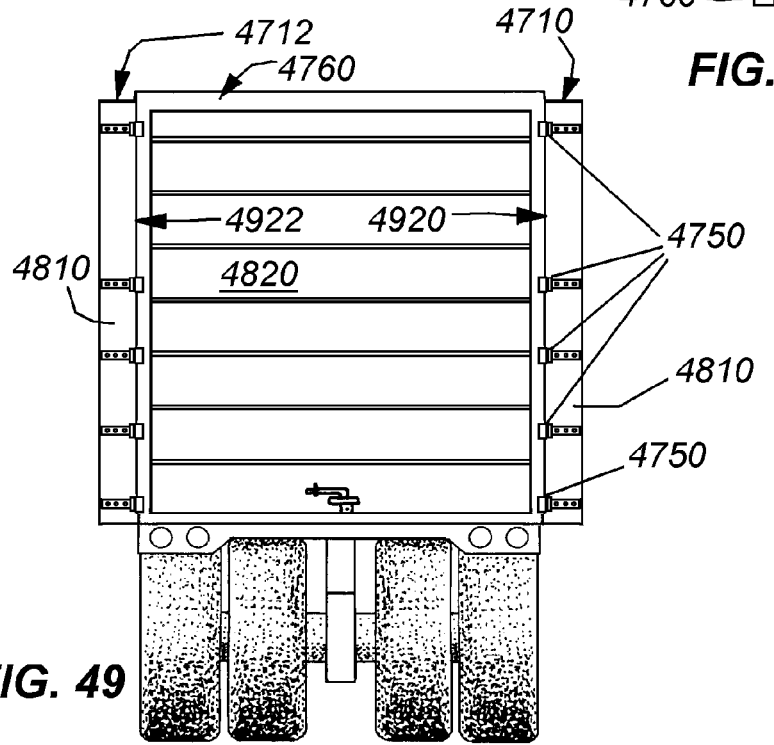
FIG. 49

REAR-MOUNTED AERODYNAMIC STRUCTURE FOR TRUCK CARGO BODIES

CROSS-REFERENCE TO RELATED APPLICATIONS

This application is a continuation of U.S. patent application Ser. No. 13/752,368, entitled REAR-MOUNTED AERODYNAMIC STRUCTURE FOR TRUCK CARGO BODIES, filed Jan. 28, 2013, now U.S. Pat. No. 9,039,069, issued May 26, 2015, which is a continuation of U.S. patent application Ser. No. 13/343,288, entitled REAR-MOUNTED AERODYNAMIC STRUCTURE FOR TRUCK CARGO BODIES, filed Jan. 4, 2012, now U.S. Pat. No. 8,360,510, issued Jan. 29, 2013, which is a continuation of U.S. patent application Ser. No. 12/122,645, entitled REAR-MOUNTED AERODYNAMIC STRUCTURE FOR TRUCK CARGO BODIES, filed May 16, 2008, now U.S. Pat. No. 8,100,461, issued Jan. 24, 2012, which claims the benefit of U.S. Provisional Application Ser. No. 60/938,697, entitled REAR-MOUNTED AERODYNAMIC STRUCTURE FOR TRUCK CARGO BODIES, now expired, and U.S. Provisional Application Ser. No. 61/039,411 also entitled REAR-MOUNTED AERODYNAMIC STRUCTURE FOR TRUCK CARGO BODIES, now expired, the teachings each of which applications are expressly incorporated herein by reference.

FIELD OF THE INVENTION

This invention relates to aerodynamic fairings for truck bodies and other large cargo vehicles, and more particularly to aerodynamic fairings and structures that are attached to the rear of the vehicle.

BACKGROUND OF THE INVENTION

Trucking is the primary mode of long-distance and short-haul transport for goods and materials in the United States, and many other countries. Trucks typically include a motorized cab in which the driver sits and operates the vehicle. The cab is attached to a box-like cargo section. Smaller trucks typically include an integral cargo section that sits on a unified frame which extends from the front wheels to the rear wheel assembly. Larger trucks often include a detachable cab unit, with multiple driven axles, and a separate trailer with a long box-like cargo unit seated atop two or more sets of wheel assemblies. These truck assemblages are commonly referred to as "semi-trailers" or "tractor trailers." Most modern trucks' cabs—particularly those of tractor trailers, have been fitted with aerodynamic fairings on their roof, sides and front. These fairings assist in directing air over the exposed top of the box-like cargo body, which typically extends higher (by several feet) than the average cab roof. The flat, projecting front face of a cargo body is a substantial source of drag, above the cab roof. The use of such front-mounted aerodynamic fairings in recent years has served to significantly lower drag and, therefore, raise fuel economy for trucks, especially those traveling at high speed on open highways.

However, the rear end of the truck's cargo body has remained the same throughout its history. This is mainly because most trucks include large swinging or rolling doors on their rear face. Trucks may also include a lift gate or a lip that is suited particularly to backing the truck into a loading dock area so that goods can be unloaded from the cargo body. It is well-known that the provision of appropriate aerodynamic fairings (typically consisting of an inwardly tapered set of walls) would further reduce the aerodynamic profile of the truck by reducing drag at the rear face. The reduction of drag, in turn, increases fuel economy. By way merely of background, one such aerodynamic structure is shown and described in U.S. Pat. No. 6,595,578 entitled TRUCK AFTER-BODY DRAG REDUCTION DEVICE, by Kyril Calsoyas, et al., the teachings of which are expressly incorporated herein by reference.

Nevertheless, most attempts to provide aerodynamic structures that integrate with the structure and function of the rear cargo doors of a truck have been unsuccessful and/or impractical to use and operate. Such rear aerodynamic structures are typically large and difficult to remove from the rear so as to access the cargo doors when needed. One approach is to provide a structure that swings upwardly, completely out of the path of the doors. However, aerodynamic structures that swing upwardly require substantial strength or force to be moved away from the doors, and also require substantial height clearance above an already tall cargo body. Other solutions have attempted to provide an aerodynamic structure that hinges to one side of the cargo body. While this requires less force to move, it also requires substantial side clearance—which is generally absent from a closely packed, multi-truck loading dock.

In fact, most loading dock arrangements require that the relatively thin cargo doors of conventional trucks swing open fully to about 270 degrees so that they can be latched against the adjacent sides of the cargo body. Only in this manner can the truck be backed into a standard-side-clearance loading dock, which is often populated by a line of closely-spaced trailers that are frequently entering and leaving the dock. In such an environment, side-projecting or top-projecting fairings would invariably interfere with operations at the loading dock.

A possible solution is to bifurcate the aerodynamic structure into a left hinged and a right-hinged unit that defines a complete unit when closed, and hinges open to reveal the doors. However, the two separate sections still present a large projection that would be incapable of swinging the requisite 270 degrees, and would undesirably tend to project into the adjacent loading bays when opened.

Another alternative is to remove the fairing structure from the truck before it is parked at the loading bay. However, the removed structure must then be placed somewhere during the loading/unloading process. Because most truck doors are relatively large, being in the range of approximately 7-8 feet by 8-9 feet overall, removing, manipulating and storing a fairing in this manner may be impractical, or impossible, for the driver and loading dock staff.

In the face of ever-increasing fuel costs, it is critical to develop aerodynamic structures that can be applied to the rear of a truck cargo body, either as an original fitment, or by retrofit to existing vehicles. These structures should exhibit durability and long service life, be easy to use by the average operator, not interfere with normal loading and unloading operations through a rear cargo door, and not add substantial additional cost or weight to the vehicle. The structure should exhibit a low profile on the vehicle frame and/or doors, not impede side clearance when the doors are opened, and where possible, allow for clearance with respect to conventional door latching mechanisms. Such structures should also allow for lighting on the rear, as well as other legally required structures. Moreover, given the large existing fleet of trucks and trailers, it is highly desirable that an aerodynamic structure be easily and inexpensively retrofit-table to a wide range of existing vehicles without undue customization.

SUMMARY OF THE INVENTION

This invention overcomes the disadvantages of the prior art by providing an aerodynamic structure attached to the rear face of a truck cargo body, which rear typically contains a door assembly, with a plurality of doors that swing open on hinges, or a single, full-width door, which rolls upwardly. The various embodiments of the invention allow an aerodynamic structure to be permanently attached to the rear of the trailer in a manner that would obscure access to the door(s) in a deployed position, in which the aerodynamic structure generates reduced drag on the trailer body, yet enables ready access to the door(s) in a folded position. The folded position still allows the rear of the trailer to be fully accessible for loading and unloading, and in the case of swinging, hinged doors (among others), allows the doors to be folded through a full 270-degree arc from a closed position to a position flush along the sides of the vehicle, with a minimal sideways projection. The various embodiments also enable relatively rapid and easy transition between the folded position and the deployed position using a variety of actuators and linkages that tie the folding and deployment of various panels of the structure together. This allows an operator to selectively fold and deploy the structure without undue effort or strength.

In an embodiment of the invention, the structure consists of a pair of opposing side or lateral panels that are oriented vertically and an assembly of upper and lower panels (or at least an upper panel) that adjoin the lateral panels. The structure is divided into a respective portion on each adjoining door—or is otherwise divided between the overall width of the trailer rear. This can be implemented by dividing the upper/lower panels along a medial dividing line so each half folds upon the underlying door. The four (or three) panels of each of the two, side-by-side hinged aerodynamic structure portions are separate, rigid, semi-rigid or semi-flexible panel units, which are each manually or automatically unfolded into the desired, tapered aerodynamic structure, and then locked in place with respect to each other.

In another embodiment of this invention, all the panels of the aerodynamic structure portion on a given door are interconnected by hinges so that the overall tapered box defines an "origami" type of folding arrangement. In such an arrangement, a vertical, medial panel is divided into three separate panel sections with the its upper and lower panel sections joined to adjacent horizontal top and bottom surfaces. The horizontal upper and lower surfaces are, likewise, each divided diagonally into a pair of upper and lower panel sections, respectively. The opposing upper and lower panels are hingedly attached to a one-piece outer vertical panel. When either the medial panel or the outer panel is moved toward or away from the underlying truck rear face/door, the force is transmitted throughout the structure, causing it to either fold or unfold, respectively. The separate panels are joined by sliding hinges or another type of hinge assembly (such as a flexible material) that facilitates the folding of each panel over the other by allowing the joined panel to translate, as well as rotate in two degrees of freedom. This facilitates the requisite origami folding pattern by allowing movement in two degrees of freedom. This accommodates the fact that the panels have a finite thickness.

The aerodynamic panels can be deployed from a folded orientation and refolded against the doors in a variety of manners. In general it is desirable to provide an easy and accessible technique to deploy the panels without need to access the upper panels—which may be hard for an operator to reach. A variety of illustrative systems and methods can be employed to coordinate deployment and folding of the panels—typically the upper and lower panels. The lower panels can be coupled to the upper panels using a linkage such as a swing arm framework that employs tie rods on each opposing panel (upper and lower), and also join to a central swinging arm structure with a vertical hinge axis. The movement of the lower panel is translated into a swinging motion about the vertical hinge axis that translates the motion to the upper panel. Other linkage mechanisms for a pair of opposing (typically upper and lower) panels include a folding medial panel attached to each door's upper and lower panels, a pneumatic/hydraulic master cylinder and slave cylinder, a flexible cable and/or an eccentric linking bar. In general, these linking mechanisms ensure that, when the lower panel is folded/deployed, the upper panel follows.

In one embodiment the upper and lower panels can be locked together using corner-mounted latches on one of the adjoining panels (typically the lateral panel) that engage lock pins on the other of the panels (typically each of the upper and lower panel). The latches can be spring-loaded and release together using a connecting linkage, such as a cord. In another embodiment the upper and lower panels can be locked and unlocked using a series of rotating blocks interconnected with vertical, rear-edge-mounted rods. In an "origami" embodiment, the medial panel of each folding structure portion interconnects with a stiffener bar that extends into an overlapping relation with the top and bottom medial panel sections, but is unattached to the top and bottom medial panel sections. A cord runs through a hollow aperture in the stiffener bar between an attachment point on one adjacent medial panel section and a loop on the opposing medial panel section. When the cord is tensioned, the stiffener bar is biased by the taut cord into engagement with the upper and lower medial panel sections, thereby forming a single, planar media panel. This motion forces the unfolding of the adjacent, interconnected horizontal and outer panel sections, thereby deploying the aerodynamic structure.

Linear actuators, or other mechanisms, can be used to automatically deploy and retract the origami-type structure (or other folding aerodynamic structures defined herein). The actuators can be located along the door or another portion of the rear of the trailer and can bear upon the medial panel, the outer vertical panel, or both. A controller can be provided, so that panels are automatically deployed at, or above, a given speed (for example, over 35 mph), and refracted below a given speed. Alternatively, the driver can control deployment and refraction from the cab.

In illustrative embodiments of the present invention, the aerodynamic structure can be mounted on a door with extended hinges that either overlie conventional, original butt hinges of a retrofitted trailer door frame, or are placed remote from the original hinges. In an illustrative implementation, the hinges can be formed with a streamlined outer cover, or constructed as part of an overall, elongated butt plate with cutouts and clevis plates attached at desired locations based upon the locations of preexisting hinge devises. The butt plate is applied to the corner of the trailer frame thereby forming a relatively continuous and streamlined rear hinge extension. The pivot axis points of the extended hinges allow for a larger swing that enable the thickened door with the folded stack-up of aerodynamic panels to open approximately 270 degrees to a position flush with the side of the trailer. This facilitates movement of the trailer into a narrow loading dock space without interference by the aerodynamic structure. The extended hinges of various embodiments can have pivot points located anywhere within an arc relative to the original hinge axis points so as to extend the swing of the door and allow the doors with folded panels to be located adjacent to the side of the trailer.

In another embodiment, instead of the above-described single axis extended hinge, the extended hinge assembly can define a multi-axis hinge having at least one central hinge clevis. This multi-axis hinge assembly provides at least two separate, parallel hinge pivots that allow the thickened door unit (with attached spacer frame and nested, folded panels) to be opened a full 270 degrees so as to lie against the adjacent side of the cargo box. In one example, at least two of the hinge assemblies on each door can be geared so as to prevent racking of the door as it swings by maintaining it within a predetermined swing pattern as defined by meshing gears in each assembly. In other examples, the doors can be conventionally hinged, using extended hinge pivots, or another type of multi-axis hinge, such as a four-bar linkage, can be employed.

In various embodiments in which the trailer employs hinged doors, lock rods are used to secure the doors near the medial joint line therebetween. To allow for clearance over these lock rods when the panel structure is folded, the panels (upper and lower, for example) can be located on hinges that define an axis with a rearwardly directed angle when folded against the door so as to provide the needed clearance. This angled fold-line allows for decreased overall stack-up at the lateral side of the door, which results in less room needed between trailers at a dock when the doors are open. The panels can be mounted to the door on hinges with pivot points remote from the inner surface of the respective panel so that the forward (trailer-frame-confronting) edge is located adjacent to the side of the trailer body/door frame for added streamlining.

In another embodiment, to bridge the trailer door lock rods, a spacer frame can be attached onto or over a hinged trailer door and provide a hinged base member for a plurality of panels that, when folded or "collapsed," are substantially or fully nested within the spacer frame and, when deployed, define the desired rearwardly tapered box-like aerodynamic structure. Typically, there are two separate spacer frames, each mounted on a respective swinging door of the overall door assembly. In one embodiment, each spacer frame contains its own folding aerodynamic assembly/structure, and each structure can include a central or medial panel (also termed a "splitter," or another type of non-panel supporting member that defines a central support. Each splitter or medial panel relatively closely confronts the other medial panel. When the two aerodynamic structures are deployed they collectively define an aerodynamic structure having at least one tapered horizontal top surface and a pair of opposing tapered vertical side surfaces. The spacer frame is sized and arranged so that the various panels can be folded into an overlapping arrangement without binding on each other. In other words, some sides of the spacer frame are lower than others by an amount equal to, or greater than, the thickness of the attached panel.

The upper and lower panels of the structure can account for variability in the width of the doors, and any resulting gap by providing a medial wiper that seals between the medial facing edges of the panels to reduce/eliminate air leakage into the cavity defined by the panels. Other seals between panels, and between the panels and the door frame can also be provided. The presence of seals and other structures between the door and the frame can be accommodated by a spacer that positions the panel hinges rearwardly to overlie, for example, a preexisting door-to-frame gasket. The size of the spacer can be to allow accommodation of different-sized gaskets and differing positions for the forward end of the panel (to align its confrontation with the door frame edge).

In another embodiment, a door having relatively conventional hinges can be employed, with the door being modified to include inwardly (toward the cargo compartment) directed recesses into which individually house deployable, folded aerodynamic structures. The folded structures reside at, or below, the outer face of the surrounding door so that, when the doors are opened open to a 270-degree orientation from the closed position, they naturally lay flat against the trailer's sides with the structure-containing recesses projecting outwardly from the sides to a small degree.

In other embodiments, such as those applicable to a rolling rear cargo door (and also conventional, hinged, side-swinging doors), the aerodynamic structures can be provided on hinged secondary doors or frameworks that are separate from the underlying door, and are instead mounted on the outside trailer body frame that surrounds the door. To access the underlying cargo door, the two hinged structure frames are opened to 270 degrees, and secured to the sides of the trailer—and then the rolling door (or other form of door) is made accessible. Modified hinge assemblies using a central clevis and two spaced-apart parallel pivots can be employed to afford additional clearance needed to allow the frames to swing through 270 degrees. Likewise, the hinges for the secondary door or framework can be mounted on the above-described hinge butt plate, which is secured to the corner of the frame.

To facilitate required lighting in a flush-mounted, streamlined panel, lights can be surface mounted directly to the panel (particularly the upper panels). Alternatively, the aerodynamic structure can include a tapered frame-mounted header that includes built-in, flush-mounted lights. Likewise, the door frame-confronting edges of the panels (typically upper) can include a translucent or transparent section that expose lights mounted on the rear face of the frame while maintaining a streamlined structure. In another embodiment, the upper panels are mounted so that their adjacent edges mate with the top frame member at a location beneath any lighting on the top frame member of the trailer body so that the lighting remains visible.

In further embodiments of the invention a method for retrofitting an aerodynamic structure of a type described above is provided. This method includes identifying locations of existing door hinge devises and removing the existing doors from the existing devises. Extended hinge devises are applied to the door frame, either individually, or as part of the elongated hinge butt plate that overlies and is secured to the vertical corner of each side of the door frame. In manufacturing the butt plate, slots or cutouts are formed in locations that match those of the existing devises and opposing clevis plates with (typically rearward) extended pivot holes are attached to opposing sides of each cutout so as to eventually overlie the existing devises. The doors are provided with door hinge portions that are located to align with the extended devises. The door hinge portions can also include intermediate lateral panel hinges mounted on remote pivot axes formed on the hinge portions. The trailer doors are reattached to the new devises using hinge pivots, such as bolts that pass through a tube in the hinge portions and the new clevis plate holes. The lateral panels on each door are attached to the intermediate lateral panel hinges and the upper and lower panels are attached to the door with folding hinges that can include an angled hinge line so as to enable angled folding that clears the door lock rod. The upper and lower panels can each include a medial sealing strip that is cutout at the appropriate location to allow clearance for the lock rod without excessive air leakage there around. The medial wiper is attached to each medial sealing strip to ensure a wind-tight connection. In one embodiment, a swing arm linkage is attached at an appropriate location on each door. The tie rods between the upper and lower panels are secured between the swing arm and the respective panels and a central rod that is threaded to opposing ball joints is rotated to appropriately adjust the length of each tie rod and thus the corresponding level of each panel with respect to the other.

BRIEF DESCRIPTION OF THE DRAWINGS

The invention description below refers to the accompanying drawings, of which:

FIG. 47 is a rear view of a truck trailer cargo body rear according to an alternate embodiment, having aerodynamic structures separately hinged to the cargo door frame, shown in a closed orientation;

FIG. 48 is a partial side cross section of the truck trailer door and aerodynamic structure taken along line 48-48 of FIG. 47;

FIG. 49 is a rear view of the truck trailer cargo body of FIG. 47 showing the aerodynamic structures hingedly moved to an opened orientation and secured against the trailer sides so as to reveal a rolling cargo door;

DETAILED DESCRIPTION

Figure 1:
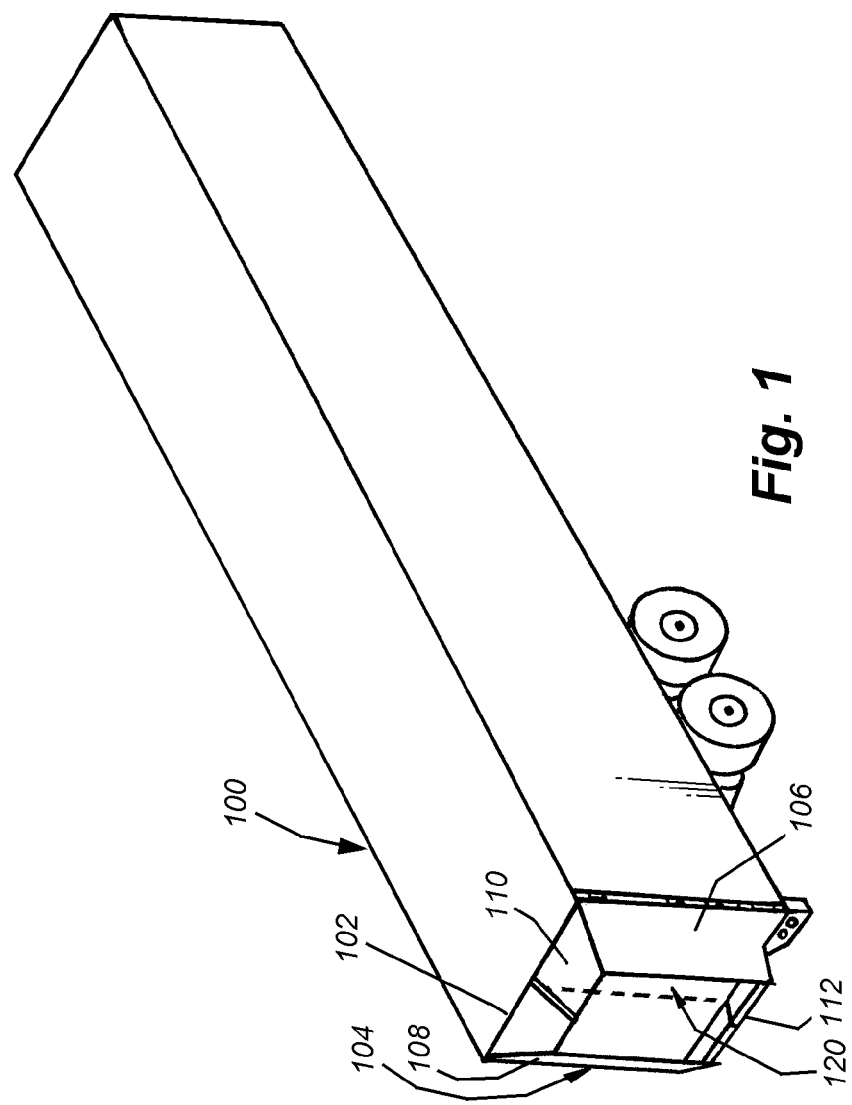
FIG. 1 is a perspective view of a truck trailer having an aerodynamic structure on its rear according to an illustrative embodiment of this invention.

An exemplary truck trailer section 100 is shown in FIG. 1. The cab has been removed in this depiction for further clarity, but can be any acceptable size, model, type and configuration of motorized unit. It can be assumed that this cab includes appropriate roof and side aerodynamic structures to enhance the overall aerodynamic efficiency of the assembled truck. In accordance with an embodiment of this invention the trailer section includes, at its rear end 102, an aerodynamic structure 104 consisting of four inwardly tapered aerodynamic surfaces or panels 106, 108, 110 and 112. The surfaces/panels are formed from rigid, semi-rigid or somewhat-flexible sheet material that, as will be described further below, can be folded along hinge lines, or otherwise refracted, to allow access to the doors 120 that are mounted on the back 102. The thickness and perimeter shape of the panels is highly variable. In an exemplary embodiment, the panels can be formed from a lightweight metal, like aluminum alloy or a synthetic composite, such as fiberglass or carbon-fiber composite. They panels should be able to withstand high winds experienced at highway speeds without excessive flapping or vibration. Internal stiffeners or ribs can be provided where appropriate. The panels have an exemplary thickness along their mid-regions of between approximately ⅛ inch and ¼ inch—but lesser or greater thicknesses are expressly contemplated. The overall structure extends rearwardly approximately four feet from the back of the trailer in the embodiment, but other distances of extension are expressly contemplated.

Figure 2:
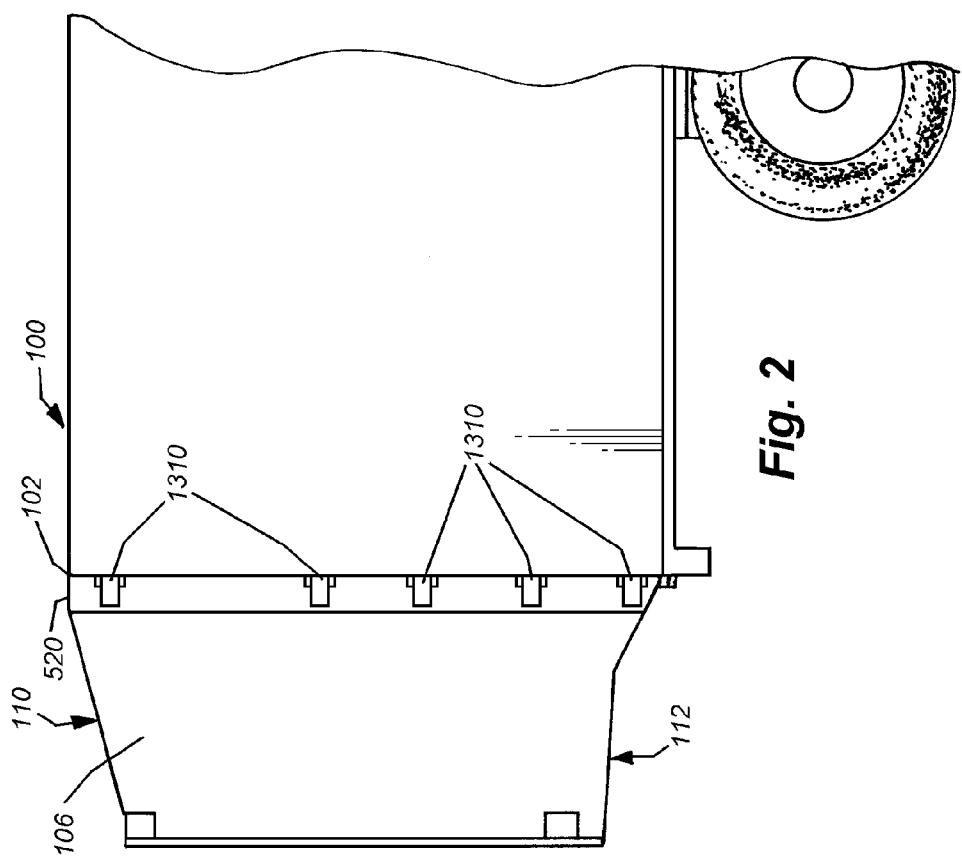
FIG. 2 is a partial side view of the truck trailer rear of FIG. 1.
Figure 3:
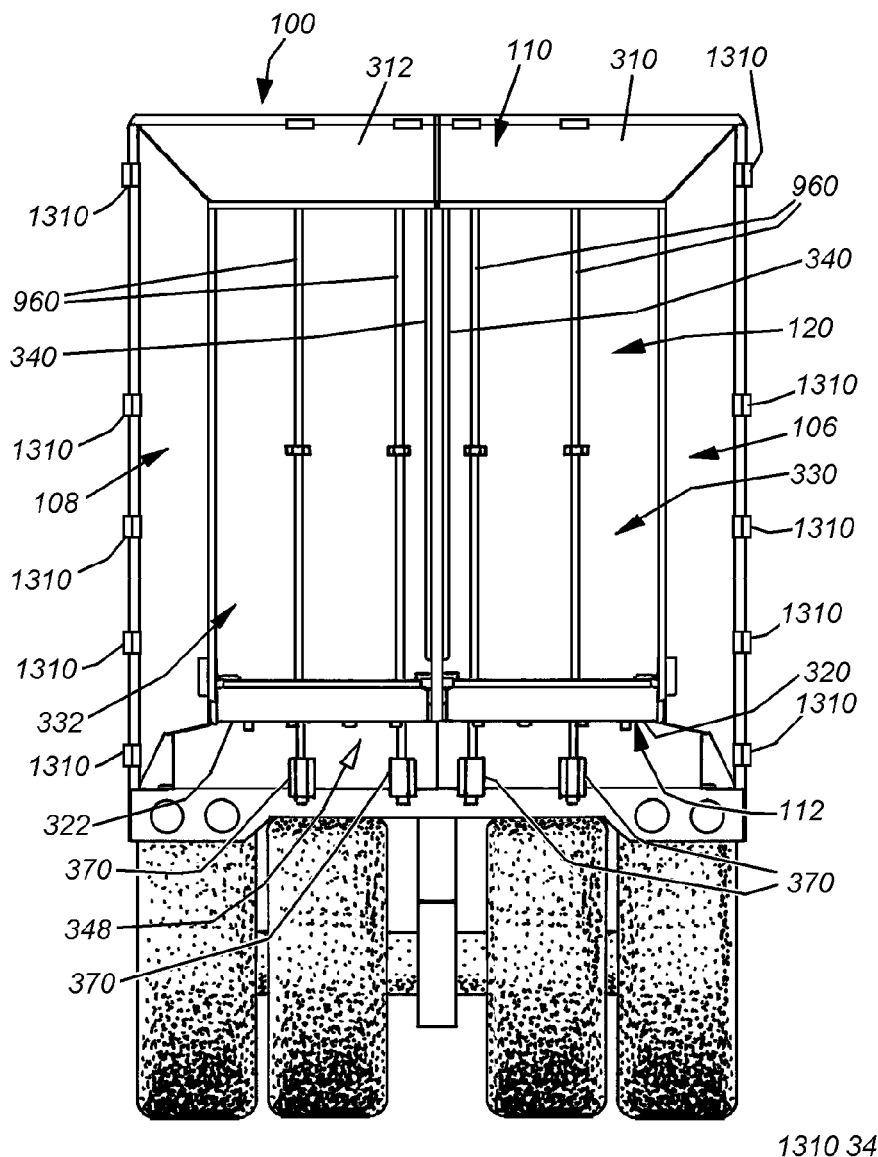
FIG. 3 is a rear view of the truck trailer rear of FIG. 1.
Figure 4:
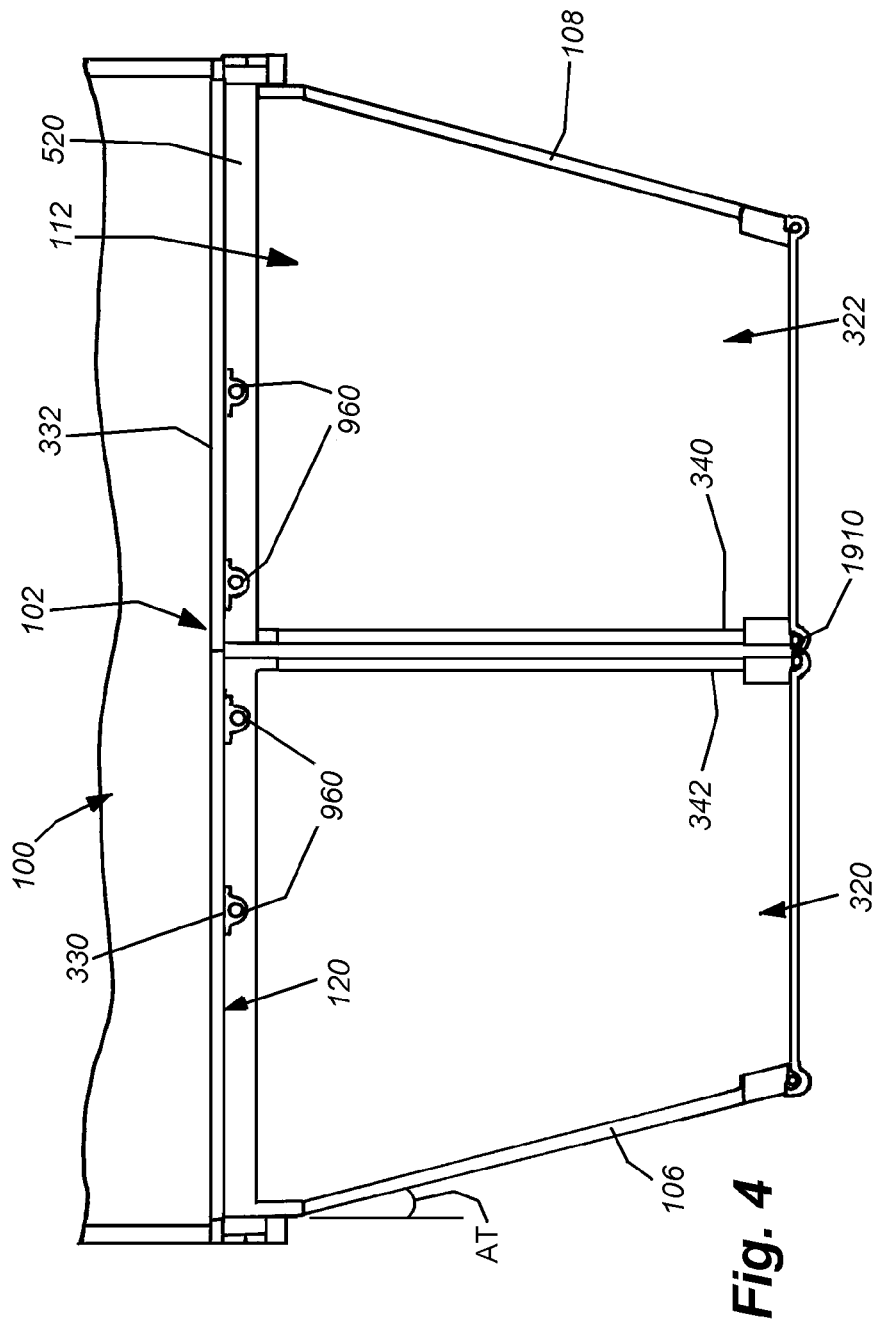
FIG. 4 is a partial top view of the truck trailer rear of FIG. 1.
Figure 5:
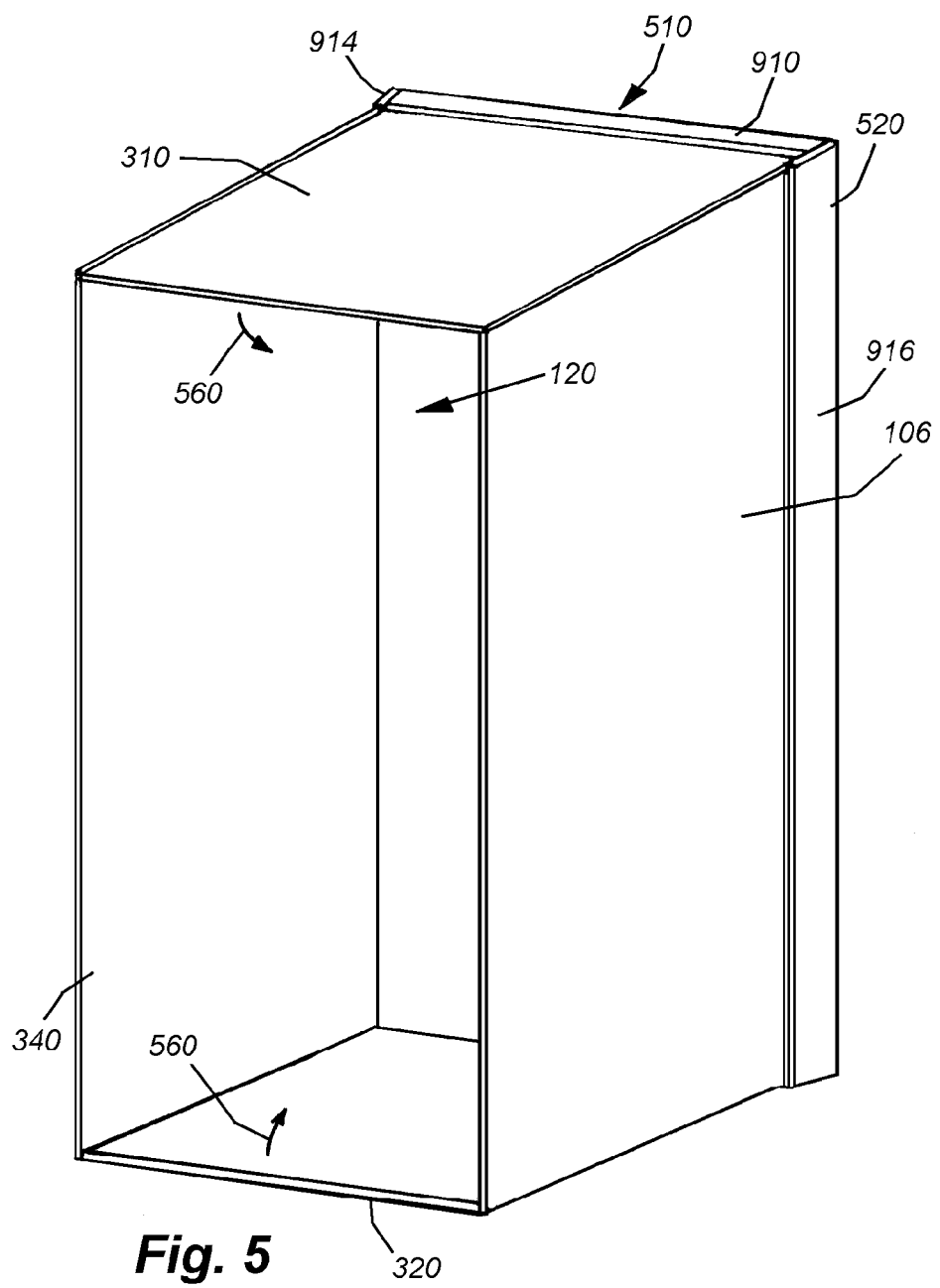
FIG. 5 is a perspective diagram of a deployed aerodynamic assembly for a single door showing the first step typical folding procedure in which the top and bottom horizontal panels are now folded so as to retract the assembly into the underlying spacer frame.

Referring to FIGS. 2-4, the rear or back 102 of the trailer cargo body 100 is shown in further detail. Referring first to the side view in FIG. 2, the top horizontal aerodynamic panel 110 and bottom horizontal aerodynamic panel 112 span between the illustrated external, right side vertical aerodynamic panel 106. A similar left side vertical aerodynamic panel 208 is also provided. Referring further to FIGS. 3 and 4, the top and bottom horizontal panels 110 and 112 each comprise a pair of adjacent right/left panels 310, 312, and 320, 322, respectively. In this manner, one half of the upper panel and the lower panel is attached to each door 330, 332 respectively. A pair of central or medial vertical panels 340 and 342 extend between respective top and lower panel sections 310, 320 and 312, 322 respectively. Thus, each door has attached thereto and individual tapered box-like aerodynamic assembly/structure. FIG. 5 describes one of these exemplary, individual aerodynamic structures 510 in further detail.

As shown in FIG. 5, the four aerodynamic panels 310, 320, 106 and 340 are all hingedly attached to a rectangular spacer frame 520 that acts as a fixed mounting base. The spacer frame 520, as will be described below, includes hinges along each of four sides that allow each of the panels hingedly attached aerodynamic panels to be folded inwardly toward the spacer frame. As shown in FIG. 5, an aerodynamic panel can be moved from the depicted deployed position to a folded, retracted position. In this example, the folding process begins by first folding inwardly the upper horizontal panel 310 and the bottom horizontal panel 320 as shown by arrows 560. While a spacer frame is employed in this exemplary embodiment, in illustrative embodiments described further below the stackup of folded panels can be reduced and other benefits can be achieved without the use of a spacer frame.

Figure 6:
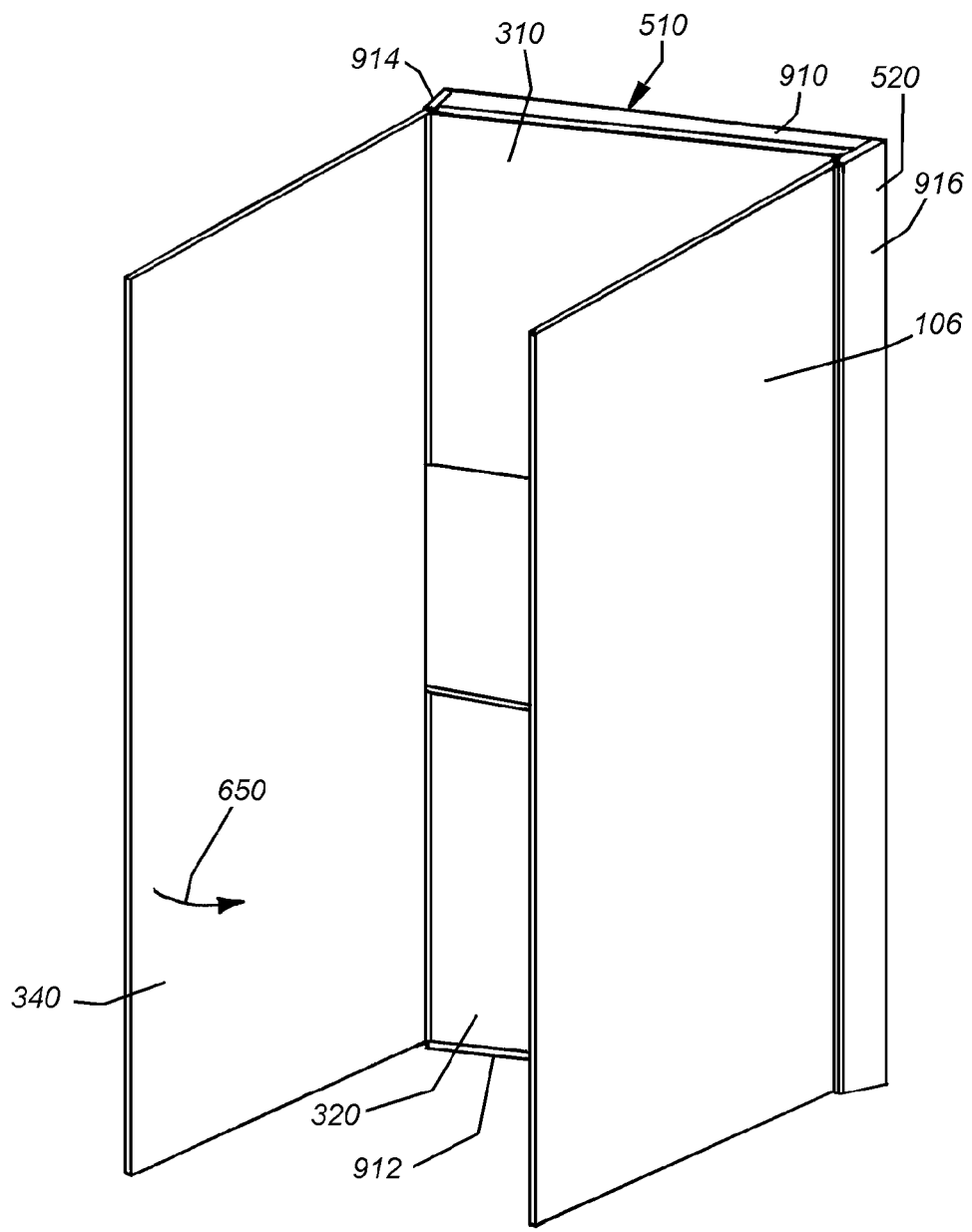
FIG. 6 is a perspective diagram of the arrangement of FIG. 5 showing the top and bottom horizontal panels folded against the frame and the vertical, central/medial panel now in the process of being folded in a subsequent folding procedure step.
Figure 7:
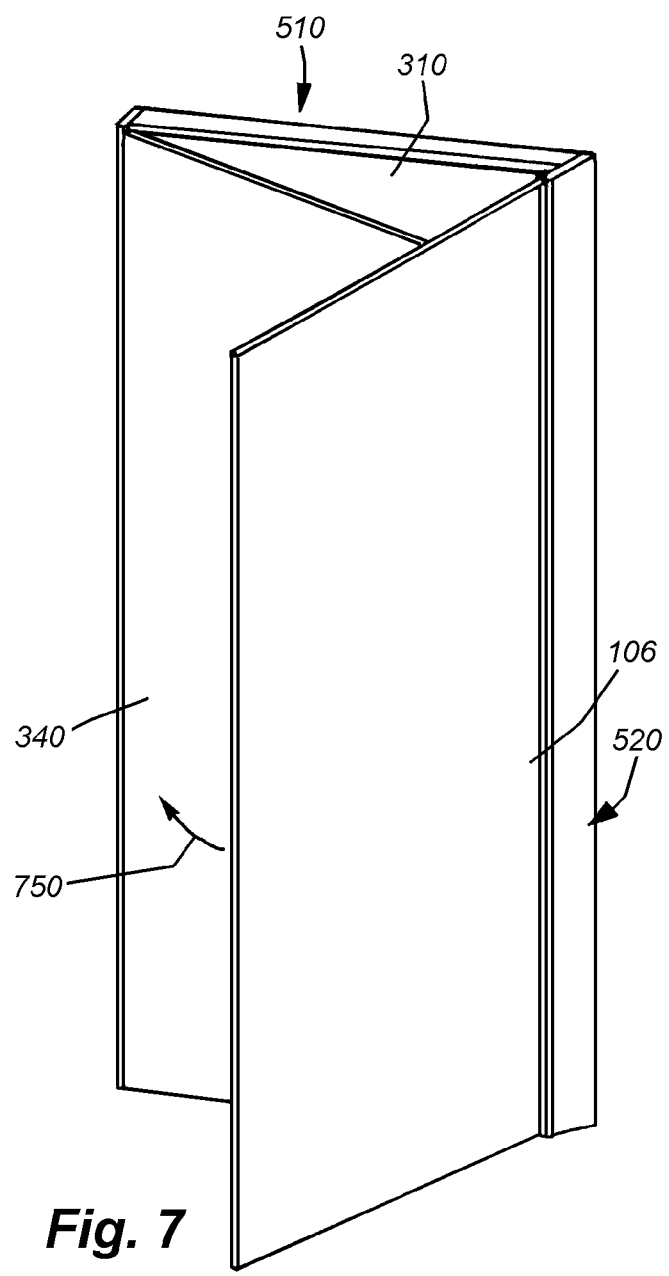
FIG. 7 is a perspective diagram of the arrangement of FIG. 5 showing the medial panel now folded over the top and bottom horizontal panels and the medial panel overlying them in a folded orientation, with the vertical outer panel being folded in the process of being folded in a final folding step.
Figure 8:
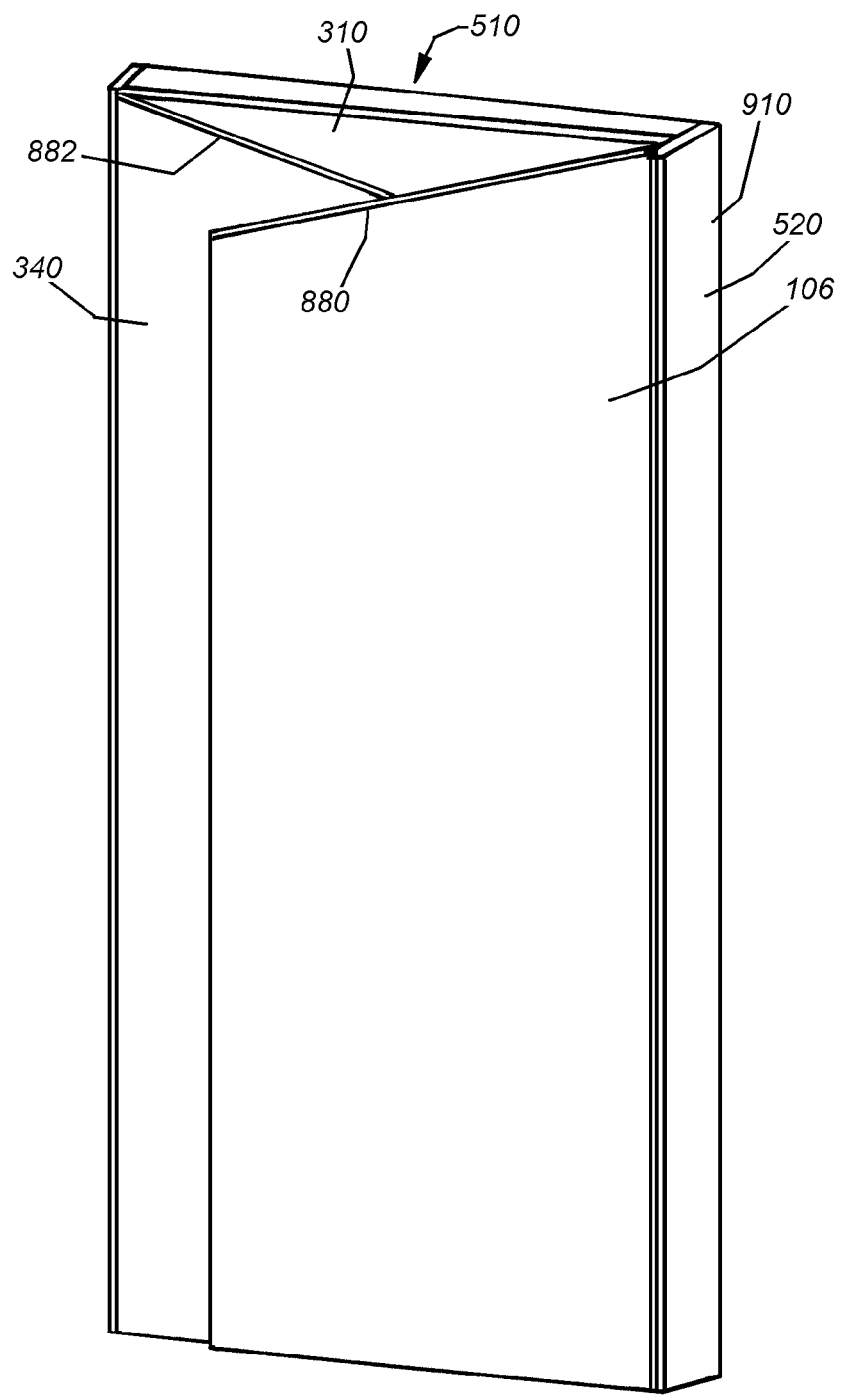
FIG. 8 is perspective diagram of the arrangement of FIG. 5 showing all panels now in a fully folded orientation with respect to the underlying spacer frame.

Referring next to FIG. 6, the upper and lower panels 310 and 320 are now folded within the spacer frame 520, thereby allowing the medial vertical panel 340 to be folded inwardly as shown (arrow 650). In FIG. 7, the medial vertical panel 340 is now folded-in to overlie the upper and lower horizontal panels 310 and 320. Now the outer vertical panel 106 can be folded inwardly (arrow 750) to overlie the inner vertical panel 340. The final folded structure is shown in FIG. 8 with all panels essentially nested within the spacer frame 520.

Note that a medial "panel" is shown and described for each folding aerodynamic structure herein. While the depicted panel is a solid planar member, the term "panel" as used herein should be taken broadly to include other types of interior supporting members that may not fully, or substantially, close-off the space between the two adjacent aerodynamic assemblies on the adjacent doors. For example, the medial panel (which can also be termed a "splitter" can comprise a beam, or an open trusswork). Since this component is not within the airstream, it can take any form that is sufficient to support the inside corners of the top and bottom horizontal panels.

Figure 9:
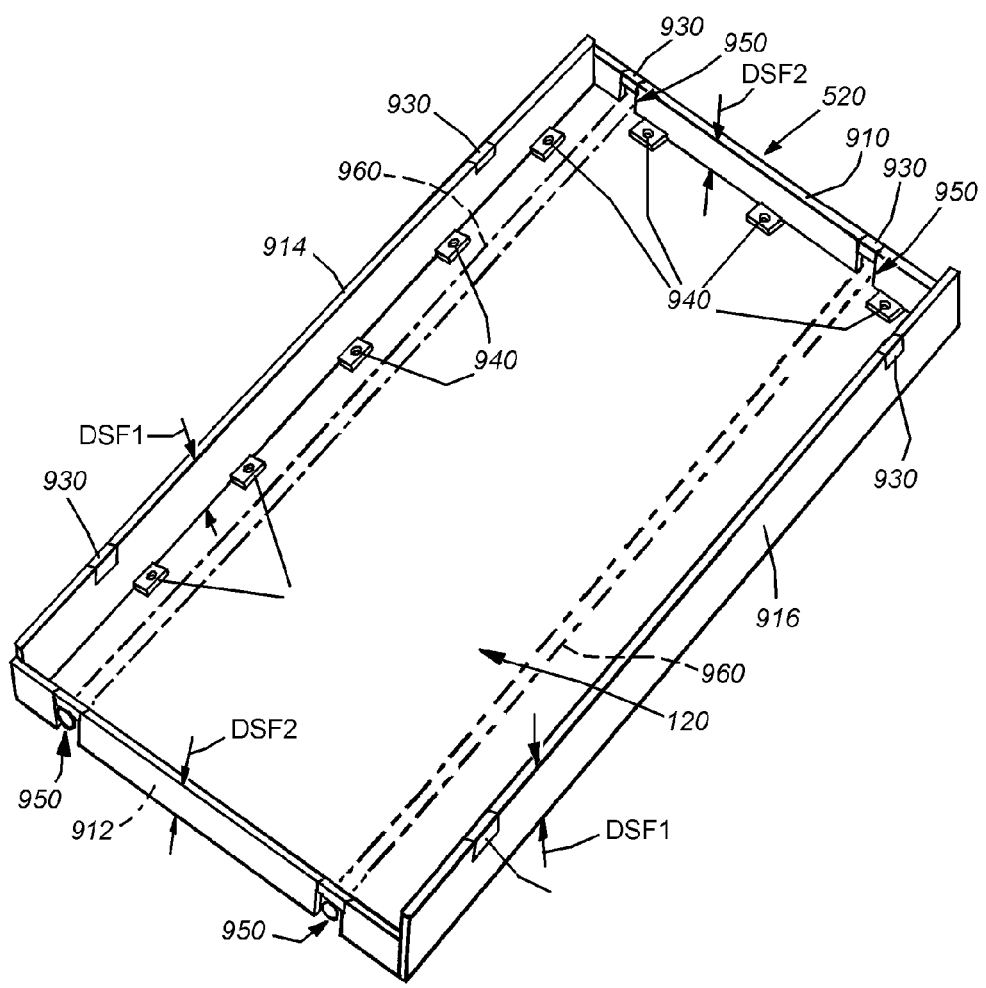
FIG. 9 is more-detailed perspective view of a spacer frame mounting base for the aerodynamic assembly of FIG. 1 with aerodynamic panels removed.

Referring to FIG. 9, the depth DSF1, DSF2 and DSF3 of each side of the spacer frame 520 is chosen so that the panels neatly overlie each other without binding in the desired folding order. To facilitate this folding order, the upper and lower/bottom horizontal spacer frame sides 910 and 912 are located lowest (DSF2), the medial vertical spacer frame side 914 is slightly higher (DSF3), and the outer vertical spacer frame side 916 is the highest side (DSF1). Since the upper and lower panels do not overlap in the folded orientation, their sides 910 and 912 are the same height (DSF2) in this embodiment. Each spacer frame side includes hinge brackets 930 that interconnect with corresponding hinges on the adjoining folding aerodynamic panels. The spacer frame sides also include mounting plates 940 (or another acceptable mechanism) to allow them to be secured to the flat face of a conventional, underlying door (120). The mounting plates 940 in this embodiment include holes for allowing fasteners to be passed therethrough and into the door. The upper and lower horizontal spacer frame sides 910 and 912 also include through-holes or slots 950 that are sized and arranged to allow clearance for the passage of conventional exterior cargo door locking rods 960, the use and construction of which should be well-known to those known in the art. These locking rods 960 particularly facilitate the locking of each door against the trailer cargo body. As will be described below, a mechanism that allows the driver to access the locking rod handles is desirable. In the depicted embodiment, the bottom horizontal panel 112 is elevated above the bottom of the door section to create an open space 348 (see, for example, FIG. 3). This open space can be used to access the handles, which are typically located slightly above each rod's pivot base 370. As will be described further below, alternate mechanisms for allowing actuation of the locking rods 960 can be employed, thereby allowing the aerodynamic structure to extend down to the bottom region of the door section. Note, even when suspended above the bottom of the door, each depicted aerodynamic assembly in this embodiment affords a significantly improved aerodynamic profile to the rear of the trailer.

In this embodiment, the angle of taper (angle AT in FIG. 4) for the sides (and the top and bottom) can be between approximately seven degrees and twenty degrees. The precise taper angle is highly variable, and can be determined (in part) by exposing the particular trailer shape and configuration to wind tunnel tests and/or other well-known aerodynamic testing techniques. As shown particularly in FIG. 8 when folded the vertical panels 106 and 340 each display a characteristic downward angle along the top edge 880 and 882, respectively due to the horizontal upper panel's taper.

While the spacer frame 520 is depicted as a series of thin, upright plates, in alternate embodiments, it can be a set of lower, flattened beams, with fasteners passing directly through the faces of the beams (as opposed to separate L-shaped mounting plates 940 as shown).

Figure 10:
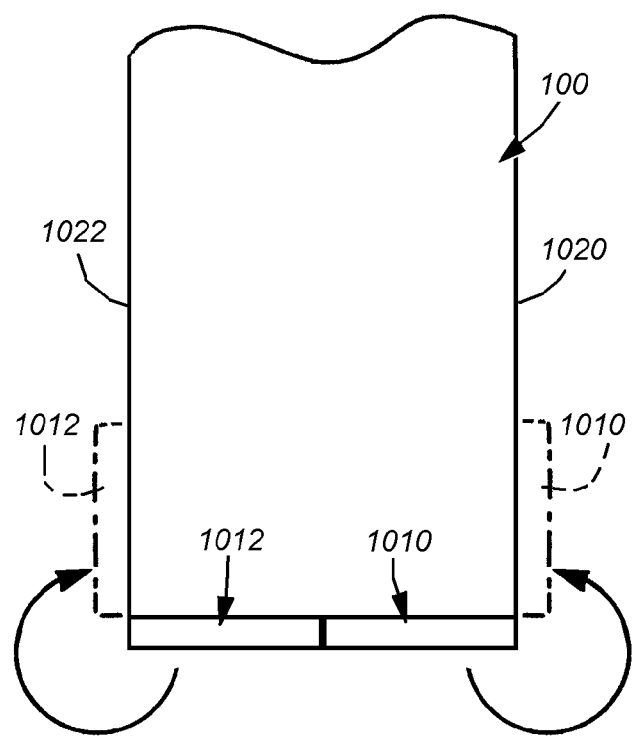
FIG. 10 is a schematic top view showing the folded door panel assemblies with the doors and attached aerodynamic panel assemblies in a closed position and a phantomized open position located against the sides of the trailer.

When folded, as shown generally in FIG. 8, each door's respective aerodynamic assembly in accordance with this embodiment presents a relatively low profile that compactly overlies its respective door. As shown further in FIG. 10, each folded aerodynamic structure 1010 and 1012 can be hinged approximately 270 degrees into the fully opened depicted orientation (as shown in phantom) so that the door and overlying aerodynamic assembly are collectively secured against the sides 1020 and 1022, respectively of the trailer cargo body 100.

Figure 11:
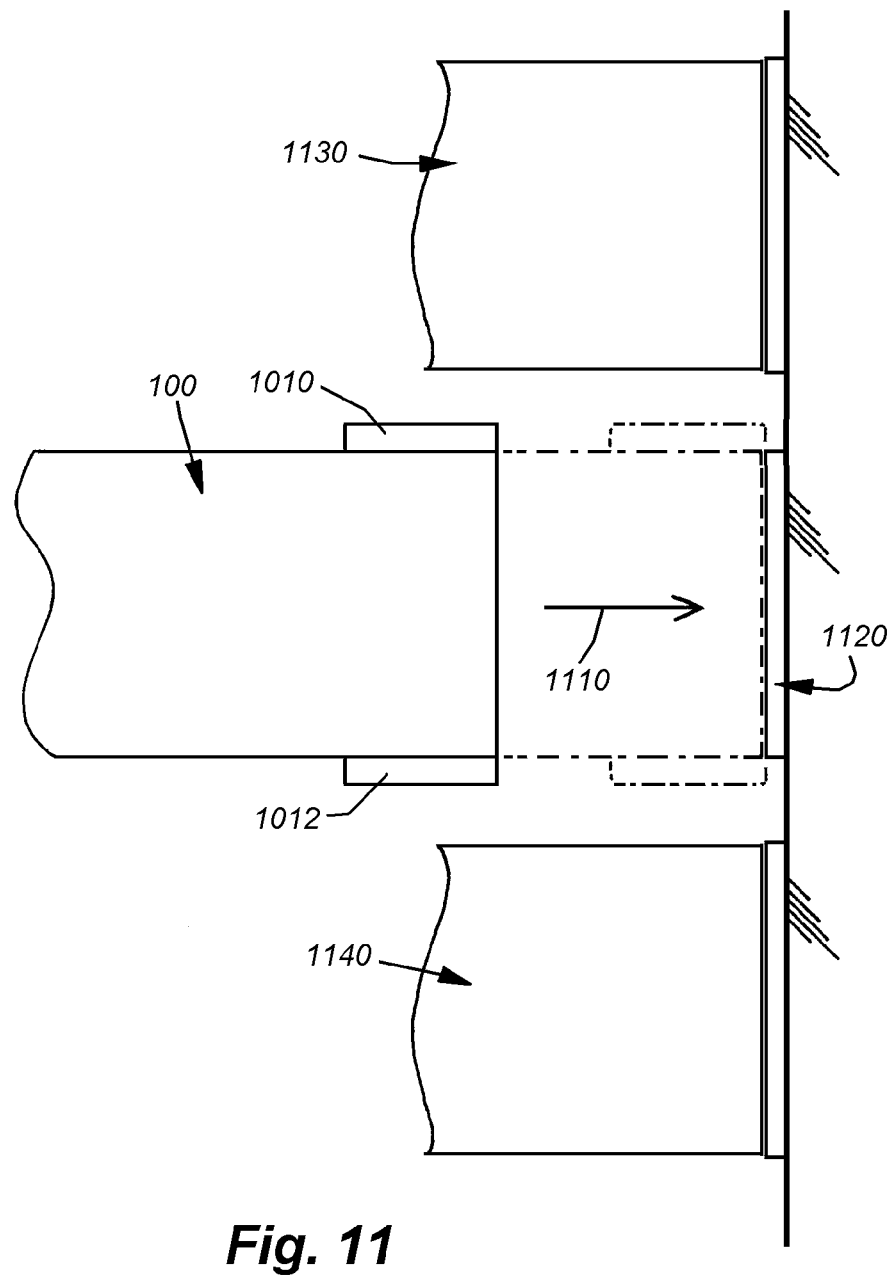
FIG. 11 is a schematic top view showing the available clearance at an exemplary loading dock when the panels are folded and the doors are in an open position, secured to the sides of the trailer.

As shown in FIG. 11, this compact folding arrangement, thus allows a trailer cargo body 100 to be readily backed (arrow 1110) into a conventional loading dock bay 1120 with its doors opened and secured in a conventional manner, and free of interference with adjacent, closely spaced trailers 1130 and 1140, which may be already positioned at the dock as shown, or subsequently maneuvered into and out of the dock. Hence, the folding arrangement of this embodiment affords the driver and/or loading dock personnel an easy and conventional technique for maneuvering the vehicle and for opening trailer doors to gain full, unobstructed access to the trailer's cargo compartment.

Figure 12:
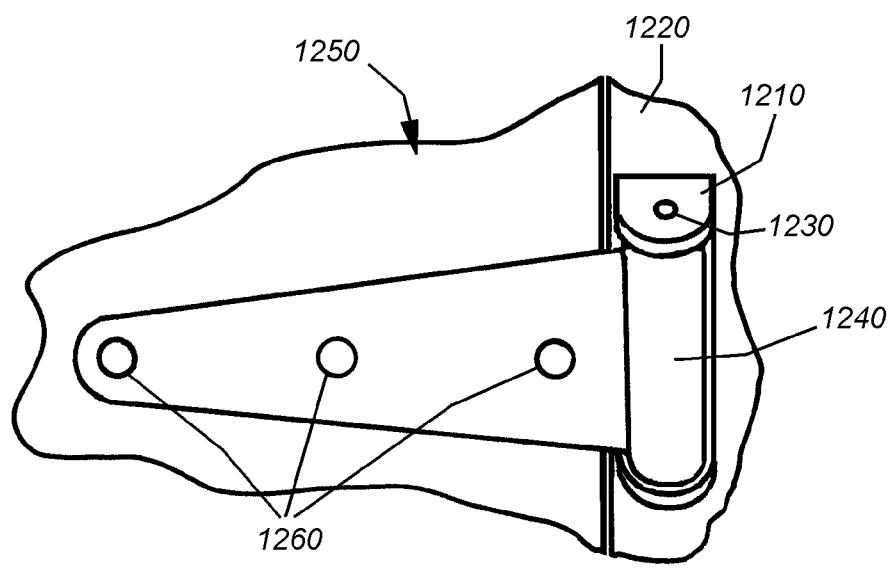
FIG. 12 is a fragmentary perspective view of an exemplary truck/trailer cargo door hinge according to the prior art.
Figure 13:
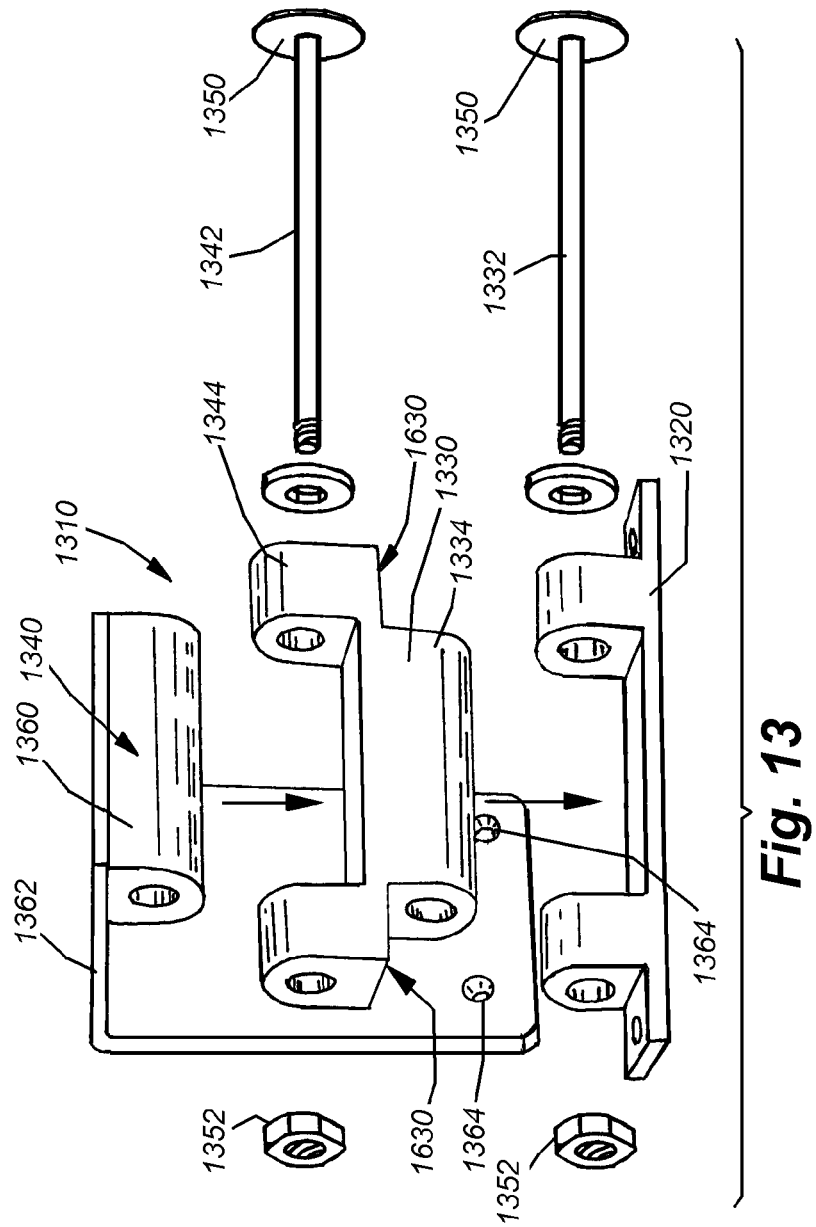
FIG. 13 is a multi-piece, dual-pivot hinge assembly for use with the aerodynamic panel assemblies in accordance with this invention.

In order to facilitate the hinged movement of the substantially thickened door and aerodynamic structure (1010 and 1012), a conventional hinge cannot be employed. The additional thickness provided by the space frame (between approximately three and eight inches of additional thickness in various embodiments—depending in part upon the height of the spacer frame and folded panel components) would cause the corner of the spacer frame to bind against the truck side after only 180-200 degrees of opening movement. By way of illustration, and as shown in FIG. 12, a conventional truck door hinge consists of a clevis 1210 that is secured to the trailer's door frame 1220 using fasteners, welding or another technique. A pin 1230 passes through the clevis and provides a pivot point for a stamp section 1240 that extends onto the door surface 1250, and is attached to the door (1250) by fasteners 1260. This hinge structure allows the relatively thin conventional door to swing around and lay flatly against the sides of the trailer. However, a significantly outwardly thickened door could not lay flat against the sides and, instead, would bind up on the sides before fully swinging around as described above. This would interfere with loading and unloading, and more particularly would interfere with adjacent trailers at the dock. Thus, as shown in FIG. 13, a modified, multi-part hinge assembly 1310 is employed with the door and aerodynamic panel assembly of this embodiment.

The trailer's original clevis (or a modified clevis) 1320 is used in connection with the trailer's door frame. The clevis 1320 is connected by a pivot pin 1332 to the first side 1334 of a central clevis 1330. This central clevis 1330 extends the overall swing range of the hinge assembly to allow for the thicker door. The opposing side 1344 of the central clevis 1330 is joined by another pin 1342 to the strap assembly 1340 that is secured to the door and spacer frame. Each pin 1332, 1342 can be secured in place by a respective head 1350 and opposing threaded nut 1352. A strap assembly 1340 includes a pivoting base 1360 that engages the pin 1342 and an L-shaped strap plate 1362. The strap plate includes fastener holes 1364 or another mechanism for securing it to the door and aerodynamic assembly.

Figure 14:
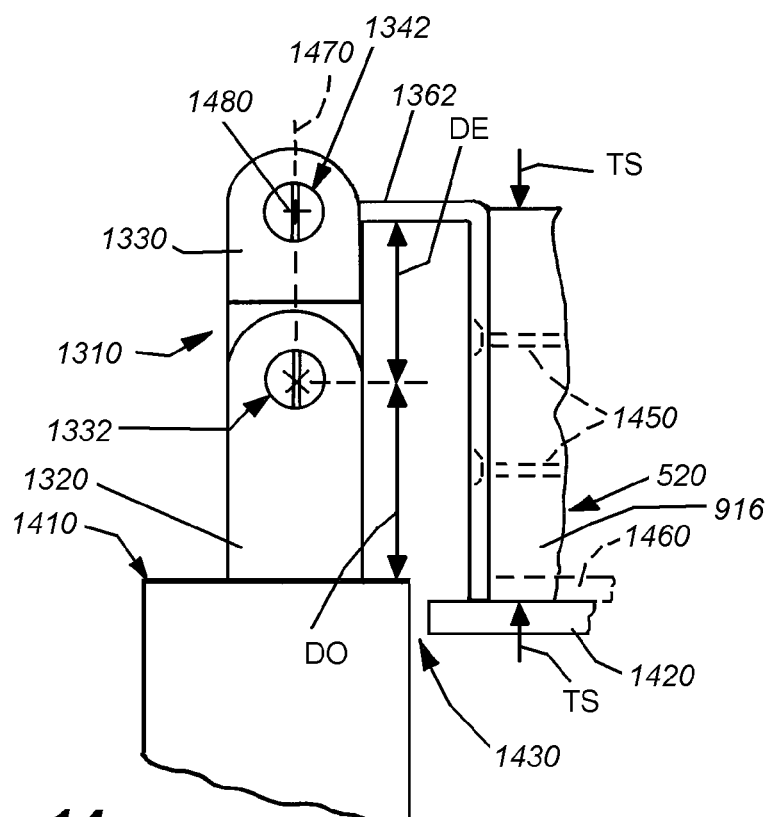
FIG. 14 is a fragmentary top view showing a door assembly with an aerodynamic arrangement in accordance with an embodiment of this invention in a closed position.
Figure 15:
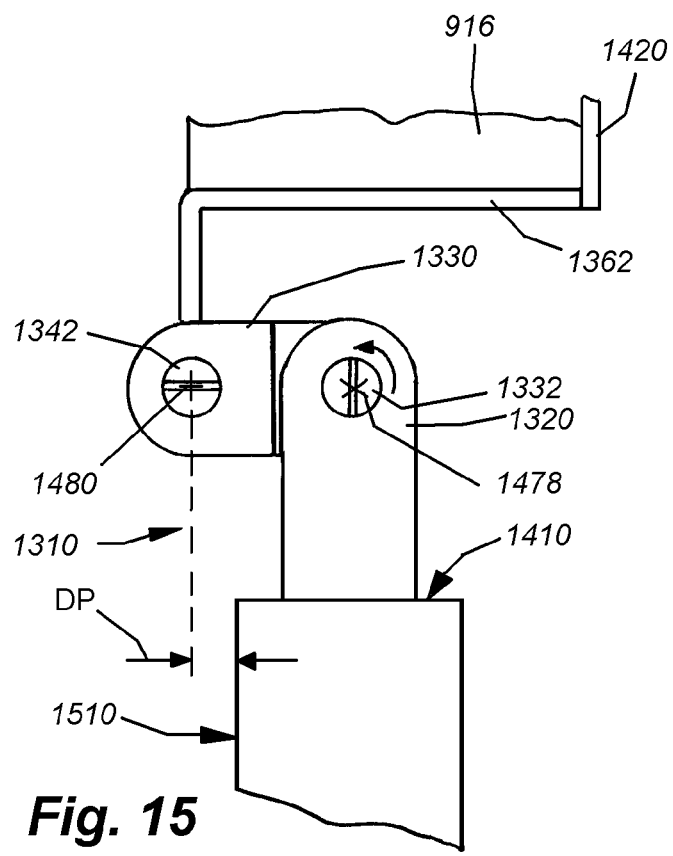
FIG. 15 is a fragmentary top view of the arrangement of FIG. 14 in a half-partially position of approximately 180 degrees.
Figure 16:
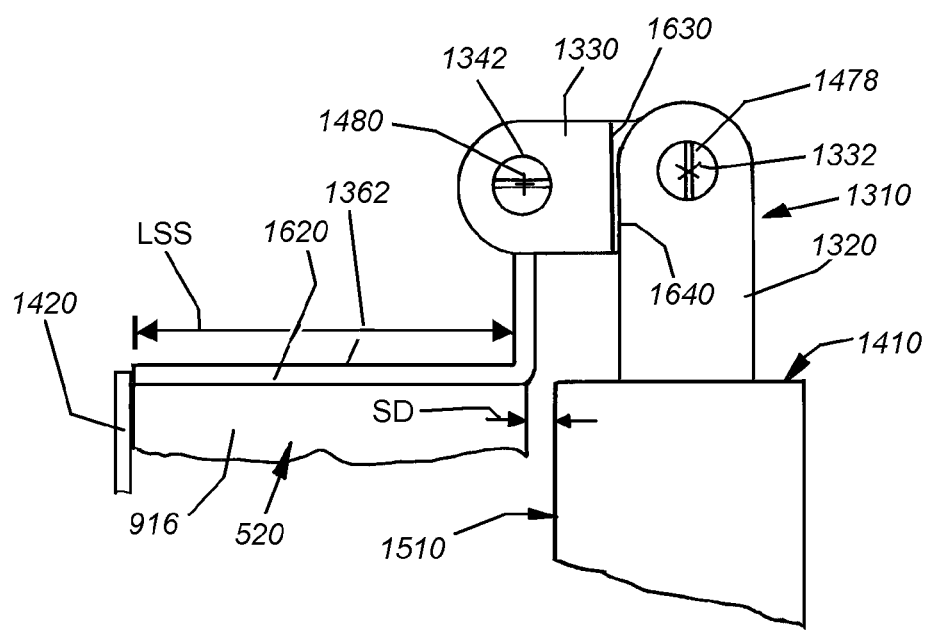
FIG. 16 is a fragmentary top view of the arrangement of FIG. 14 in a fully opened position of approximately 270 degrees.

With reference now to FIGS. 14-16, the operation of the hinge assembly 1310 is shown in further detail. In FIG. 14, the clevis 1320 is attached to the door frame 1410 of the trailer body with the original door 1420 in a closed position. There may be a variety of gaskets and/or other seals within the gap 1430 between the door 1420 and the frame 1410. These have been omitted for clarity. The door 1420 is attached to the outer spacer frame side 916 by fasteners 1450 (shown in phantom), or another securing mechanism. Similarly, the spacer frame side 916 (as well as other parts of the spacer frame 520) is attached securely to the face of the door 1420. In alternate embodiments, a further L-shaped hinge strap section 1460 (shown in phantom) can be provided at the end of the strap 1362. This section 1460 can pass under a portion of the spacer frame side 916 and be attached directly to the door face for further security.

As shown in FIG. 14, in the closed position the base clevis 1320 and central clevis 1330 are in alignment along a center line 1470 that runs between parallel pivot axes 1478 and 1480 for each respective pivot pin 1332, 1342. By employing the central clevis 1330, the pivot point 1480 for the strap section 1362 has been extended outwardly from the door frame edge 1410 by an additional distance DE relative to the original pivot point's (1478) extension distance DO. This additional distance DE is designed to compensate for the thickness TS of the aerodynamic structure.

Thus, referring now to FIG. 15, when the door assembly is opened, the strap 1362 and central clevis 1330 rotate about the pin 1332 of the base clevis 1320. The added extension provided by the central clevis causes the pivot point 1480 of the pin 1342 to extend beyond a distance DP with respect to the face of the trailer side wall 1510.

As such, when the overall door assembly is swung fully around on the pivot 1480 (270 degrees, as shown in FIG. 16), the aerodynamic structure is separated by a gap SD relative to the side of the trailer 1510. In this orientation, the door 1420 is positioned at a significant distance from the trailer side 1510, with the spacer frame 916 disposed in the intervening space. The length LSS of the strap section 1620 that is mounted along the side 916 is equal to or greater than the length of the longest side of the frame (520). This dimension and the placement of the central clevis pivot 1480 determine the appropriate spacing for the door assembly relative to the trailer side. These dimensions can be adjusted based upon the over thickness of the organic assembly. While not shown, the end of each assembly includes a hook or other fastening mechanism that allows the overall door to be secured against the side 1510 without unwanted release. This ensures that the doors do not inadvertently flop back, and possibly strike an adjacent trailer, as the vehicle is backed into a loading position. Note also that the central clevis includes a shoulder 1630 that is sized and arranged to bear against the base clevis side 1640 when the central clevis is pivoted to a maximum position. This maximum pivot position is typically at a ninety degree angle with respect to the original pivot alignment line 1470 (FIG. 14).

Figure 17:
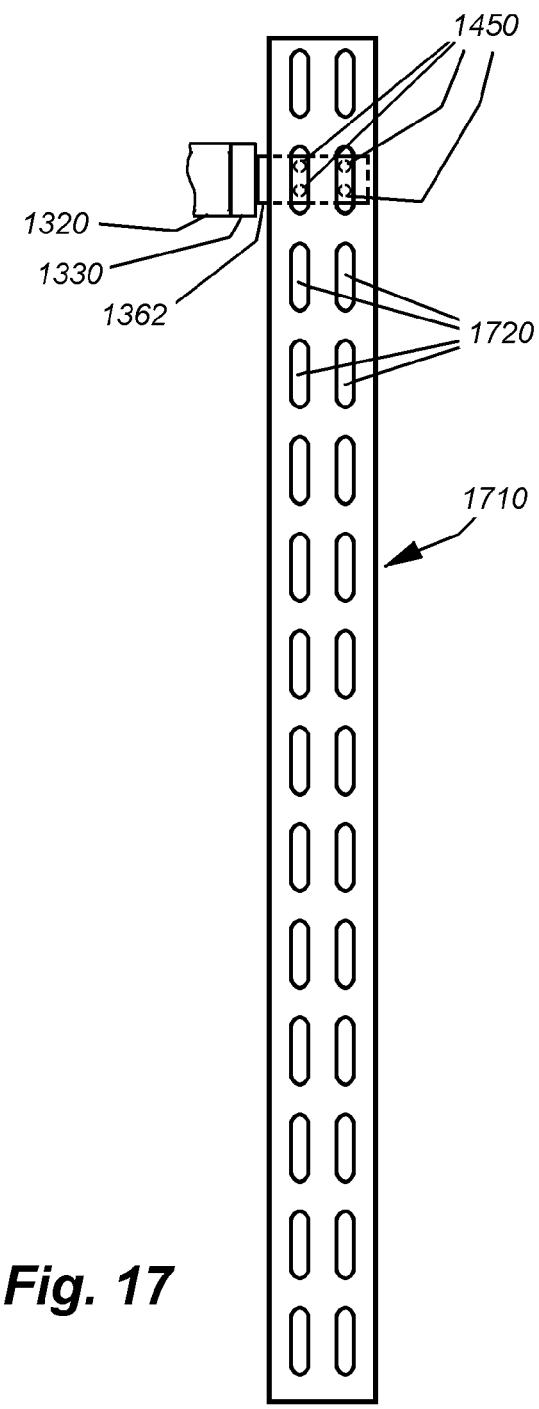
FIG. 17 is side view of a slotted spacer frame side that allows for variable placement of hinges according to an alternate embodiment.

It is generally contemplated that, where possible, the truck's original devises will be employed in a retrofit application of the aerodynamic structure of this invention. Thus, in such a retrofit application, a custom central clevis, or a central clevis that includes appropriate spacers, is provided as a replacement for the original strap member. However, the vertical placement and/or number of hinges on a given trailer door is highly variable among various manufacturers. To allow for a standard aerodynamic structure that can be retrofit to a variety of vehicles, an embodiment of a "universal" spacer frame outer side member 1710 is shown in FIG. 17. This adjustable side member can include a series of slots 1720 along its length at appropriate locations to receive fasteners 1450 from the modified hinge strap plate 1362. By carefully locating and sizing slots, a variety of conventional trailer door hinge placements can be accommodated without need of providing a customized aerodynamic spacer frame.

When folded together, the vertical panels can be secured together by any acceptable mechanism to maintain the folded shape. For example, a strap, or catch assembly can be provided between the spacer frame and the edge of each respective outer vertical panel. And when fully deployed, a secure mechanism for maintaining the panels in this deployed orientation is also provided. Given the prevailing aerodynamic pressures experienced by the deployed assembly at high speed, the locking mechanism for the deployed orientation should resist detachment of panels.

Figure 18:
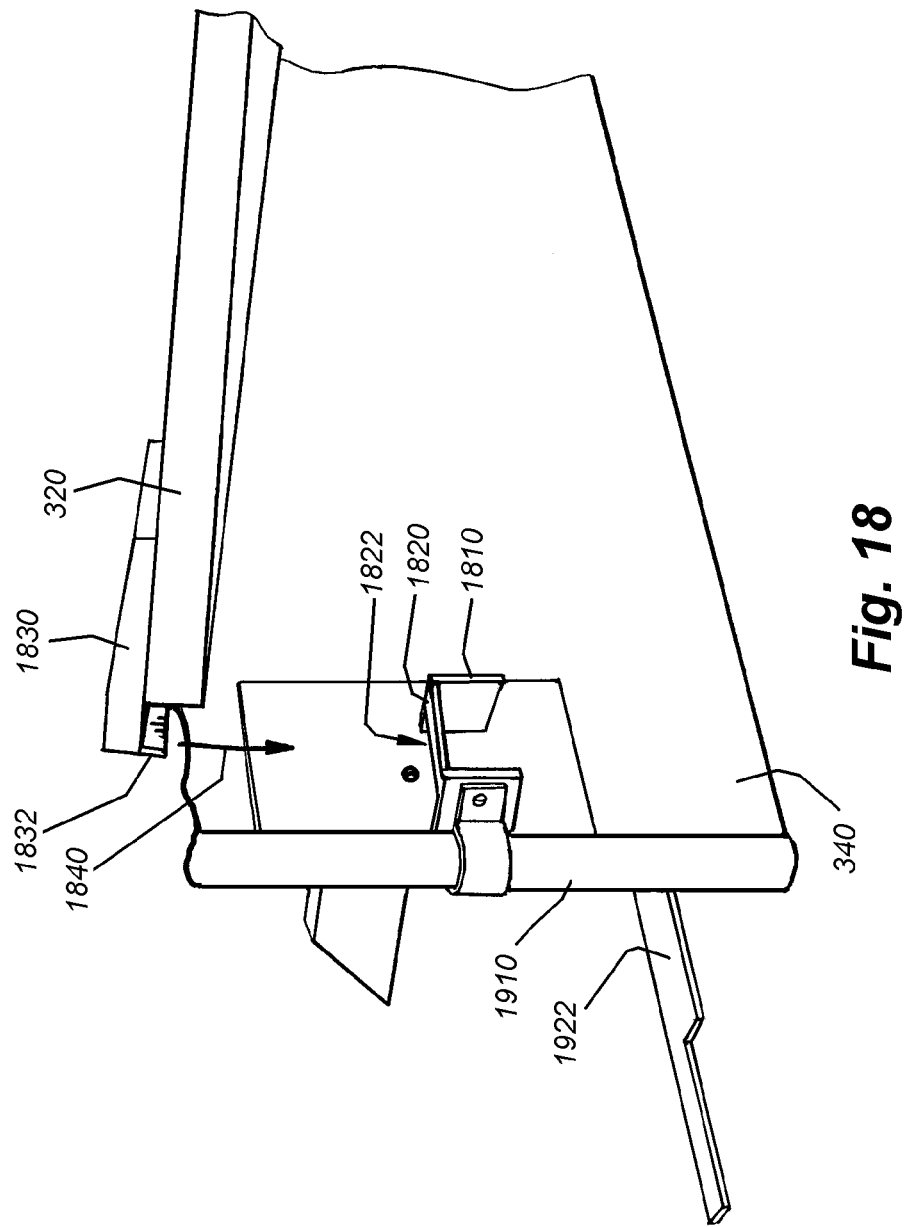
FIG. 18 is a fragmentary perspective view of an unlocked lower panel moved into an engagement with a lock member of a vertical medial panel in the aerodynamic arrangement of FIG. 1.
Figure 19:
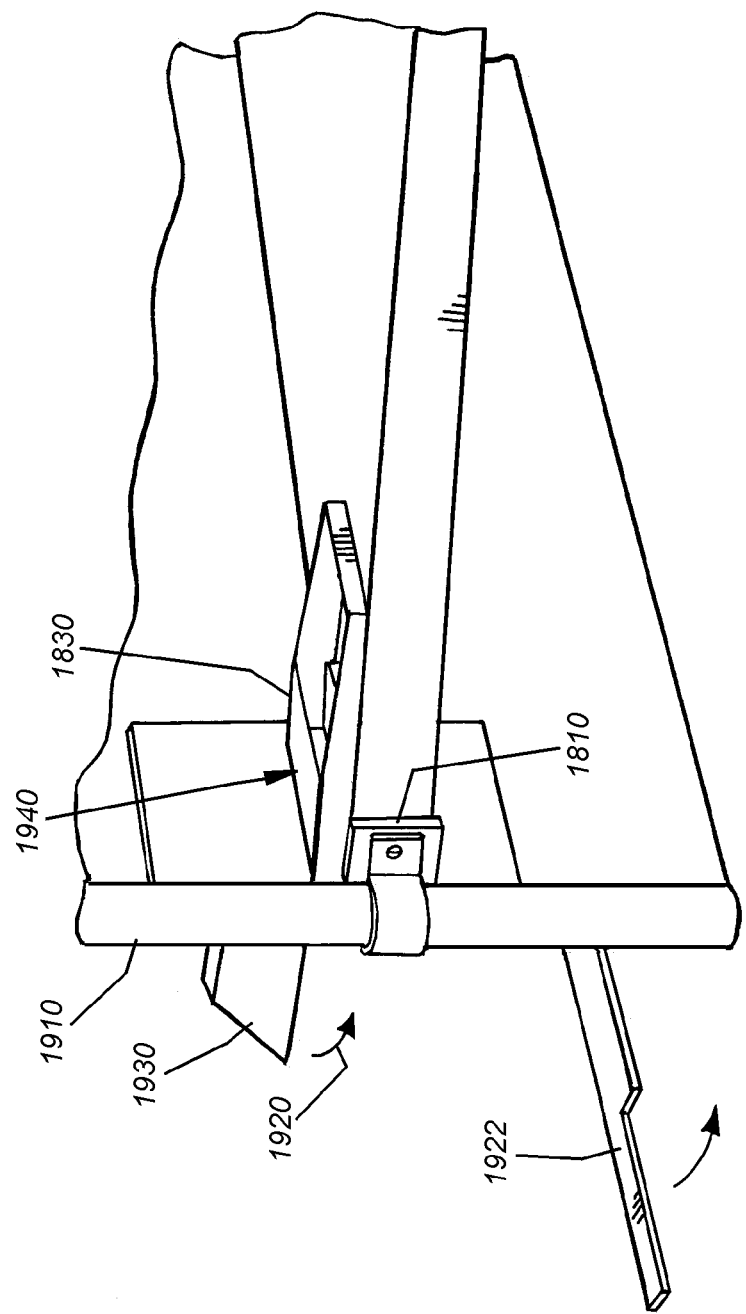
FIG. 19 is a fragmentary perspective view of the process of locking the lower panel as shown in FIG. 18 with respect to the vertical medial panel.
Figure 20:
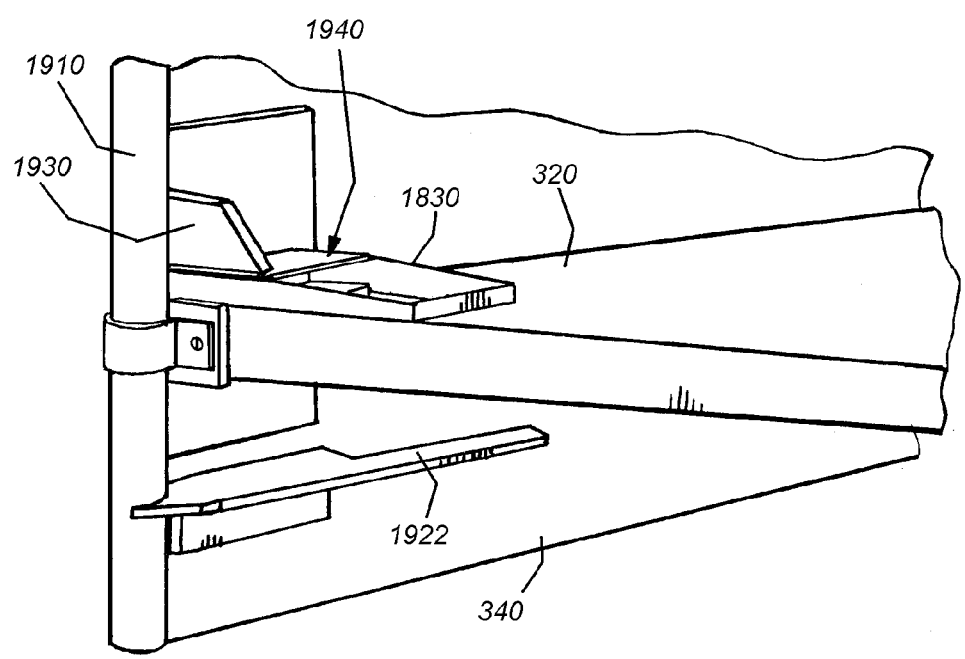
FIG. 20 is fragmentary perspective view of the lower panel of FIG. 18 shown in a locked position with respect to the vertical medial panel.

With reference to FIGS. 18-20 the sequence for locking of vertical and horizontal panels in place is shown in detail. The unlock sequence is, of course, the reverse of the depicted locking sequence.

Referring first to FIG. 18, the central/medial vertical panel 340 is shown in deployed orientation, facing perpendicularly with respect to the back face of the door (not visible). The medial vertical panel 340 includes a projecting locking base 1810 with an outer strap 1820 and an inward slot 1822. The detached horizontal lower panel 320 includes a corresponding locking plate 1830 with a small tongue 1832 that is sized and arranged to pass through the slot 1822 as the panel 320 is moved downwardly (arrow 1840) into engagement with a locking base 1810. When the plate 1830 has been secured against the locking base 1810, as shown in FIG. 19, an rotating rod 1910, mounted on the vertical edge of the medial panel 340 is rotated 1920 using a locking handle 1922. The rotation (arrow 1920) causes an overlying block 1930 to move into position over the top face 1940 of the plate 1830. As shown further in FIG. 20, the block 1930 now overlies the top face 1940 of the plate 1830, thereby preventing upward movement of the panel 320 with respect to the vertical panel 340. An appropriate locking strap or catch (not shown) can then be used to secure the handle 1922 against the panel 340 so that the assembly remains intact until released. Similar locking assemblies can be provided at each junction between a vertical panel and a horizontal panel. Thus, this structure and locking procedure is applied to each corner of the aerodynamic panel assembly. In particular the rotating locking rod 1910 engages blocks at both the adjoining horizontal top and lower panels simultaneously.

Note that the depicted horizontal and vertical panels can be deployed by manually, or by physically, drawing them into the deployed orientation, and then undertaking the above-described locking procedure. Alternatively, automated mechanisms that may include springs and actuators can be used to deploy panels. Similarly panel-assembly locks can be applied through manual or automatic techniques.

Figure 21:
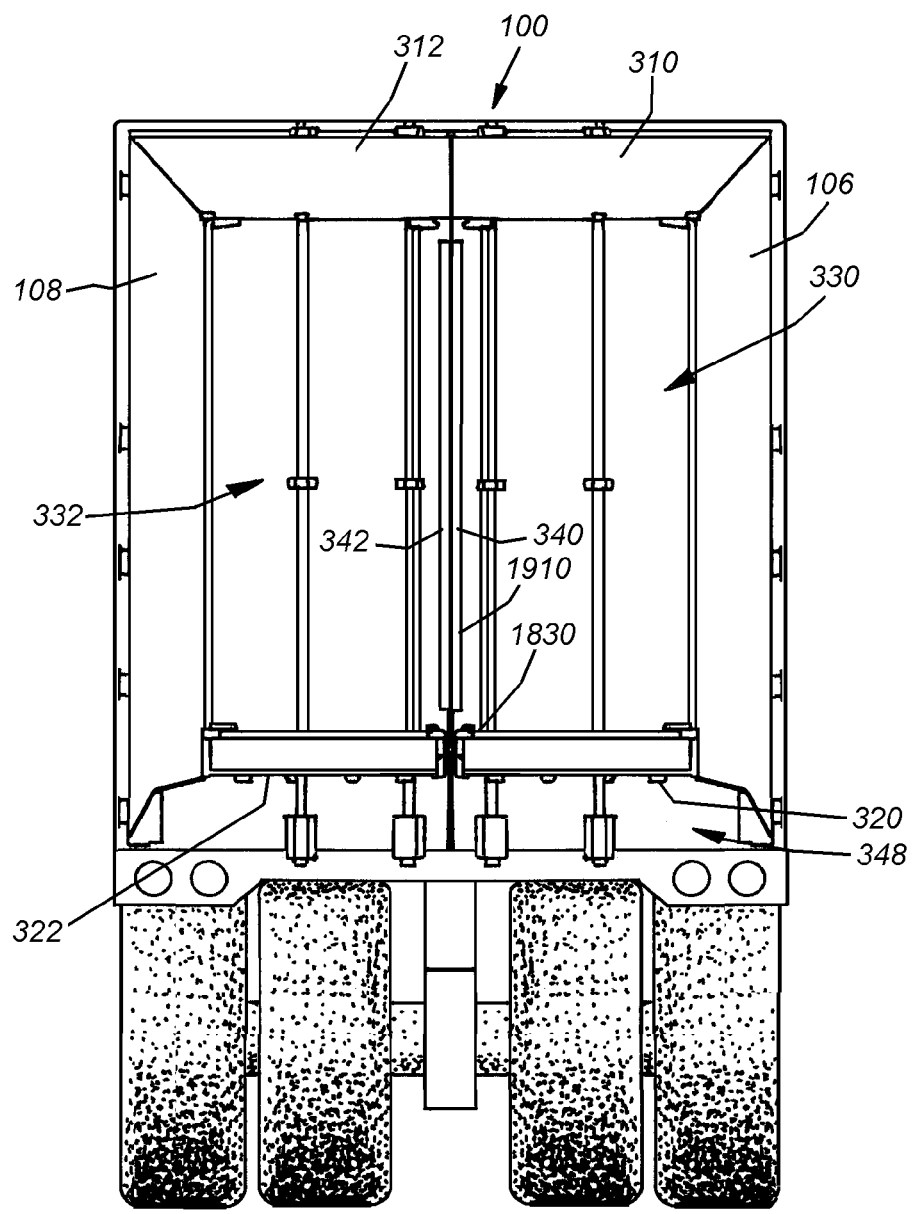
FIG. 21 is a rear view of the truck trailer rear of FIG. 1 again showing the aerodynamic panels in a deployed and locked orientation in accordance with the process shown in FIGS. 18-20.
Figure 22:
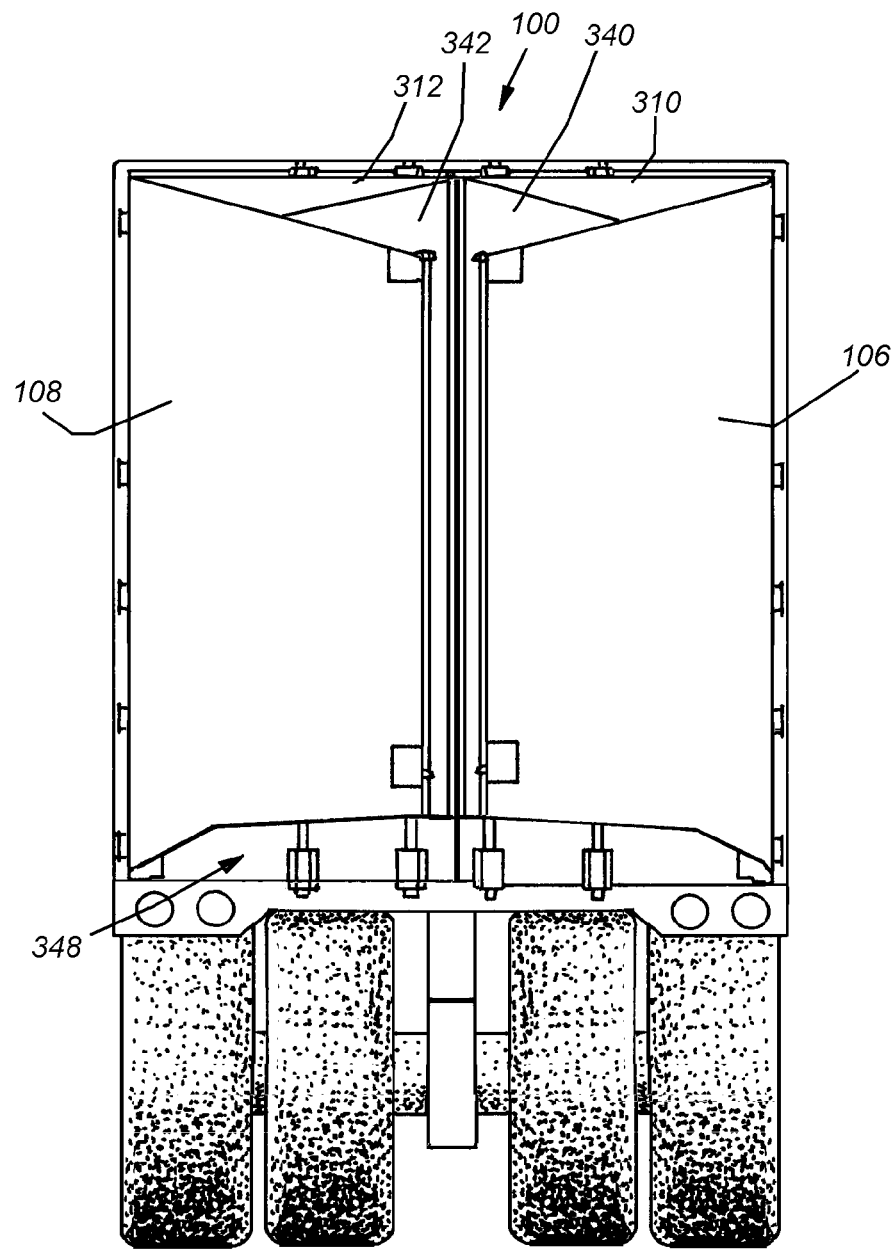
FIG. 22 is a rear view of the truck trailer rear of FIG. 1 showing the panels in a folded orientation.

By way of comparison, the panels 106, 108, 310, 312, 320 and 322 are shown fully deployed in FIG. 21 with the center parts of each of the doors 330 and 332 exposed. By unlocking the panels as described above, and folding, first the horizontal panels 310, 312, 320 and 322, and then the vertical panels 106, 340, 108 and 342, the folded assembly assumes the compact appearance as shown in FIG. 22. As noted above, an appropriate strap or other locking assembly can be used to maintain the panel's folded orientation on each door assembly. Since each door's panel assembly is completely separate from the other, each door may swing open as described above on the modified hinges.

Figure 23:
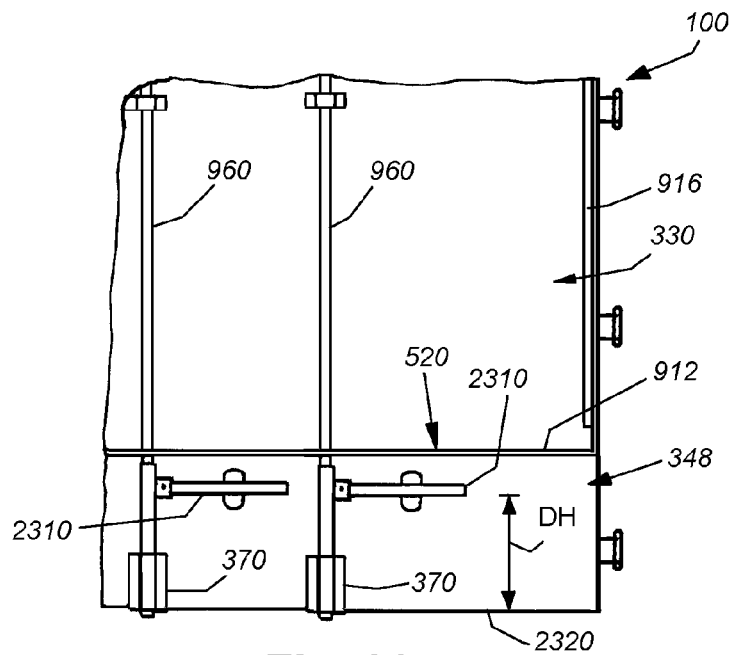
FIG. 23 is a fragmentary rear view of a truck trailer rear showing an aerodynamic panel in which the lower panel is located above conventionally-located cargo door lock handles thereby allowing access to the handles for locking and unlocking of doors.
Figure 24:
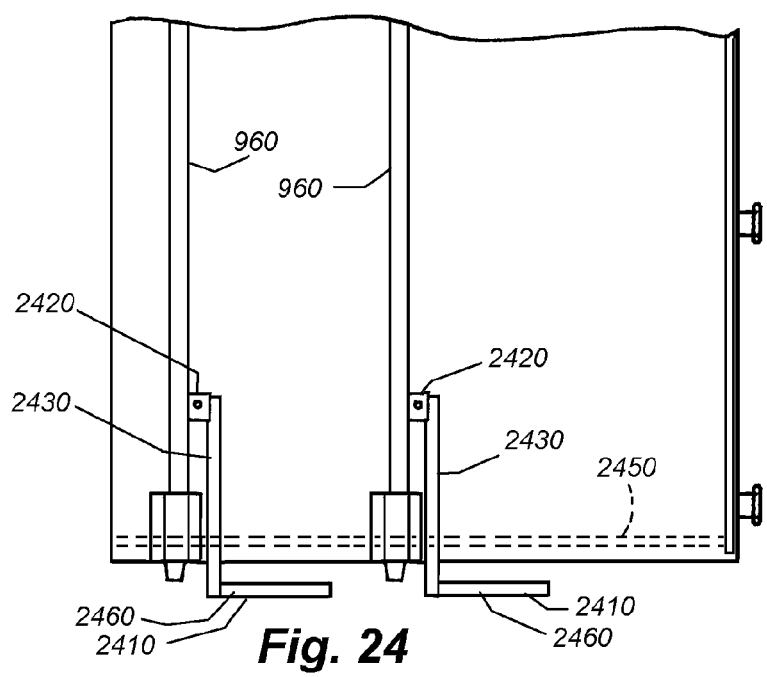
FIG. 24 is a fragmentary rear view of a truck trailer rear showing an arrangement of the cargo door lock handles adapted to allow an aerodynamic panel to be extended to the bottom of the door, while still enabling the door to be locked and unlocked.

As also described above, and with further reference to FIG. 23, the base frame 520 is shown attached to the door 330. The door locking rods 960 extend through the horizontal base frame side 912 at the bottom of the assembly as shown. As noted above, because the conventional door handles 2310 extend at a distance DH from the bottom edge 2320 of the trailer 100, the bottom spacer frame side 912 is positioned above the handles 2310. This allows the user access to the handles when the aerodynamic structure is folded. However, in alternate embodiments, the locking rods 960 can be actuated by modified handles as shown in FIG. 24 which allow for lowering of the bottom frame side 2450 (shown in phantom). The modified handles 2410 extend from the original handle mounting pivots 2420 on the rods 960, but include and elongated downward extension 2430 that positions the handles below the now-lowered frame side 2450. Appropriate slots can be formed in the frame sides to allow the handles 2410 to swing around their full 180-degree arc. In this manner, the user can grasp handle extensions 2460 that are now located beneath the frame side 2450 to open the corresponding door.

Figure 25:
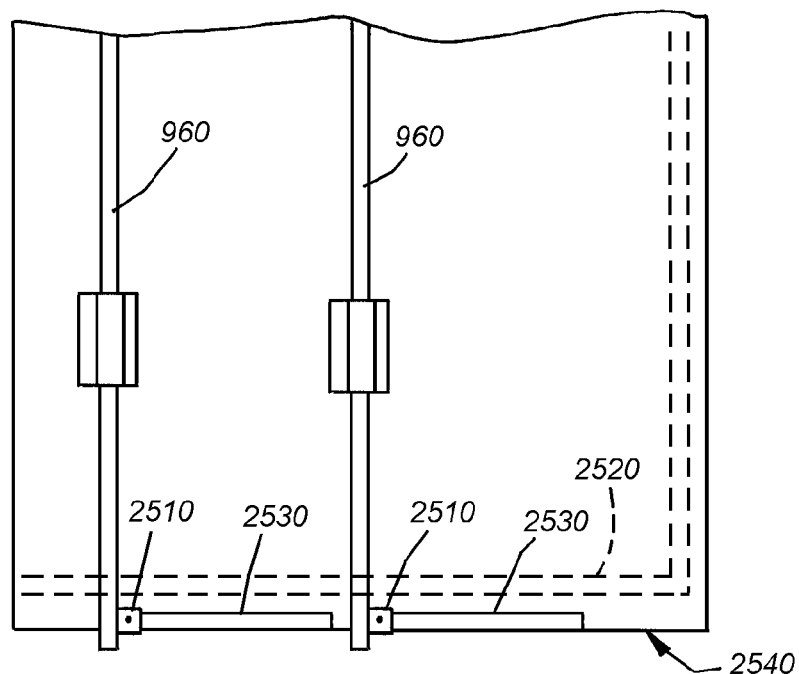
FIG. 25 is a fragmentary rear view of a truck trailer rear showing an alternate arrangement of cargo door lock handles that allow panel to be extended near the bottom of each door.
Figure 26:
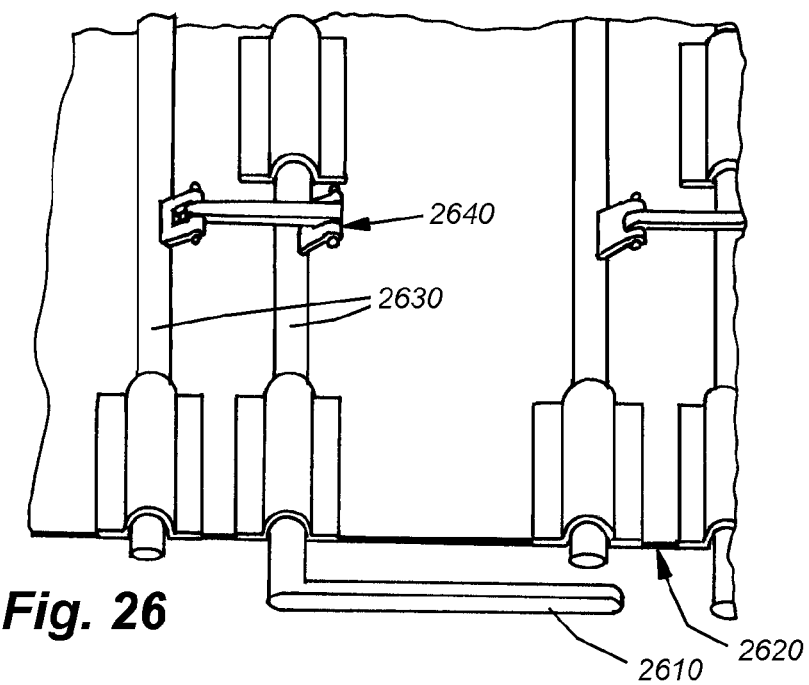
FIG. 26 is a fragmentary rear view of a truck trailer rear showing yet another alternate arrangement in which the cargo door lock handles extend from the bottom of the door, thereby allowing the panel to extend substantially to the bottom of the trailer door assembly.
Figure 27:
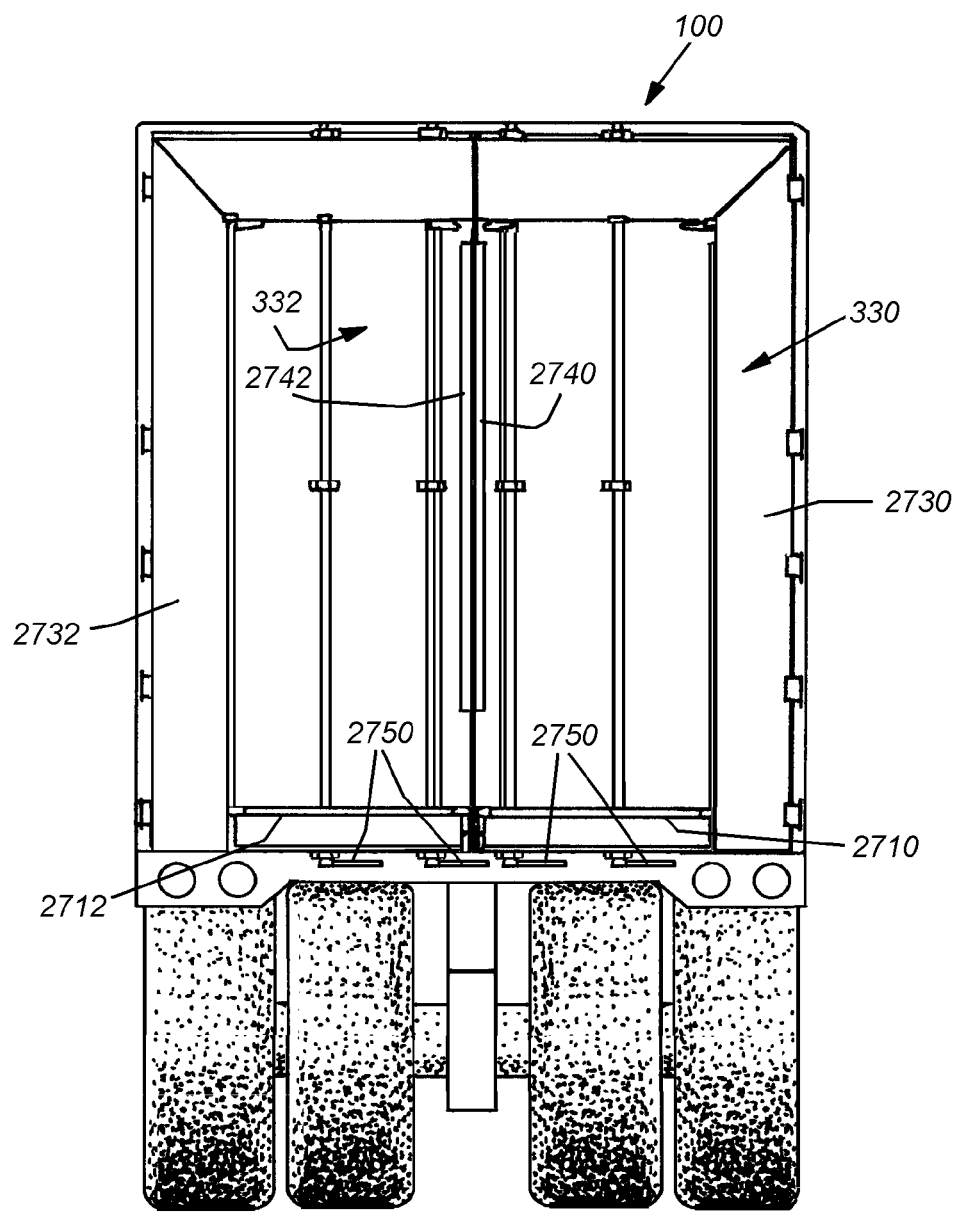
FIG. 27 is a rear view of an exemplary truck cargo body rear with aerodynamic panels extended to the bottom of the door according to an alternate embodiment.

In another embodiment, the handle bases can be moved as shown in FIG. 25. The bases 2510 are thus located below the lowered horizontal frame side 2520 so that the handle extensions 2530 reside near the bottom 2540 of the trailer. As shown further in FIG. 26, where multiple locking rods are employed, the handles 2610 can extend below the bottom 2620 of the horizontal frame member and the multiple locking rods 2630 can be rotatably linked by a pushrod-and-clevis linkage assembly 2640. In this manner, when the handle 2610 is rotated, it rotates each of the rods 2630. As shown in FIG. 27, the trailer 100 is provided with lowered horizontal panels 2710 and 2712, and associated vertical side panels 2730, 2732, 2740 and 2742 as a result of the downward movement of the door lock handles 2750. It should be clear that a variety of straightforward approaches can be employed to allow access to the trailer's door locking mechanism while affording an efficient shape for the aerodynamic structure according to this invention.

The above-described panel embodiment, using separate panels that are each separate from each other and locked together upon deployment, provides a simple and effective structure for creating a tapered aerodynamic tail section on a trailer's cargo door assembly. However, in some instances, the movement of multiple panels and their locking/unlocking may prove cumbersome. Therefore, FIG. 28 details an alternate embodiment for a truck aerodynamic structure that is based on an "origami" type folding principle. That is, the folding of the central/medial vertical panel causes the remaining, fully interconnected aerodynamic panel structure to fold together into a final folded form in a predetermined order.

Figure 28:
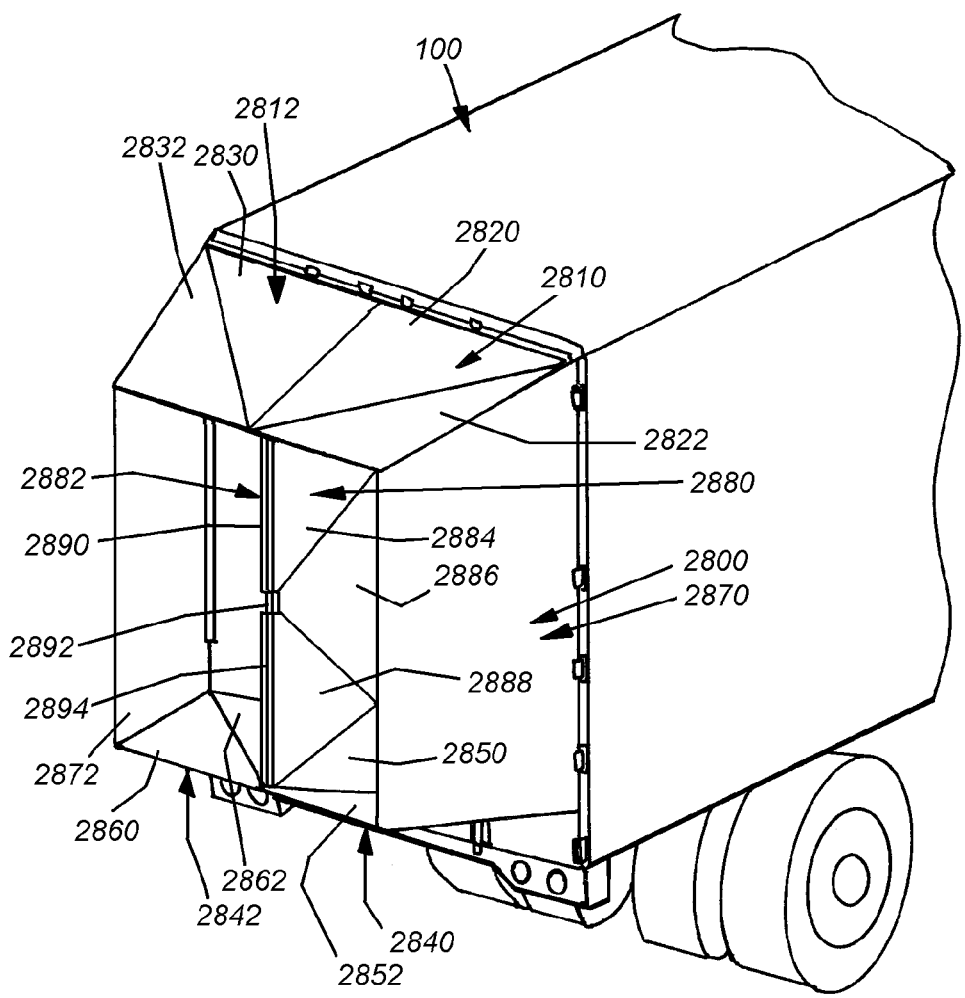
FIG. 28 is a fragmentary perspective view of the rear of a truck trailer cargo body rear showing an aerodynamic structure in a deployed orientation according to an alternate embodiment that employs an "origami" type folding arrangement.

As shown in FIG. 28, the above-described trailer cargo body 100 has been provided with an aerodynamic structure 2800 that consists of two individual door assemblies 2810 and 2812 attached to each of two respective underlying hinged cargo doors. Each aerodynamic assembly 2810 and 2812 comprises a set of individual panels that fold along accurately placed and oriented adjoining hinge lines. That is, each top horizontal panel 2810 and 2812 consists of a pair of foldable upper panel sections 2820, 2822 and 2830, 2832 respectively. Likewise, each bottom horizontal panel 2840 and 2842 consists of corresponding folding sections 2850, 2852 and 2860, 2862 respectively. In this embodiment, the outer side panels 2870 and 2872 are single-piece units for maximum rigidity and strength. The two confronting medial vertical panels 2880 and 2882 each consist of three separate folding sections 2884, 2886, 2888 and 2890, 2892, 2894, respectively.

Figure 29:
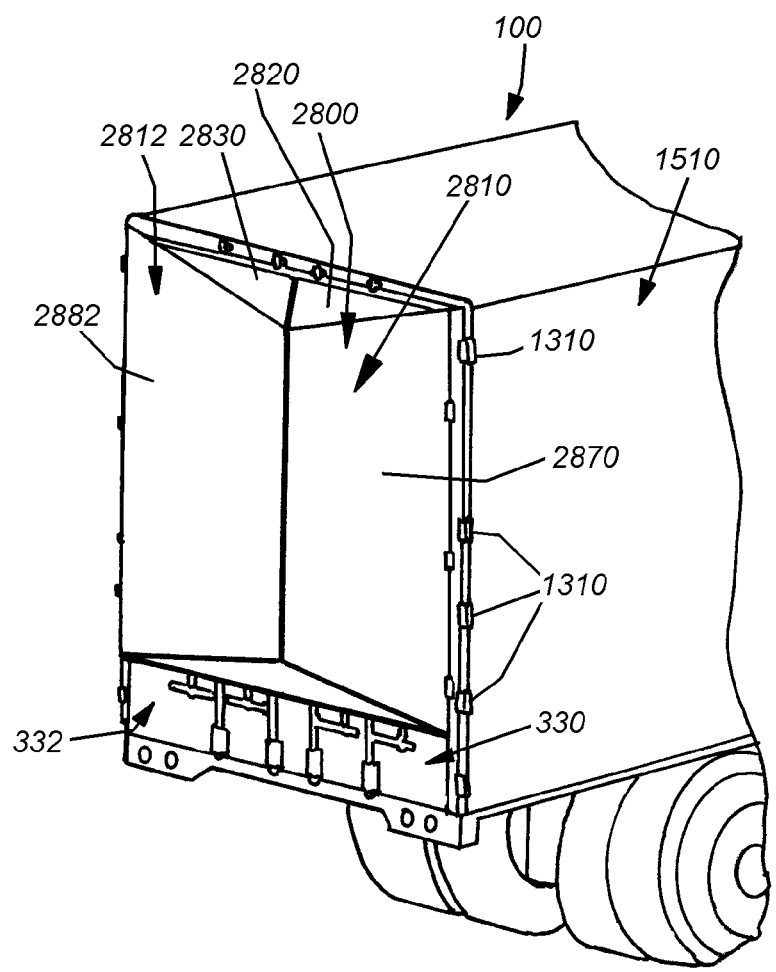
FIG. 29 is a fragmentary perspective view of the rear of a truck trailer cargo body rear of FIG. 28 showing the origami aerodynamic arrangement in a folded orientation.

Referring to FIG. 29, in a folded orientation, the aerodynamic structure lies flatly against the respective doors 330 and 332 to allow these doors to be opened, and secured against the sides 1510 of the trailer 100 in a manner generally described above for the separate, lockable panels. A version of the modified hinge assemblies 1310 are described above are employed in order to facilitate opening of a thickened overall door structure to its full degree.

Figure 30:
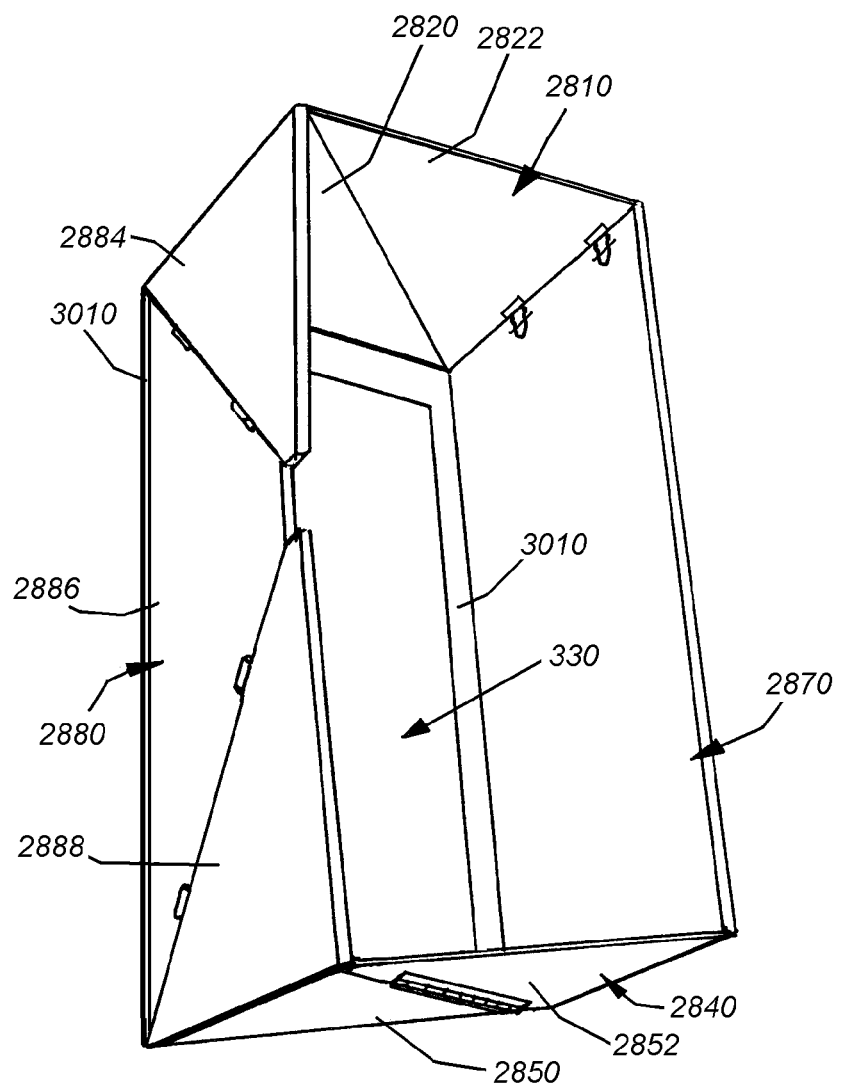
FIG. 30 is a perspective view of the folding origami aerodynamic structure for one of the pair of adjacent truck trailer cargo doors according to the embodiment of FIGS. 28 and 29 in a fully deployed orientation.

Referring now to FIG. 30, the operation of one of the "origami" type aerodynamic structures (2810) is shown in further detail. It should be noted that the structure resides on a spacer frame 3010 that is similar in size, shape and relative standoff (e.g. different heights for different frame sides) as the above-described frame base. In this embodiment the sizing of heights for each side of the spacer frame 3010 is chosen to allow each of the four overall panels 2870, 2810, 2840 and 2880 to properly overlap each other in the final folded orientation.

Figure 31:
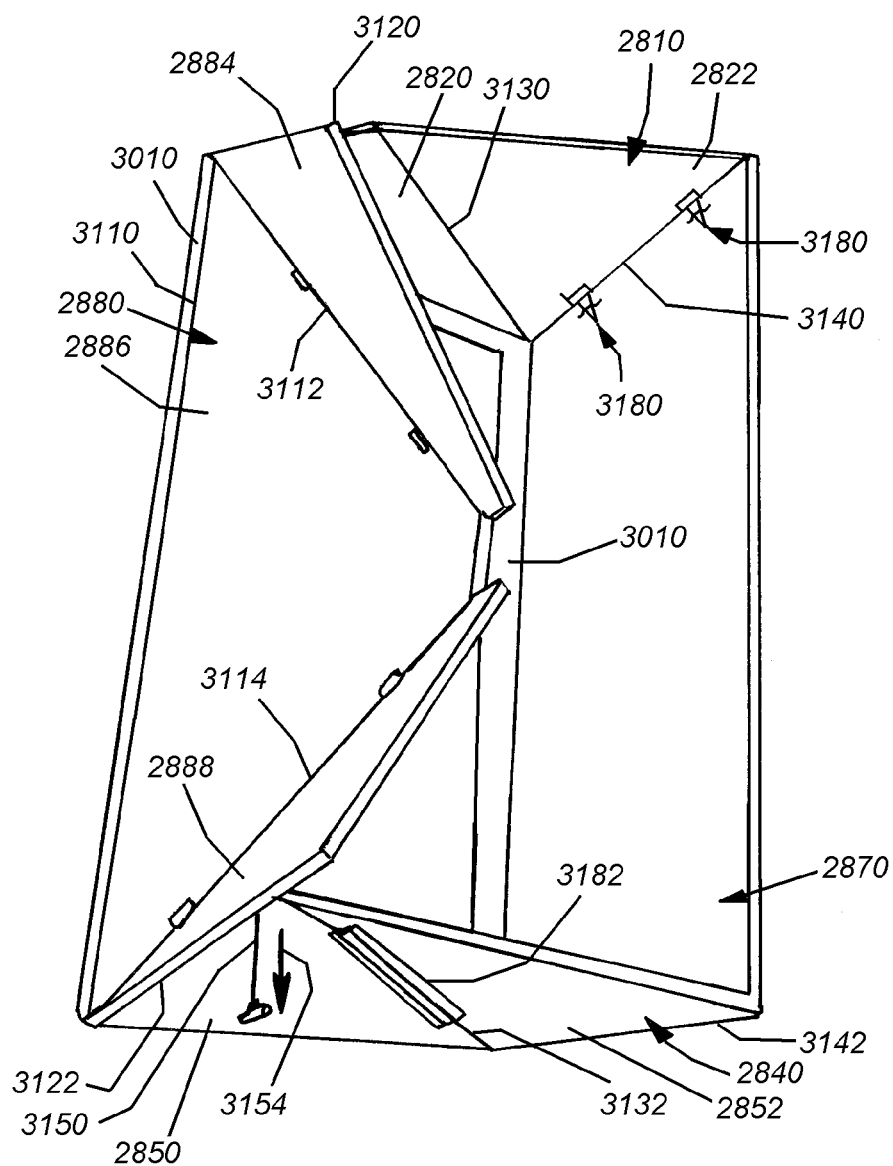
FIG. 31 is a perspective view of the folding origami aerodynamic structure for one of the pair of adjacent truck trailer cargo doors according to the embodiment of FIGS. 28 and 29 showing the folding procedure from the deployed orientation of FIG. 30.

With reference also to FIG. 31, the structure and function of the origami-type aerodynamics structure is described in further detail. The central or medial vertical panel 2880 hinges along its base line 3110 with respect to the spacer frame 3010 as shown. In this manner, the main/center medial panel section 2086 moves inwardly and outwardly, causing the upper and lower panel sections 2884 and 2888 to hinge along the adjoining medial panel hinge lines 3112 and 3114. This movement, in turn, causes the adjoining top and lower panel sections 2820 and 2850 to hinge along the corner hinge lines 2120 and 3122. In addition, the movement of these panel sections 2820 and 2850 causes the adjoining top horizontal panel sections 2822 and 2852 to move along hinge lines 3130 and 3132. Likewise, the hinged one-piece outer vertical panel 2870 is drawn in along hinge lines 3140 and 3142.

When folded, the central medial vertical panel section 2886 is placed closest to the underlying cargo door, followed by the two folded-in adjoining medial upper and lower panel sections 3112 and 3114, respectively. Overlying these medial panel sections are the adjoining upper panel sections 2820 and 2850, followed by the adjoining upper panel sections panels 2822 and 2852. Overlying this folded grouping of panel sections is the outer vertical panel 2870. In this manner, the outer vertical panel 2870, which defines the only one-piece, unitary member in this embodiment, covers the separate, individual folded pieces thereby assisting in protecting them from damage and weathering. A variety of hinge structures can be used to join the panels and panel sections. Strap hinges, or elongated piano-style hinges can be employed. Where possible such hinges should be located on the interior of the panel assembly (when deployed) to protect hinges from the elements and smooth the aerodynamic profile. Flexible tape or an elastomeric sheet (or another flexible material) can be used to cover the outside surface at each hinge line so as to further seal the joint from air and water infiltration. In alternate embodiments, hinge material can be constructed from a durable and high-strength polymer material or a high strength fabric.

Because each panel has a finite thickness, a fixed hinge joint between panels, which displays only one rotational degree of freedom would not allow the unique origami type folding of panels to occur without binding. To compensate for this characteristic non-linear folding, the hinge lines of adjoining horizontal and vertical panels are provided with "planar joints" that exhibit both rotational and translational motion. This is accomplished by providing so-called sliding hinge assemblies 3180 at the hinge lines between horizontal and vertical panels/panel sections. In this embodiment, the intra-panel joints between sections of the same panel (e.g. joints between top sections, joints between bottom sections and joints between medial sections) are provided with fixed rotation-only hinges 3182. These rotation-only hinges can be elongated piano-style hinges or separated hinge units.

Figure 31A:
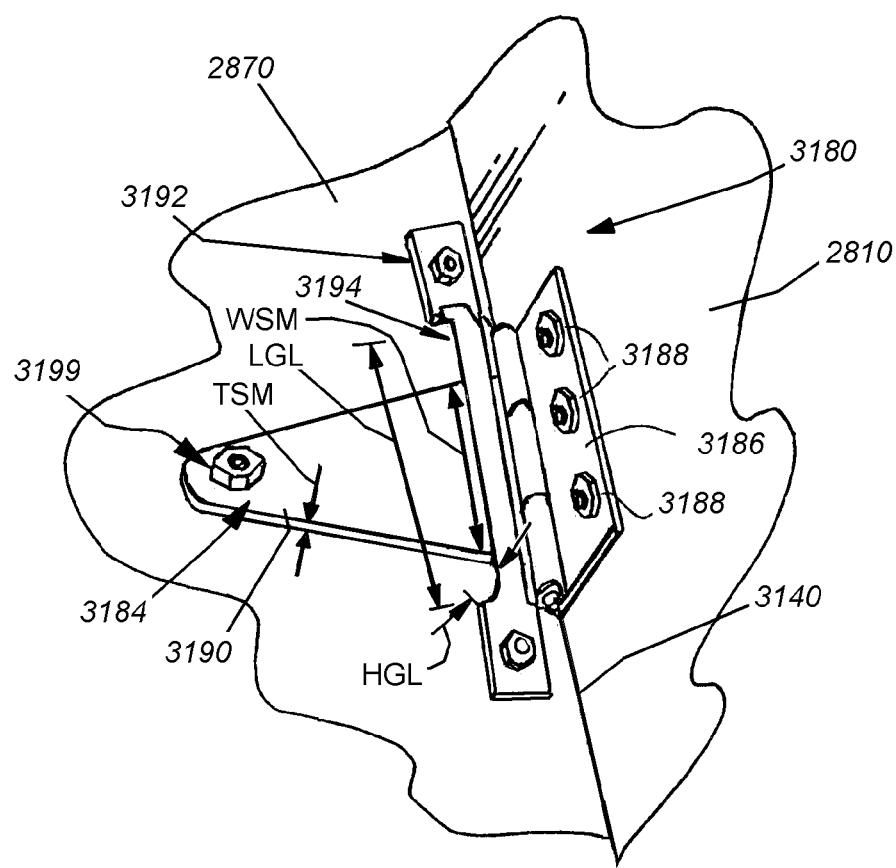
FIG. 31A is a fragmentary perspective view of a pair of adjoining panels in the origami arrangement of FIG. 30 detailing an exemplary sliding hinge assembly in a fully deployed orientation.

Referring to FIG. 31A, a sliding hinge assembly 3180 mounted between exemplary panels 2870 and 2822 along hinge line 3140 is shown. The hinge element 3184 in this embodiment is similar in form to a conventional strap hinge with a butt base that is secured to the panel 2180 by fasteners 3188 and a pivoting strap member 3190. Unlike a conventional hinge, however, the strap member is not directly and fixedly secured to the opposing panel 2870. Rather, the strap member 3190 resides within a loop 3192 that has a gap 3194 with a gap height HGL (relative to the panel surface) that is slightly greater than the thickness TSM of the strap member so as to allow the strap member 3190 to slide within a gap 3194. The length LGL of the gap is also greater than the maximum width WSM of the strap member 3190 to provide limited side-to-side/lateral clearance between the strap member and loop in this embodiment. When the panels are fully deployed, the hinge line is closely conformed by the adjoining panels 2810, 2870, and the strap member of the hinge is directed fully into the loop. The fitment of the panels and accurate placement of the hinges and loops ensures a tight and rigid structure in the deployed orientation.

Figure 31B:
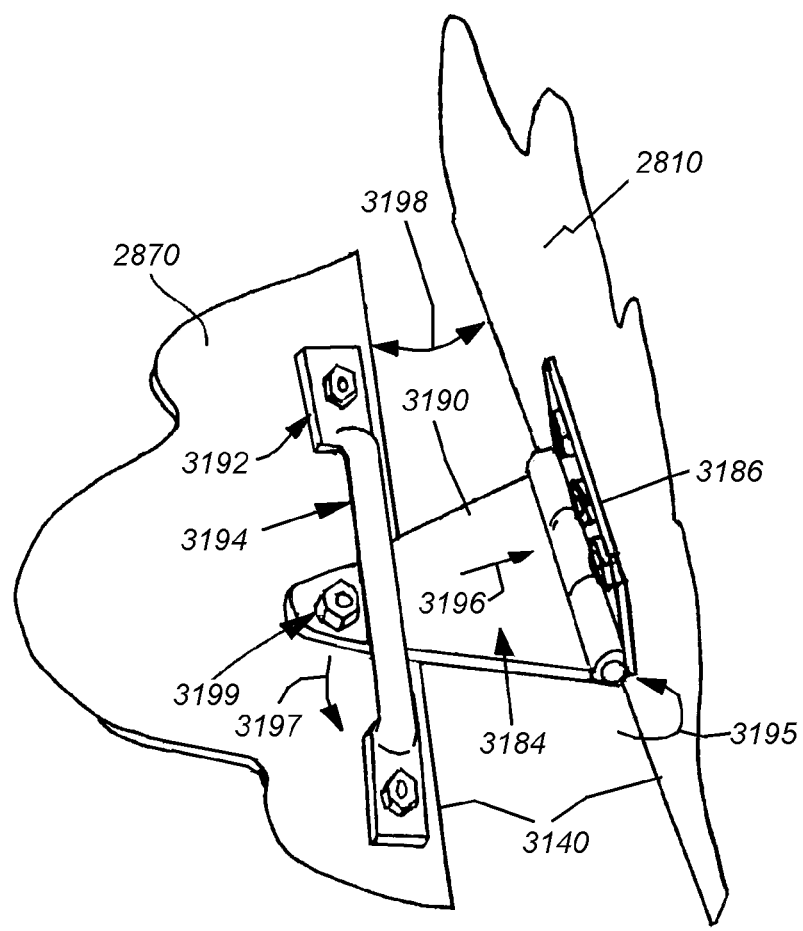
FIG. 31B is a fragmentary perspective view of the pair of adjoining panels in accordance with FIG. 31A detailing the operation of the exemplary sliding hinge assembly during a panel folding/collapsing process.

However, as shown in FIG. 31B when the panels are folded, and rotate about the hinge pivot (curved arrow 3195), the strap member translates in two degrees of translational freedom (arrows 3196 and 3197) as the strap member 3190 slides within the gap as the panels form a separation (double arrow 3198) along their mutual hinge line 3140. In this embodiment, the degree of sliding along the direction of arrow 3196 is approximately 3 inches. This amount varies based upon the relative thickness of the panels and the folding geometry. To avoid inadvertent pullout of the strap member form the loop, the end of the strap member includes a stop. To avoid inadvertent pullout of the strap member 3190 from the loop 3192, the end of the strap member includes a stop 3199 that prevents the strap member from fully passing out of the loop. It should be clear that the above-described configuration for a sliding hinge is only one of a variety of possible designs. The term "sliding hinge" as used herein should be taken broadly to contemplate any hinge geometry that allows rotation, and at least one degree of translational movement between adjoining panels.

In this embodiment, two or more, spaced-apart, discrete sliding hinges (or a single, elongated sliding hinge structure) are mounted along hinge line 3120, 3140, 3142 and 3122, while other hinge lines are served by rotation-only hinges. In alternate embodiments, other sets of hinge lines can be served by sliding hinges.

Referring further to FIG. 31, a simple deployment mechanism for the structure 2810 is shown, consisting of a pull cord 3150 and handle 3152 that are drawn downwardly (arrow 3154) to bias the unit into deployment. The cord 3150 can be locked in place against a stop on the door, or another retaining mechanism can be used to hold the cord taut.

Figure 32:
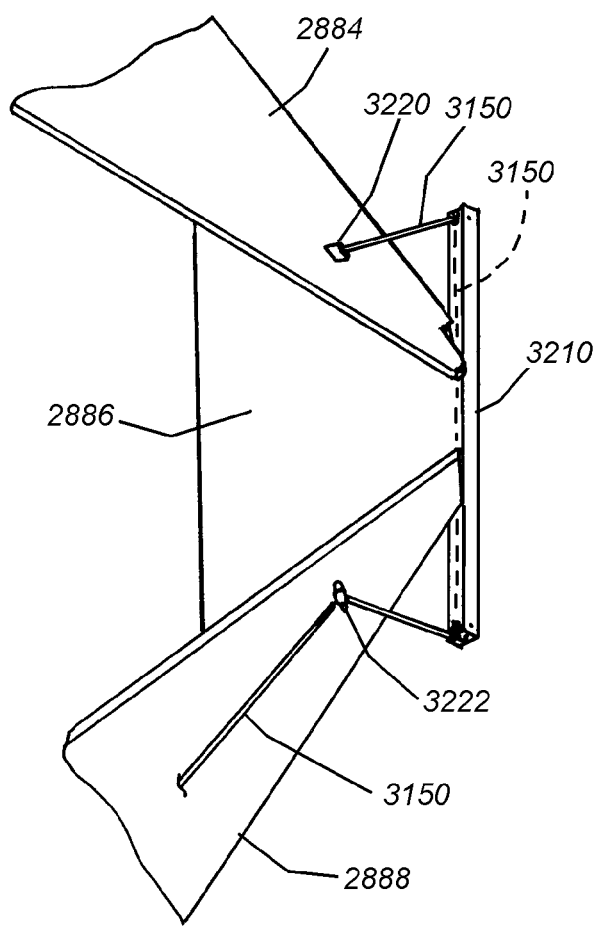
FIG. 32 is a more detailed perspective view showing the central stiffener bar/brace used for deploying and securing the unfolded origami aerodynamic arrangement as shown in FIG. 30.

Referring further to FIG. 32, the cord 3150 passes through a hollow stiffener bar 3210 that is physically secured by fasteners or another mechanism to the central medial panel section 2886. The cord is secured to a loop 3220 on one adjoining medial panel section 2884, and slidably passes through a loop 3222 on the other adjoining medial panel section 2888. When the cord is pulled taut (the upper end of the cord being anchored against the loop 3220), it forces the draw bar to bias the central medial panel 2886 into alignment with the two adjoining panels 2884 and 2888. This provides a simple and effective mechanism for deploying the aerodynamic structure as the adjoining upper panel sections and outer panel are thus forces to move outwardly into the deployed orientation. By releasing the cord's tension, the panels can be folded back together, and nested within the spacer frame. A pre-tensioned shock cord, or other form of tension spring assembly can be attached between the central medial panel and cargo door face (or another location, to facilitate folding when cord tension is released. Note, in alternate embodiments, the stiffener bar can be spring loaded against the door, so that release of tension of the cord 3150 automatically brings the aerodynamic structure into a folded orientation.

Figure 32A:
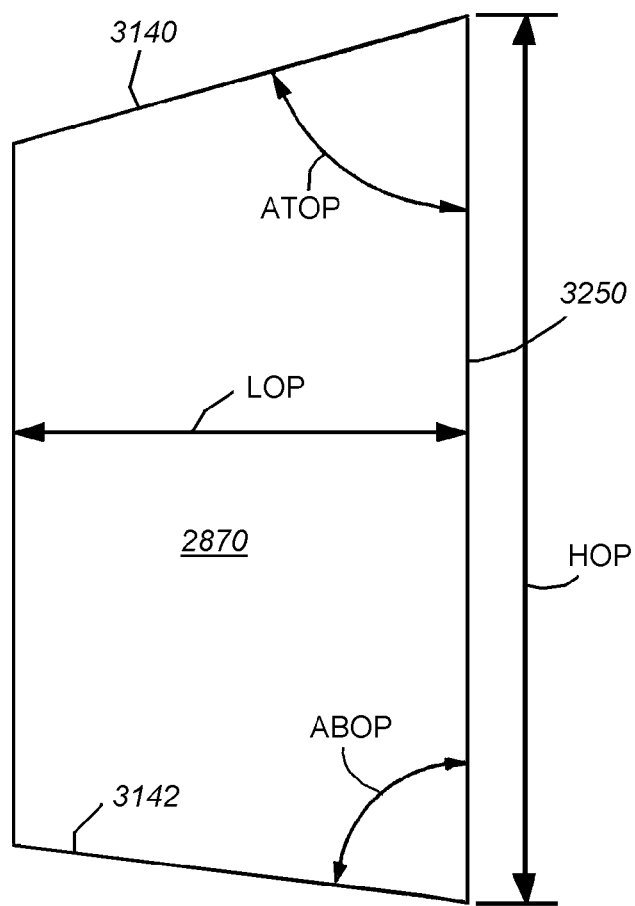
FIG. 32A is a plan view showing exemplary dimensions for an outer vertical aerodynamic panel according to an embodiment of the origami arrangement of FIGS. 28-32.

In an illustrative embodiment, the particular geometry that characterizes each of the origami-type panels is as follows:

FIG. 32A shows the one-piece outer vertical panel 2870. In an illustrative embodiment, the overall height HOP of the hinge line 3250 between the spacer frame and the panel 2870 is approximately 94.75 inches. The perpendicular length LOP of the panel is approximately 48 inches. The top taper, defined by the angle ATOP between the spacer frame hinge line 3250 and the hinge line 3140 with the adjoining upper panel is approximately is approximately 75.49 degrees. The bottom taper angle ABOP between the lower panel hinge line 3142 and the spacer frame hinge line 3250 is approximately 83.24 degrees.

Figure 32B:
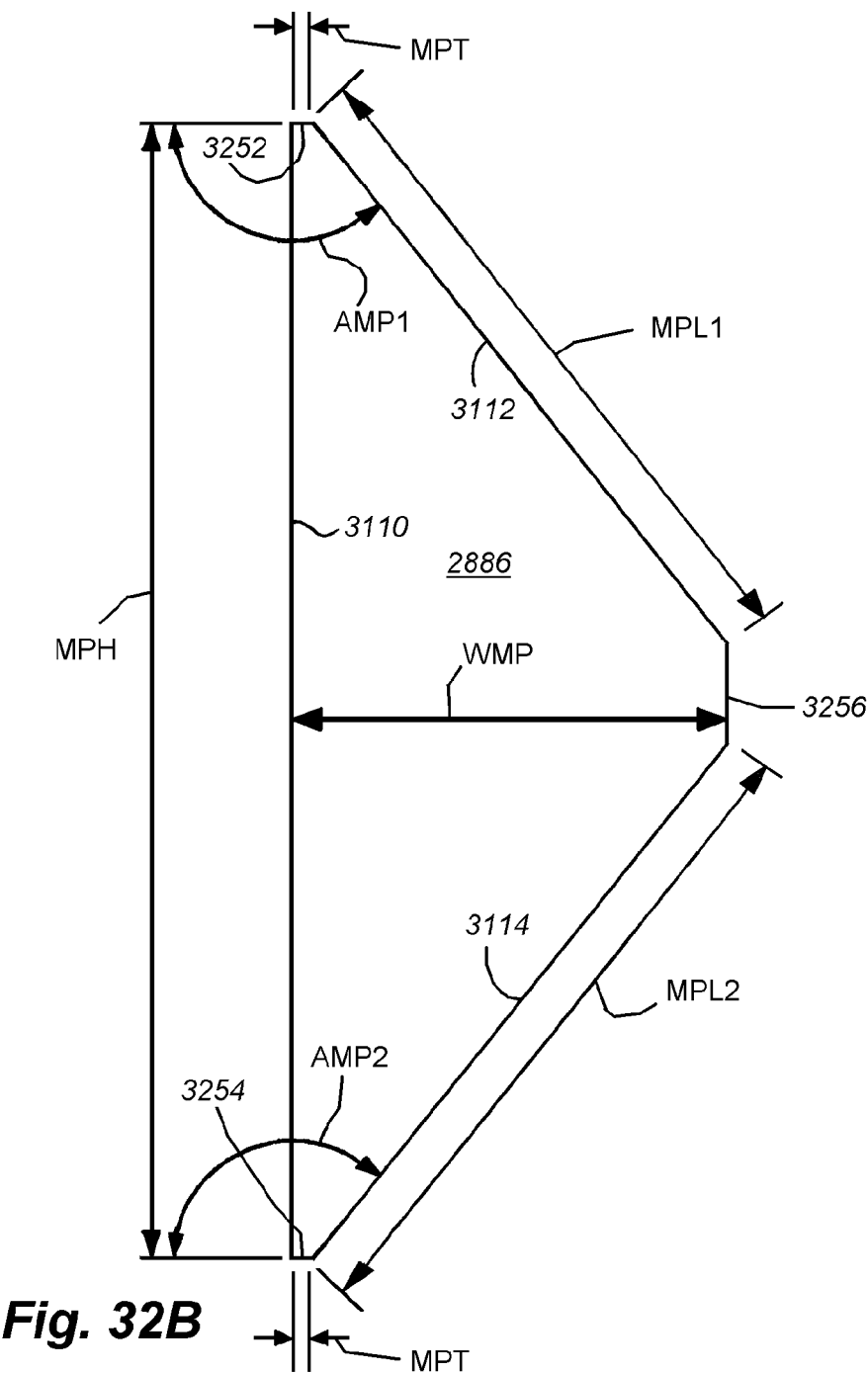
FIG. 32B is a plan view showing exemplary dimensions for the central/medial vertical aerodynamic panel section according to an embodiment of the origami arrangement of FIGS. 28-32.

FIG. 32B details the layout of the central section 2886 of the overall medial panel. The overall vertical height MPH of the space frame hinge line 3110 is approximately 93.75 inches. The hinge line 3114 between the central section 2886 and the upper medial section 2884 (see FIG. 32C) has a length MPL1 of approximately 54.08 inches. Likewise, the length MPL2 of the lower hinge line 3114 between the central section 2886 and the bottom medial section 2888 (see FIG. 32D) is approximately 67.88 inches. The small thickness 3252 and 3254 at the top and bottom of the central panel section 2886 has a measurement MPT of approximately 2 inches. The depicted angles AMP1 and AMP 2 of the respective hinge lines 3112 and 3114 are 127.5 degrees and 131.5 degrees, respectively. The horizontal width WMP of the panel at its widest point, between the hinge line 3110 and outer edge 3256 is approximately 36 inches.

Figures 32C, 32D:
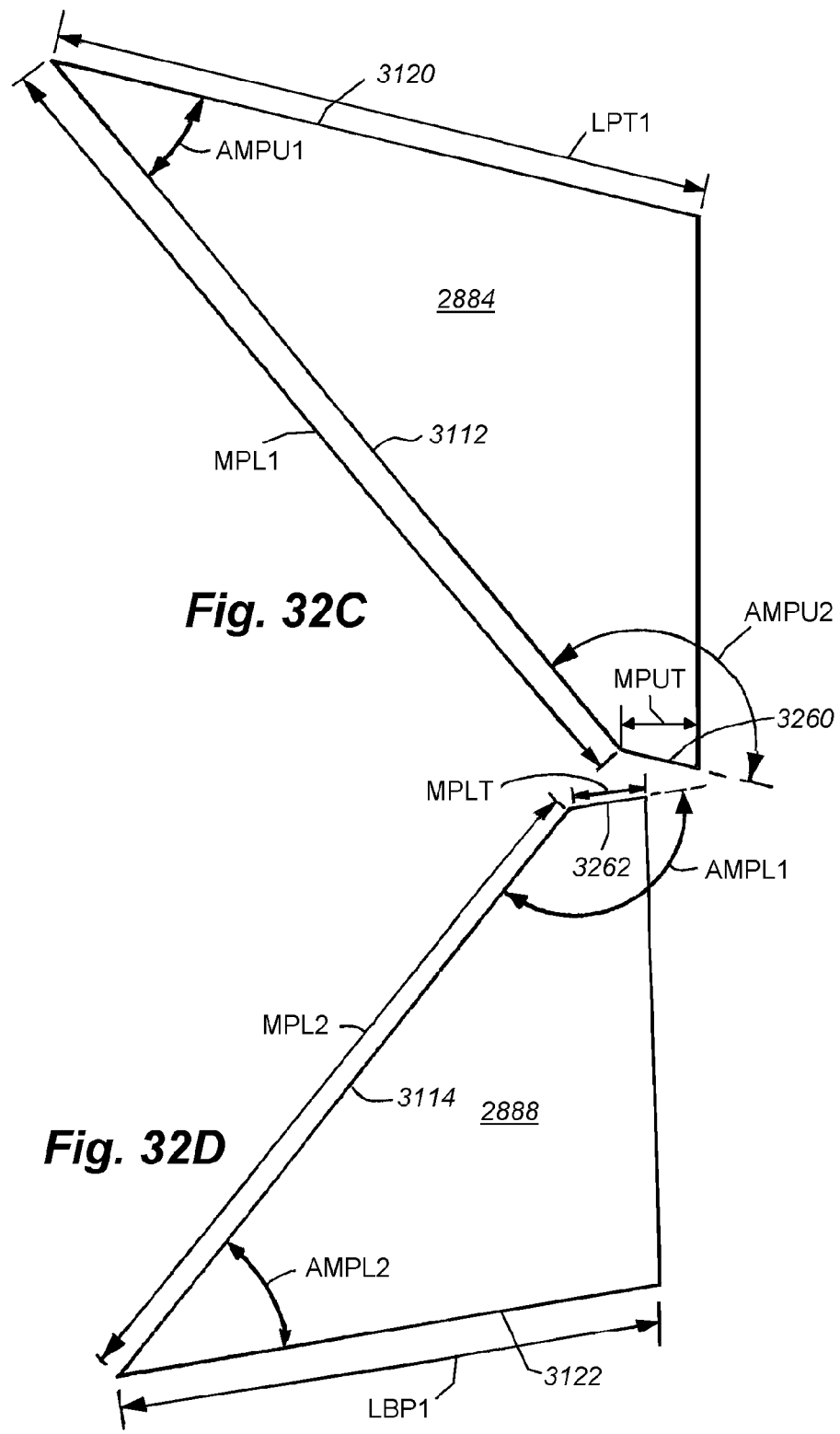
FIG. 32C is a plan view showing exemplary dimensions for the upper, adjoining central/medial vertical aerodynamic panel section according to an embodiment of the origami arrangement of FIGS. 28-32.
FIG. 32D is a plan view showing exemplary dimensions for the adjoining lower central/medial vertical aerodynamic panel section according to an embodiment of the origami arrangement of FIGS. 28-32.

With reference to FIG. 32C, the upper medial panel section 2884 defines the above-described length MPL1 of 54.08 inches along its common hinge line 3112 with the central media panel 2886. The upper angle AMPU1, between hinge lines 3120 and 3112, is approximately 37.5 inches. The lower edge 3260 has a length MPUT, as shown, of approximately 4.82 inches. The depicted angle AMPU2, at this location is approximately 142.5 degrees. The hinge line 3120, which connects to the upper panel section has a length LPT1 of approximately 48 inches.

With reference to the bottom medial panel section 2888 shown in FIG. 32D, the hinge line 3114, as described above, has a length MPL2 of approximately 49.65 inches. The hinge line 3122, which interconnects with the lower panel section, has a length LBP1 of approximately 48 inches. The upper section 3262 has a length MPLT of approximately 4.69 inches and the depicted angle AMPL1 is approximately 138.5 degrees. The opposing angle AMPL2, between the hinge lines 3114 and 3122, is approximately 41.5 degrees.

Figure 32E:
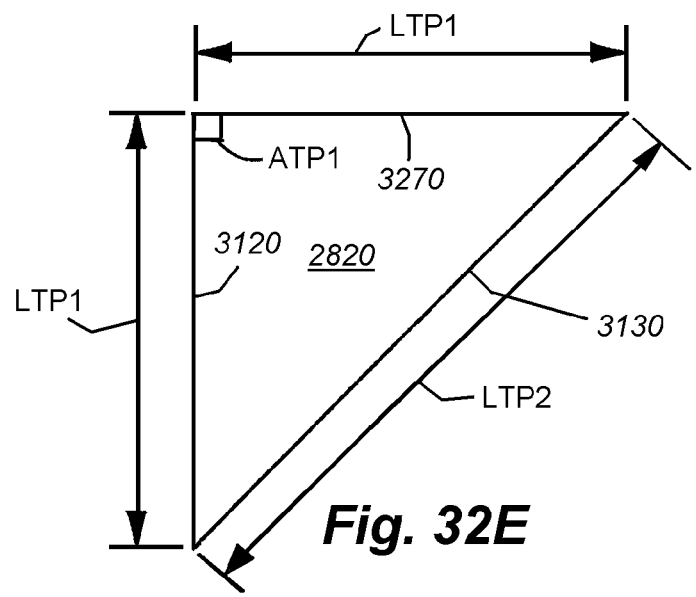
FIGS. 32E and 32F are each respective plan views showing exemplary dimensions for the two adjoining top horizontal aerodynamic panel sections according to an embodiment of the origami arrangement of FIGS. 28-32.
Figure 32F:
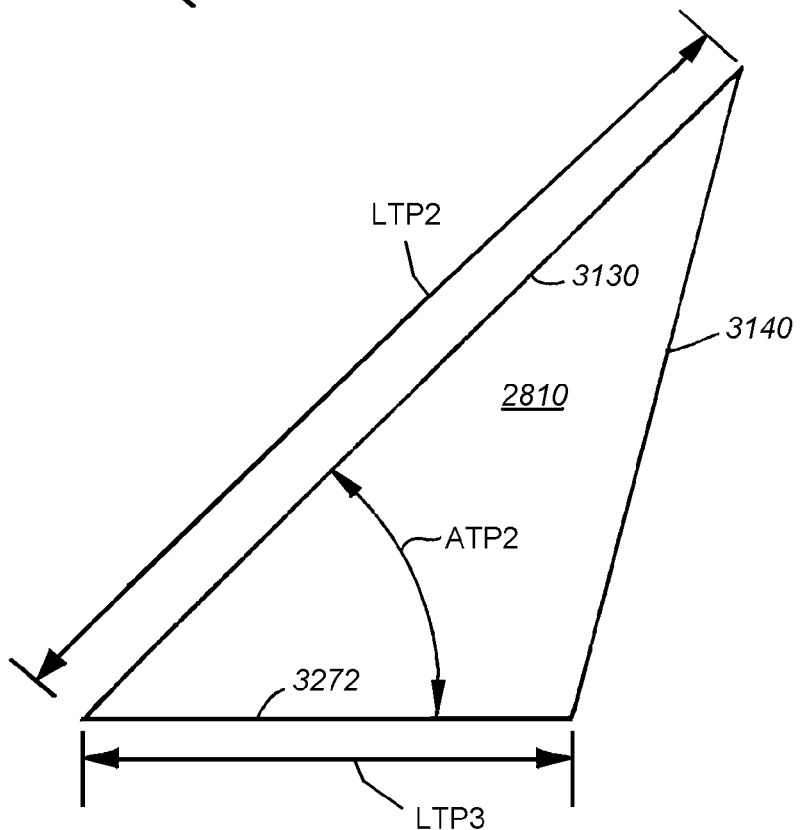

The two hinged-together sections 2820 and 2810 of the top horizontal panel are shown, respectively in FIGS. 32E and 32F. In the panel section 2820, the hinge line 3120 has a length LTP1 of approximately 48 inches. Likewise, the spacer frame hinge line 3270 has a similar length LTP1 of approximately 48 inches. The hinge line 3130 that joins to the other, adjoining upper panel section 2810 has a length LTP2 of approximately 67.88 inches. The panel defines a right-angle ATP1 of 90 degrees.

The adjoining upper panel section 2810 has a length LTP2 along its adjoining hinge line 3130 of approximately 67.88 inches. The outer edge 3272 has a length LTP3 of approximately 35.58 inches. The angle ATP2, between the edges 3130 and 3272, is approximately 45 degrees.

Figure 32H:
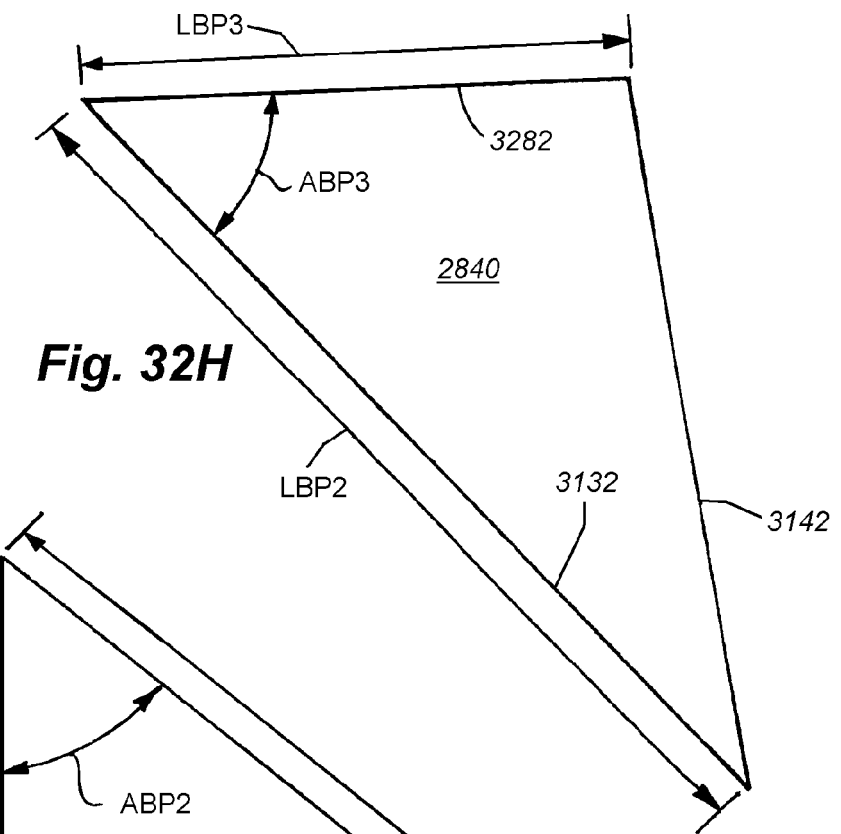
FIGS. 32G and 32H are each respective plan views showing exemplary dimensions for the two adjoining bottom horizontal aerodynamic panel sections according to an embodiment of the origami arrangement of FIGS. 28-32.
Figure 32G:
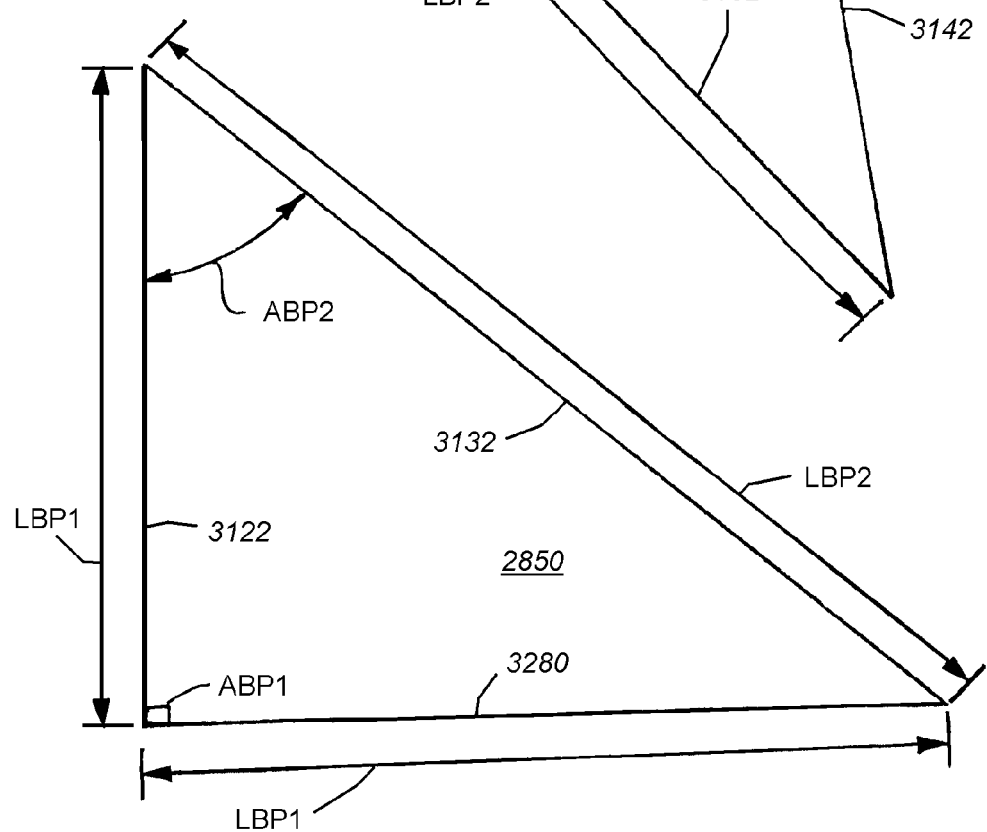

Reference is now made to the bottom horizontal panel sections 2840 and 2850, shown respectively in FIGS. 32H and 32G. The panel section 2850, which adjoins the medial panel is shown in FIG. 32G, and includes an adjoining hinge line 3122 with the bottom medial panel section 2888. This hinge line 3122 has the above-described length LBP1 of an approximately 48 inches. Likewise, the spacer frame hinge line 3280 defines a length LBP1 of approximately 48 inches. The lines join at a right angle ABP1 of 90 degrees. The opposite hinge line 3132, which connects with the other lower panel section 2840, has a length LBP2 of approximately 63.54 inches. Referring to FIG. 32H, which shows the other, adjoining lower panel section 2840, the adjoining hinge line 3132 also defines the above-described length LBP2 of approximately 63.54 inches. The outer edge 3282 of the panel 2840 has a length LBP3 of approximately 35.94 inches. The angle ABP3, between edges 3132 and 3282, is approximately 49.06 inches.

It should be noted that each of the above-described dimensions is exemplary and can be varied in order to vary the size, shape, or relative taper of the panels. Dimensions for an aerodynamic structure having a different size, shape and/or taper can be derived using geometric and trigonometric calculations or through trial-and-error, based upon full-size prototypes and small scale models. Accordingly, each of the dimensions described above should be taken as exemplary.

Figure 33:
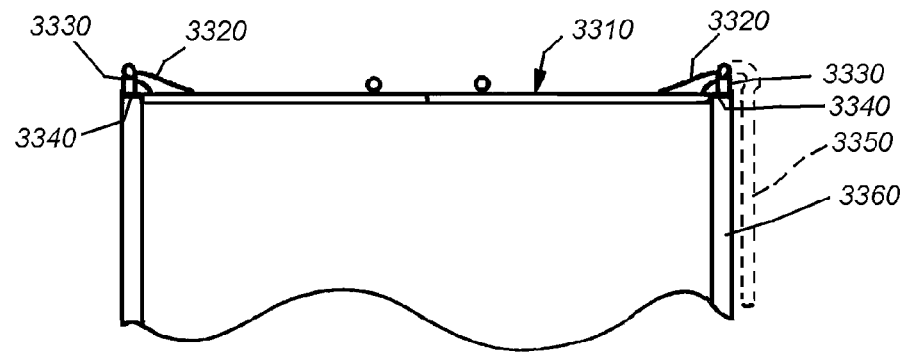
FIG. 33 is a partial top view of a conventionally mounted truck trailer cargo door without aerodynamic structures according to the prior art.

Each of the above-described embodiments utilizes modified hinges (1310 in FIG. 13) that allow for a thickened, outwardly extended door, due to the presence of the base frame and folded aerodynamic panels. In an alternate embodiment, the cargo hinges may remain conventional, and a modified door can be employed. With reference first to FIG. 33, a conventional door assembly 3310 according to the prior art is shown. This door assembly consists of hinge straps 3320 mounted on devises 3330 that are each secured against the trailer body door frame 3340. The relatively flat door 3350 can be opened to approximately 270 degrees, and secured flushly against the trailer side 3360 as described above.

Figure 34:
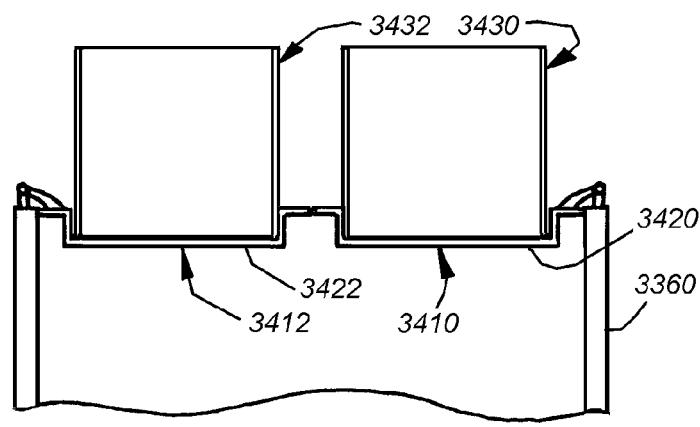
FIG. 34 is a top view of a folding aerodynamic structure in accordance with any of the embodiments contemplated herein, which seats within a recess of a modified door, shown in a deployed orientation.
Figure 35:
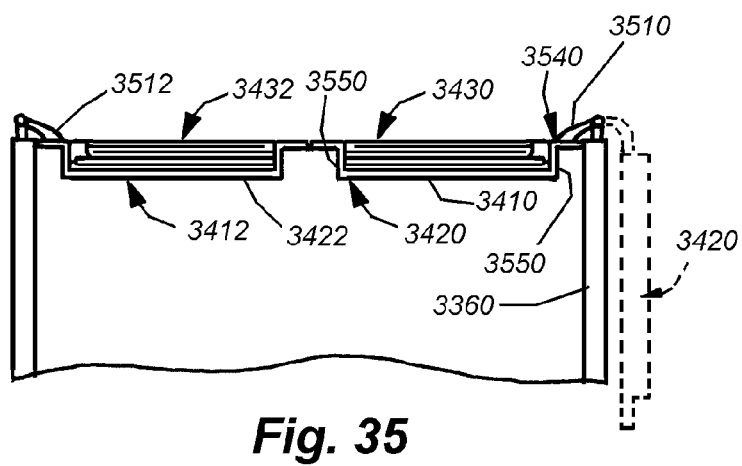
FIG. 35 is a top view of the folding aerodynamic structure of FIG. 34 in a folded orientation in which it lays flushly against, or below, the surrounding outer surface of the recessed door.

Conversely, FIGS. 34 and 35, detail modified doors 3410 and 3412 that each includes an inward recess 3420 and 3422, respectively. The recess is sized and arranged so that it allows a pair of aerodynamic structures 3430 and 3432 of an appropriate size and shape to be deployed out of the recesses as shown. When not in use, the aerodynamic structures can be folded into their respective recesses 3420 and 3422 as shown in FIG. 35. Because the surrounding surface 3540 of each door 3410 and 3412 is the maximum outward projection of the door (the folded panels being disposed at or below the surrounding surface). Thus, as shown in phantom, the door 3420 swings through 270 degrees to rest against the side 3360 of the trailer body in the same manner as a conventional door.

For the purposes of this embodiment, the recessed frame 3550 for each door can be defined as all or part of the "spacer frame" within the meaning of the term herein. That is, the folding panels can be nested within this frame structure.

Figure 36:
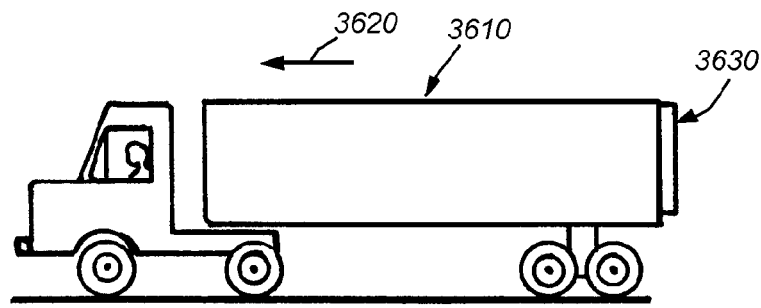
FIGS. 36 and 37 are schematic side views of a truck having a trailer that includes a folding aerodynamic structure in accordance with the embodiments of this invention in each of a retracted and deployed orientation, respectively using automated techniques, typically while the truck is in motion.
Figure 37:
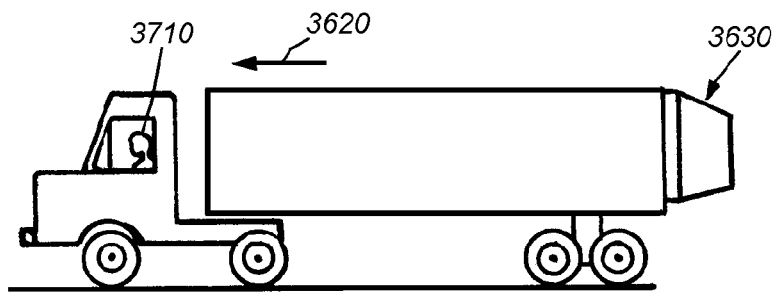

It is contemplated that any of the structures described herein can be deployed automatically. For example, as shown in FIG. 36, a truck 3610 is moving at a predetermined speed (arrow 3620). Either automatically, when a sufficient level of speed is met (for example 35 mph), or by a deliberate operation of the driver 3710, the aerodynamic structure 3630 moves from a refracted position (FIG. 36) to an extended position (FIG. 37). Automated extension and refraction can also occur while the truck is stationary, without regard to the prevailing speed based upon the driver's direction or another predetermined condition. Likewise, automatic refraction can occur whenever the truck moves in reverse.

Figure 38:
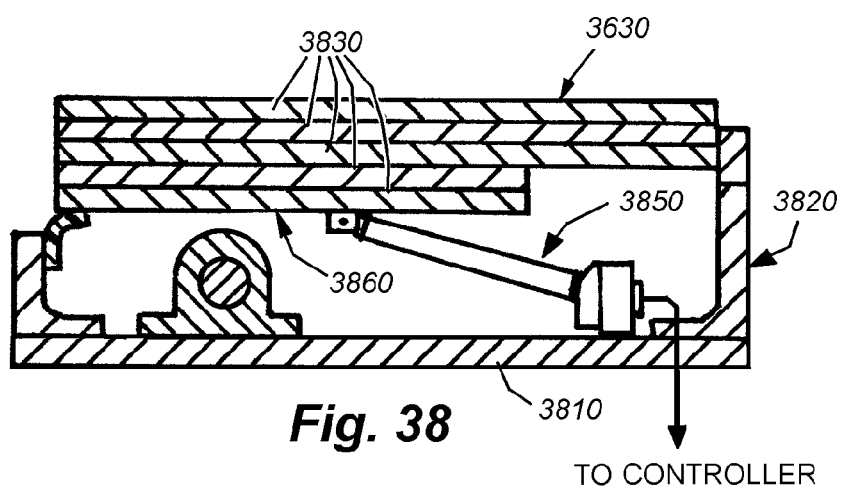
FIG. 38 is a fragmentary top cross section of a door assembly with attached aerodynamic structure showing an actuator secured to the medial panel that enables the unfolding of the aerodynamic structure according to an embodiment of this invention from the depicted folded state.

As shown in FIG. 38, a cargo door, 3810 of the exemplary truck trailer includes a spacer frame 3820 that supports a folded aerodynamic structure 3630 with panels 3830 in accordance one of the various embodiments of this invention (for example, the above-described "origami" type structure). Hence, the panels are each hinged to a respective portion of the spacer frame 3820. A linear actuator 3850 that is hydraulically or pneumatically controlled, and which responds to an electrical signal from a controller, is attached between the cargo door 3810 and (in this example) a portion of the central medial panel section 3860.

Figure 39:
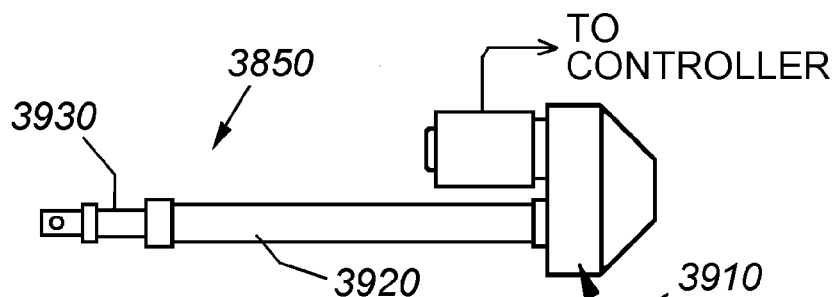
FIG. 39 is a more detailed side view of the actuator of FIG. 38.
Figure 40:
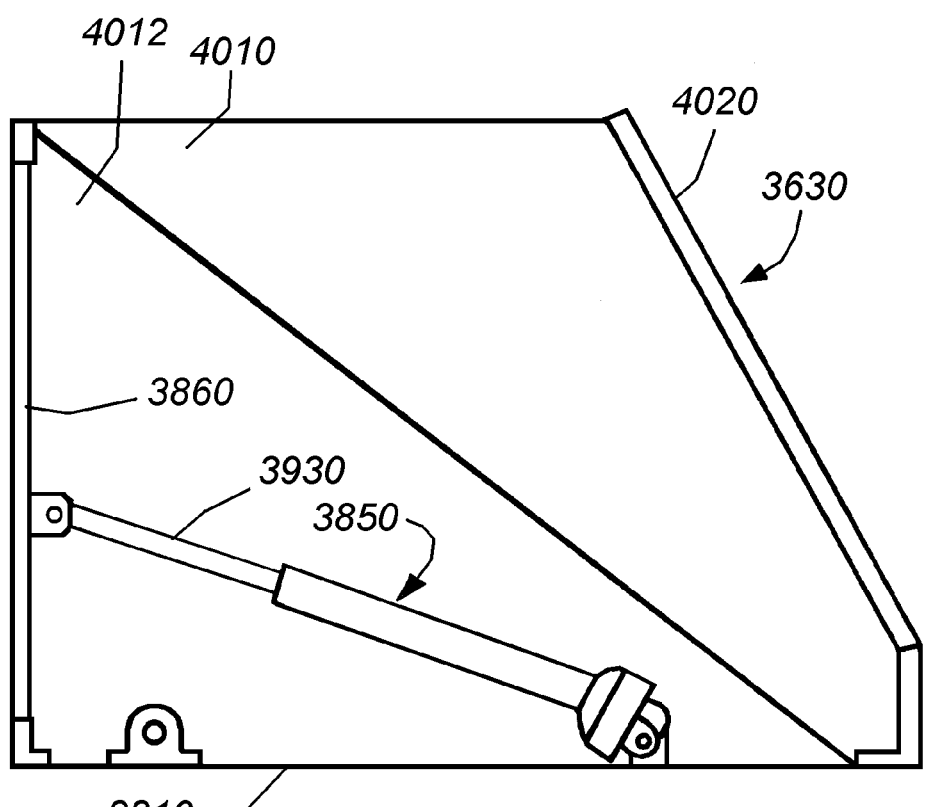
FIG. 40 is a top view of the folding aerodynamic structure of FIG. 38 showing the aerodynamic structure fully deployed in response to bias force from the actuator of FIGS. 38 and 39.

With reference briefly to FIG. 39, the actuator 3850 includes a base power unit 3920, a linear cylinder 3920 and a moving ram 3930. As shown in FIG. 40, when activated, the actuator 3850 extends the ram 3930, causing deployment of the folded medial panel section 3860. In this fully deployed orientation, the depicted pair of horizontal lower panel sections 4010 and 4012 are biased into a fully deployed orientation. Likewise, the outer panel 4020 is shown fully deployed at its characteristic taper.

Figure 41:
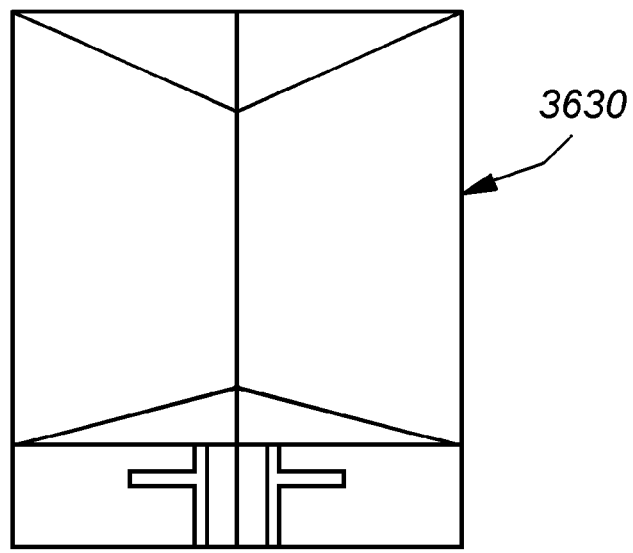
FIGS. 41 and 42 are rear views of the automated aerodynamic structure of FIG. 38 in each of a folded/retracted and deployed orientation, respectively.
Figure 42:
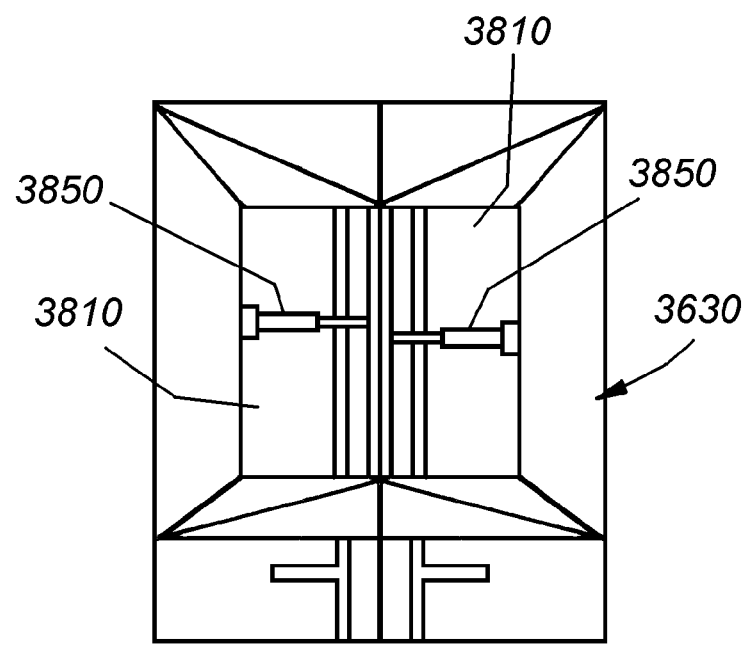
Figure 43:
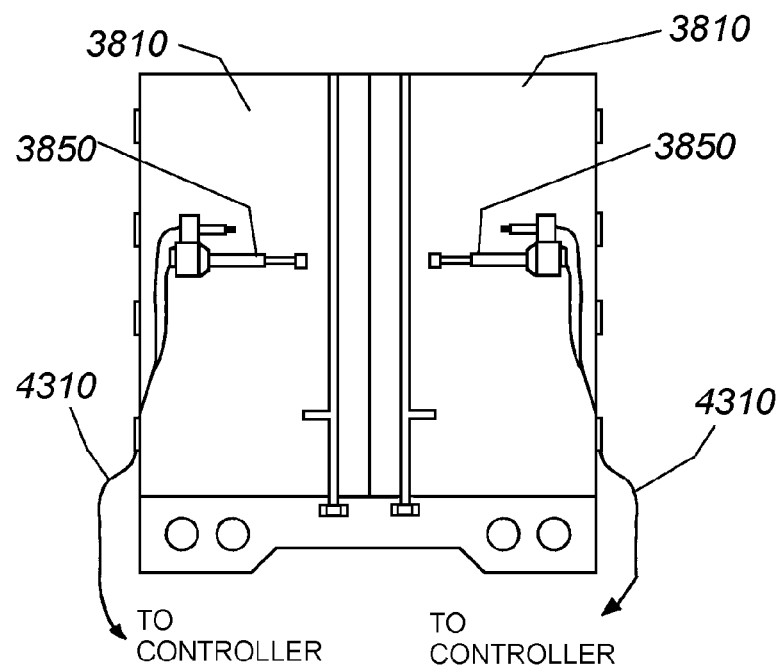
FIG. 43 is an exposed rear view of the truck trailer rear of FIGS. 36 and 37 showing the positioning of the actuators of FIG. 38 upon the underlying cargo doors.

Retraction/folding of the aerodynamic assembly 3630 occurs in a manner opposite deployment, with the ram 3930 begin drawn into the actuator 3850 to assume the refracted form shown in FIG. 38. In rear view, as shown in FIG. 41, the aerodynamic structure 3630 assumes the typical folded orientation. When extended, as shown in FIG. 42, the actuators 3850 are visible on the respective doors 3810. In alternate embodiments, the actuators can be secured beneath a covering for enhanced weather protection. Such a covering can be part of an aerodynamic surface that creates desired aerodynamic effects within the open cavity defined by the deployed aerodynamic panels.

As described briefly above, each actuator 3850 mounted on a respective door 3810 is interconnected via a control wire, or pneumatic/hydraulic line 4310 to an electronic, pneumatic or hydraulic controller (not shown) that can be instructed by a speed/motion sensor and/or the driver to selectively extend and retract the aerodynamic structure. This mounting arrangement allows easy access to the actuators and can enable the driver too quickly to deploy and retract the system manually if necessary. This arrangement also has the advantage that it applies force to the middle of the central medial panel section for even application of biasing force during deployment. However, this arrangement may be more susceptible to weather and wear and tear.

Figure 44:
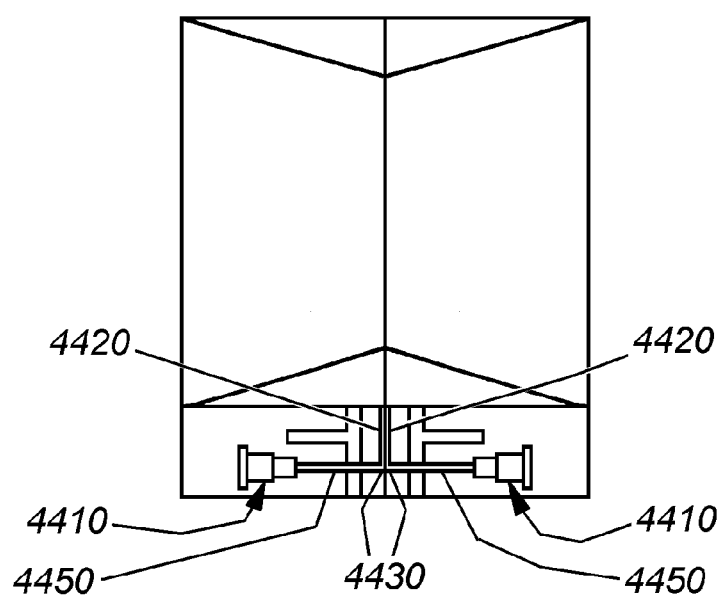
FIG. 44 is a rear view of the truck trailer rear of FIGS. 36 and 37 showing an alternate positioning of an actuator in accordance with this invention.

In an alternate embodiment, as shown in FIG. 44, the actuators 4410 can apply force to the central medial panel sections via an L-shaped extension 4420 that extends from each central medial panel section to a location beneath the aerodynamic assembly—in the region of the bumper. A pivot resides at each connection 4430 between the L-shaped extension and the actuator ram 4450. This allows the actuators to be located remote from the central region of each door, reducing the possibility of obstruction.

Figure 45:
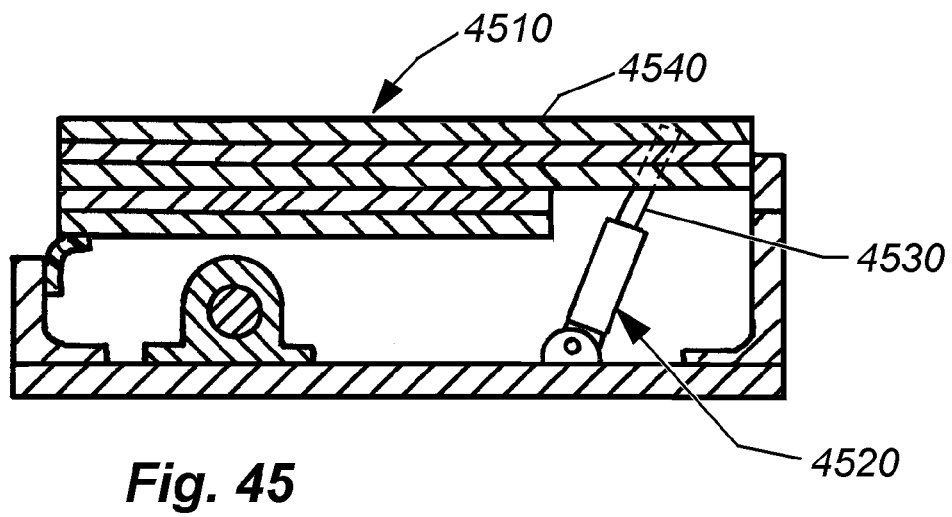
FIG. 45 is a fragmentary top cross section of a door assembly with attached aerodynamic structure showing an actuator secured to the outer panel that enables the unfolding of the aerodynamic structure according to an embodiment of this invention from the depicted folded state.
Figure 46:
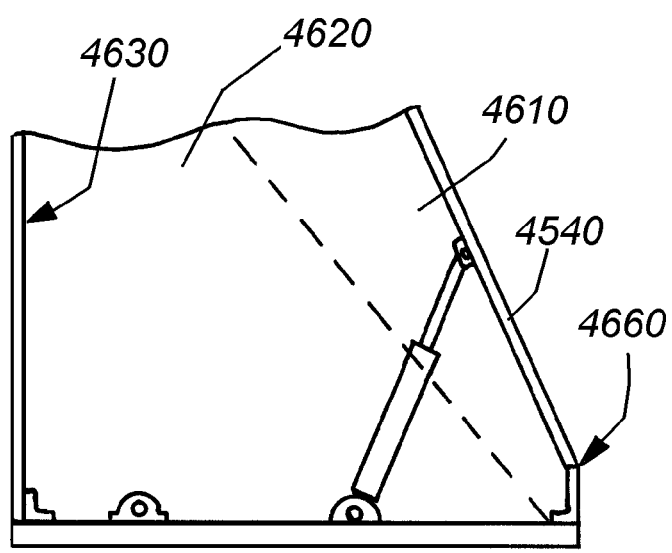
FIG. 46 is a top view of the folding aerodynamic structure of FIG. 45 showing the aerodynamic structure fully deployed in response to bias force from the actuator.
Figure 50:
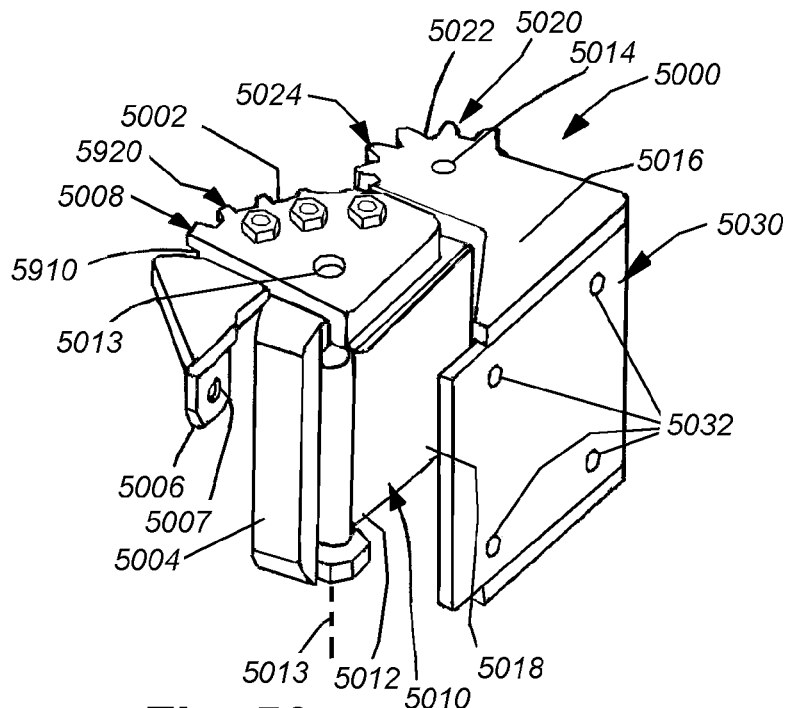
FIG. 50 is a rear perspective view of a geared hinge assembly for preventing racking of a door and/or spacer frame having an aerodynamic structure mounted thereon, according to an illustrative embodiment of this invention.
Figure 51:
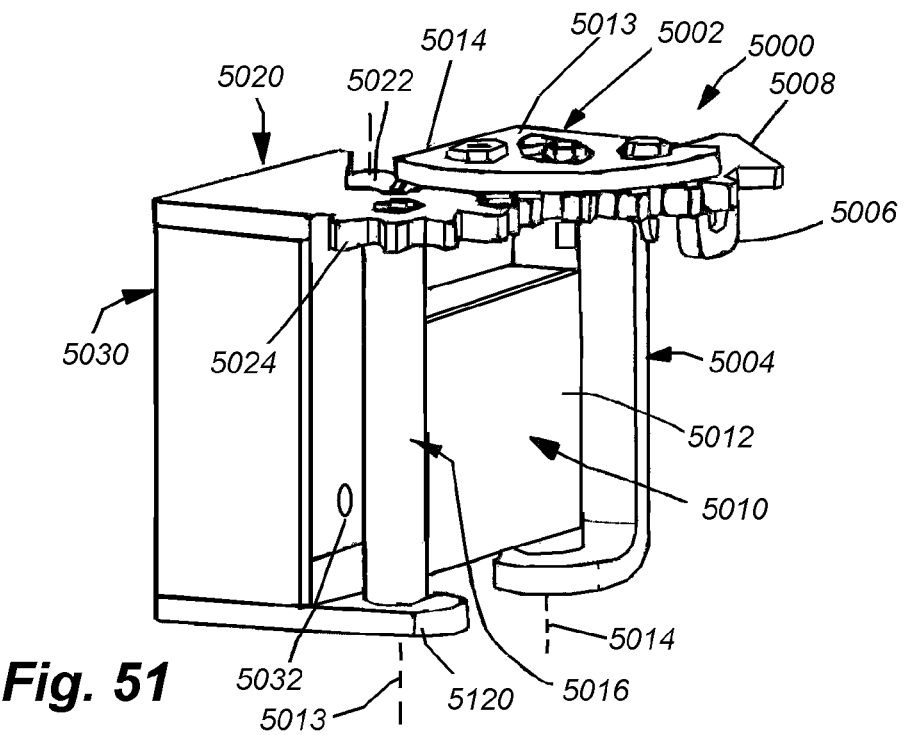
FIG. 51 is a frontal perspective view of the geared hinge assembly of FIG. 50.
Figure 52:
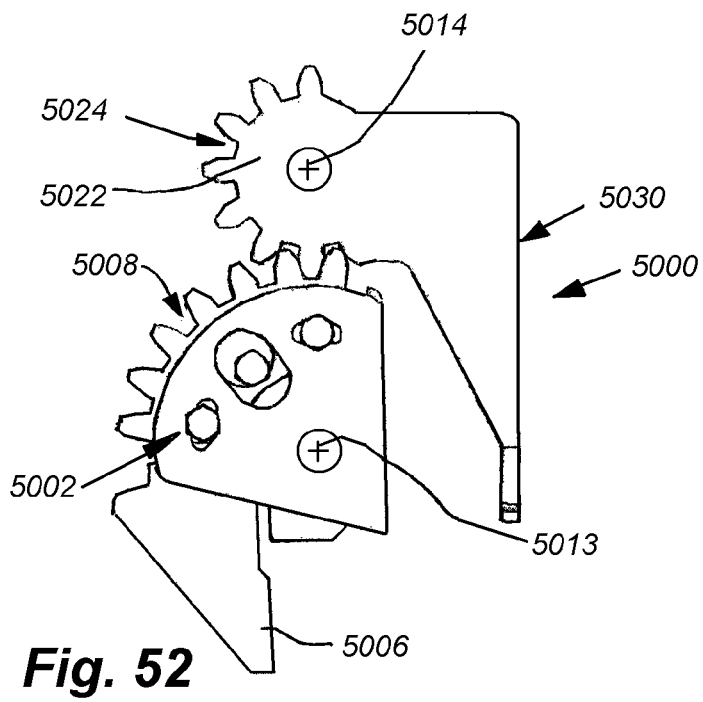
FIG. 52 is a top perspective view of the geared hinge assembly of FIG. 50.
Figure 53:
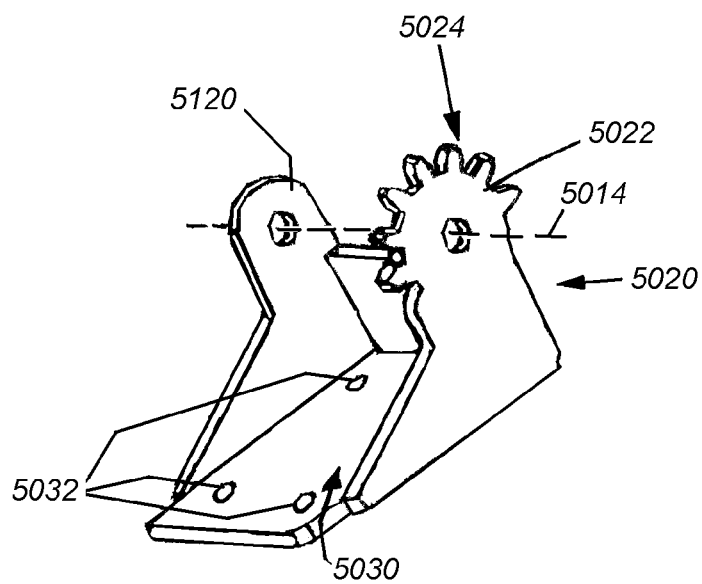
FIG. 53 is a perspective view of an intermediate geared spacer clevis and hinge strap for use in the hinge assembly of FIG. 50.
Figure 54:
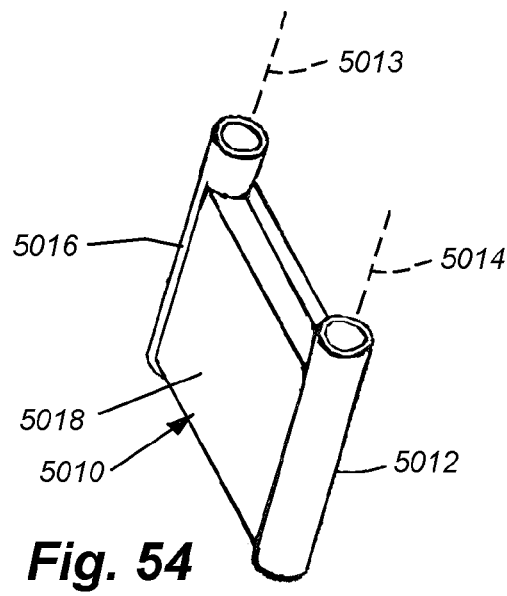
FIG. 54 is a perspective view of a dual-pivot-axis central extension link for use in the geared hinge of FIG. 50.
Figure 55:
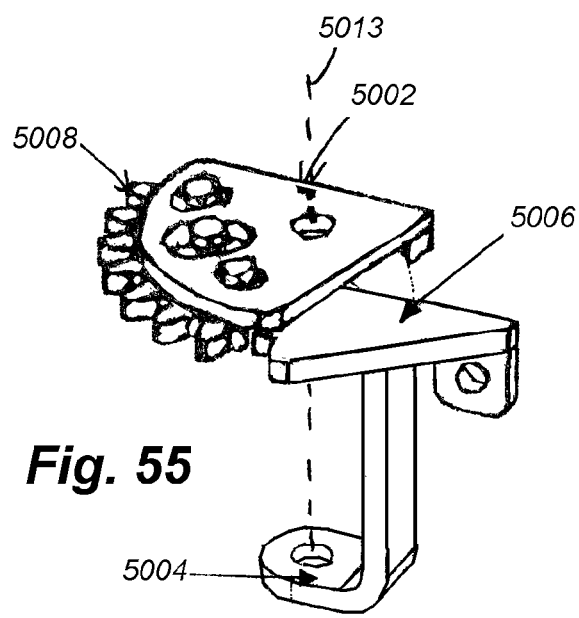
FIG. 55 is a perspective view of a geared hinge cap and cargo body hinge clevis for use in the geared hinge assembly of FIG. 50.

In a further alternate embodiment, shown in FIG. 45, the aerodynamic structure 4510 is biased by an outboard actuator 4520, with its ram 4530 attached to the outer panel 4540 of the aerodynamic structure. As shown in FIG. 46, during deployment, the outer panel 4540 opens to its maximum extension, thereby deploying the bottom sections 4610 and 4620, the top sections (not shown) and the medial panel 4630. This arrangement may be advantageous in that it provides less chance of interference between the trailer door locking rods and the mechanism. Such actuators also require less overall ram extension that can be placed closer to the hinge line 4660. This mechanism also provides increased locking strength to the overall structure in the refracted state, as it retains the outer panels, rather than the inner panels. Alternatively, the embodiment of FIGS. 38-43 is advantageous in that it locks the last panel to collapse in the open position rather than the first panel to collapse. In addition, closing the aerodynamic assembly is accomplished more efficiently by pulling on the medial panels. In further embodiments, both medial-mounted and outer pane-mounted actuators can be used, thereby overcoming all disadvantages. Hence, in a further embodiment, actuators position in accordance with a combination of the embodiments of FIGS. 38-46 can be combined.

While each of the foregoing embodiments shows the aerodynamic structures and their underlying spacer frame attached directly to a swinging truck door, it is contemplated that the aerodynamic structures can be attached directly to the door frame of the cargo body and swung separately from the doors. As shown in FIG. 47, a truck body 4700 has mounted thereon a pair of aerodynamic structure assemblies 4710 and 4712. Each assembly includes a plurality of deployable/foldable aerodynamic panels 4730 and 4732. The panels 4730, 4732 can be arranged according to any acceptable folding configuration. For example, they can be separate, locking panels or origami-type panels as described above. The panels are contained with in individual rectangular spacer frames the spacer frames are attached by hinges 4750 directly to the rear door frame 4760, rather than the cargo door(s).

As further detailed in FIG. 48, the spacer frame 4810 is depicted overlying the cargo body door frame 4760. The depicted spacer frame 4810 contains the hinged, nested aerodynamic panels of its respective aerodynamic structure. The spacer frame can be constructed similarly to any of the spacer frames described above so as to facilitate a stacked folding of panels without binding. As shown in FIG. 48, the cargo body employs a roll-top door 4820 in this example. Hence, this form of arrangement allows an aerodynamic structure to be attached to a cargo body with a non-hinged or rolling door. The two frames can be secured together in the closed orientation of FIG. 47 using any appropriate locking or fastening system including simple latches between the confronting central sides of the panels along the midline 4780. When unlatched, the spacer frames, with their aerodynamic structures can be swung outwardly as shown in FIG. 49. The spacer frames 4810, thus, are allowed to lie flushly against the sides 4920 and 4922 of the trailer cargo body. In this orientation, the rolling (or other type) door 4820 is revealed, and fully accessible. In order to facilitate the desired 270-degree swing needed to lay the drawers flat as shown in FIG. 49 against the sides, the hinges 4750 can be constructed in accordance with the teachings herein (e.g. similar to multi-pivot/multi-part hinge 1310 in FIG. 13). That is, the hinges can contain a central clevis and at least two parallel pivot points that allows the door strap pivot to be shifted to a location outside the respective plane defined by each of the body sides 4920 and 4922. The spacer frames 4810 can also include an appropriate actuation system according to the teachings herein so as to allow the panels to be deployed and folded/collapsed.

While a multi-part hinge, such as the hinge assembly 1310 described above, can effectively provide the needed clearance space to accommodate the swing of an increased-thickness door, it is recognized that the added thickness (up to approximately 6-8 inches) along with the increased weight of the doors may cause them to rotate out of a desired hinge line. In other words the doors may tend to twist along their many multi-pivot hinges As such, the door assemblies may be difficult to relock to the trailer when closed, and may generally tend to droop.

Thus, it is contemplated that the hinge arrangement should be able to eliminate this unwanted degree of freedom and allow all cargo body hinges to be aligned along a common rotational path. In a number of examples, truck trailers use five hinges along each door. However, the use of a different number of hinges along a door is expressly contemplated herein. In a typical five-hinge assembly, it is contemplated that the uppermost and lowermost hinges can be of an anti-racking type of hinge 5000 as shown and described in FIGS. 50-55. These figures will be referred to variously in the following description.

The hinge assembly 5000 includes a gear cap assembly 5002 that resides over a door-frame-mounted hinge clevis 5004. The gear cap assembly is shown separately in FIG. 55. This hinge clevis 5004 can be an original clevis or a new clevis as appropriate. The gear cap assembly 5002 includes a mounting tab bracket 5006 that can be secured to the outer side of the trailer frame by a fastener (not shown) passing through the tab hole 5007 and into the cargo body frame. A gear face 5008 is provided along the perimeter of the gear cap assembly 5002. The gear cap assembly 5002 covers a two-pivot axis (axes 5013 and 5014) extension link 5010, shown separately in FIG. 54. The pivot extension link 5010 operates to extend the rotational radius of the hinge assembly similarly to the above-described central clevis 1330 (FIG. 13). One of the pivot axes 5013 extends through the door-frame-mounted clevis 5013, and resides within a tube 5012 of the extension link 5010. The extension link 5010 also includes a parallel second pivot axis 5014 within a remotely located tube 5016 on the opposing end of an intervening web 5018. The remote tube 5016 is interconnected with a geared spacer-frame-attached clevis 5020 (shown separately in FIG. 53). This geared clevis 5020 includes a bottom pivot base 5120 and a top, geared pivot base 5022. The geared pivot base 5022 includes a gear face 5024 that intermeshes with the cap's gear face 5008. The two pivot bases 5022 and 5120 are joined to a hinge strap 5030 that includes holes 5032 or other structures for receiving fasteners (not shown) therethrough. The fasteners are passed through the spacer frame in this embodiment. Note that the pivot pins (not shown) have been omitted for clarity from the bore of each pivot axis (5013 and 5014) in this illustration. In general, a through bolt or rod acts as the pivot for each axis 5013, 5014. Note that the components of the hinge can be formed form a sturdy metal, or where appropriate a durable polymer. In general, the load bearing components are typically constructed from steel due to its strength and durability.

Figure 56:
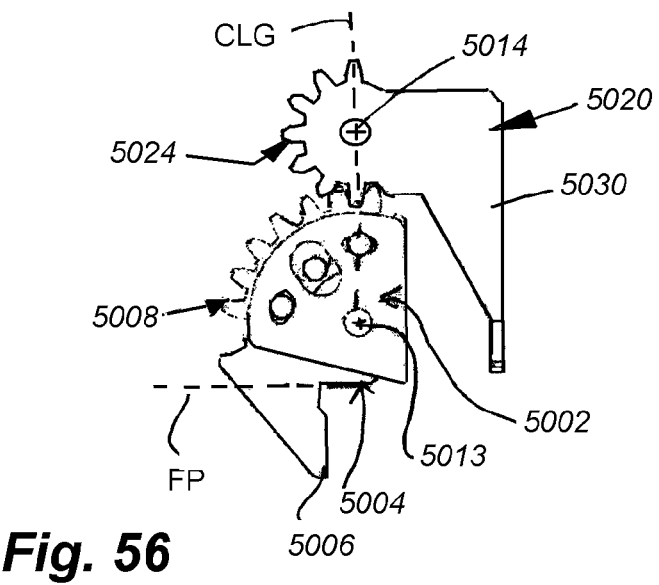
FIG. 56 is a top view of the geared hinge assembly of FIG. 50 shown in a closed orientation.
Figure 57:
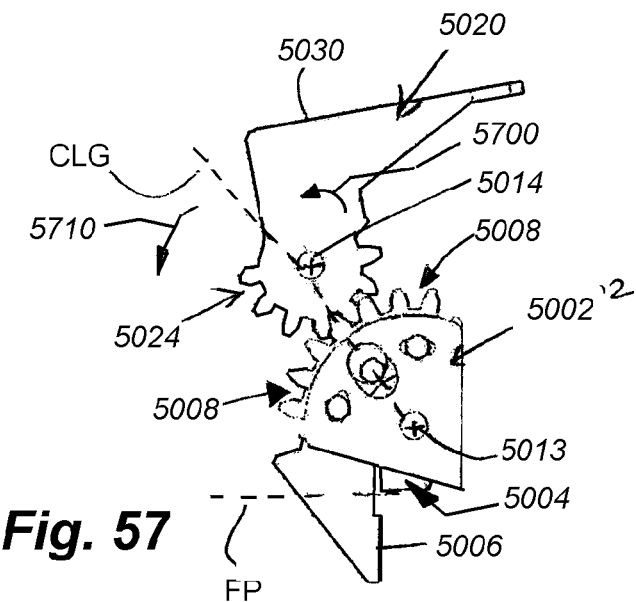
FIG. 57 is a top view of the geared hinge assembly of FIG. 50 shown in a partially opened orientation.
Figure 58:
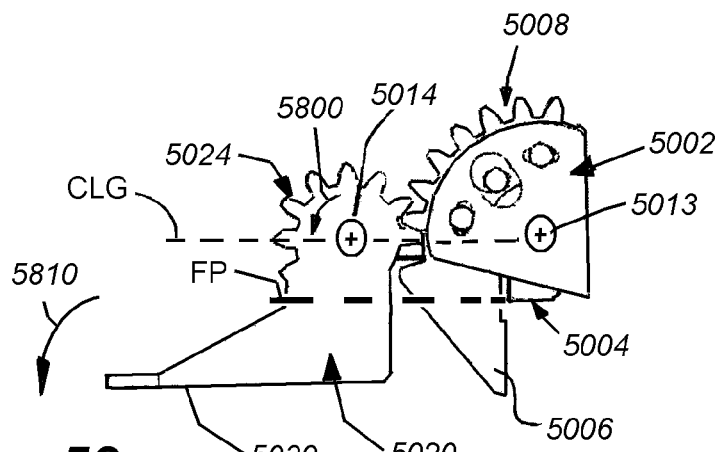
FIG. 58 is a top view of the geared hinge assembly of FIG. 50 shown in a fully-opened, 270-degree orientation.

Reference is now made to the top views of FIGS. 56-58, which show various stages of rotation of the door from fully closed (FIG. 58) to fully open (FIG. 58). In this embodiment, the geared cap 5002 remains rotationally fixed, along with its gear face 5008. Thus, the geared clevis 5020 pivots about the pivot axis 5014 to swing the attached door and spacer frame (not shown in this figure). In FIG. 58, the line CLG between the axes 5013 and 5014 is directed perpendicularly relative to the plane FP of the door frame (not shown). The line CLG also represents the centerline of the extension link 5010. When the door is opened, the geared clevis 5020 (to which the door is attached) pivots, and its gear face 5024 meshes with the geared cap's face 5008. The intermeshing of the gear faces 5008 and 5024 causes the geared clevis to rotate (curved arrow 5700) as the line CLG swings around (arrow 5710), as shown in the half-opened view of FIG. 57). When swung fully opened (arrow 5810), as shown in FIG. 58, the geared clevis 5020 has rotated (arrow 5800) to orient the strap 5030 facing rearwardly, along the side of the cargo body (not shown). The gears 5008 and 5024 ensure that the door strap follows a precise swing pattern as the line CLG (and the underlying extension link 5010) are swung from closed to opened. Since every hinge assembly constructed in this manner swings according to the same pattern (e.g. swing on both axes 5013, 5014 is coordinated by the gears 5008, 5024), the provision of two or more properly aligned geared hinge assemblies in the overall array of door hinges ensures that the door will swing in a rotational set pattern on two axes that is governed by the gears, and is free of racking along a non-rotational degree of freedom.

Figure 59:
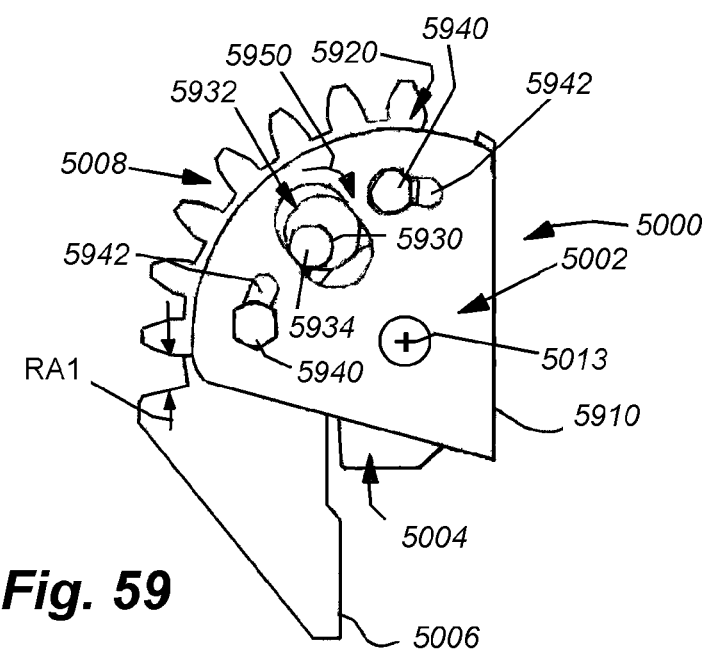
FIGS. 59-61 are each top views of the geared hinge cap of the geared hinge assembly of FIG. 50 showing various positions for the adjustable gear cam.
Figure 60:
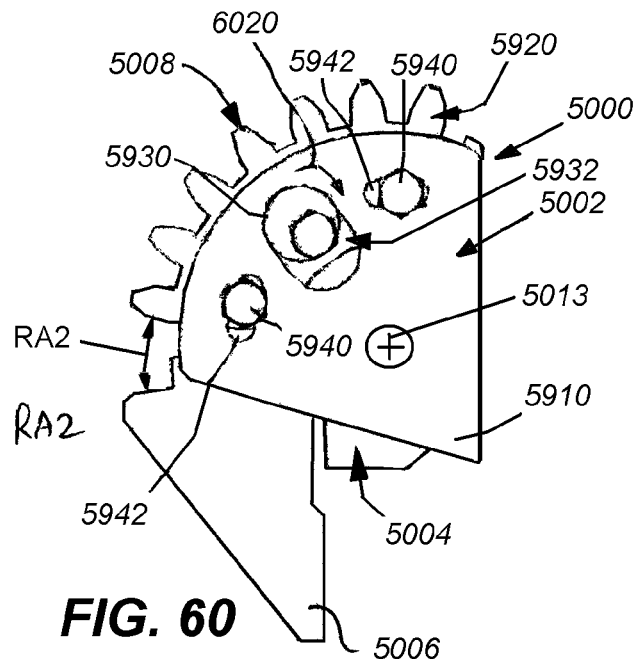
Figure 61:
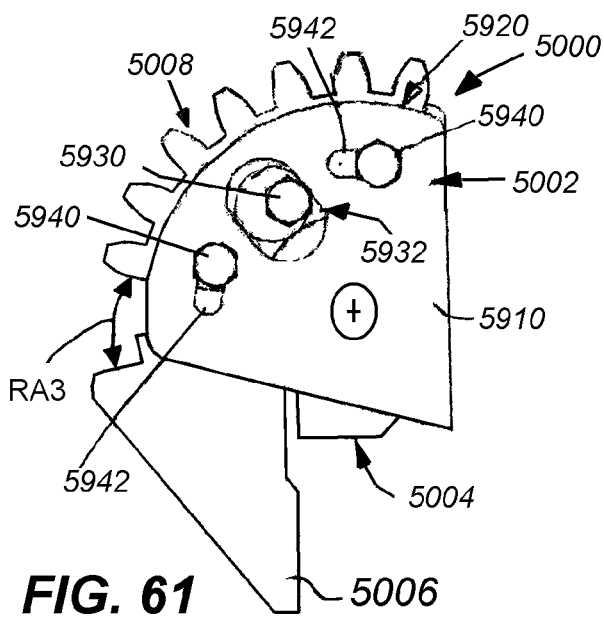
Figure 62:
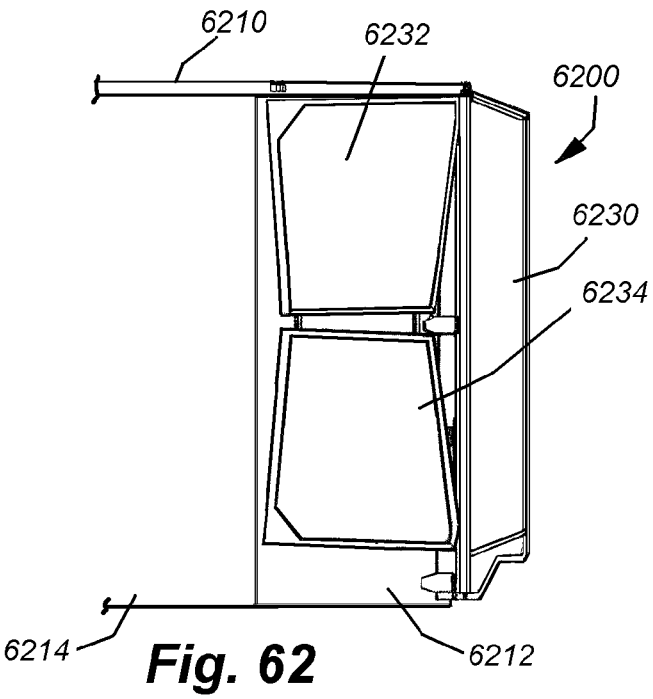
FIG. 62 is a partial perspective view of the rear of an exemplary trailer having an aerodynamic panel assembly with a swing arm-based deployment and folding system, shown in a folded orientation according to an embodiment of this invention.

Since the precise positioning of devises and strap attachment points is not always accurate, the geared cap 5002 of each hinge assembly 5000 is adjustable so that the alignment of the pivots between two or more hinge assemblies in a door's hinge array can be varied. This simplifies installation of hinge assemblies. As shown in FIGS. 59-61, the geared cap 5002 consists of an upper adjustment-cam-following piece 5910 and a lower gear-carrying piece 5920. Both pieces 5910 and 5920 are mounted so as to rotate about the pivot axis 5013. This allows the rotational position of each gear face 5008 to be varied within predetermined limits. An eccentric cam 5930, rides within a closely fitting slot 5932 of the cam-following piece 5910. The cam 5930 is adjustably secured by a bolt 5934 that is seated in the underlying gear-carrying piece 5920. A pair of securing bolts 5940 area also seated in the gear-carrying piece 5920, and ride in arcuate slots on the cam-following piece. By loosening the bolts 5934 and 5940, the gear face 5008 can be rotated in response to rotation of the eccentric cam, within predetermined limits. Thus, the setoff RA1 in FIG. 59 can be increased by rotating (curved arrow 5950) the cam 5930 to a new setoff RA2 (FIG. 60). A greater setoff RA3 (FIG. 61) can be achieved by further rotation the cam 5930 (curved arrow 6020). When the proper setoff is achieved for each hinge assembly, the bolts 5934, 5940 are tightened to lock in this adjustment. In this manner, the door swings in the desired arc between the opened and closed position, and the gears in each hinge assembly 500 ensure synchronization of swing without racking.

Figure 63:
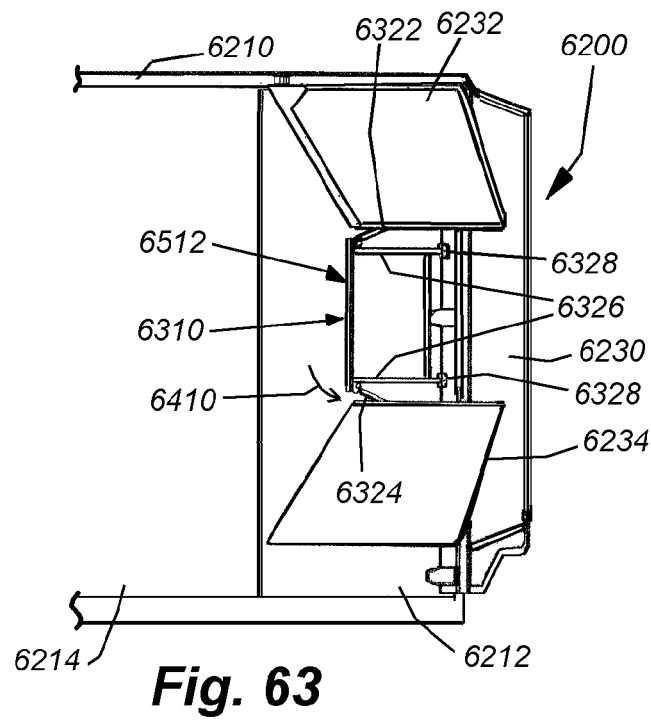
FIG. 63 is a partial perspective view of the aerodynamic panel assembly of FIG. 62 in which the panel assembly is beginning to deploy in response to rotation of the swing arm.
Figure 64:
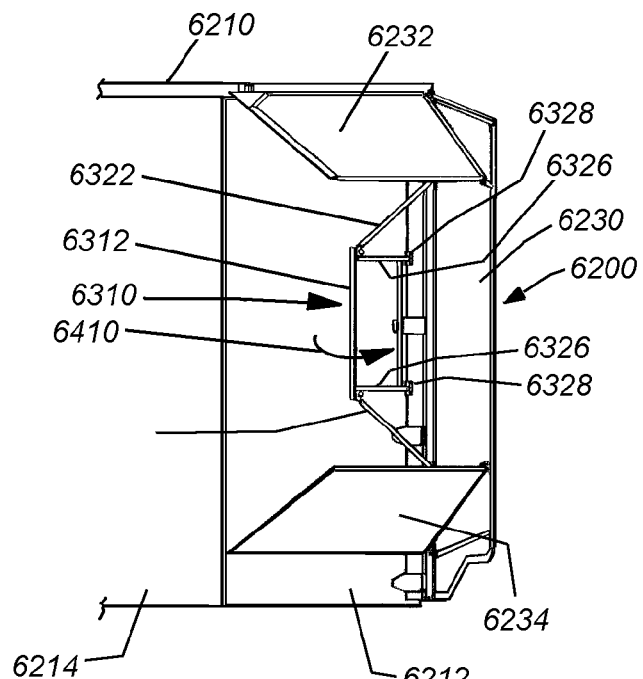
FIG. 64 is a partial perspective view of the aerodynamic panel assembly of FIG. 62 in which the panel assembly is further deployed in response to rotation of the swing arm.
Figure 65:
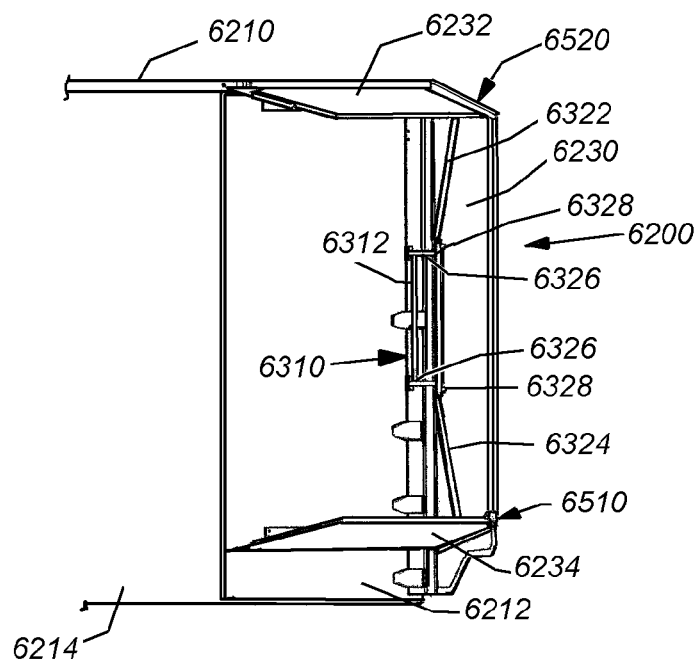
FIG. 65 is a partial perspective view of the aerodynamic panel assembly of FIG. 62 in which the panel assembly is fully deployed in response to rotation of the swing arm.
Figure 66:
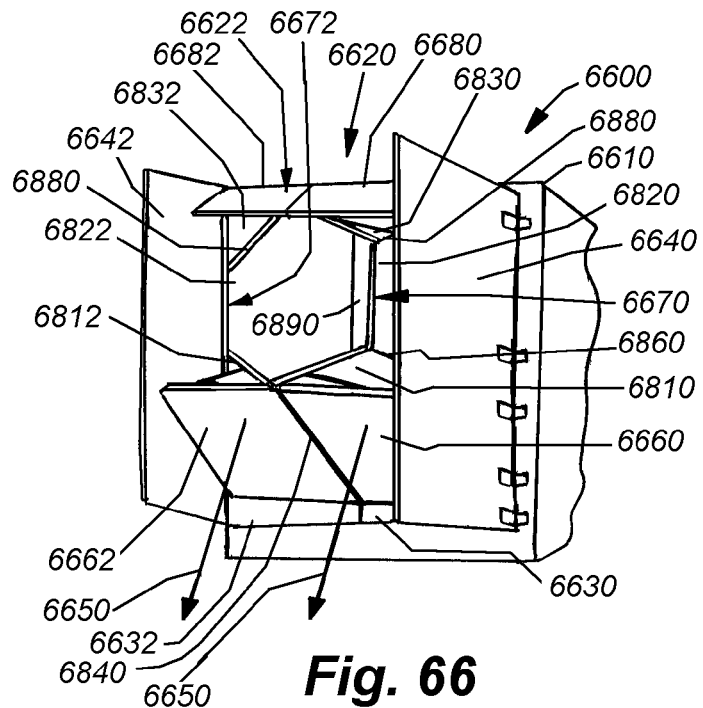
FIG. 66 is a perspective view of the rear of an exemplary trailer having an aerodynamic panel assembly with a folding medial panel deployment and folding system, shown in a partially deployed orientation according to an embodiment of this invention.
Figure 67:
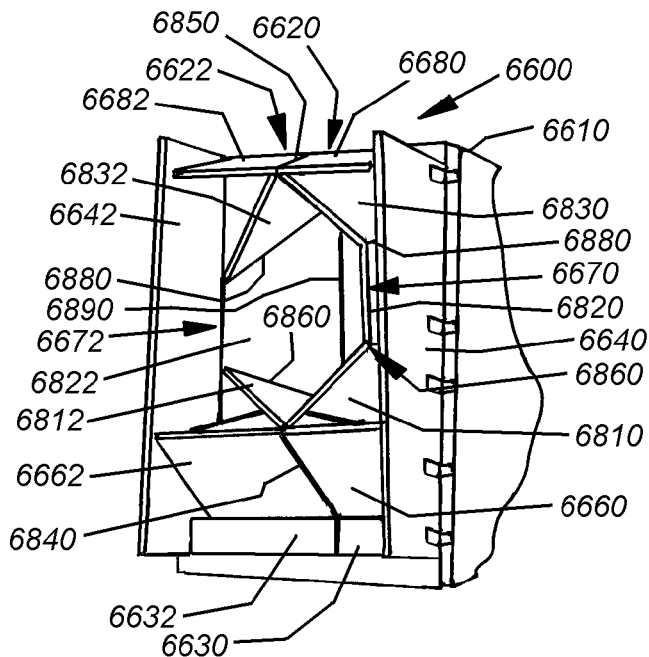
FIG. 67 is a perspective view of the aerodynamic panel assembly of FIG. 66 in which the panel assembly is further deployed in response to unfolding of the medial panels.
Figure 68:
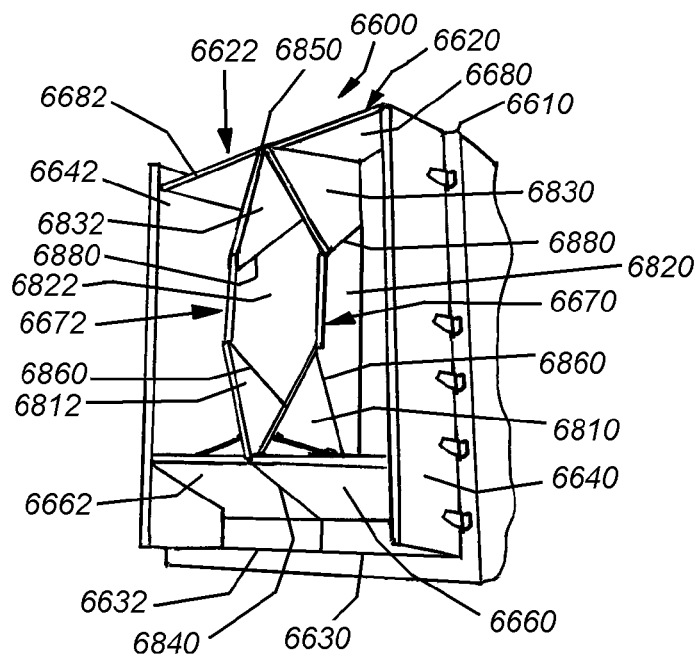
FIG. 68 is a perspective view of the aerodynamic panel assembly of FIG. 66 in which the panel assembly is nearly completely deployed in response to unfolding of the medial panels.

For ease of operation, it is desirable that the aerodynamic structure/assembly be easily deployed using either automated or manual operations. In the case of manual deployment, it is desirable that the act of deployment occur without substantial effort and in a manner that is easily within the reach of an average-sized operation. Reference is now made to FIGS. 62-65, which depict a folding aerodynamic assembly 6200 mounted on the rear of a truck trailer 6210 according to another illustrative embodiment of this invention in which deployment of the reachable lower panels serves to simultaneously deploy the upper panels (and folding of the lower panels, likewise folds the upper panels). In this embodiment, each rear door (right door 6212 being shown) supports a respective set of three exterior panels including a side panel 6230 (shown already unfolded from the door), a upper panel 6232 and a lower panel 6234 (in which the top and lower panels are to be unfolded and deployed. The above-described solid medial panel is omitted, and instead, the aerodynamic assembly provides with a framework 6310 of swing arms and tie rods. When the top and lower panels are folded, this framework 6310 is nestled flush against the doors as shown. The horizontal swing arms 6326 of the framework 6310 are mounted on vertically aligned hinges 6328 to the door or door frame. They are tie together by at least one outer vertical connecting bar 6312. When the operator rotates the lower panel 6234, the hinged framework 6310 responds by rotating (arrow 6410) outwardly as shown in FIGS. 63 and 64, the upper and lower tie rods 6322, 6324, which respectively (and hingedly) are attached to the extreme ends of top and lower panels 6232, 6234 are biased by the motion of the lower panel, and resulting framework rotation. The bias of the upper tie rod 6322, thus, causes the upper panel 6232 to move in coordination with the lower panel 6234. In the fully deployed view of FIG. 65, the upper and lower panels are locked into the desired deployed orientation by the swing arms 6326 and tie rods 6322, 6324. The framework assembly can be further secured as described generally above by engaging latches at the bottom (location 6510) and top (location 6520) of the trailing edge junction between the side panel 6230 and respective upper and lower panels 6232, 6234. The framework 6310 provides an extremely strong, truss-based securing mechanism that resists significant inward pressure by the top and lower panels, while requiring very little force to deploy or refold. It also affords a single large cavity for the aerodynamic structure with only a lightweight open truss in the medial region. Note also that in this, and all other panel designs herein, it is contemplated that the edges of external panels can be fitted with appropriate seals or gaskets, both where they mate with each other and where they mate with portions of the door, frames and/or truck body. This ensures a clean aerodynamic structure without undesired stream air leakage into the cavity defined by the panels.

FIGS. 66-69 detail a further embodiment of the above-described origami-folding aerodynamic assembly 6600. In this illustrative embodiment, the entire rear of the truck body 6610 is depicted, with a discrete folding assembly 6620, 6622 mounted on each trailer rear door 6630, 6632, respectively. Each folding assembly 6620 and 6622 includes a respective side panel 6640 and 6642. As shown, the side panels 6640 and 6642 have been deployed, and this operation can be performed independently of deployment of the top and lower panels 6680, 6682 and 6660, 6662 (respectively).

Figure 69:
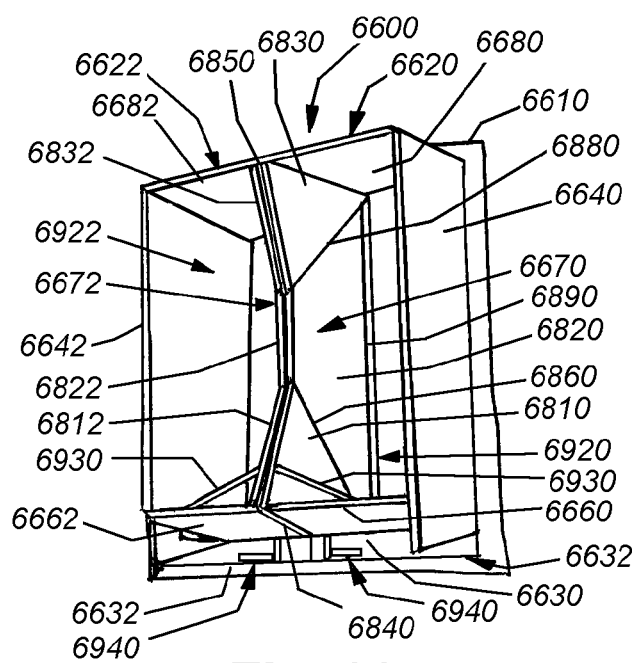
FIG. 69 is a perspective view of the aerodynamic panel assembly of FIG. 66 in which the panel assembly is fully deployed in response to unfolding of the medial panels, with the medial panels placed in a flush, confronting relationship.

Once the side panels 6640, 6642 are opened/deployed, the user then deploys the upper and lower panels 6680,m 6682, 6660, 6662 separately by pulling downwardly (arrows 6650) on the two lower panels 6660, 6662, which were previously folded against the doors 6630 and 6632. The lower panels 6660 and 6662 are attached at their inner/medial edges 6840 to lower portions of respective medial panels 6670 and 6672. The medial panels 6670 and 6672 consist of three sections. These sections, which are better shown in FIGS. 68 and 69, consist of a bottom section 6810 and 6812, a central section 6820 and 6822 and an upper section 6830 and 6832. The bottom sections 6810 and 6812 are hingedly joined to the inner/medial edges 6840 of respective lower panels 6660 and 6662. The bottom sections 6810, 6812 are also hingedly joined to the central section at hinge line 6860. Likewise, the top sections 6830 and 6832 are joined to respective upper panels 6680 and 6682 at hinge lines 6880. The central panels are hinged against the door at hinge line 6890. Thus, as depicted in FIGS. 66-69, as the lower panels 6660 and 6662 are pulled downwardly (arrow 6650) out of their folded position, they bias and unfold the bottom sections 6810, 6812 of the medial panels 6670 and 6672. This hinges out the attached central sections 6820 and 6822 which, in turn, each bias the attached upper sections 6830 and 6832. This bias of the medial panels forces thereby the upper panels 6680 and 6682 to hinge upwardly until the medial panels are brought into flush, confronting contact with each other as shown in FIG. 69. The top and lower panels are now fully deployed, and the overall aerodynamic shape is formed by the depicted pair of cavities 6920 and 6922. Note that the illustrative embodiment can employ the above-described sliding hinge assemblies to allow the panels to fold over one another and also deploy in a rectilinear manner as shown. Such sliding hinges can be located along the joints between the medial panels 6670 and 6672 and adjacent upper panels 6680, 6682 and lower panels 6660, 6662.

In this arrangement, a pair of gas springs or similar spring/damper units 6930 are hingedly attached between each lower panel 6660, 6662 and the respective bottom sections 6810 and 6812 of the medial panels 6670, 6672. These bars 6930 are hinged at both attachment points to fold freely against the adjacent folded panels when in a fully folded orientation against the respective doors 6630, 6632. These bars, thus, fold with the panels. The bars provide further directed bias to the medial panels 6670, 6672 when they are unfolded, and also serve to reinforce the fully deployed structure. As shown, the lower panels 6660 and 6662 are positioned at spacing above the bottom edge 6632 of the doors 6630 and 6632. In this manner, the conventional latches 6940 of the door can be accessed. In alternate embodiments, a different latch system can be employed allowing the panels to be brought to a lower potion of the door (described further below). The illustrative aerodynamic assembly 6600 also includes appropriate frame spacers and/or hinge extensions as necessary to allow clearance for the latches and/or to allow folding of the doors flush against the sides of the truck body 6610, in a manner described generally above.

Figure 70:
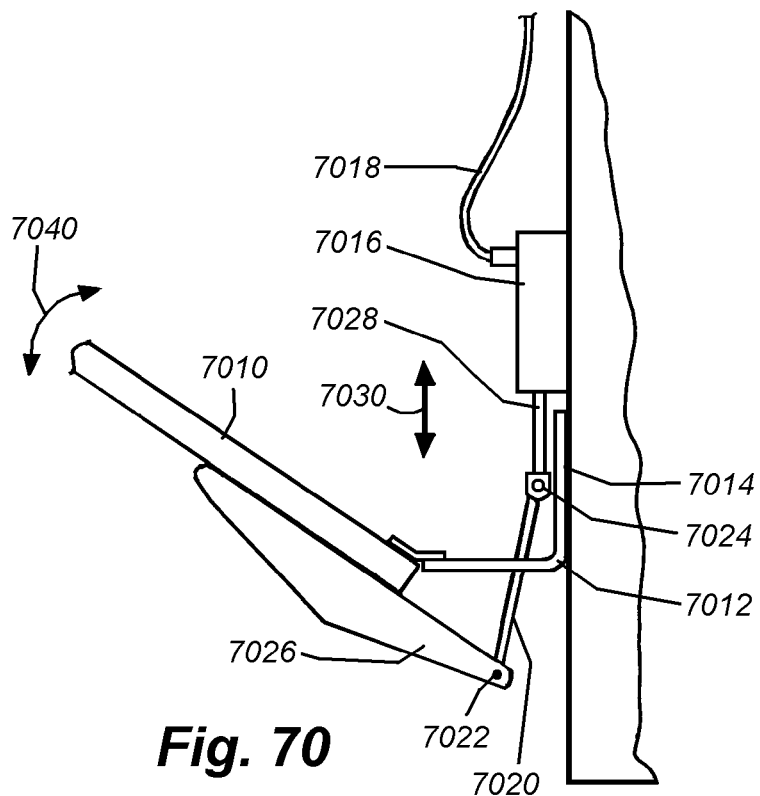
FIG. 70 is a fragmentary side view of a hydraulic/pneumatic-based upper and lower panel deployment and folding system in an aerodynamic assembly, showing the lower panel and associated master cylinder, according to an embodiment of this invention.
Figure 71:
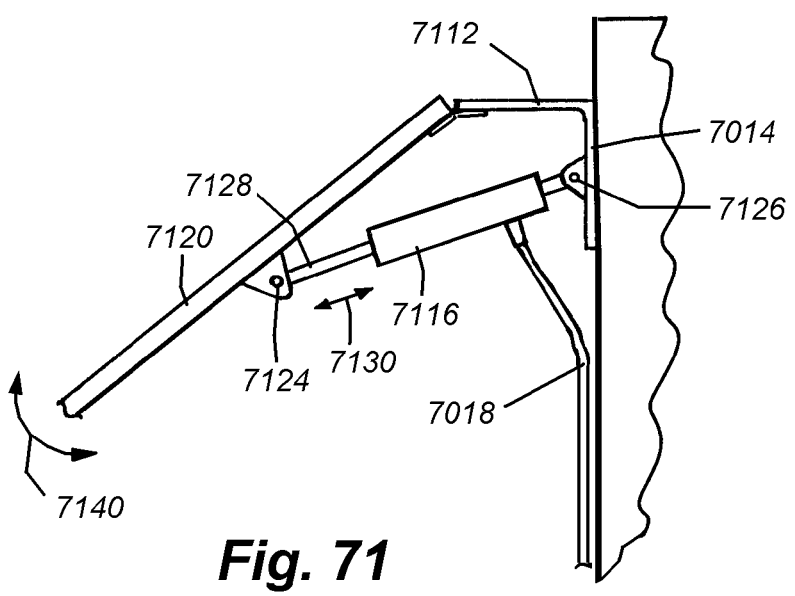
FIG. 71 is a fragmentary side view of a hydraulic/pneumatic-based upper and lower panel deployment and folding system, showing the upper panel and associated slave cylinder, which responds to movement of the master cylinder of FIG. 70, according to an embodiment of this invention.

In another embodiment, in which medial panels maybe omitted, the bottom and upper panels can be deployed mechanically, using coupled hydraulic or pneumatic circuits attached to each set of top and bottom hinged panels on a respective door (or door frame). As shown in FIGS. 70 and 71, the illustrative lower panel 7010 is mounted on a hinge bracket 7012 against the door surface 7014. A hydraulic master cylinder and piston assembly 7016, connects to a linkage 7020 that is secured by opposing pivots 7022 and 7024 to the panel bracket 7026 and the piston shaft 7028, respectively. As the operator manually moves the panel between a folded and unfolded position (double curved arrow 7040), it causes the linked piston shaft 7028 to move in and out (double arrow 7030) of the master 7016 cylinder. This causes expansion or compression of the fluid contained within the cylinder 7016—i.e. unfolding the lower panel causes the piston to compress the fluid space, while folding causes the piston to expand the fluid space.

In this embodiment, the master cylinder 7016 feeds pressure via a pneumatic or hydraulic line 7018 to a slave cylinder 7116 shown in FIG. 71. This slave cylinder 7116 is joined to the upper panel 7120 by the piston shaft, via a pivot point 7124. An opposing pivot 7126 joins the base of the slave cylinder to the door or frame surface 7014. The upper panel 7120 is hinged with a hinge bracket 7112 that is mounted against the door surface 7014, near the upper end of the door/frame 7014. The line 7018 from the master cylinder 7016 is connected to the chamber of the slave cylinder 7116. When pressure from the master cylinder 7016 is varied, it causes the slave's piston shaft 7128 to move inwardly or outwardly (double arrow 7130) thereby causing the upper panel 7120 to move between a folded and an unfolded position (curved arrow 7140) in response to the relative movement of the lower panel 7010 by the operator.

In this embodiment, the operator manually pulls down on the lower panel 7010 to unfold it, thereby causing the shaft 7028 to generate pressure in the master cylinder 7016. This fluid pressure is routed along the line 7018 to the slave cylinder 7116. The routed fluid pressure causes a responding expansion within the slave cylinder 7116, which forces the slave's shaft 7128 to move outwardly, thereby unfolding the upper panel 7020. Thus, a movement of the lower panel by the operator causes the upper panel to respond in like kind. Conversely, when folding, the operator forces the master cylinder shaft 7028 outwardly, thereby creating space within the cylinder. This expanded space is filled by the pressurized fluid stored within the upper cylinder 7116. This causes the upper shaft 7128 to withdraw into the slave cylinder 7116, thereby folding the upper panel 7120. The illustrative hydraulic/pneumatic system is contemplated to operate manually in this embodiment. In alternate embodiments, a power and/or pressure source can be provided to one of the cylinders (by for example the vehicle's pressure system or a separate pump), thereby allowing both panels to open automatically at the press of a button. This system can also be used with a variety of side folding panels. In one example, a master is connected to one side panel, while a slave is connected to the other end a line routed along the bottom or top of the door frame connects the two cylinders. Since side folding panels are relatively easy to open, and readily accessible by the operator, folding and unfolding generally need not be automated. However, in alternate embodiments, manual or powered automation of the side panels can be provided.

Figure 72:
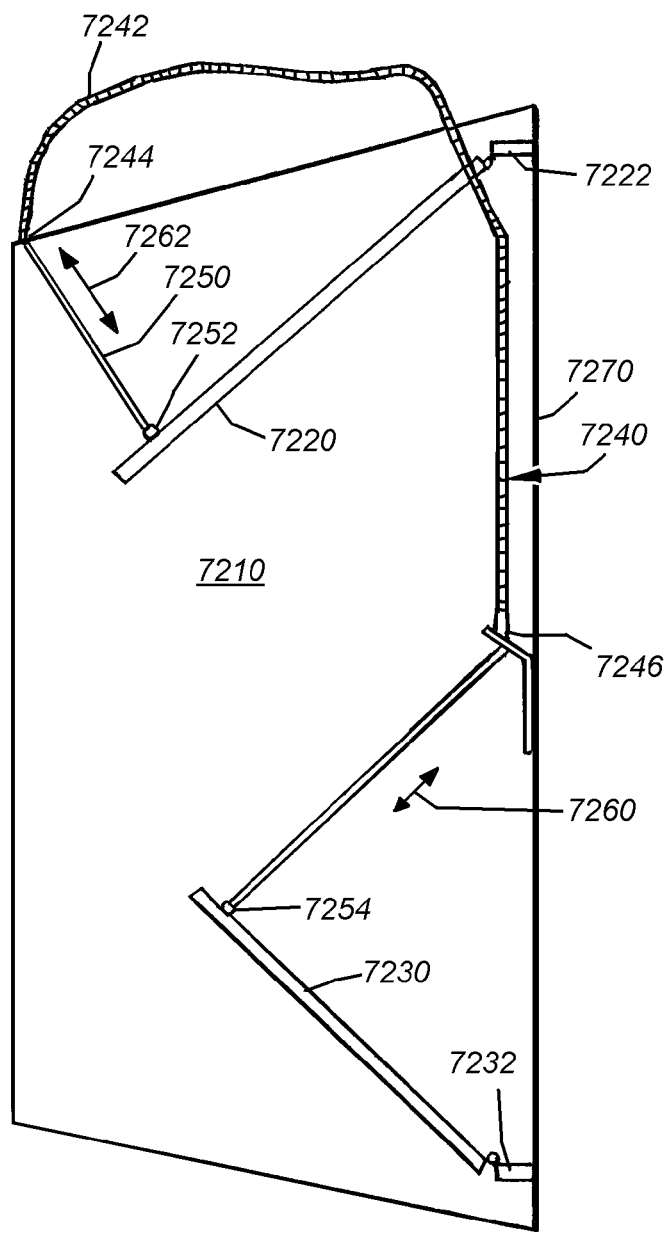
FIG. 72 is a side view of a portion of an aerodynamic assembly having a cable-interconnected upper and lower panel deployment and folding system according to an embodiment of this invention.

FIG. 72 depicts another system for deploying the upper and lower panels in a coordinated manner—with the user needing only to actuate the easily reached lower panel. As shown, a side panel 7210 has already been unfolded and deployed to provide clearance to deploy the opposing upper and lower panels 7220 and 7230. These panels 7220, 7230 are located on respective hinge bases 7222 and 7232 that extend the pivot points rearwardly from the door to, for example, provide clearance for locking rods. The upper and lower panels 7220, 7230 are joined by a cable assembly 7240. This cable assembly 7240 includes a sheath 7242 that is fixed at a top end 7244 and a bottom end 7246 so that it does not slide. Running through the sheath 7240 is a flexible braided steel (or other type) cable 7250. The cable 7250 is secured to a mounting point 7252 near the outer edge of the upper panel 7220 and opposing mounting point 7254 at the outer end of the lower panel 7230. When the lower panel

7230 is drawn downwardly, or pushed upwardly (double arrow 7260) the cable 7250 moves through the sheath 7240, causing a like reaction at the upper cable end 7252 (double arrow 7262). This causes the upper panel 7220 to deploy or fold in concurrently with the lower panel 7230. The weight of the upper panel 7220 should be sufficient to allow it to fold in as tension of the cable 7250 is released—based upon folding-up of the lower panel 7230. If further tension is needed to fully retract the upper panel 7220 to a fully folded orientation, then spring-loaded hinges and/or tension springs (not shown) can be provided between the panel 7220 and the door 7270 (or frame).

Figure 73:
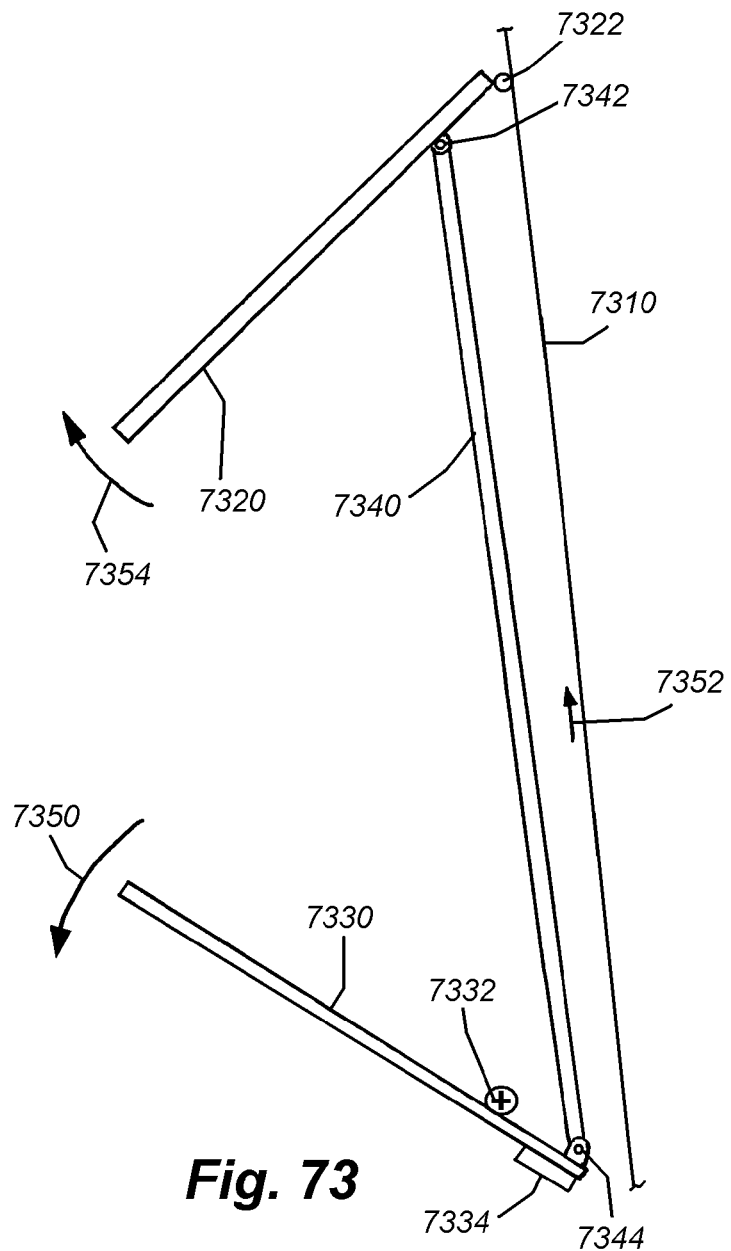
FIG. 73 is a side view of a portion of an aerodynamic assembly having an eccentric linking bar-interconnected upper and lower panel deployment and folding system according to an embodiment of this invention.

Another illustrative system for folding upper and lower panels is shown in FIG. 73. The upper panel 7320 is hinged to the door or frame member 7310 at an upper pivot point 7322. This pivot point is located at the rear end of the upper panel 7320, and is adjacent to the door or door frame. Conversely, the lower panel 7330 pivots at an outboard pivot point 7332 that is positioned a few inches (or more) remote from the plane of the door and frame 7310. Thus, a portion 7334 of the lower panel extends forwardly (in a vehicle reference frame) of the pivot point 7332. A linking rod 7340 extends between an upper, rearwardly placed pivot point 7342 on the upper panel 7320 and an end-mounted pivot point 7344 on the lower panel 7330. This eccentric pivot and link arrangement allows the linking rod 7340 to move upwardly as the lower panel 7330 is biased downwardly (curved arrow 7350) about its hinge pivot 7332. This upward movement (arrow 7352) of the linking rod 7340 is translated into upward pivoting rotation (curved arrow 7354) at the upper panel about its hinge pivot 7322. Thus, by locating the panel hinge points 7322, 7332 and the linkage pivot points 7342, 7344 at the appropriate positions, both panels can move between a fully folded and fully deployed orientation by moving only the lower panel 7330.

It should be clear that this invention contemplates a variety of other systems and methods for linking the two sets of panels (upper and lower) in an aerodynamic structure/assembly so that movement of one (usually lower) panel, moves both panels in the set. These techniques can employ a manual, automatic or combination of manual and automatic mechanisms to actuate folding and deployment.

Figure 74:
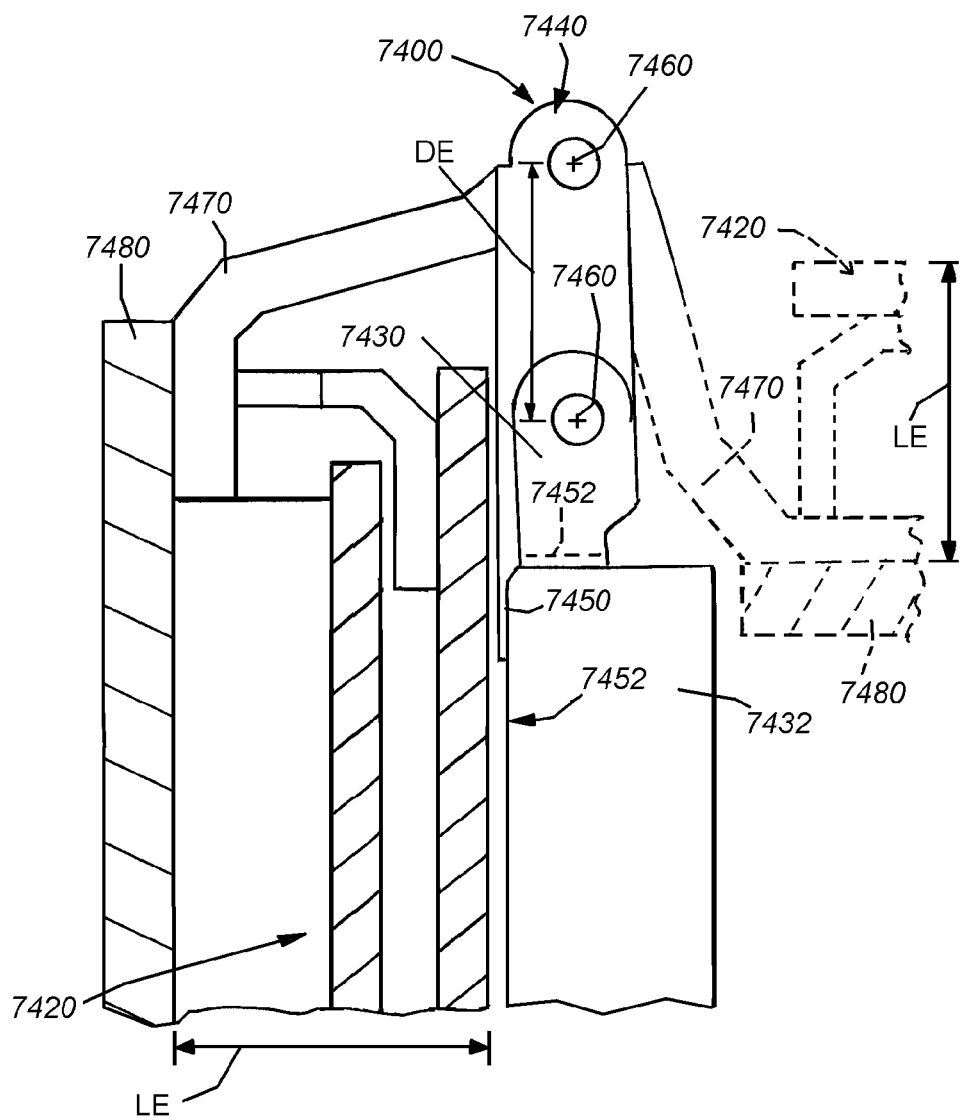
FIG. 74 is a fragmentary top cross section of the hinge area of a door and aerodynamic assembly with an extended hinge member according to an embodiment of this invention.

Reference is now made to FIG. 74 which illustrates the provision of a modified "one-piece" hinge assembly 7400. In general and as discussed above, when a conventional trailer rear door is provided with additional rearward extension (e.g. length LE) due to the addition of the folding aerodynamic panels 7420, then that door can only be rotated to a full 270 degrees from the closed position (shown in phantom) to the fully opened position when that increased length LE is accommodated. In this embodiment, the conventional hinge butt 7430, which is permanently fixed (by bolts, rivets, welding, etc., to the body frame 7432, is extended by a novel extension hinge 7440. This extension hinge 7440, unlike the above-described two part hinge, does not rotate. Rather, it includes a side extension 7450 and a base 7452 that fit closely to the adjacent corner edges of the frame 7432. The extension 7440 is rotationally fixed in the desired orientation, with its pivot point 7460 extended rearward by a predetermined distance DE with respect to the original pivot point 7460. In this embodiment, the extension DE is directly rearward. Note that the side extension 7450 as well as other portions of the extension hinge 7440 are typically welded or otherwise fixed (rivets, screws, etc.) to the vehicle door frame side 7452 (and other frame locations) for added strength. A corresponding hinge-to-door bracket 7470 is attached to the door 7480. This extended bracket 7470 accommodates the increased length of the new hinge extension 7440. Given this extended length, the full door assembly can rotate through a full 270 degrees to the desired flush, confronting position along the vehicle side 7452 as shown. Note that in an alternate embodiment, the hinge 7440 can be mounted over an existing hinge butt 7430 by providing holes through each of the horizontal members of the hinge extension 7440, and placing a pin through the pivot point 7460 of the hinge butt 7430 and the holes. The hinge extension's attachment can be reinforced by appropriate welds if desired.

Figure 75:
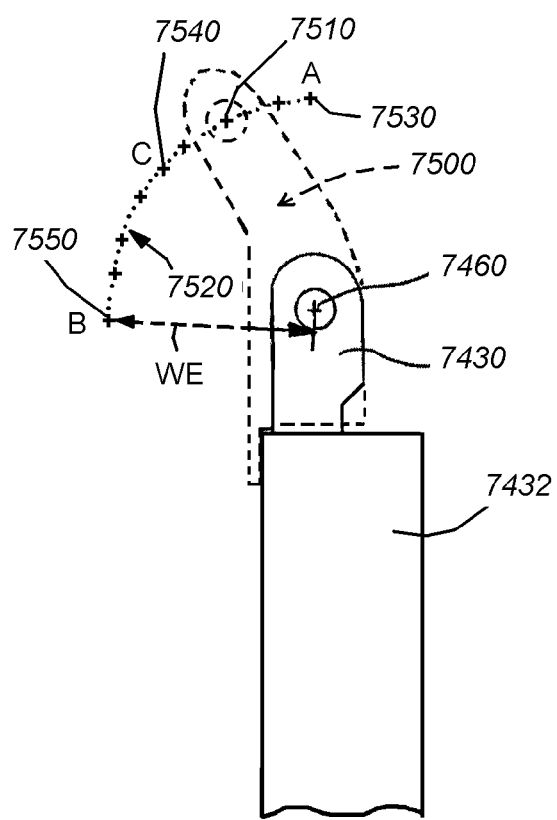
FIG. 75 is a fragmentary top view of a hinge area and exemplary having a pivot axis point located along a directly rearward to a directly sideward arc, spaced from a conventional butt hinge pivot axis point.

With further reference to FIG. 75, it is contemplated that the extended hinge structure 7500 (shown in phantom) can be shaped so that its pivot point 7510 is oriented anywhere within a predetermined arc 7520. Note that the hinge 7500 attaches to the existing butt hinge 7430 as a hinge extension in a manner described above with reference to FIG. 74. Alternatively, the hinge of this embodiment can be a purpose built one-piece hinge that attaches directly to the vehicle frame using welding, fasteners and the like. In this embodiment, the arc extends between a longitudinally, directly rearward position 7530 (position A) to an intermediate, 45-degree angled position 7540 (position C) to a 90-degree position 7550 (position B). At the 90 degree position B, the pivot point is directly in line with the rearward extension of the original pivot point 7460, but has been extended laterally outwardly by a distance WE—which is also the approximate radius of the arc from the pivot point 7460. This distance WE is sufficient so that a door assembly (with aerodynamic panels having an overall thickness LE—see FIG. 74) can be fully folded to the sides.

It should be noted that the construction of the hinge 7500 can take into account aerodynamic considerations. That is, the pivot point 7510 can be placed at a location that provides improved aerodynamic benefits and overall streamlining with respect to the vehicle side.

Figure 76:
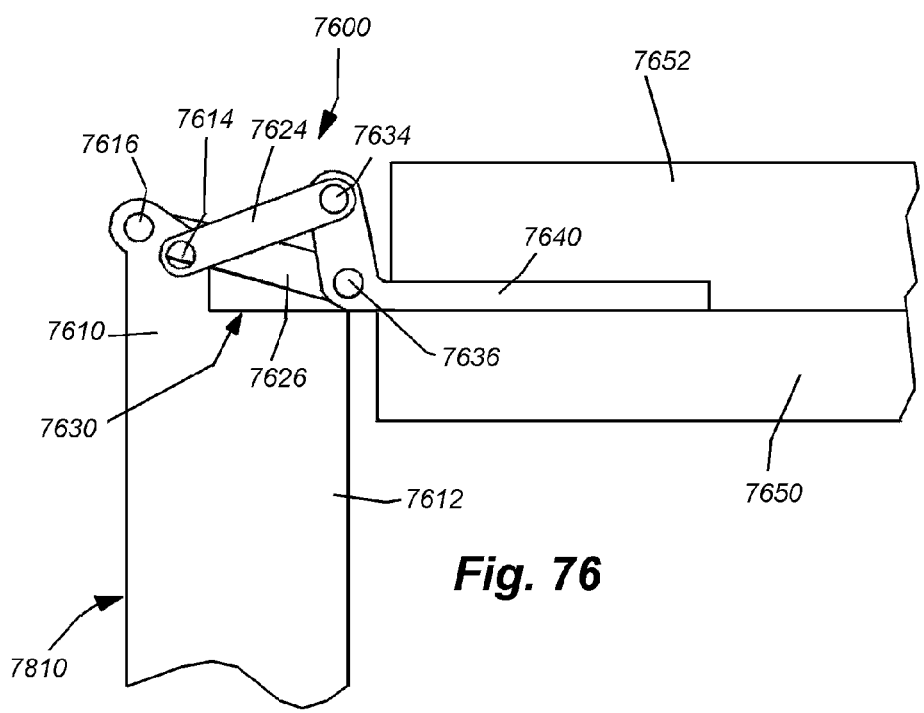
FIGS. 76-78 are fragmentary top views of a four-bar linkage hinge assembly mounted between a trailer frame and a door with aerodynamic assembly that swings in approximately a 270-degree arc between a closed position, and intermediate position and a fully open position, according to an embodiment of this invention.
Figure 77:
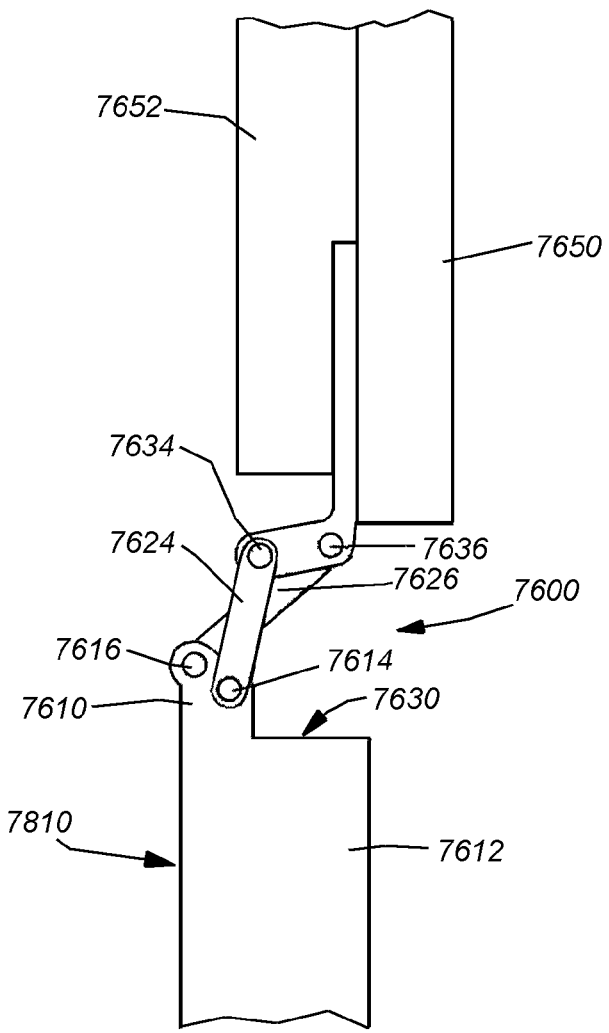
Figure 78:
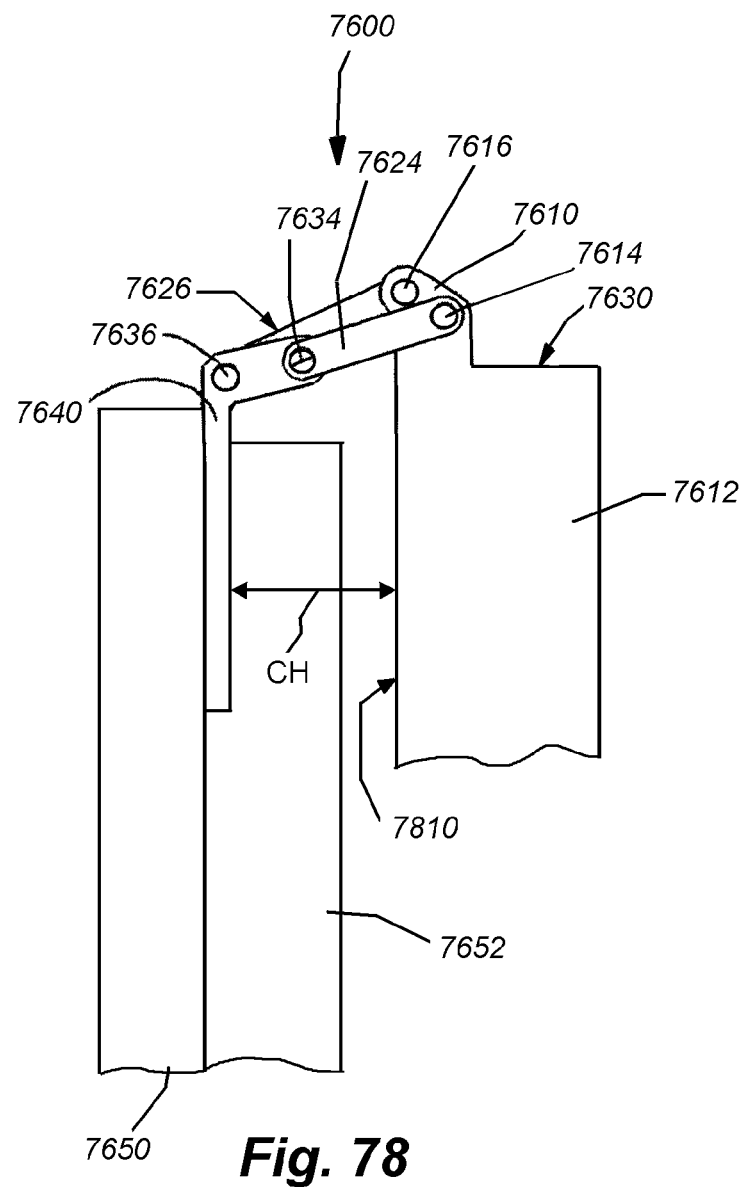

FIGS. 76-78 detail an alternate hinge system 7600 for use with the doors and aerodynamic assemblies according to the various embodiments described herein. This hinge system 7600, which like the above-described geared hinges, allows for a substantial clearance of the door 7650 and folded aerodynamic assembly 7652 with respect to the trailer side (7810), while the closed door 7650 remains relatively flush with respect to the rear face 7620 of the trailer door frame 7630. The hinge assembly 7600 includes a base 7610, which is fixed to the vehicle frame 7612. The base 7610 includes two spaced-apart pivot axis points 7614 and 7616. Each point 7614, 7616 pivotally receives a respective connecting bar 7624, 7626. The opposing ends of the bars 7624, 7626 are connected to spaced-apart pivot axis points 7634, 7636 on a door-mounted hinge member 7640. The two bars can be on opposite vertically stacked sides of the hinge assembly 7600 so they do not interfere with each other during movement. Other non-interfering stacking arrangements can be employed in alternate embodiments. In the closed orientation (FIG. 76), the door 7650 resides relatively inline with the door frame face 7630. When opened (FIG. 77) the interaction of the bars 7624 and 7626 and their respective pivots 7614, 7634 and 7616, 7636 causes the door to move through a non-circular arc, away from the frame. As shown in FIG. 78, when the door is fully open and resides at approximately 270 degrees with respect to the closed orientation, the hinge assembly 7600 defines a clearance CH between the exterior face of the door 7650 and the trailer side 7810 that is sufficient to accommodate the folded assembly. The spacing of the hinge points 7614, 7616, 7634, 7636 and the length of the two bars 7624, 7626 determines the size of the clearance CH, and this can be derived using conventional mechanical engineering and geometric techniques.

Figure 79:
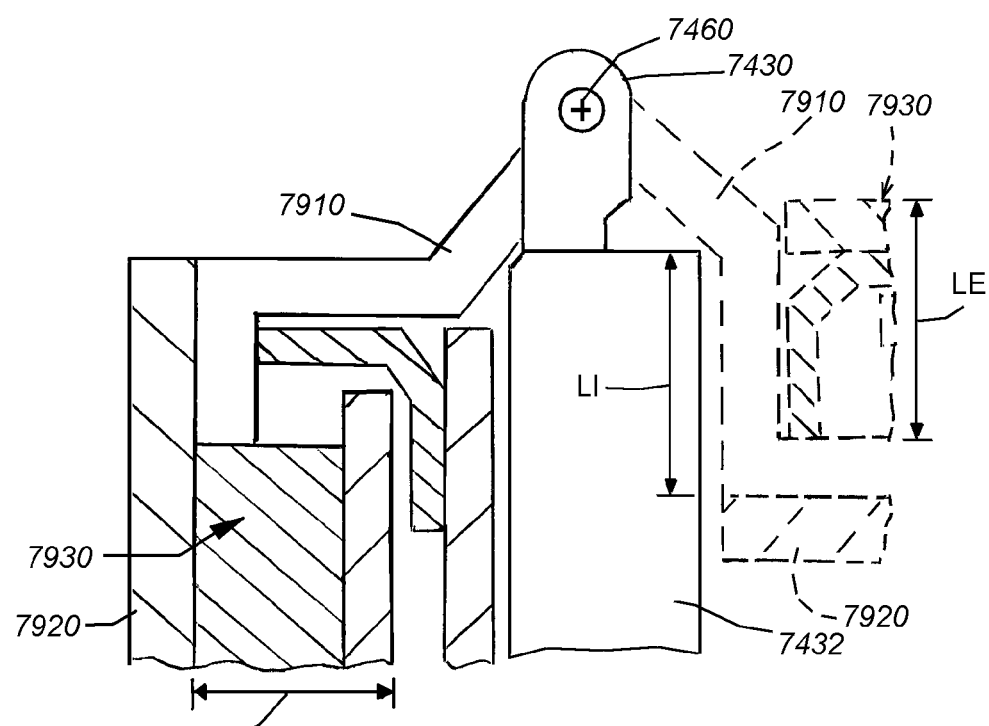
FIG. 79 is a fragmentary top cross section of the hinge area of a door and aerodynamic assembly with a conventional butt hinge and extended door hinge member that repositions the door itself further into the trailer cavity, according to an embodiment of this invention.

Reference is now made to FIG. 79, which details another embodiment of a hinge system in which a thickened door (thickness LE) assembly is able to rotate through a full 270-degree arc. In this embodiment, the frame 7432 and the original hinge butt 7430 are unchanged. The associated pivot axis 7460 is used to facilitate the rotation between the closed position (show in phantom) and the open position. In this embodiment, conventional pivot point position (unchanged) is accommodated by providing a modified hinge door member 7910. The door member 7910 is attached to a normally located door 7920 that mounts the rearwardly directed aerodynamic assembly 7930 according to any embodiment described herein. The hinge 7910 allows the door to be inset by several inches (distance LE) forwardly along the frame 7432. Thus, when the door is opened, the combination of door 7920 and folded assembly 7930 will lay flushly against the side of the trailer body as shown. Note that the latching mechanism for the door may require modification—for example, providing latch bases that are forwardly inset within the top and bottom of the trailer to accommodate the inset of the door. It should be clear that a variety of door hinge shapes can be employed to allow the insetting of the door 7920 with respect to the frame 7432.

Figures 80, 81:
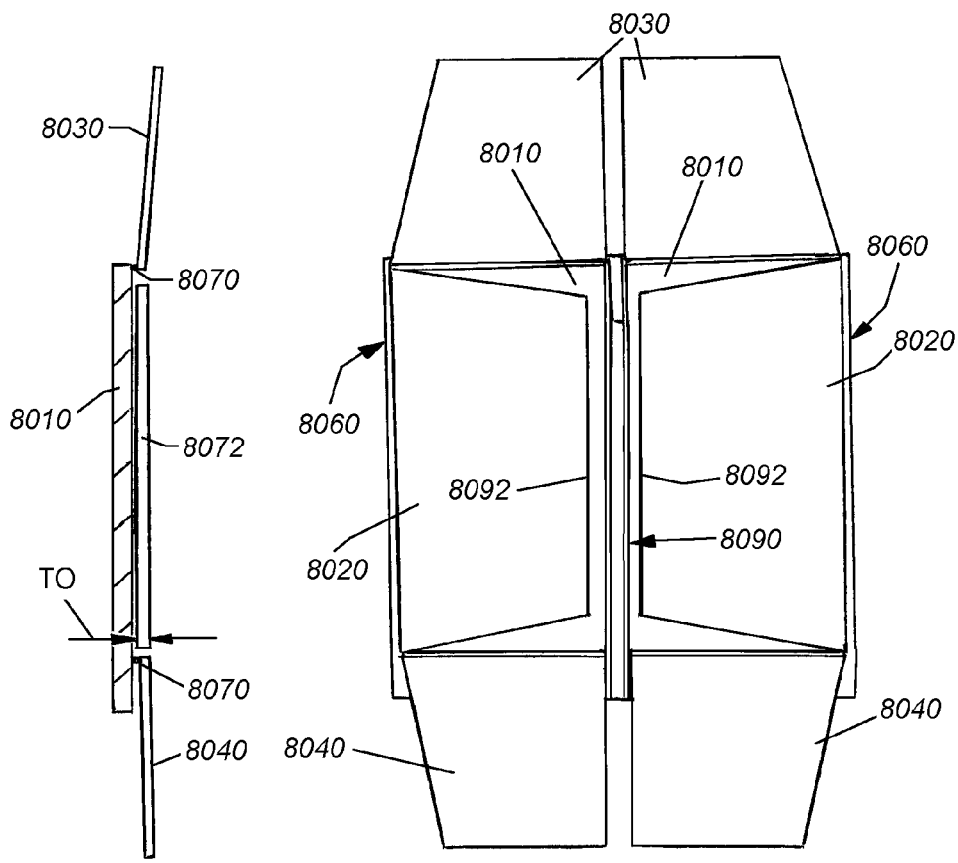
FIGS. 80 and 81 are respective side cross section and rear views of a outward-folding panel arrangement for a rear-mounted aerodynamic assembly according to an embodiment of this invention shown in a folded orientation.

Another embodiment that can facilitate a full 270-degree rotation of the doors, while employing existing (or slightly modified) hinge assemblies and other components is shown in FIGS. 80 and 81. Each aerodynamic assembly includes a base, attached to a respective door 8010 which allows the upper and lower aerodynamic panels to fold away from the center region of the door, rather than toward it. Each door 8010 also supports a side panel 8020 along its surface. All panels are hinged closely to the door 8010 to produce a low profile. A plano-style hinge (for example hinges 8070, 8072) mounted between the door and each panel can facilitate such a low-profile, while still affording strength and a good seal against air leakage. Using either automated or manual mechanisms, the upper panels 8030 and the lower panels 8040 are each allowed hinge outwardly away from the respective door 8010 as shown. Appropriate locks or latches (which can be integrated into the operation of a lifting mechanism) should be provided, particularly to secure the upper panels 8030 in the upward orientation. In one embodiment, a panel thickness TO of approximately ⅝$^{th}$ inch is sufficient to allow the door to fold up flushly against the side. In this embodiment, the door latches may require relocation to, for example, a central area 8090 that is beyond the extension of the rear edges 8092 of the folded side panels 8020. In other embodiments, the panels may be sized to provide sufficient clearance room for the latches. This arrangement contemplates that the aerodynamic assembly is always deployed when the vehicle is in motion (at significant speed). Otherwise, the outwardly extending top and lower panels 8030, 8040 would act as a significant source of air resistance. However, when the vehicle is moving slowly (such as in a loading area) or is stationary, air resistance is not a concern and the panels can be extended upwardly and downwardly as shown.

Figure 82:
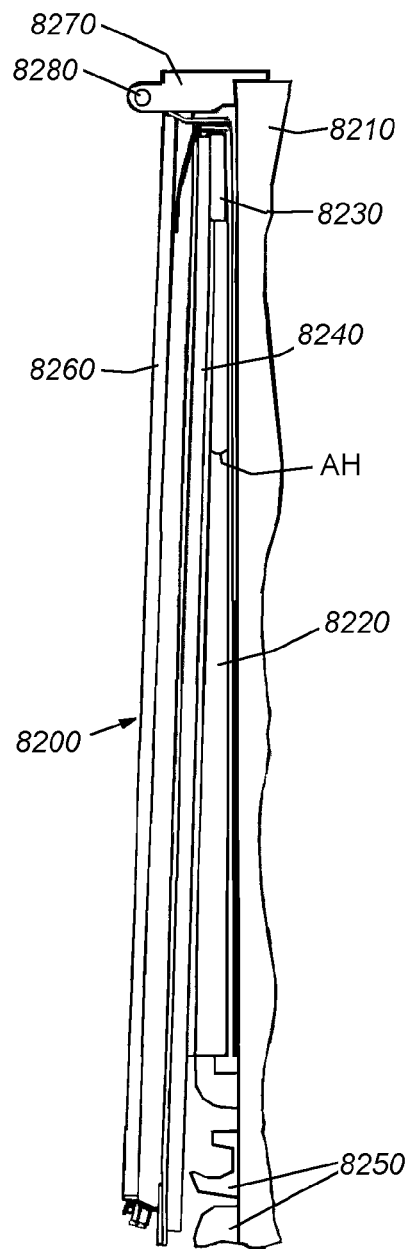
FIG. 82 is a fragmentary top view of a trailer door and mounted aerodynamic assembly according to an illustrative embodiment having an angled stacking arrangement during folding to clear conventional door locking rods, shown with the aerodynamic assembly folded and the trailer door closed.
Figure 83:
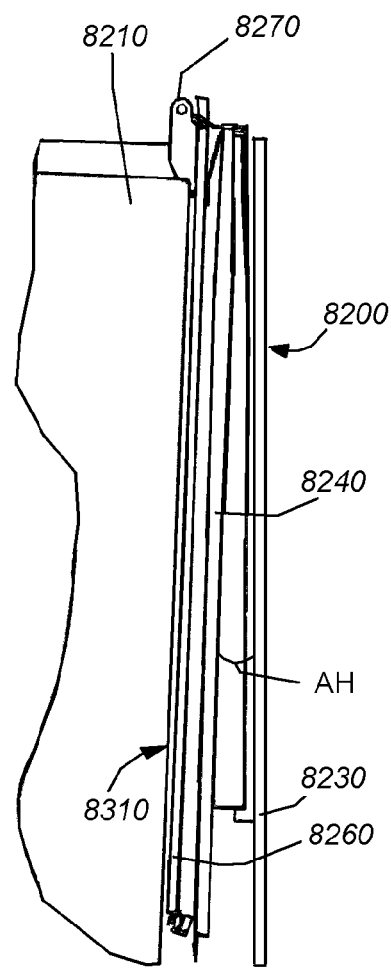
FIG. 83 is a fragmentary top view of the trailer door and mounted aerodynamic assembly according to FIG. 82, shown with the aerodynamic assembly folded and the trailer door fully open.

FIGS. 82 and 83 detail another embodiment of a door and aerodynamic assembly that can allow flush, or nearly flush positioning of the opened doors with respect to the vehicle side—and also allows clearance of the door locking mechanism. In FIG. 82, the illustrative door and aerodynamic assembly 8200 is shown in a closed orientation with respect to the truck body 8210. In FIG. 83, the door and assembly 8200 is shown in a fully opened orientation. In this embodiment, an angled hinge member 8220 (defining a folded angle AH) is secured between the door 8230 and each of the top and lower panels (upper panel 8240 being depicted). This allows each upper panel 8240 to be angled slightly rearwardly toward the middle of the trailer in the folded orientation, so that these panels clear the locking rods and other locking components 8250 located at the center region of the door, while maintaining a low stackup at the lateral (external side) edge of the door. The side panel 8260 is free to swing out with respect to an extended door hinge 8270. The pivot axis 8280 of the hinge 8270 can be located at any acceptable position (e.g. within an arc as described above). Using sufficiently thin aerodynamic panels, a conventional hinge and axis location can be employed and allow the door assembly 8200 to swing through almost a full 270 degrees as shown in FIG. 83. In this manner, the door assembly resides relatively flushly against the side 8310 of the trailer body 8210. Other components of this novel door and aerodynamic assembly combination 8200 are described below.

Figure 84:
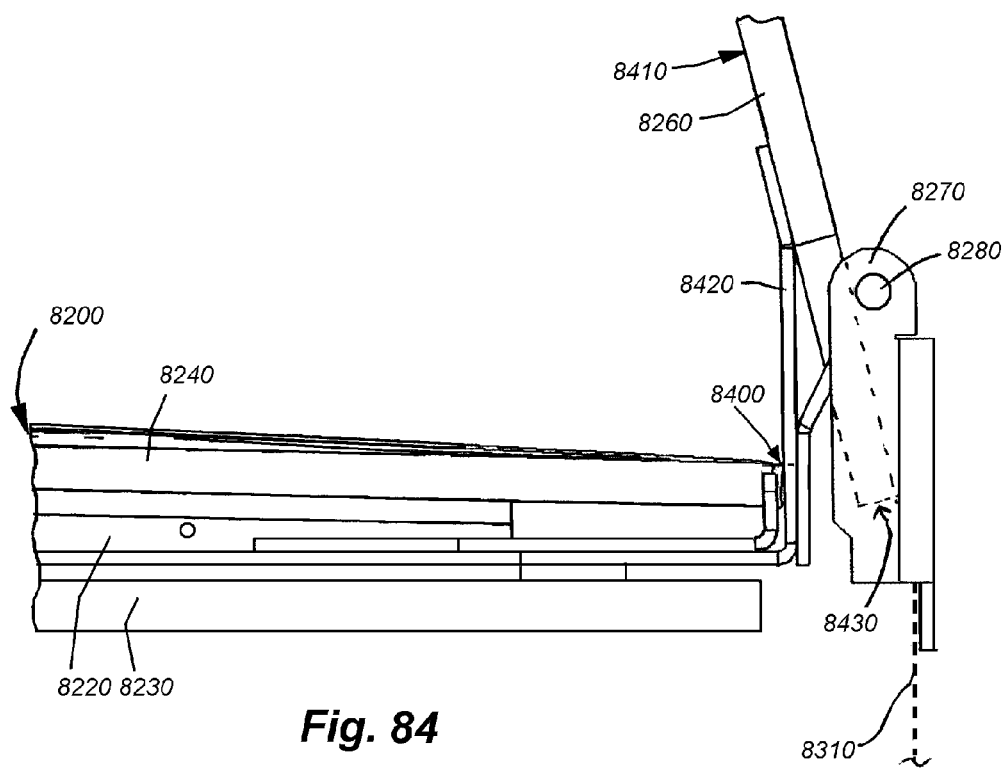
FIG. 84 is a fragmentary top view of the trailer door and mounted aerodynamic assembly according to the embodiment of FIG. 82 showing a remotely placed hinge pivot that enables a panel of the aerodynamic assembly to deploy into a flush relation with the trailer outer side, with side panel shown in a deployed position.
Figure 85:
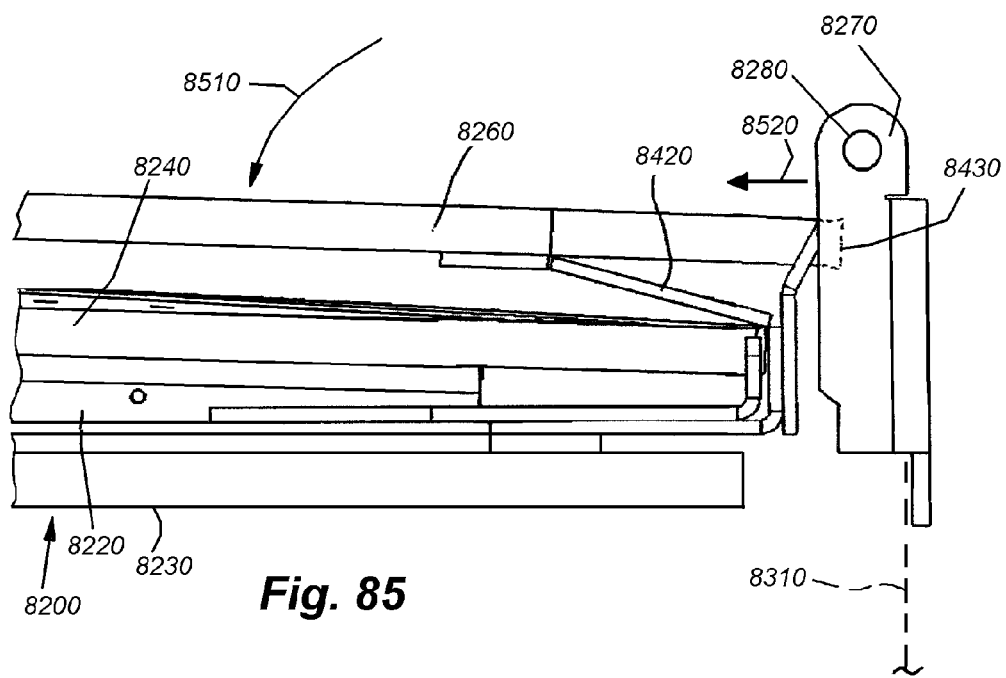
FIG. 85 is a fragmentary top view of the trailer door and mounted aerodynamic assembly according to FIG. 84, with side panel shown in a folded position.

Another technique for reducing the stackup of the trailer aerodynamic assembly is further detailed if FIGS. 84 and 85. In FIG. 84, the above-described assembly 8200 is mounted on the door 8230 with the side panel 8260 hinged so that its hinge pivot/axis of rotation 8400 is remote from the plane defined by its interior (cavity/door-facing) surface 8410. In this manner, when the side panel 8260 rotates into a deployed position (FIG. 84), the panel hinge member 8420 is angled as shown, which causes the outer end 8430 (shown in phantom beneath the butt hinge 8270) of the side panel 8260 to be located flush (or nearly flush) with side of the trailer body 8310. In this manner, the end 8430 of side panel 8260 can be positioned for maximum streamlining with respect to the side 8310 of the trailer body. Moreover, when closed (arrow 8510 in FIG. 85) the end 8430 of the side panel 8260 moves inwardly (arrow 8520) toward the center of the trailer allowing further clearance for viewing of vehicle lights or side hinges. Upper panels can be, likewise, mounted with hinge pivot points that are remote from the actual surface of the panel. Modified hinge brackets on the upper panels can be employed for this purpose.

FIGS. 86-89 detail an illustrative system and method for allowing the above-described door and aerodynamic assembly 8200 (shown with respect to one closed door 8230) to clear an exemplary locking rod 8620 provided on the outside of the door 8230. In this embodiment, the point of rotation of the top and lower panels has been moved based upon the above-described rearwardly/inwardly angled panel-to-door hinge member 8220 (of the hinge assembly 8650). The illustrative example shows only the upper panel 8240, but the lower panel of each assembly 8200 is similarly constructed (allowing the lower panel to hinge inwardly toward the center of the door 8230 along an angled hinge member). Based upon the orientation of the angled hinge member 8220, the medial side 8632 of the upper panel (and lower panel) is now positioned approximately two inches above the surface 8640 of the door 8230 when the panel is fully folded. This provides sufficient room for clearance of the exemplary locking rod (or rods) 8620.

Figure 86:
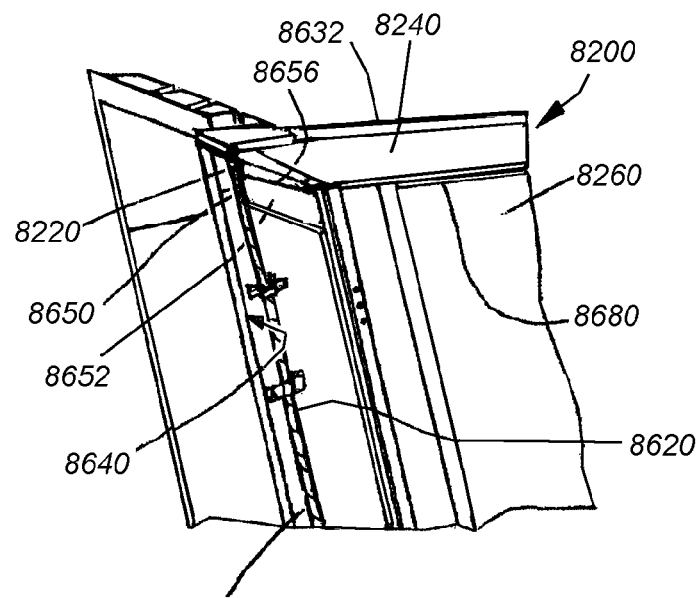
FIG. 86 is a fragmentary perspective view of the rear of a trailer with a door and mounted aerodynamic assembly according to FIG. 82, shown with an upper panel in a deployed orientation and having an angled hinge line for clearance of an externally mounted door locking rod upon folding.
Figure 87:
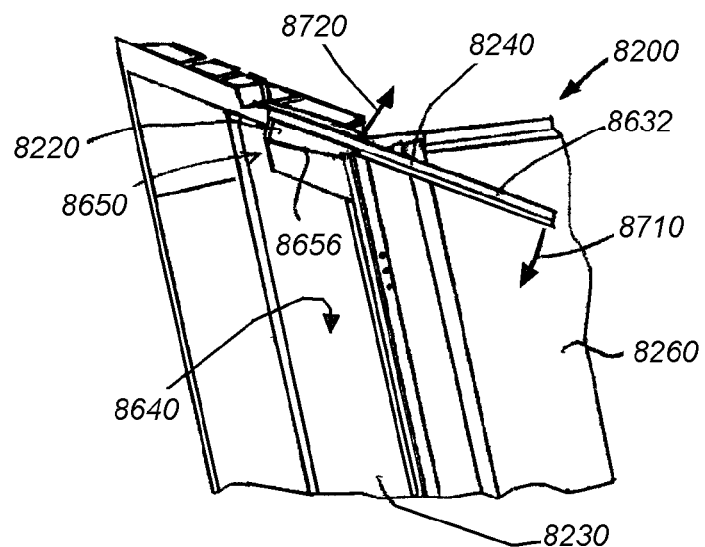
FIG. 87 is a fragmentary perspective view of the rear of a trailer with the door and mounted aerodynamic assembly according to FIG. 86, showing the upper panel beginning to fold downwardly and exhibiting a differential in clearance across its width with respect to the surface of the door.
Figure 88:
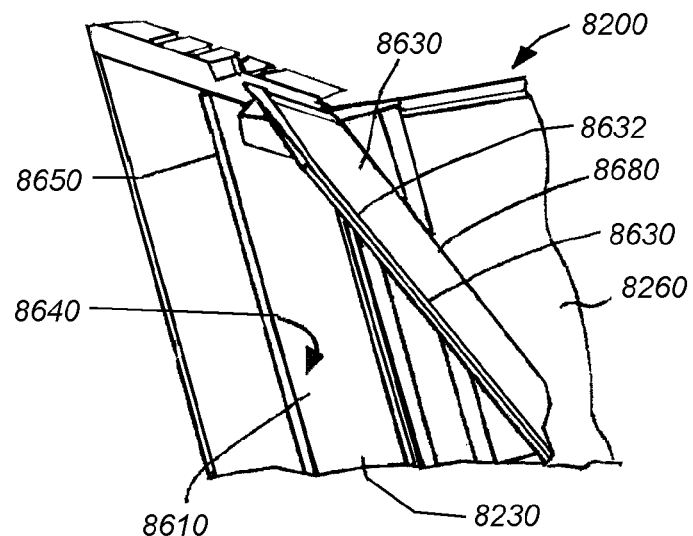
FIG. 88 is a fragmentary perspective view of the rear of a trailer with the door and mounted aerodynamic assembly according to FIG. 86, showing the upper panel folded further downwardly, and exhibiting a further differential in clearance across its width with respect to the surface of the door.
Figure 89:
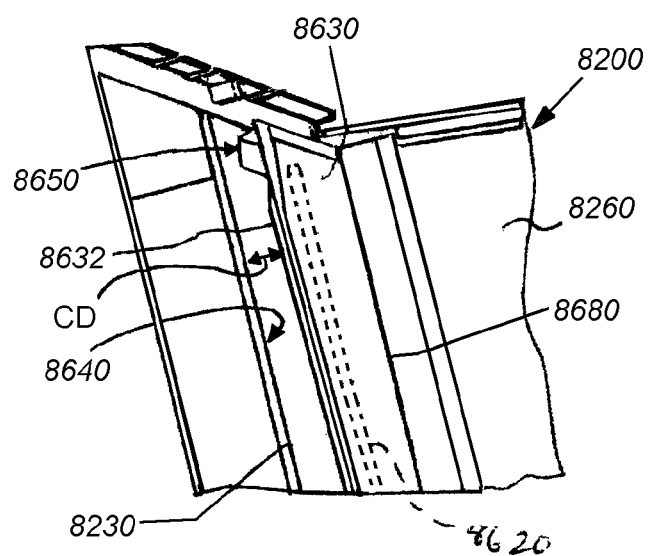
FIG. 89 is a fragmentary perspective view of the rear of a trailer with the door and mounted aerodynamic assembly according to FIG. 86, showing the upper panel folded fully and exhibiting the desired differential clearance across its width with respect to the surface of the door so as to provide clearance for the externally mounted door locking rod.
Figure 90:
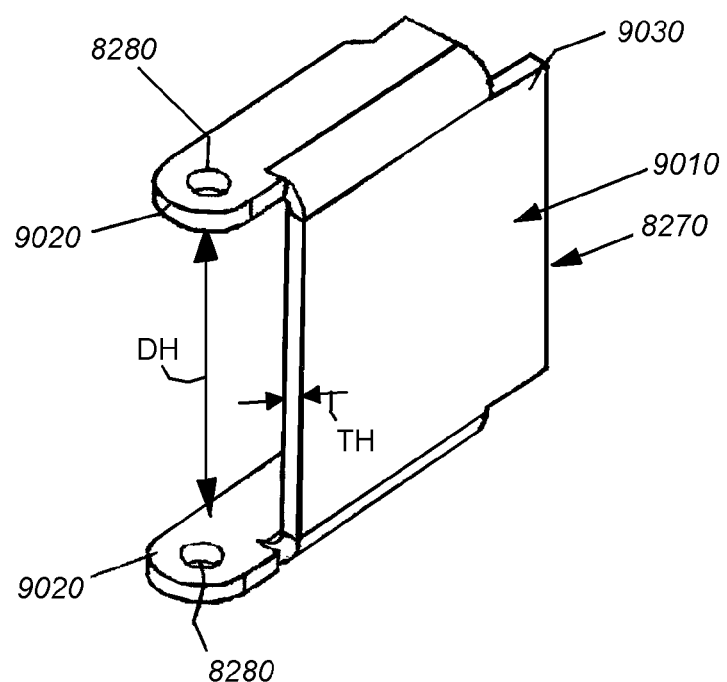
FIG. 90 is a perspective view of a frame-mounted hinge member having an extended pivot point for use with the door and aerodynamic assembly according to FIG. 82 and for providing a streamlined panel attachment according to this invention.

As shown in FIG. 86, the aerodynamic upper panel 8240 is in a fully deployed position, with its hinge assembly 8650 oriented to be fully opened. Note that the aerodynamic side panel 8260 is also deployed. More particularly, the hinge assembly 8650 includes a door-mounted member 8652 and the above-described, angled panel-mounted member 8220. The hinge line 8656 between the two members 8220, 8652 has been angled so that during rotation (arrow 8710 in FIG.

87), the hinge 8650 causes the medial side to move outwardly (arrow 8720) away from the door surface 8640 further than the opposing exterior side (8680 in FIG. 86), which adjoins the aerodynamic side panel 8260. As the upper panel 8240 is further folded along the angled hinge line 8656 toward the door surface 8640 (see FIG. 88), the difference in door-to-panel spacing between the side panel side 8680 and the medial side 8632 becomes more pronounced. As shown FIG. 89, the panel 8630 is fully folded with appropriate clearance for the locking rod 8620. That is, the upper panel's medial side 8632 is at a clearance spacing CD from the door surface 8640 that is greater than the spacing between the panel's exterior side 8680 and door surface 8640. The medial spacing CD is sufficient to override the locking rod 8620, as shown.

It is further contemplated that the aerodynamic shape of the assembly can be adapted to retrofit to a variety of different types of trailers using some standardized components. In other words, certain "universal" components can be provided. One component is the above-described frame-mounted hinge member 8270 with pivot points (centered around through-cut holes 8280) formed on a pair of horizontal, spaced-apart hinge butts joined by a vertical web or "side covering." The hinge member 8270 is formed by stamping a unitary piece of sheet metal having a predetermined thickness TH. The thickness TH can be between approximately ⅛ inch and ½ inch in various embodiments. The dimension TH can be even thicker in more heavy-duty applications. The hinge member 8270 is typically constructed from a strong material such as steel of an appropriate grade and type, or another metal with high strength and durability.

Figure 91:
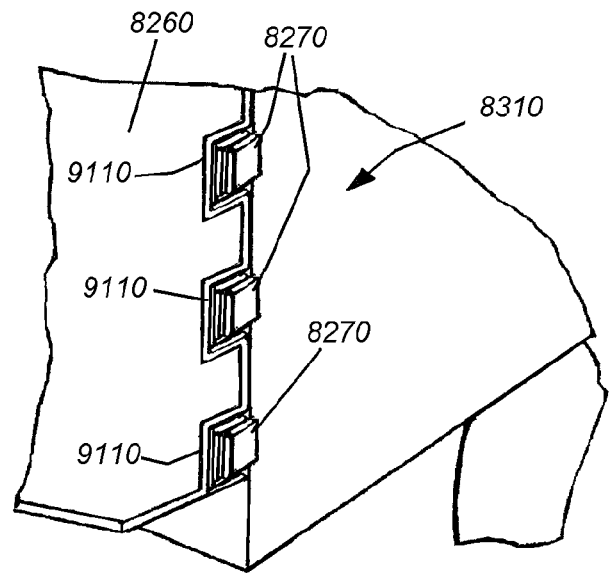
FIG. 91 is a fragmentary perspective view of the rear of a trailer with attached side panel of an aerodynamic assembly having hinge members according to FIG. 90 that define a streamlined profile between the trailer side and the adjacent side panel.

With further reference to the partial view of a truck body in FIG. 91, the hinge member 8270 generally defines a streamlined shape with respect to the side 8310 of the trailer body. As shown, each hinge member 8270 mounted vertically along the rear frame of the trailer body presents a smooth profile between the aerodynamic side panel 8260 and the respective hinges 8270. A series of cutouts 9110 minimize gaps between the hinges 8270 and the adjacent aerodynamic side panel surface 8360 (shown fully deployed). Moreover, the outboard side covering 9010 of the hinge 8270 provides increased structural strength to prevent yielding and deflection based upon the additional mass of the door with the aerodynamic assembly attached thereto, as well as the more rearward location of the pivot 8280. In general, airflow across the hinge passes over the outboard hinge plate 9010 rather than forming all turbulent vortices at each hinge gap. Note that the distance DH between the horizontal hinge butts 9020 of the hinge member 8270 are sized somewhat larger than conventional truck body hinge butts. This allows the tail member 9030 on the outboard side 9010 of the hinge 8270 to be welded anywhere vertically along the side of the trailer's rear door frame. This hinge configuration can, thus, be located to fit over an existing hinge butt, while providing proper door and aerodynamic assembly function without the need to grind off the existing hinge butt.

Figure 92:
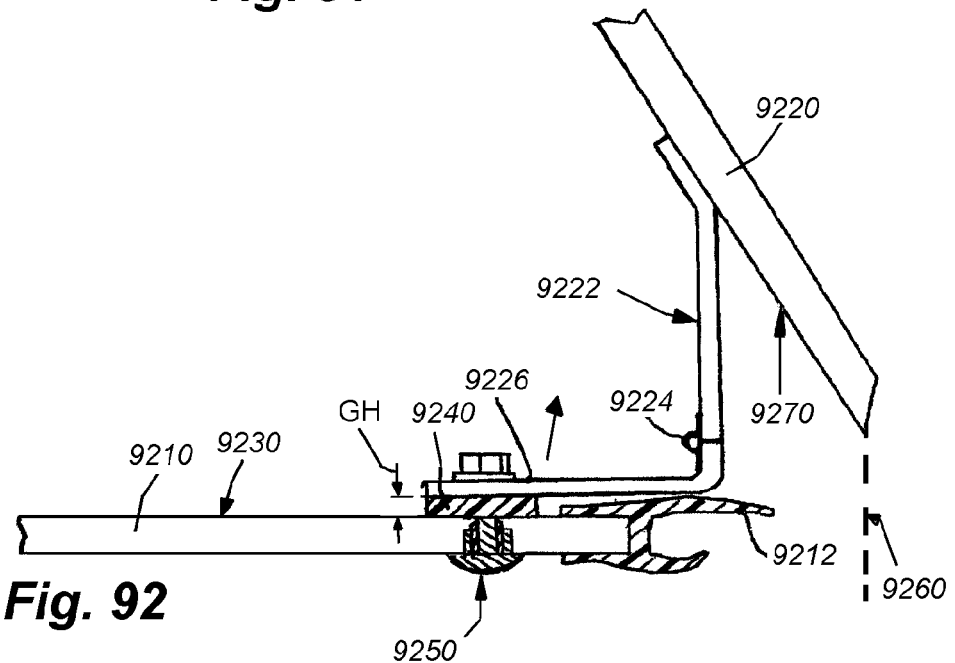
FIG. 92 is a fragmentary top cross section of a trailer door and an attached side panel hinge assembly showing a spacer that allows for variable mounting of the hinge assembly.

Reference is now made to FIG. 92 in which the challenge of applying the assembly to doors (exemplary door 9210) having different sized door-to-frame gaskets 9212 is addressed. As shown the aerodynamic side panel 9220 according to various embodiments is mounted to a hinge assembly 9222 as described herein with hinge pivot 9224. The door base 9226 of the hinge assembly 9222 would normally interfere with the rearwardly projecting, thickened door gasket 9212 if mounted flushly upon the rear surface 9230 of the door 9210. However, employing a thin, corrosive-resistant plastic or hard rubber strip 9240 (secured to the hinge base 9226 and door 9210 with a through bolt assembly 9250) creates a gap GH between the hinge member 9226 and the trailer door surface 9230. Existing trailer door gaskets of different lengths and thicknesses can fit in this gap, and the spacer 9240 can extend outboard of the trailer door 9210 without interference to accommodate a desired gap size (GH). The aerodynamic side panel 9220, or an aerodynamic upper or lower panel, rotating about a point (9224) away from a door surface attached in this manner can fold out to the outboard edge of a trailer (shown as a dashed line 9260). The mounting location of the spacer 9240 and fastener(s) 9250 on the trailer door 9210 can be adjusted to ensure proper fit for trailers having a variety of specifications and dimensions. In general, by placing the rotation axes of panels some distance remote from their inner surfaces (surface 9270, for example), allows attachment to trailer doors with different gasket sizes, door frame thicknesses, etc.

Figure 93:
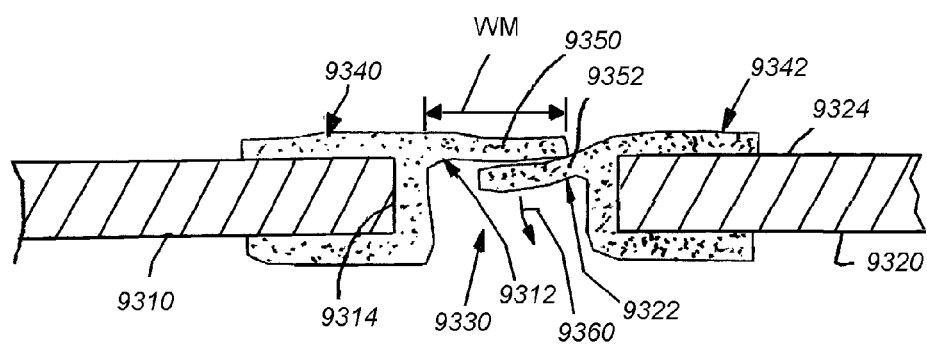
FIG. 93 is a fragmentary front cross section of a medial region between adjacent aerodynamic upper or lower panels showing a pair of medial wipers in a sealing engagement within a gap between the panels.

Another challenge in providing universal fitment is that the gap between right and left (port and starboard) upper and lower panels may vary based upon the width and spacing of the rear doors. During operation the doors may also flex somewhat, thereby varying the gap therebetween. Referring to FIG. 93, a cross section of the medial region between a left horizontal aerodynamic panel (upper or lower) 9310 and a right horizontal panel (upper or lower) 9320. A gap 9330 of several inches is purposely provided between the panels 9310, 9320. This gap 9330 is covered for sealing purposes with one or two medial wipers 9312, 9322 attached to either or both the left and right panels 9310, 9320 at their medial edges 9314, 9324, respectively. In this embodiment, medial wipers 9312, 9322 are constructed oversized, soft and flexible foam or rubber gaskets that bend or deflect to seal gaps (9330) of different widths along the length of the panels 9310, 9320. In this embodiment, both wipers 9312, 9322 have the same dimension, facing opposite directions. They include a respective base portion 9340, 9342 that overlies the medial end 9314, 9324 of each panel and an inwardly extended gasket section 9350, 9352. The gasket sections overlap each other and at least one becomes elastically deflected slightly (arrow 9360) in engagement with the other to create the desired seal therebetween. The cross-sectional shape and dimension of each gasket section is highly variable and can be chosen to improve the mating between gaskets as well as the sealing properties (using for example further lips, ridges, etc.). For trailers with especially large or small gaps between the port and starboard top and bottom panels, medial wipers having gasket sections 9350, 9352 of different overall gap-spanning width dimensions WM can be interchanged to ensure proper sealing and fit with no modification of the panels or custom parts.

Figure 94:
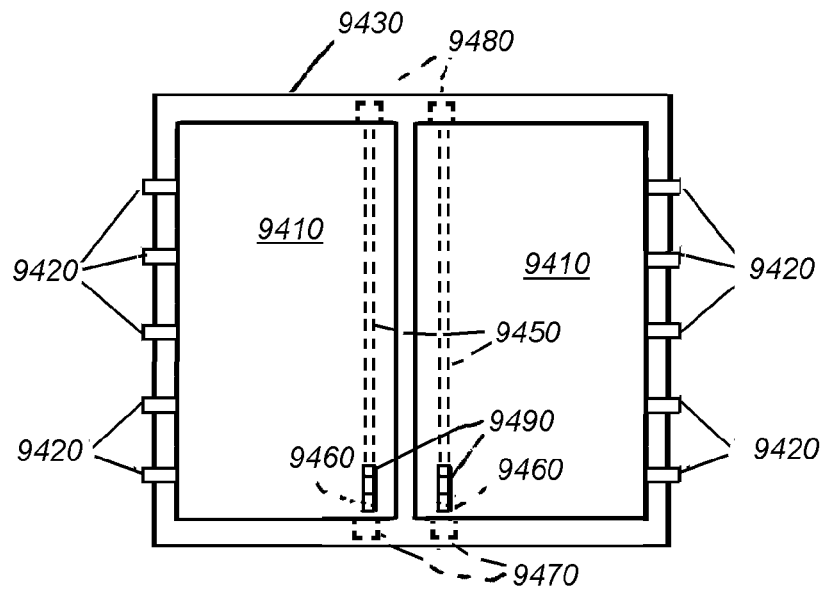
FIGS. 94 and 95 show a modified door-locking assembly in which the vertically translating locking rods move, respectively from an unlocked to a locked position in response to rotation of an external handle according to an illustrative embodiment.
Figure 95:
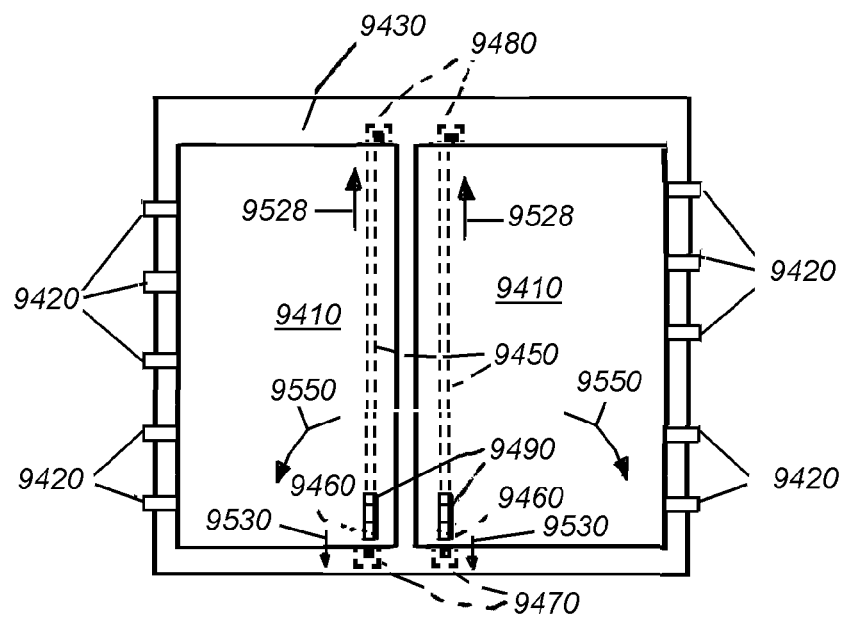

As discussed above, other systems and methods can be employed to allow the aerodynamic panel assembly to clear the door locking mechanism on a variety of trailer types and styles. In particular, the locking handles should be accessible, at least when the aerodynamic assembly is retracted. One technique described above, entails locating the lower panel above the locking handles. Alternatively, the trailer door locking mechanism itself can be modified, thereby allowing the lower panel to extend as low as possible with respect to the doors. A variety of alternate locking mechanisms are also contemplated. FIGS. 94 and 95 detail a typical pair of hinged trailer doors 9410 mounted on hinges 9420 within a door frame 9430. The aerodynamic panels are omitted for clarity. In this embodiment, vertically moving, retractable lock rods 9450, 9460 (shown in phantom) are slidably mounted along the interior surface of each door or within channels formed on the body of a thickened door. In either case, the rods do not project from the outer surfaces of the door, where they would impede mounting of a lower-profile aerodynamic assembly. Such rods move vertically from a disengaged position shown in FIG. 94 in opposing directions (arrows 9520, 9530 in FIG. 95) to engage respective orifices 9470, 9480 in the bottom and top of the rear frame 9430 of the trailer, as shown in FIG. 95. A rod-actuation mechanism can be positioned on a convenient location that is accessible on the outside of the door, or at another location. The rods 9450, 9460 can be manually operated or automated. In this embodiment, rotating handles 9490 are mounted on the door exterior at a position remote from interference with the folded panels. The handles 9490 can be retractable so as to provide a low profile when not in use, or can be located beneath the lower panel's hinge position. As shown, the handles rotate (curved arrows 9550 in FIG. 95) from an unlocked/disengaged position (FIG. 94) to the locked/engaged position (FIG. 95).

Another alternate door locking assembly that reduces the overall exterior profile of the doors employs rotating lock rods that are mounted on the inside of the door, but otherwise operate similarly to conventional exterior-mounted rotating lock rods. A locking handle can be provided with respect to each of the rods through a recessed port in the door for easy access. This arrangement also eliminates the need for fitting the bases for the aerodynamic panels around lock rods. Further alternate embodiments can use internally mounted electromechanical actuators (solenoids, for example) that lock and unlock with respect to the top and bottom of the door frame.

A streamlined shape that places the mating edges (forward edges) of aerodynamic panels as close to the outer edge of the trailer body is highly desirable. However, the end of the vehicle may contain lights along the rear that are slightly inboard of the outer edge—particularly along the top rear face of the trailer. Often, such lighting is a requirement under state and federal vehicle laws and regulations.

Figure 96:
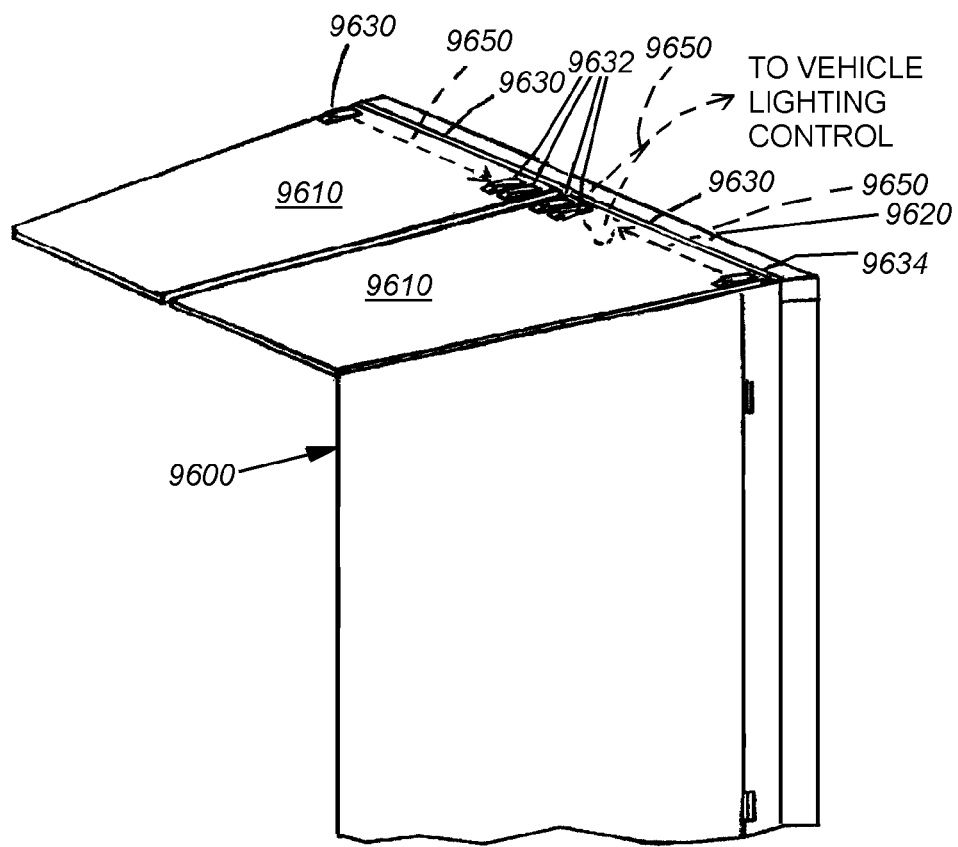
FIG. 96 is a fragmentary perspective view of a rear-mounted aerodynamic panel assembly with surface mounted upper lighting assemblies according to an illustrative embodiment.

FIG. 96 shows a system and method for providing required lighting to a streamlined aerodynamic assembly 9600. In this embodiment, the upper panels 9610 mate closely with respect to the corner of the top frame 9620 of the trailer body. The mating edge 9630 of each panel can be directly hinged to the frame, or provided with a remote hinge pivot point on a respective door hinge member as described above (see FIGS. 85 and 85, for example) that allows the forward mating edge to extend outwardly to meet the adjacent frame edge. In either case, the normal position of the lights on the top rear face of the frame 9620 has been obscured. Accordingly, a set of lights 9630, 9632 and 9634 has been affixed to the outer surface of each upper panel 9610 at the appropriate spacing and mounting positions to comply with regulations. The lights can be custom-shaped or a commercially available type that allow for surface mounting. The new lights 9630, 9632, 9634 are connected to the existing lights on the frame or another connection via appropriate wires (or fiber optics), that pass through the panels and into the vehicle as shown by dashed lines 9650 allowing for a clean exterior surface, free of exposed wires. The shape of the lights, combined with the downward angle of the deployed upper panels 9610 renders a relatively low profile light visible from behind. When folded, the lights are still visible so long as they are not completely covered by the side panels in a folded orientation.

Figure 97:
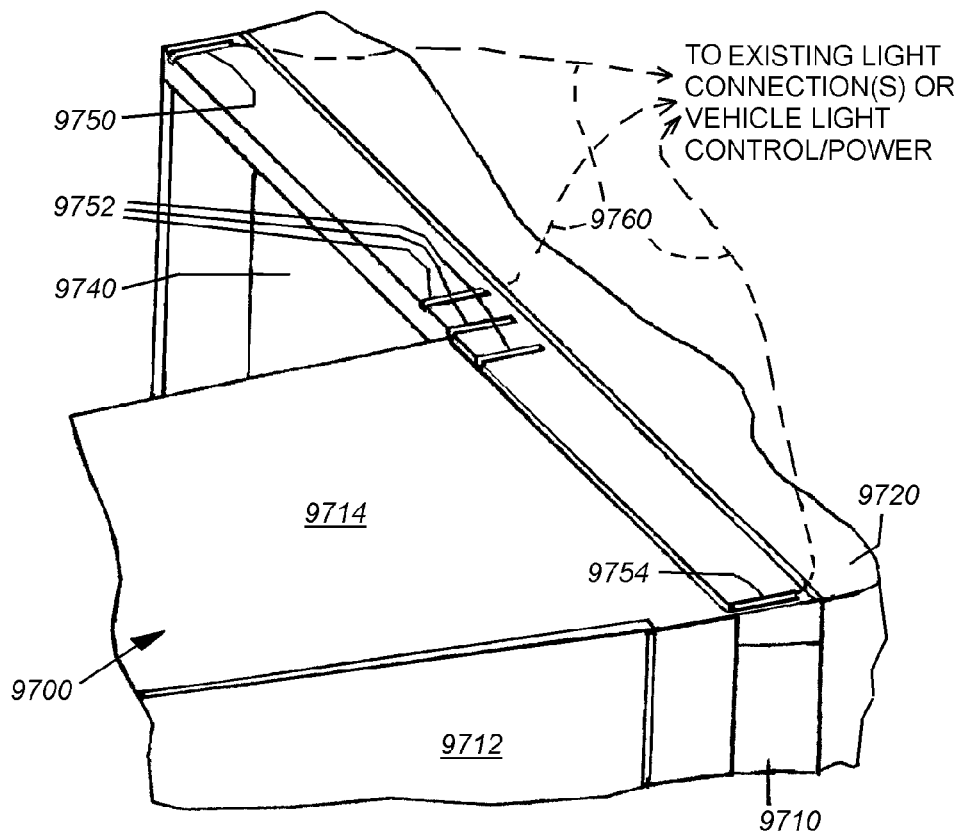
FIG. 97 is a fragmentary perspective view of a rear-mounted aerodynamic panel assembly having a header assembly with flush-mounted upper lighting assemblies according to an illustrative embodiment.

In another embodiment, shown in FIG. 97, the aerodynamic assembly is mounted to a header 9710 that defines an inward taper on all sides matching the taper angle of the adjacent aerodynamic panels 9712, 9714. The header is part of an integral door frame system, which is attached to the rear of the trailer body 9720. It is constructed typically as part of an OEM trailer to achieve optimal aerodynamic efficiency. In this manner the header 9710 presents a continuous streamlined transition from the trailer body to the rear ends of the panels. The panels can be hinged to the doors (9740) or header 9710 as described variously above. The header includes a plurality of top-mounted lights 9750, 9752, 9754 mounted across the top at the required locations. The lights 9750, 9752, 9754 are embedded within the header so that only a flush (color tinted) lens is visible, while the electrical and lighting elements (LEDs for example) are recessed within the header 9710. This arrangement provides complete streamlining of the lights. They are electrically (or optically) connected to the existing light connections on the vehicle frame 9720, or otherwise connected to the lighting control of the vehicle. Again, the slant of the aerodynamic assembly 9700 and header 9710 ensure that the lights are visible from behind. They are also visible when the aerodynamic panels are folded.

Figure 98:
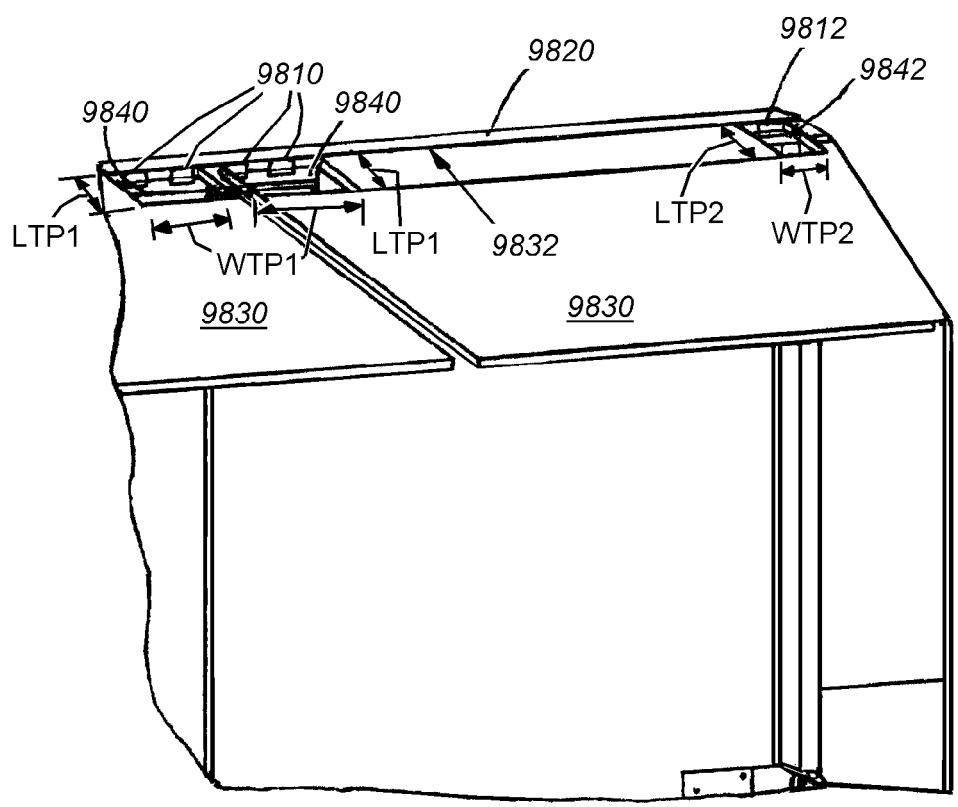
FIG. 98 is a fragmentary perspective view of a rear-mounted aerodynamic panel assembly with transparent/translucent sections to expose conventionally located trailer frame mounted upper lighting assemblies according to an illustrative embodiment.

Another system and method for providing required top (or other location) lighting to a vehicle rear equipped with an aerodynamic assembly is shown in FIG. 98. In this embodiment, the existing vehicle lighting 9810, 9812 remains in place on the rear face of the vehicle frame 9820, or is only slightly modified. At the forward edge 9832 of the aerodynamic upper panels 9830, a section adjacent to each set of lights has been cut out, and replaced with a transparent or translucent material panel sections 9840, 9842 of approximately the same thickness as the surrounding panel sheet. The width WTP1, WTP2 of respective panel sections 9840, 9842 is sufficient to expose the underlying lights 9810, 9812. The width should afford an appropriate angle of viewing from behind. Likewise, the rearward length LTP1, LTP2 of respective sections 9840, 9842 should be sufficient to expose the light for viewing from the rear given the taper angle of the panels 9830 when deployed and when the panels are folded. A variety of alternate techniques for providing lighting to the panels, such as embedded fiber optic emitters, etc. is expressly contemplated. Likewise additional lights can be provided, for example, at the rearward edges of the panels. Again fiber optic systems or other types of lighting (LED bars, for example) can be employed to accomplish this and other lighting tasks with respect to the aerodynamic assemblies according to this invention.

Again note that any of the above-described systems and methods for providing light using an aerodynamic assembly can be applied to brake and tail lights as well as backup lights mounted at acceptable locations with respect to the rear of the trailer.

Figure 99:
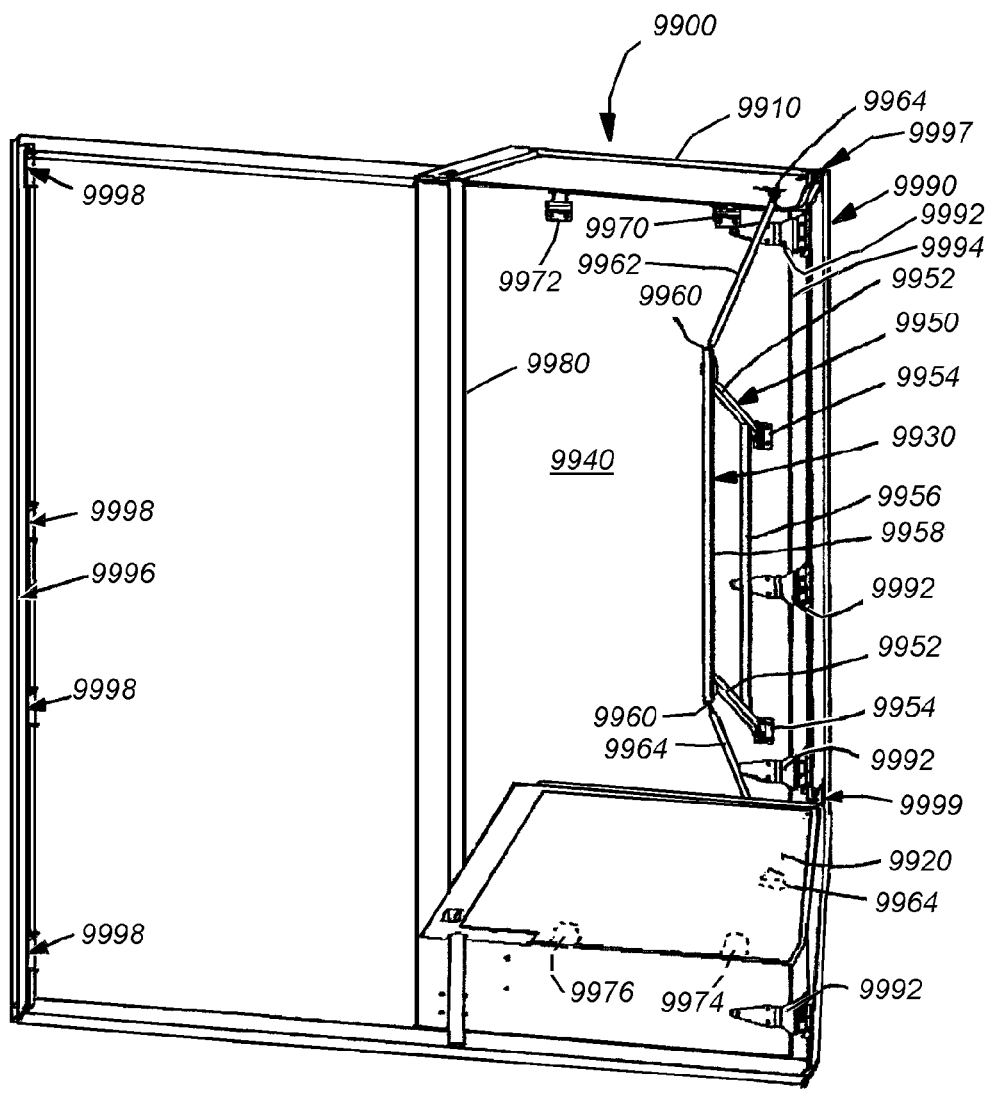
FIG. 99 is a rear perspective view of a fully deployed aerodynamic assembly mounted on one trailer door according to an illustrative embodiment of this invention, and employing a swing arm-type upper and lower panel deployment system.

FIG. 99 shows an illustrative embodiment of an aerodynamic assembly 9900 that deploys an upper panel 9910 and a lower panel 9920 using a linkage therebetween that comprises a swing arm assembly 9930, according to the principles discussed generally with reference to FIGS. 62-65 above. Note, as used herein, with respect to the coordinated movement of the upper and lower panels (or generalized folding and deployment of an aerodynamic assembly) the term "linkage" shall mean a mechanical, fluid or electromechanical assembly that allows at least a second aerodynamic panel to move between a folded and deployed position in coordination with the movement of a first aerodynamic panel between a corresponding folded and deployed position. In this embodiment, the upper and lower panels 9910, 9920 of the assembly 9900 have been attached using hinges applied directly to the surface of the trailer door 9940 using the depicted fasteners (bolts, rivets, etc, or an alternate attachment mechanism (i.e. adhesives, welding and the like). The sing arm assembly 9930 of this embodiment includes a central frame 9950 having a pair of horizontal hinge bars 9952 that extend from door mounted hinges 9954. The hinge bars 9950 are tied together by a pair of vertical tie bars 9956 and 9958 that provide a stable framework for the overall swing arm frame 9950. The outer vertical tie bar 9958 of the swing arm 9930 includes, at opposing ends, a ball joint swivel connection 9960 (described further below) for a respective upper and lower tie rod 9962 and 9964. The opposing ends of each tie rod 9962, 9964 are attached to an attachment location 9964 and 9966 (shown in phantom) on the respective upper and lower panels 9910 and 9920. Described further below, the panel-folding hinges 9970 and 9972 of the upper panel 9910 and the panel-folding hinges 9974 and 9976 of the lower panel are mounted to define particular angles that allow the folded upper and lower panels 9910 and 9920 to clear a lock rod 9980 of the trailer door 9940 when in a fully folded position. It can be assumed that the opposing trailer door (left side as depicted) contains a similar panel and linkage structure to that of the right side, and which has been removed/omitted for clarity. This description shall apply equally to the opposing door and aerodynamic structure, which, together with the depicted and described structure constitutes a complete folding/deployable aerodynamic assembly.

As will be described further below, the side or lateral panel 9990 is mounted on hinge assemblies 9992 that (in a retrofit application) overly the preexisting trailer body hinges. The hinge assemblies 9992 are designed to relocate the hinge points/axes of the trailer door 9940 directly rearwardly, and also encapsulate separate hinges, which pivot on discrete axes (remote from the door hinge axis to allow folding of the lateral panel 9990. As will also be described, the hinge assemblies 9992 are constructed as part of an overall hinge butt plate 9994 that is attached to the rear outer corner of the trailer frame by welding, fasteners and/or any other acceptable attachment technique. An opposing hinge butt plate 9996 is shown attached to the opposing side of the vehicle frame with door and aerodynamic assembly removed for clarity. The door hinge portions of the overall hinge assemblies (9992) (e.g. the hinge portion attached to the trailer door) have been omitted from this side—typically by detaching through-bolts and nuts that act as hinge pivots—revealing the hinge devises 9998 that define the pivot axis and capture the door hinge portions of the assembly.

The panels 9910, 9920 and 9990 can be constructed from a variety of materials. Where possible thickness is minimized to allow for a lower-profile stack-up in the folded position. However, the panels should remain sufficiently rigid so as to avoid excess vibration and deflection at high speed, and should maintain their shape even with minimal locking points between panels and an open, floating confrontation (without locks) at the medial junction between upper and lower panels. Examples of accepted upper lower, lateral (etc.) panel materials and constructions can include, but are not limited, to: honeycomb sandwich panels of any combination of honeycomb and skin materials, ply-metal (wood sandwiched between metal skins) panels, foam sandwich panels with any combination of foam and skin materials, fiber-reinforced plastic panels, fiberglass panels, sheet-metal panels with stiffening ribs, composite sheets with stiffening ribs, or cloth or other non-rigid material stretched over a rigid frame.

Notably, as shown in FIG. 99, the upper panel 9910 and lower panel 9920 are each secured in the depicted deployed position with respect to the lateral panel 9990 by single, discrete locking assemblies 9997 and 9999 respectively located at the mating outer corners of the confronting panel junctions. These locking assemblies allow for the quick attachment and release of upper and lower panels with respect to the lateral panel.

Figure 100:
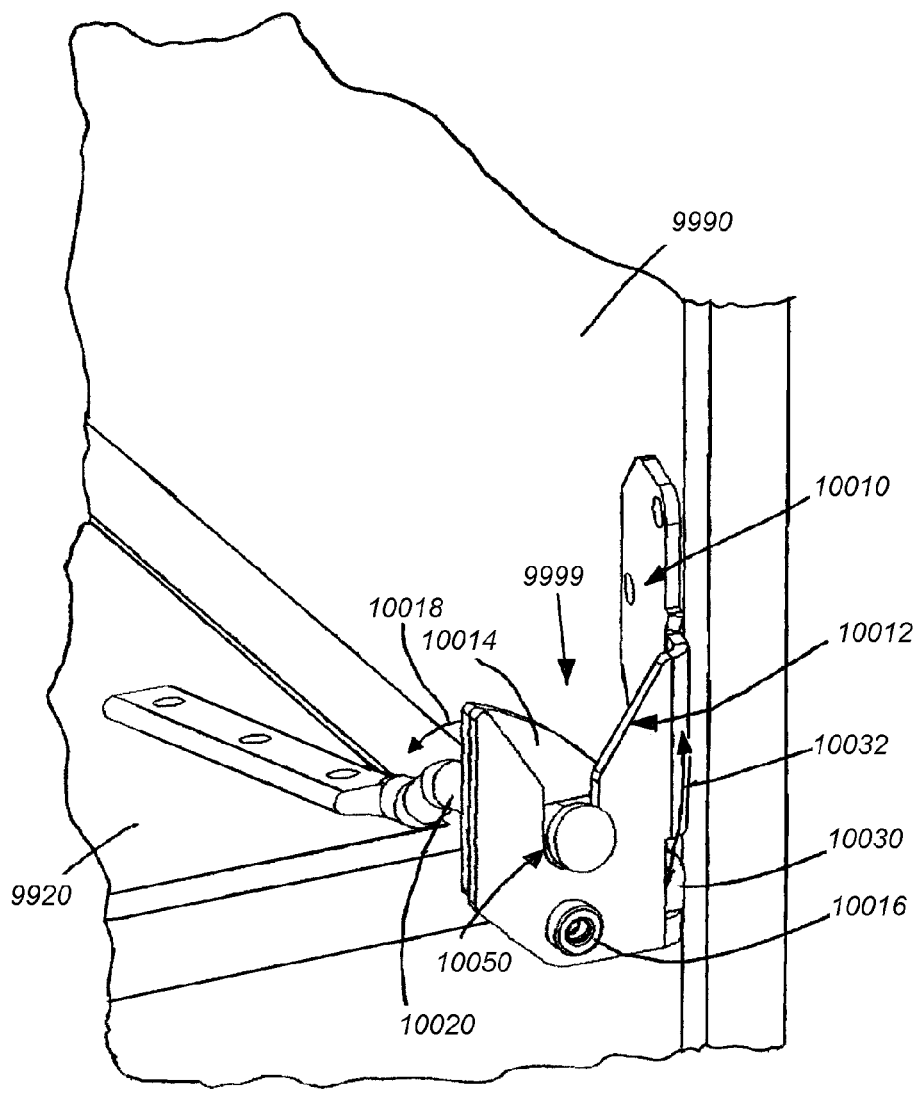
FIG. 100 is a more detailed perspective view of the lower panel locking mechanism for the deployed aerodynamic assembly of FIG. 99 detailing a locked relationship between the lower panel and the side or lateral panel.

FIG. 100 shows the lower panel 9920 and lateral panel 9990 in a deployed and locked-together position in further detail. The locking is accomplished by a lock base 10010 mounted on the lateral panel 9990. The lock base includes a V-shaped entry groove (V-groove) 10012 and a pivoting latch or catch 10014 that are similar in construction and operation to a garden gate lock of conventional design. A pivot 10016 allows the latch to move pivotally (curved arrow 10018) with respect to the lock base 10010. In the depicted orientation, the latch 10014 has captured the locking pin 10020 mounted on the inside face of the lower panel 9920 within a well 10050 located below the V-groove 10012 on the base. The lower panel 9920 is restrained from movement in this orientation. Likewise, the lateral panel 9990 cannot move inwardly due to the obstruction of the lower panel 9920. A small lever extension 10030 is provided on the opposing end of the latch 10014. It includes a hole that allows attachment of a release cable (not shown).

Figure 101:
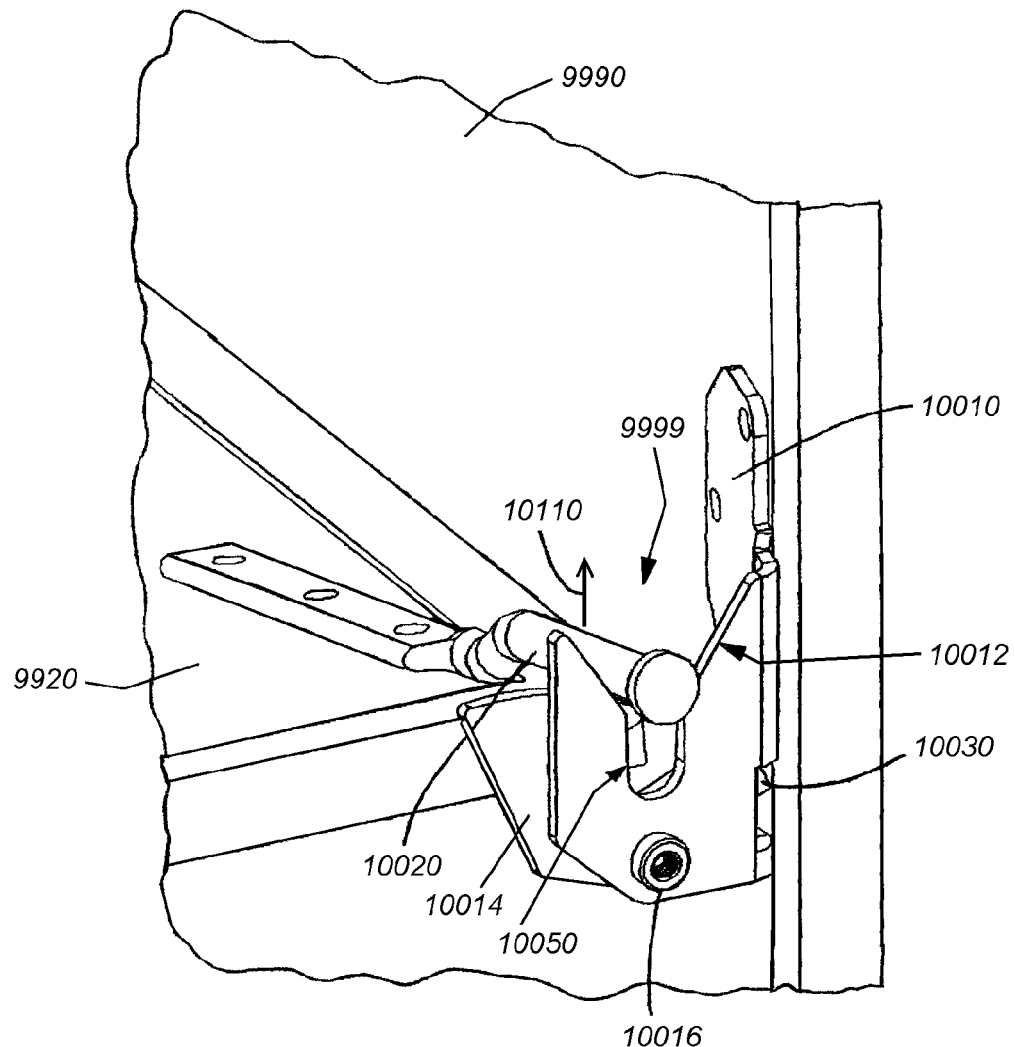
FIG. 101 is a more detailed perspective view of the locking mechanism of FIG. 100 showing the unlocking of the panels from each other.
Figure 102:
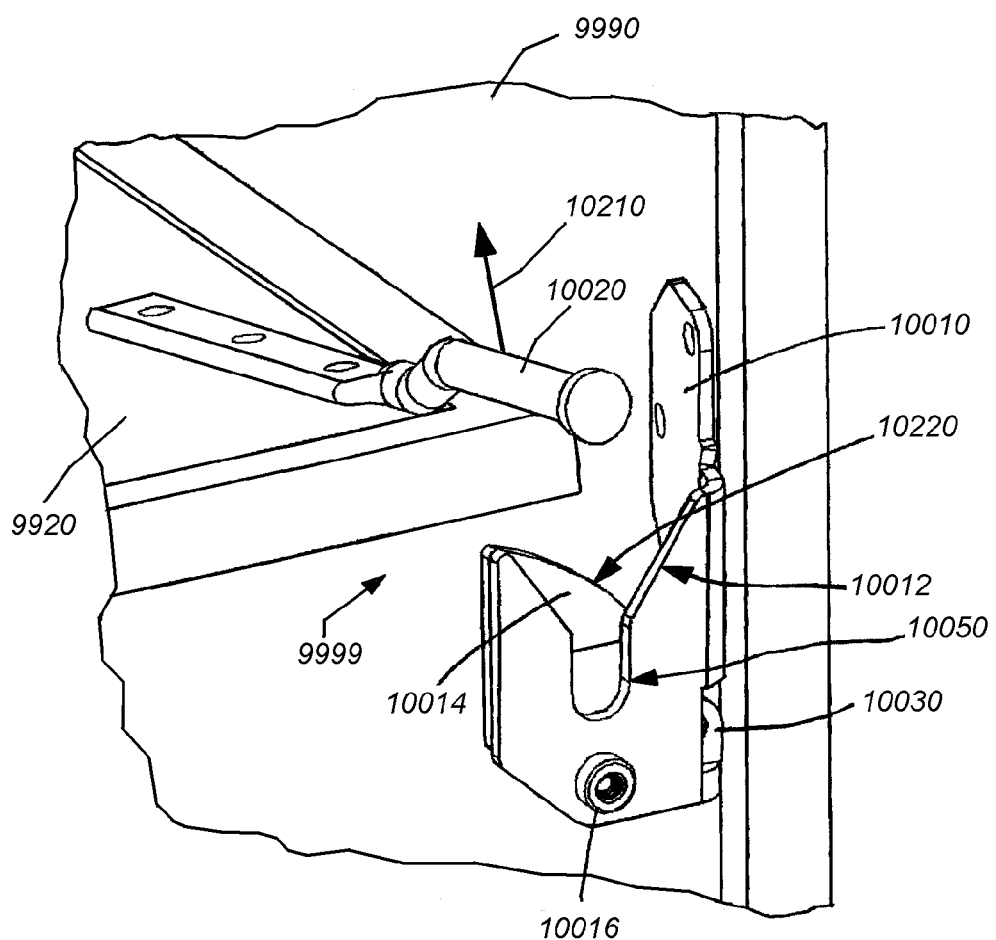
FIG. 102 is a more detailed perspective view of the locking mechanism of FIG. 100 showing the unlocked panels being moved further away from each other, and toward a folded/retracted position.

When a cable or other actuating mechanism (attached to the latch lever 10030) applies upward force on the lever 10030 (arrow 10032), the latch 10014 pivots (curved arrow 10018) as shown in FIG. 101. As detailed, the lower panel 9920 is now free to move upwardly (arrow 10110) with the pin 10020 no longer captured within the V-groove 10012. This upward movement allows the lower panel 9922 to be moved pivotally about its hinges into the folded position as shown by the continuing upward movement (arrow 10210) in the illustration of FIG. 102. As shown, once the panel's locking pin 10020 has cleared the latch, 10014 in FIG. 102, the latch 10014 can return to a closed position. For example, the latch can include a spring (not shown) that allows it to remain in the closed orientation of FIGS. 100 and 102 when not biased by movement of the lever 10030 into an unlocked position. When the panels are redeployed, and the pin moves back into engagement with the latch, the locking pin 10020 forces its way along the curved top surface 10220 of the latch 10014, thereby moving the latch temporarily out of an obstructing orientation. This movement allows the pin to pass through the V-groove 10012, and into the capturing well 10050. When no longer obstructed, the latch 10014 springs back over the pin 10020 to relock the assembly (as shown in FIG. 100). It should be noted that the upper panel locking assembly 9997 is similarly constructed, and operates in similar manner, facing in an opposing direction (e.g. facing downwardly). The latch levers of the two assemblies 9997 and 9999 can be tied together by a cable or other linkage (not shown) so that actuation of each lever occurs simultaneously by pulling upon a single cable with a single motion of the operator. In this manner, by folding the lower panel 9920, the upper panel 9910 is unlocked and folded at the same time. Appropriate guides and/or pulleys (not shown) can be provided to enable a release cable to serve each latch, with a handle at a convenient location for the operator. Such an arrangement should be within the scope of ordinary skill.

Figure 103:
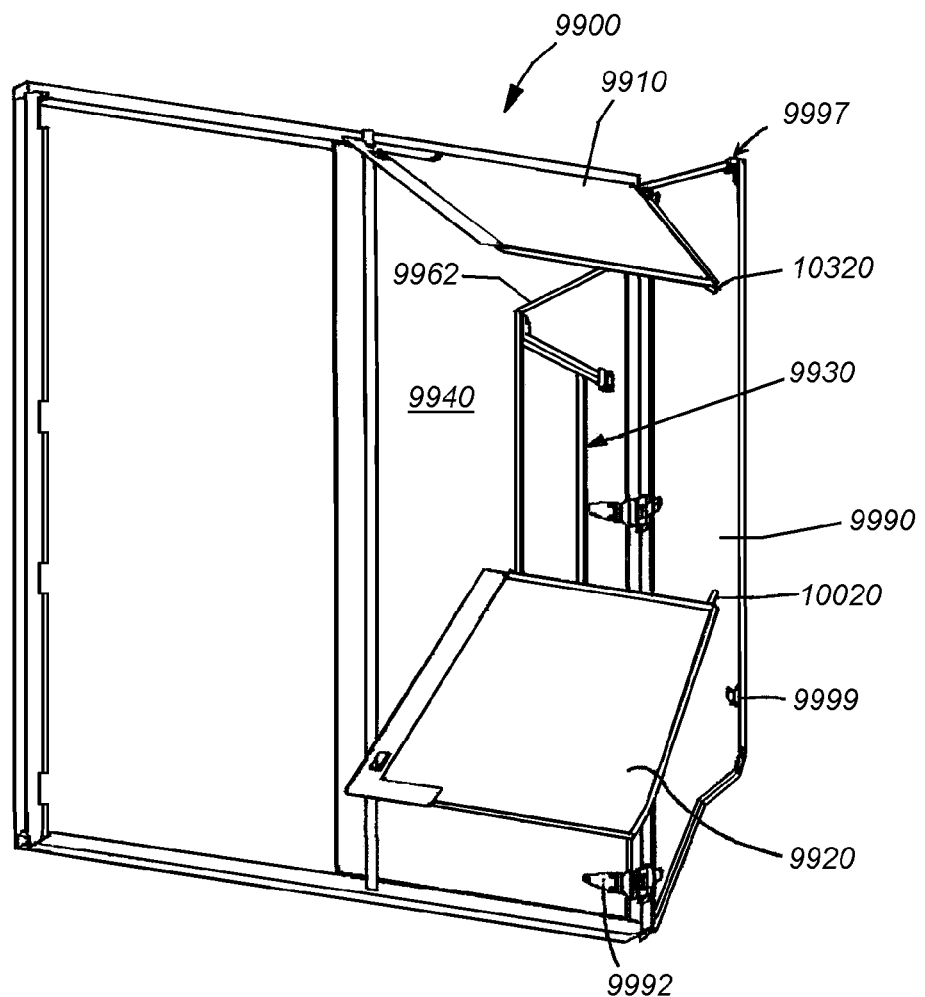
FIG. 103 is a more detailed perspective view of the aerodynamic assembly of FIG. 99 showing the now-unlocked panels moving further toward a folded/retracted position.

The folding action of the upper and lower panels 9910, 9920 is shown further in FIG. 103, in which the locking pins 10020 and 10320 of the associated locking assemblies 9997 and 9999 are fully released. In this manner, the upper panel 9910 and lower panel 9920 are in the process of being folded fully against the surface of the door 9940 by action of the interconnecting swing arm assembly that coordinates the folding/unfolding movement of these two panels. In this embodiment, the operator applies folding action to the lower panels. As described above, the folding/unfolding action can be applied by an automated mechanism, based upon a number of different triggering devices, including a cab or trailer-mounted switch or automatic, speed-or-motion-sensing circuits.

Figure 104:
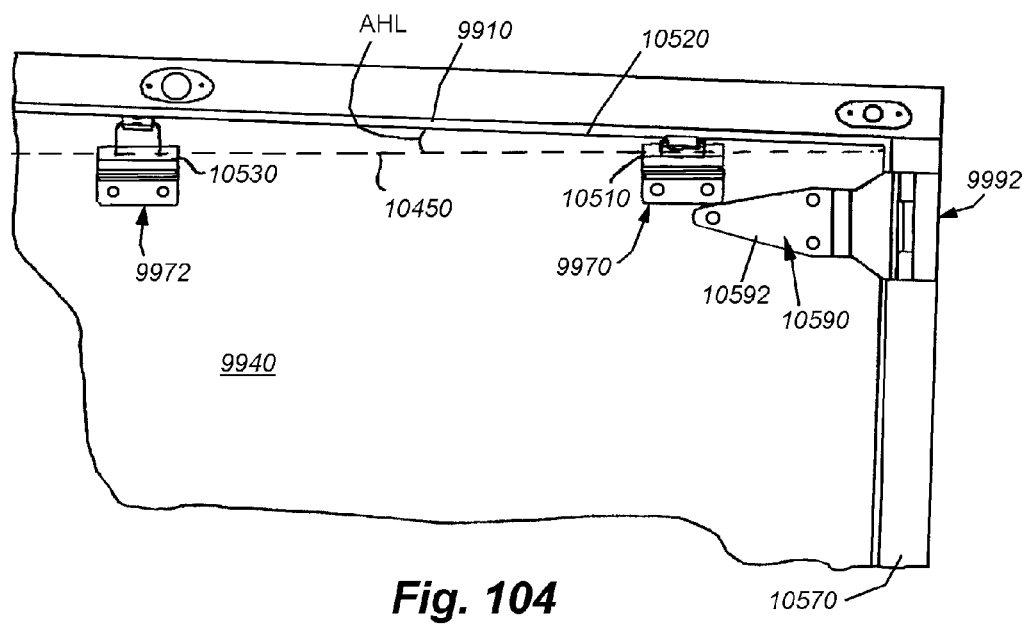
FIG. 104 more detailed, fragmentary rear view of the aerodynamic assembly of FIG. 99 showing the folding hinge arrangement for the upper aerodynamic panel.

As discussed generally above, reference to the present embodiment, and also in connection with the embodiment of FIGS. 82-89, the upper and lower panels 9910, 9920 are adapted to fold so that they generate a gap near the medial center of the trailer body to allow clearance for the door lock rod (9980 in FIG. 99). As shown in further detail in FIGS. 104 and 105, the depicted upper panel 9910 is mounted on a pair of panel-folding hinges 9970 and 9972. The hinge 9970 defines a hinge pivot point 10510 that is closer to the horizontal corner 10520 defined between the door 9940 and the deployed upper panel 9910. Conversely, the more central hinge 9972 defines a hinge pivot 10530 that is more remote from the corner 105320. With reference particularly to FIG. 104, the two hinge pivot points 10510 and 10530 thereby define a hinge line (10450) that is disposed at an angle AHL with respect to the horizontal line defined by the corner 10520. The angle AHL is between approximately one degree and five degrees and is approximately two degrees in the illustrative embodiment. In addition, the panel side/strap of each hinge (e.g. panel hinge component 10540 for hinge 9970 and 10550 for hinge 9972 define a different shape and length. In a general, the inner hinge component 10550 has a longer connecting strap 10552 than the connecting strap 10556 of the outer hinge component 10540. This increased strap length allows the inner portion of the upper panel 9910 to extend outwardly further from the door surface. As shown generally in FIG. 106, the folded panel effectively clears the lock rod 9980. Note that the lower panel hinges 9974 and 9976 (shown in phantom) define the same geometry as the upper hinges 9970 and 9972 thereby allowing the lower panel 9920 to fold in a similar manner—but in an upward, rather than a downward folding direction.

Figure 105:
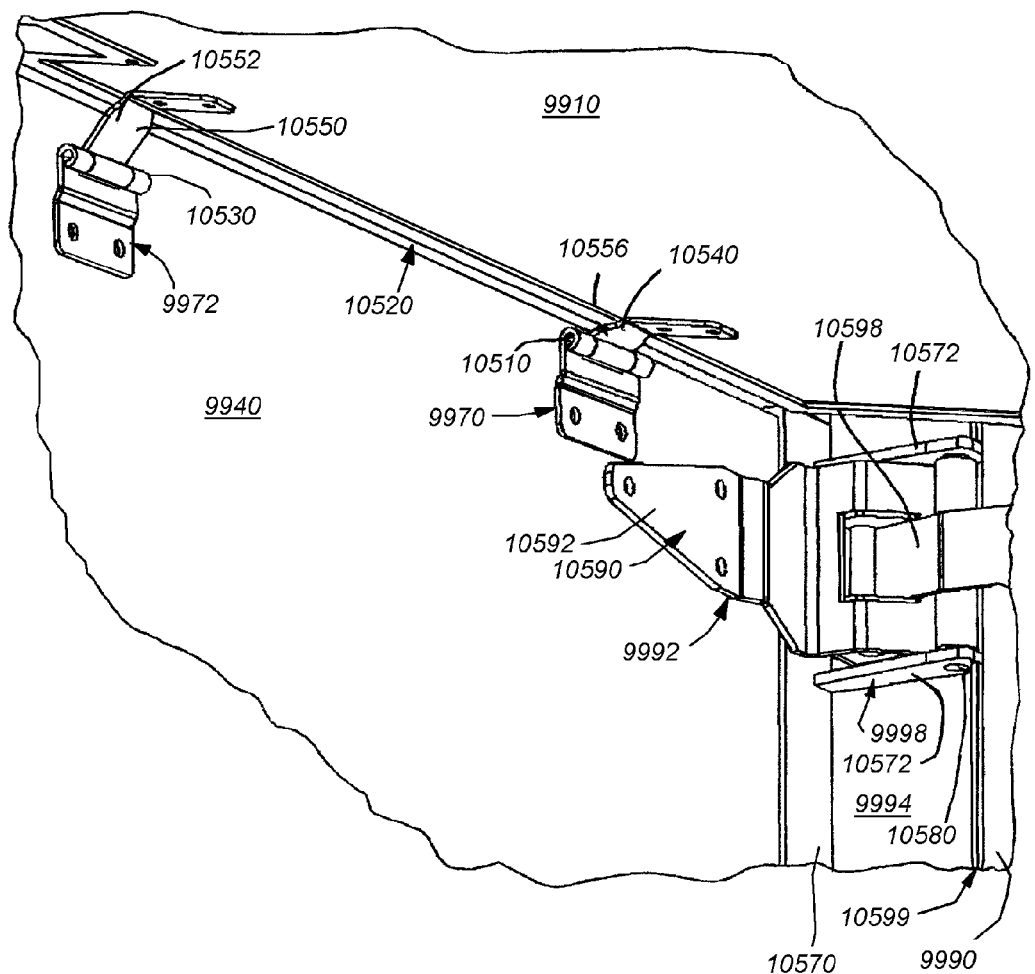
FIG. 105 is a more detailed perspective view of the folding hinge arrangement of the upper aerodynamic panel of FIG. 99.
Figure 106:
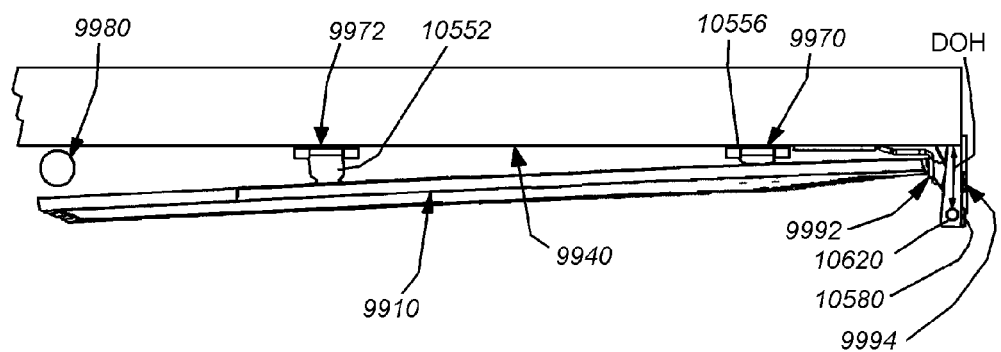
FIG. 106 is a more detailed top view of the upper aerodynamic panel and side/lateral panel of FIG. 99 in a folded orientation shown providing clearance for a door lock rod.

As shown further in FIGS. 104-106, the illustrative embodiment provides a novel door hinge assembly, consisting of a number of discrete hinge assembly units 9992. Each hinge assembly 9992 is adapted to overly the existing trailer frame door hinge devises (in a retrofit application), as will be described further with reference to FIG. 114 below. Each hinge unit 9992 is mounted on an elongated, vertically mounted hinge butt plate 9994 as described above. The hinge butt plate 9994 affords a desirable aerodynamic transition between the trailer body door frame 10570 and the lateral panel 9990. That is, the hinge butt plate 9994 is attached to the vehicle frame with a relatively flush mating between the two surfaces, thereby providing a more streamlined side profile surface with less of a jump discontinuity therebetween.

Figure 107:
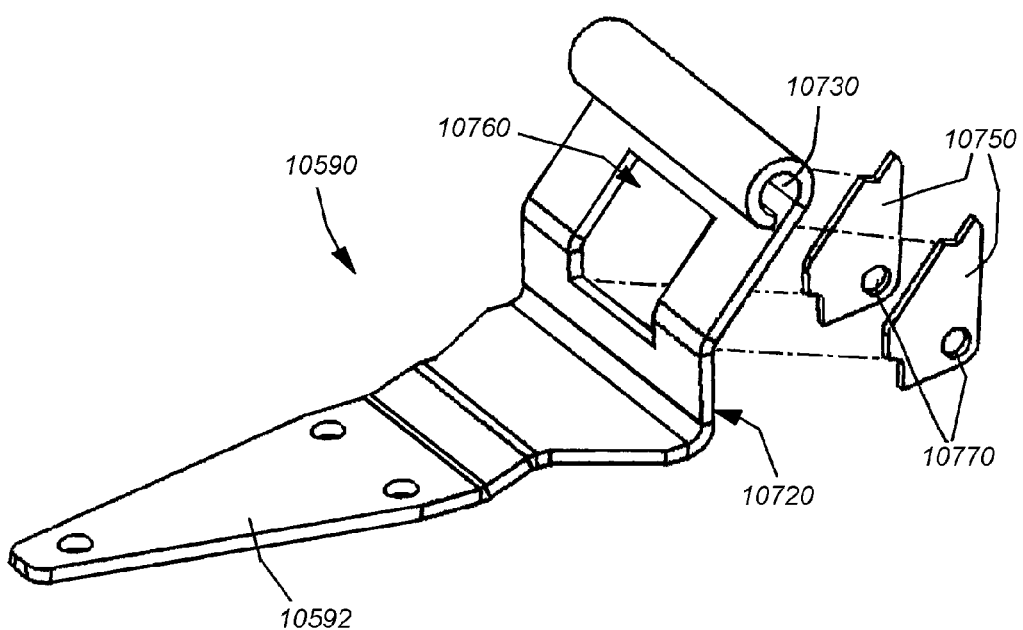
FIG. 107 is an exploded perspective view of a door hinge unit for use in the door and aerodynamic panel assembly of FIG. 99.
Figure 108:
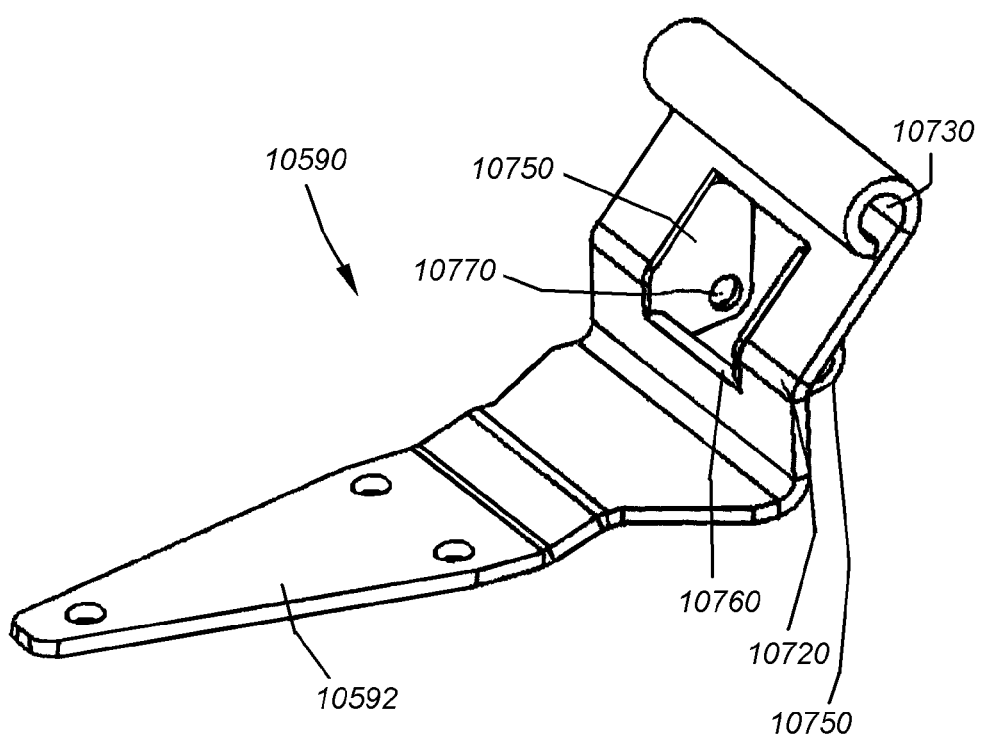
FIG. 108 is a perspective view of an assembled door hinge unit according to FIG. 108.
Figure 109:
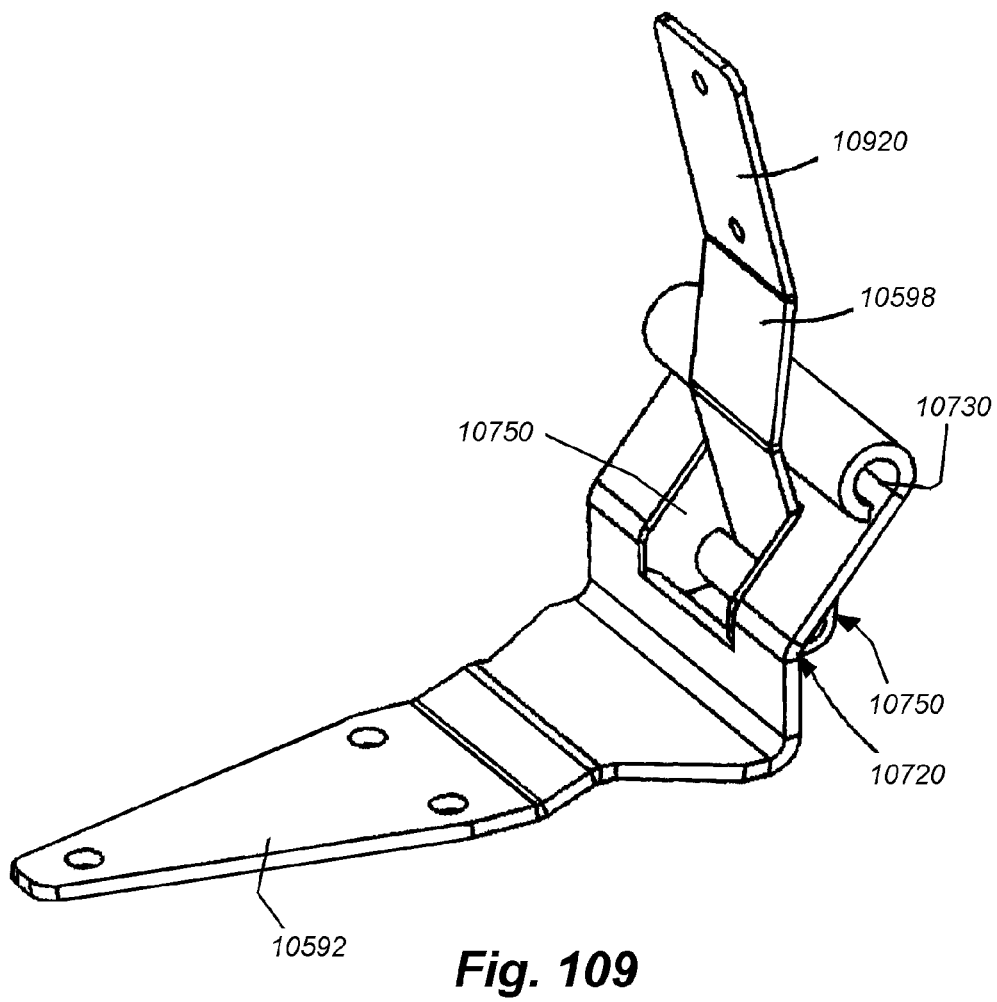
FIG. 109 is an assembled door hinge unit according to FIG. 108 further including a lateral panel hinge nested therein with it's own discrete pivot axis provided by the hinge unit.

With further reference to FIGS. 107-109, each hinge unit includes a door hinge portion 10590 that is seated within the clevis 9998. The clevis is defined by two opposing clevis plates 10572 that are welded or otherwise joined to the hinge butt plate 9994 in a manner described below. The door portion 10590 of the hinge unit 9992 consists of a door strap mounting member 10592 that is mounted to the door panel 9940 using bolts or other fasteners in a manner of a conventional door strap hinge. The hinge assembly defines a hinge pivot point 10620 that extends a predetermined distance of offset DOH rearwardly from the door frame or original door hinge pivot axis. In illustrative embodiment this offset measures approximately 3-5 inches. The offset can be varied based upon the overall thickness of the door stack when the panels are fully folded. In order to accommodate the rearward offset (DOH), the door portion 10590 includes a multi-angled extension strap portion 10720. This portion 10720 is designed to overlie the door frame 10570 and other assembly components. The strap extension portion 10720 extends to a pivot tube 10730. This tube 10730 has a cylindrical inner surface, which allows the insertion of a pivot bolt that passes through both the clevis plate holes 10580 and the tube 10730 to thereby define the assembled pivoting hinge unit 9992. The particular geometric arrangement of the strap extension 10720 and the distance it spans between the door mounting plate/strap 10592 and tube 10730 are highly variable—and the hinge strap extension 10720 can be formed to accommodate the particular door-to-frame geometry.

As shown, a pair of inner hinge plates 10750 are welded or otherwise attached to a square slot 10760 provided in the middle of the strap extension 10720. The assembled construction is likewise shown in FIG. 108. This construction defines a second pair of pivot holes 10770 formed in each of the inner hinge plates 10750. These holes 10770 are remote from the pivot tube 10730. The holes accommodate a discrete, independently pivoting central hinge member 10598 having a pivot bolt that rotatably secures the inner hinge member 10598 with respect to the overall door hinge portion 10590. The completed door hinge assembly is shown in FIG. 109. As shown, the inner hinge member 10598 includes a securing strap 10920 that attaches to an appropriate location on the lateral panel 9990. The geometry of the inner hinge member 10598 and location of its securing strap 10920 are chosen so that the hinge panel folds flushly against the two folded upper and lower panels 9910 and 9920 in the folded position, but allows the lateral panel to deploy into a closely conforming orientation with respect to the hinge butt plate as defined the junction line 10599 (FIG. 105). Each assembled hinge unit 9992 allows for 270 degree folding of the door (defining a rearwardly placed hinge pivot) as well as an aerodynamically smooth transition between the hinge butt plate and the attached lateral panel 9990.

Figure 110:
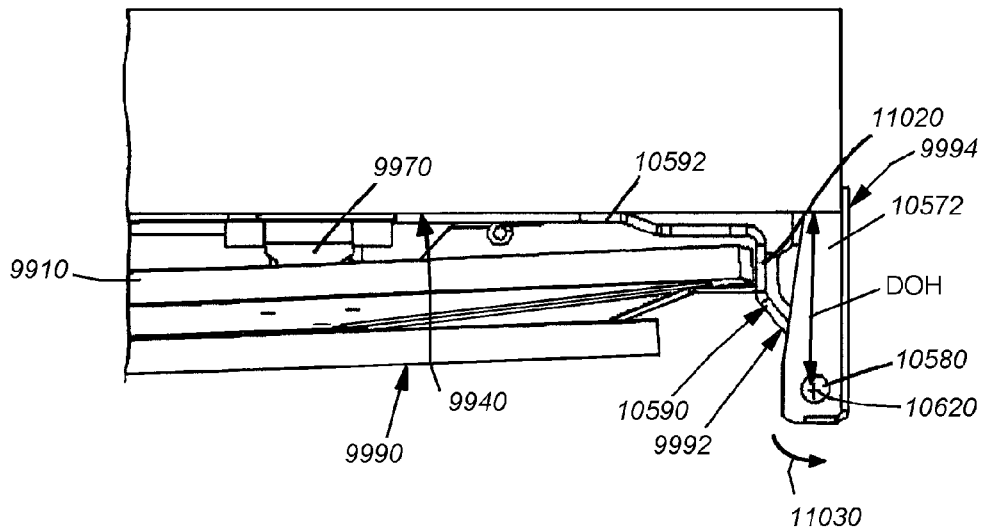
FIG. 110 is a more detailed fragmentary top view of the aerodynamic panel assembly of FIG. 99 shown with the panels in a folded position and the door in a fully closed orientation against the door frame of the trailer.
Figure 111:
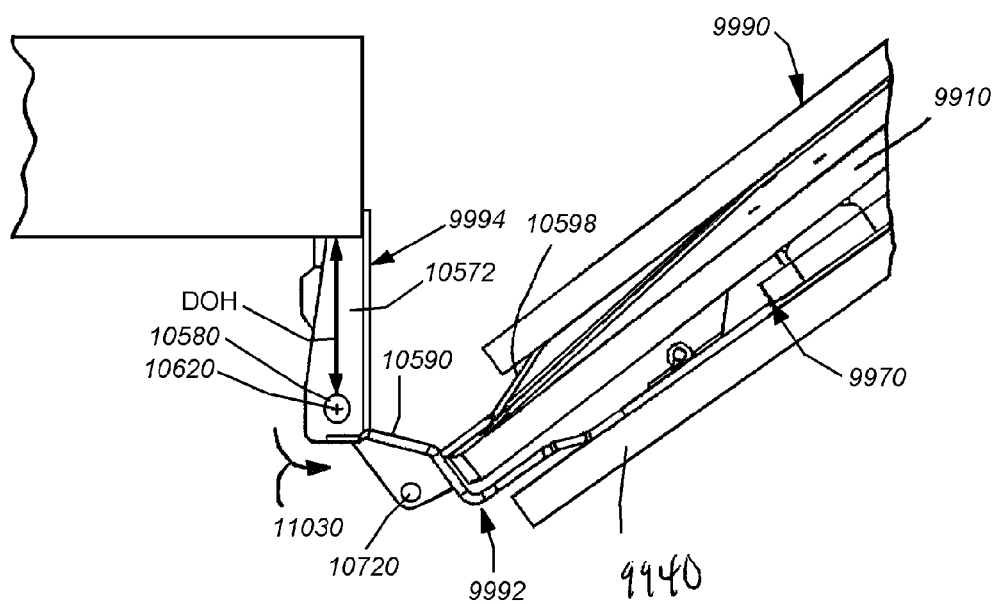
FIG. 111 is a more detailed respective view of the folded panel assembly of FIG. 99 with the door moved to an opened position upon the hinge units shown in FIGS. 107 to 109.
Figure 112:
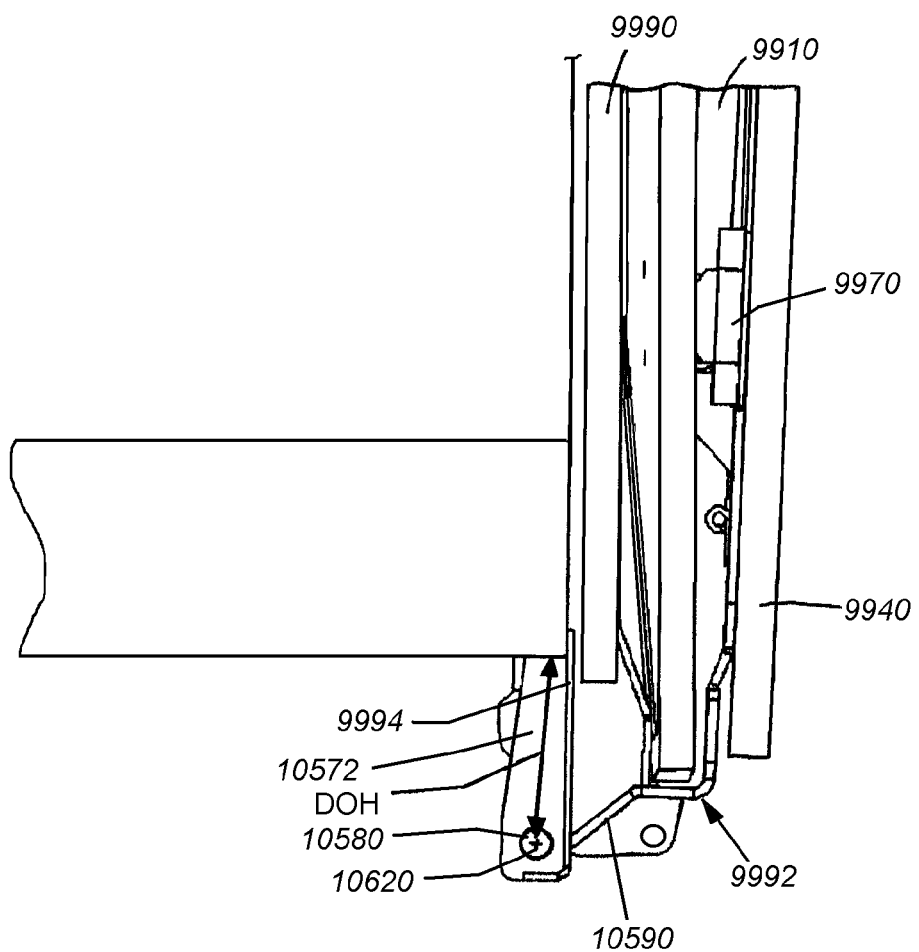
FIG. 112 is a more detailed top view of the folded panel assembly of FIG. 99 showing the door and panel assembly moved to a fully opened, 270-degree orientation upon the hinge units shown in FIGS. 107-109, and placed substantially flushly against the side of the trailer body.

The rotation of the hinge units 9992 from the closed position to the fully opened position (270 degrees) is depicted in further detail of the sequence of views in FIGS. 110-112. As shown, the adjacent folded panels (upper panel 9910 and lateral panel 9990) are secured flushly against the door surface 9940. Given the rearward extension (DOH) of the hinge pivot hole 10580 (distance DOH) allows the opening of the door 9940 to accommodate the added thickness created by the folded aerodynamic stack-up, in a manner described generally above. In contrast to above-described embodiments herein, the depicted door swing is accommodated by a single hinge pivot in this embodiment. The hinge door portion 10590 can be clearly seen angled outwardly with respect to the hole 10580. Likewise, the central portion 11020 of the strap is relatively parallel to the side wall of the vehicle. The edge of the upper panel 9910 is, thus, not obstructed by this portion as it is folded in. As shown in FIG. 110, the fully folded assembly is ready to be hinged outwardly (curved arrow 11030). In FIG. 111, the door 9940 has been hinged (curved arrow 11030) to a position approximately 200 to 220 degrees from its original location. The panel pivot hole 10720, which is part of the door portion of the hinge unit 9992, can be clearly seen. The geometry of the hinge portion 10590 allows for significant clearance of the stacked panels 9910 and 9990. In FIG. 112, the stacked panel arrangement and door 9940 have been moved to a position that is approximately 270 degrees from the original closed orientation. The door portion of the hinge unit 9992 has effectively provided clearance for the entire folded panel stack.

Figure 113:
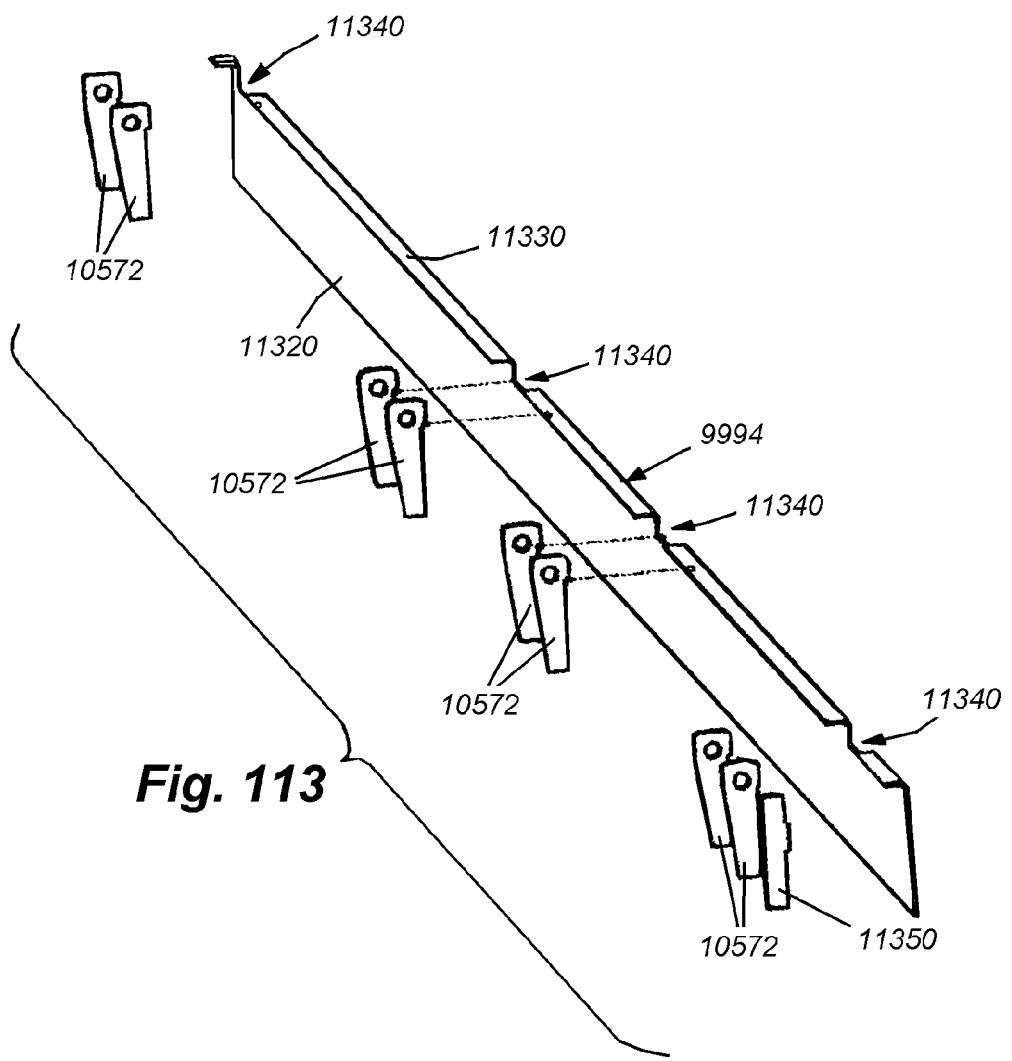
FIG. 113 is an exploded perspective view of the trailer-frame-mounted, elongated hinge butt plate having variably placed hinge locations that enable customization of the unit according to the illustrative embodiment of FIG. 99.

As described generally above, the illustrative embodiment can be adapted for somewhat universal attachment to variety of trailer frame configurations. Many trailer frame types vary significantly in the relative placement of door hinges and number of door hinges mounted. The novel hinge butt plate 9994 of this embodiment is shown in further detail in FIG. 113. This hinge butt plate 9994 includes an elongated base 11320 that is adapted to be secured to the side of the trailer frame by fasteners, welding and/or any other accepted technique. A folded-over rear edge 11330 provides further stiffness to the hinge butt plate 9994. In an illustrative embodiment, the hinge butt plate 9994 is constructed from steel having a thickness of between approximately one-sixteenth and three-eighths inch. The material used to form the butt plate, and corresponding sheet thickness thereof, are highly variable. The butt plate 9994 can be manufactured as a singe unit without any cuts along the base 11320 and its folded-over end 11330. In this embodiment, slots or cuts 11340 have been located at specific positions that correspond to a particular type of trailer frame. Slots 11340 can be made using any acceptable cutting mechanism including a milling machine, laser/plasma/water cutter, or an accurate saw. Within each cut are provided the upper and lower clevis plates 10572 that define the overall clevis that encapsulated the door hinge portion 10590. The clevis plates 10572 are secured to opposing ends of the cut 11340, and welded in place. A bottom gusset plate 11350 is also provided at the bottom edge of the butt plate 9994 in order to further stiffen the assembly against possible crush upon contact with loading dock or other obstruction. It should be clear that the retrofitter can order plates having clevis locations that match the placement of preexisting door hinge devises. The manufacturer simply cuts slots at the specified location to match the requested retrofit specification and welds in the appropriate clevis plates. A customized, but universally applicable butt plate is then shipped to the retrofitter.

Figure 114:
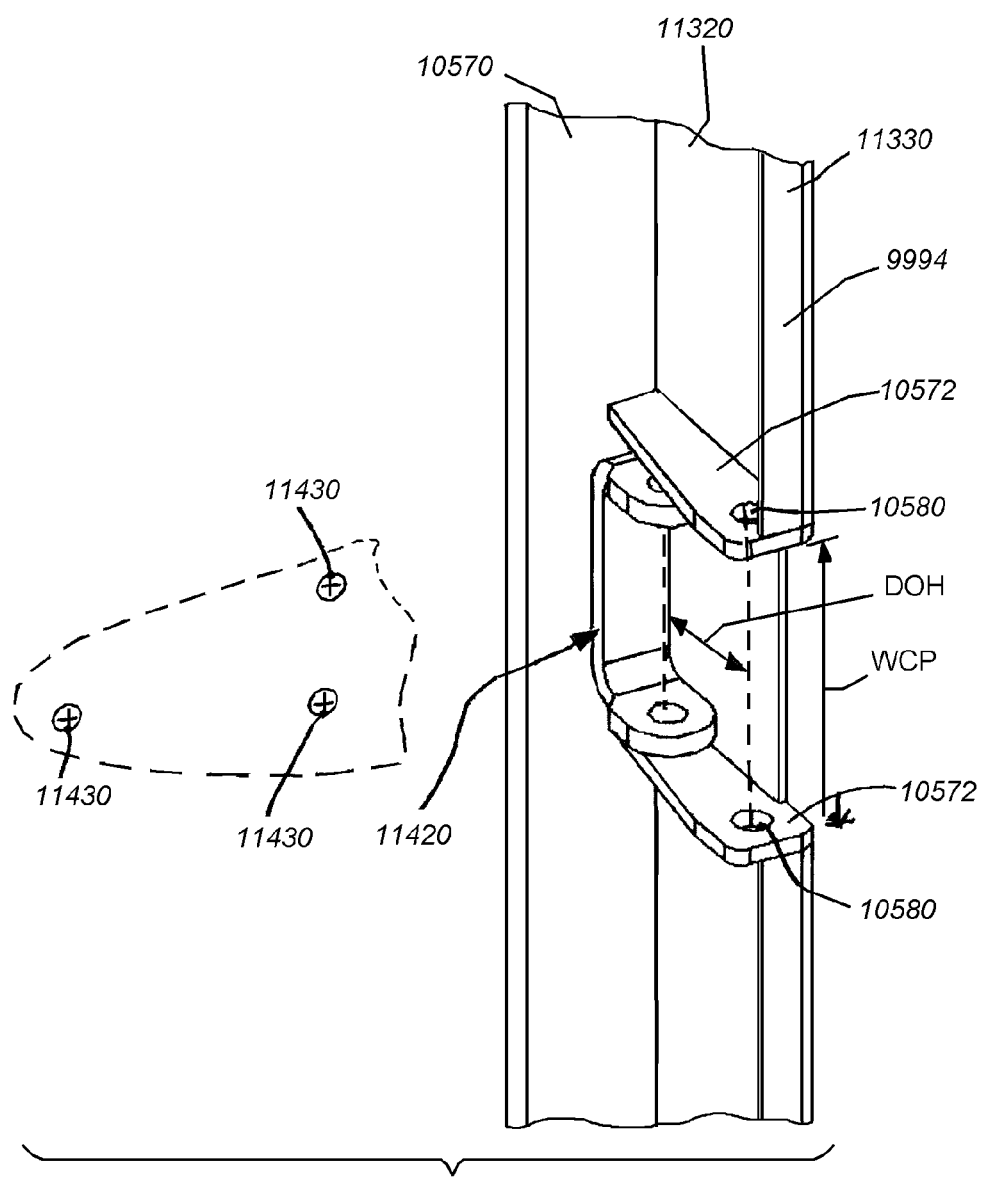
FIG. 114 is a fragmentary perspective view of the hinge butt plate of FIG. 113 installed along the edge of the trailer door frame with a new hinge butt defined by the butt plate overlying an existing trailer hinge.

Referring further to FIG. 114, the assembled hinge butt plate 9994 with welded-on clevis plates 10572 in the correct locations is shown attached to the vertical corner of the vehicle frame 10570. As shown, the clevis plates are disposed at a vertical spacing WCP of approximately three to eight inches so as to provide ample clearance for the preexisting trailer hinge butt 11420. Thus, when properly constructing the hinge butt plate 9994, the user need not remove the original hinge butts 11420, but rather may simply overlay the new devises on them, thereby reducing the effort required to retrofit the vehicle. In addition, the door portion of the hinge unit 9992 can be constructed to mate with original door bolt holes 11430 as shown in phantom. In alternate embodiments, the user simply drills new holes in the door to accommodate the attachment of the door hinge portion of each hinge unit. Note that in a new equipment (OEM) implementation the hinge butt plate of the type shown (or a similar type) maybe formed as part of the original door frame. Alternate types of door hinge clevis arrangements can be used in OEM applications. According to this embodiment, such OEM applications typically locate the clevis door hinge pivot holes at the desired offset DOH from the door frame to achieve the desired spacing when the door swings open to the full 270 degrees.

Figure 115:
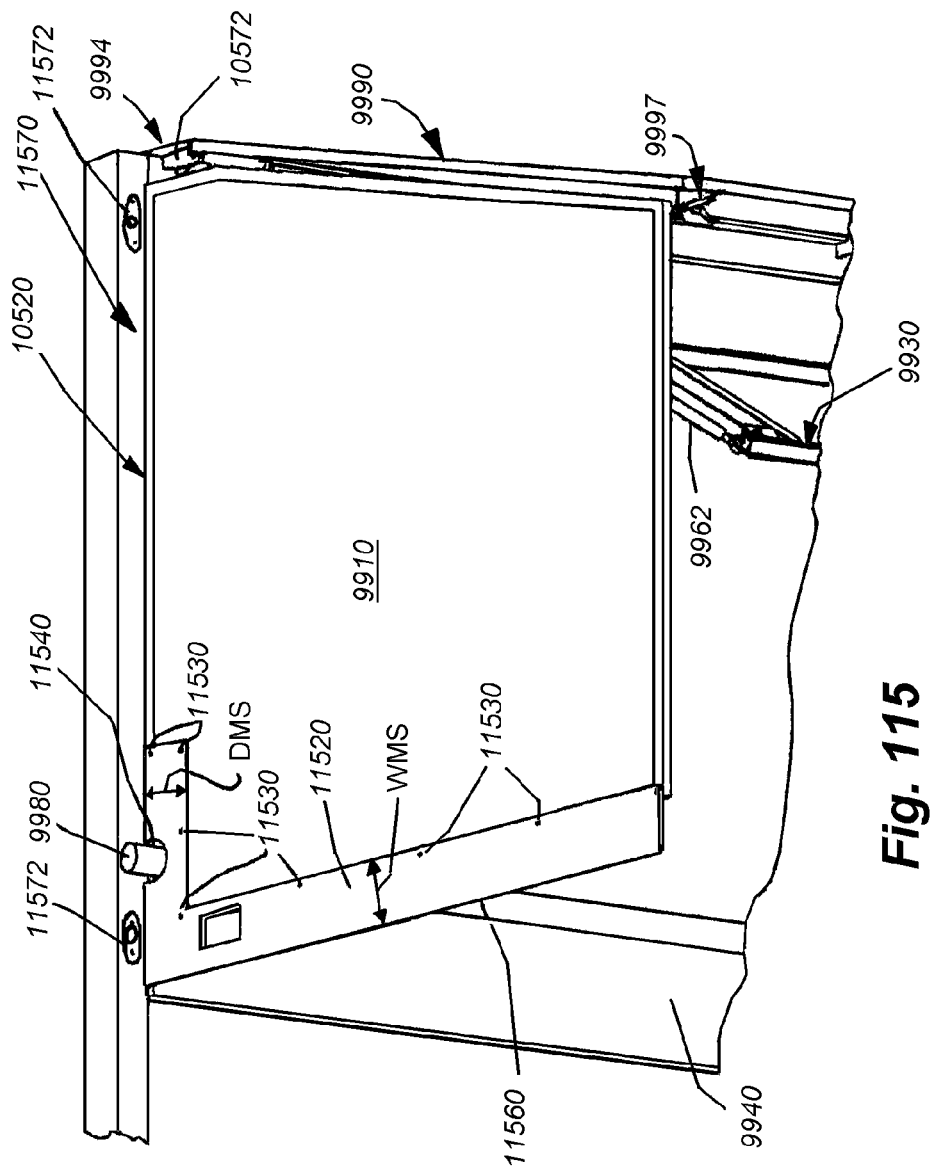
FIG. 115 is a fragmentary top perspective view of the deployed aerodynamic assembly of FIG. 99 showing the positioning of a cutout on the medial filler strip of the upper aerodynamic panel to enable a trailer door lock rod to pass therethrough.

To further facilitate the retrofit of a somewhat standardized aerodynamic assembly to a variety of trailer configurations, and also to allow for ongoing adjustment of the installed aerodynamic assembly, additional features are provided in accordance with this embodiment. With reference to FIG. 115, the trailer's original lock rod 9980 maybe located at various positions along the door 9940—each position being unique to a particular trailer model. As such, the upper panel 9910 and lower panel 9920 (not shown in this view) should be able to provide clearance for the lock rod 9980 without requiring a large universal slot that would reduce the aerodynamic performance of the assembly. Hence, the rear edge and side inner/medial edge of each upper and lower panel is provided with an L-shaped medial sealing strip 11520. The medial sealing strip has a width WMS of approximately two inches and a rear depth DMS of approximately two inches. The underlying panel's width and localized depth is reduced to accommodate the extension of the sealing strip. The sealing strip is mounted using fasteners 11530 as shown, or another attachment mechanism, so as to slightly overly the main panel structure, thereby providing a secure fitment. In this embodiment, the medial sealing strip 11520 is constructed from an appropriate aluminum alloy having a thickness of approximately one-eighth inch. In alternate embodiments, the sealing strip 11520 can be constructed from other acceptable materials, such as a composite, and its thickness is highly variable. The relatively thin aluminum of the sealing strip allows for ready cutting of a clearance slot or hole 11540 that allows for a closely-conforming clearance channel through which the lock rod 9980 extends. Because the hinge points of the upper and lower panels 9910, 9920 are offset (as described above), when the panels hinge inwardly to fold, the rear edge of the panel moves away from the door. Thus, the hole 11540 does not bind against the lock rod during hinging lock rod. As shown in FIG. 93, the inner edge 11560 of each medial sealing strip 11520 can include one-half of the overlying medial wiper assembly. This allows for slight movement between panels, and accommodates a certain degree of inherent width-variation when the assembly is mounted of a given trailer frame. Where a particular trailer model has a significantly wider or narrower width, a corresponding wider or narrower medial sealing strip can be attached to the upper and lower panels to accommodate this difference, while maintaining a standard panel size.

Note that, in addition to the medial wiper, selected edges of upper, lower and lateral panels of the illustrative embodiment (and/or any other embodiment described herein) can be provided with appropriate weather strips where they confront each other, the vehicle frame and/or the hinge butt plate. This assists in maintaining a relatively wind-tight seal for the overall aerodynamic assembly 9900 and its interface with the rear of the trailer body/door frame.

As also shown in FIG. 115, the upper frame member 11570 of the trailer door frame includes top marker lights 11572. Highway regulations typically require that such marker lights remain visible from a range of viewing perspectives. As described above, with reference for example to FIGS. 96, 97 and 98, various OEM-type implementations of marker lights are contemplated that allow the top panels to be substantially flush with respect to the top frame member and vehicle body roof. However, in a retrofit application, it may be more cost-effective and compliant with regulations to employ the original marker lights 11572 in an unobstructed manner. While this may result in some diminishment of the aerodynamic streamlining that is afforded by the assembly 9900, it is a minimal reduction in efficiency. Thus, each upper panel 9910 and its associated folding hinges are mounted so that the rear edge of the upper panel engages the top frame member beneath the marker lights. In alternate embodiments, the retrofit assembly (or other implementation) of the overall aerodynamic assembly 9900 can include marker lights that allow for flush mounting with respect to the top of the frame member 11570. Such an implementation can employ clear windows that expose underlying marker lights, surface-mounted lights, and the like.

Figure 116:
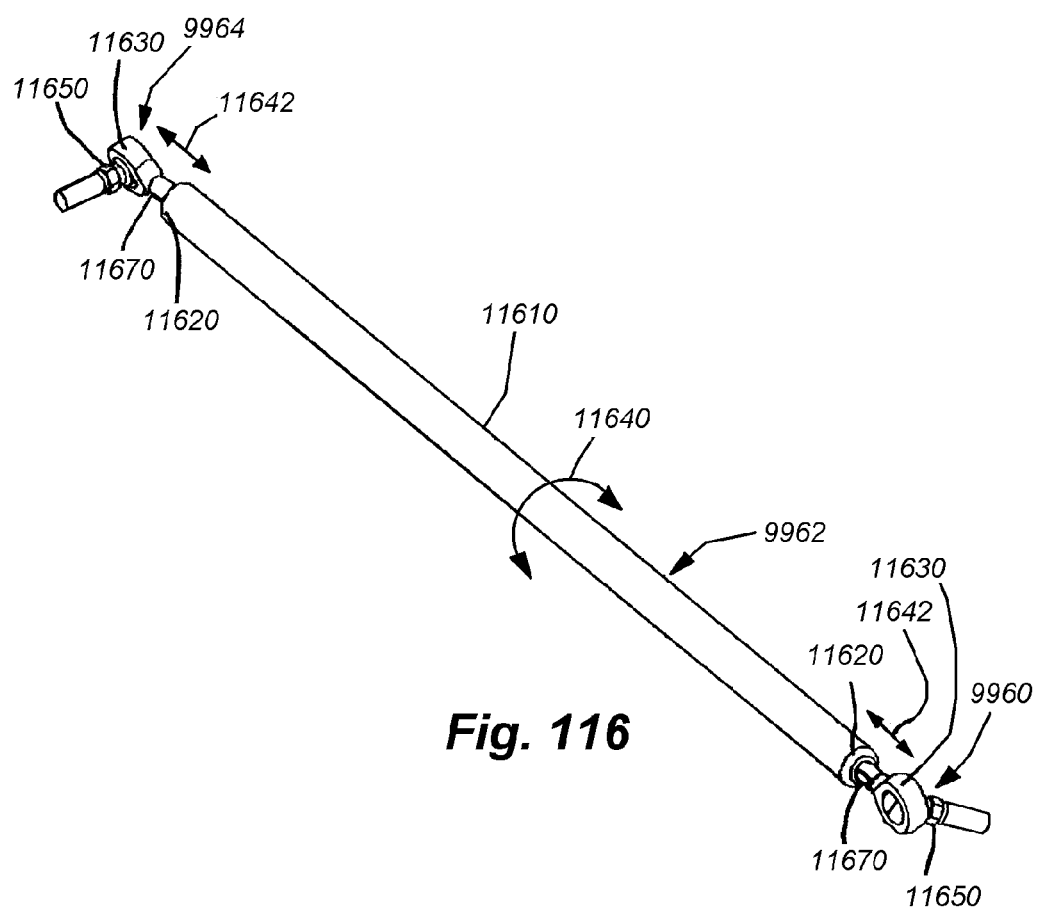
FIG. 116 is a perspective view of a length-adjustable tie-rod for adjustably interconnecting each of the upper and lower aerodynamic panels of the aerodynamic panel assembly of FIG. 99 to the swing arm assembly.

Adjustment of the assembly during installation, and during the service life of the assembly, is further accommodated through the use of tie rods 9962 (and 9964) that are adjustable for length. FIG. 116 shows an exemplary tie rod 9962 in further detail. The tie rod 9962 consists of a central shaft or rod 11610 constructed from an aluminum bar stock, and having an illustrative diameter of approximately three-quarter inch. Any acceptable alloy can be used to construct the rod section 11610. In alternate embodiments, the rod can be constructed from steel or another material. Each end 11620 of the rod includes a threaded socket for receiving a tie rod end 11630. The direction of the threads oppose each other so that rotation (double-curved arrow 11640) of the rod 11610 in either direction causes the tie rod ends to move outwardly or inwardly (double arrows 11642) to either lengthen or shorten (respectively) the overall distance between tie rod ends 11630. As shown, the tie rod ends 11630 each include a swiveling ball stud 11650 that attaches by a threaded shaft and corresponding nut (not shown) to each of the swing arm frame 9930 and corresponding upper or lower panel 9910, 9920. Once the panels of the aerodynamic assembly 9900 have been installed, the tie rods 11610 are rotated in the appropriate direction so that the panels reach the desired orientation in their deployed position. In other words, they seat properly with respect to the locking mechanism 9997 and 9999 when fully deployed. The adjusted position of each rod 11610 with respect to the tie rod ends 11630 can be secured using jam nuts (not shown) which ride on the treaded shaft 11670 of each tie rod end. The jam nuts are brought into contact with the end 11620 of the rod 11610 when the appropriate adjustment has been achieved.

As discussed above, with reference to a roll-top door embodiment of a trailer shown, for example in FIG. 49, the illustrative embodiment of FIG. 99, or any other embodiment that is adapted for mounting on opposed hinged doors can be provided to a rolling door enclosed within a rear door frame. Such an embodiment can be implemented in the illustrative embodiment by attaching hinge butt plates (9994, 9996) to the corners of the roll-top door frame and mounting a secondary hinged door or framework to the door hinge units (9992) of the butt plate. This secondary door or frame supports the upper and lower panel-folding hinges, and provides attachment points for the linkage (swing arm 9930) and other door-mounted components of the aerodynamic assembly. The assembly is folded and hinged into a 270-degree opened position to access the underlying roll-top door (or another "primary" door assembly which affords actual access to the trailer). Appropriate latches can be provided to the secondary door so that it remains in pace when the vehicle is in motion. For example, a set of secondary door lock rods similar to those used on conventional hinged main trailer doors can be employed.

It should be clear that this invention contemplates a variety of systems and methods for providing improved aerodynamic performance to original equipment and retrofitted vehicles. The teachings of this invention provide a number of solutions to challenges faced including, but not limited to, those of mounting the assembly, folding and deploying it to access the cargo doors, vehicle lighting, streamlining, sealing leaks and accessing door locking structures. The solutions provided are easy to use, cost effective and universal to a large number of trailer types, including those with hinged and rolling doors.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, additional attachments and improvements can be made to the rear of the vehicle to further enhance the security and capabilities of the aerodynamic structure of this invention. Such enhancements can include extended bumper assemblies that project rearward beyond the folded aerodynamic assemblies, or special reflectors and/or lighting on the edges of the structure and/or spacer frame. Similarly, while not shown, any of the embodiments described herein can include flexible or rigid gaskets or other seal members that extend between the aerodynamic assembly and the trailer body to further streamline the junction therebetween. The panels can be constructed from a variety of durable materials or a combination of materials. For example, the panels can include rigid or semi-rigid frames covered in a flexible fabric or similar sheet material. In further embodiments, a series of fabric or flexible wells of a predetermined shape (for example a bowl or dish shape) can be defined within the central cavity of each aerodynamic structure when deployed. Such a well shape may enhance the aerodynamic effect. In addition, it is expressly contemplated that any of the mechanisms and features shown and described herein can be combined with other mechanisms and features as appropriate. Accordingly, this description is meant to be taken only by way of example, and not to otherwise limit the scope of this invention.

What is claimed is:

1. An aerodynamic device for a rear portion of a cargo body comprising:
    an upper panel;
    a planar side panel; and
    a framework,
        wherein the upper panel and the planar side panel are each separately hingedly mounted to a door of the cargo body,
        wherein the framework is coupled to at least the door and a first panel, wherein the first panel is one of the upper panel and the planar side panel,
        wherein the upper panel and the planar side panel are adapted to have a deployed orientation and a retracted orientation,
        wherein the planar side panel maintains planar shape in the deployed orientation and the retracted orientation, wherein in the retracted orientation, the first panel is overlaid by the other of the upper panel or the planar side panel, and wherein in the deployed orientation, the upper panel and the planar side panel taper rearwardly.

2. The aerodynamic device of claim 1, wherein the upper panel includes an angled folding hinge line to provide lock rod clearance when the upper panel is in the retracted orientation.

3. The aerodynamic device of claim 2, wherein the upper panel has an edge adjacent to a hinge that is substantially horizontal and level with a top of the cargo body when the upper panel is in the deployed orientation.

4. The aerodynamic device of claim 1, wherein the framework and the first panel rotate away from the door when transitioning from the retracted orientation to the deployed orientation.

5. The aerodynamic device of claim 4, wherein the first panel pushes the other of the upper panel or the planar side panel into the deployed position.

6. The aerodynamic device of claim 1, wherein the first panel is the upper panel.

7. The aerodynamic device of claim 6, wherein the aerodynamic device further comprises a lower panel.

8. The aerodynamic device of claim 7, wherein the planar lower panel is coupled to the framework to allow for simultaneous movement with the upper panel.

9. The aerodynamic device of claim 1, further comprising a lower panel, wherein the lower panel is coupled to the framework to allow for simultaneous movement with the first panel.

10. The aerodynamic device of claim 1, wherein the framework further comprises two or more rotating joints.

11. The aerodynamic device of claim 8, wherein the upper panel comprises two upper panel sections, and wherein the planar side panel comprises one panel section.

12. An aerodynamic structure for the rear of a cargo body comprising:

a planar side panel and an upper panel separately hingedly mounted on each of a pair of doors, wherein the upper panel and the planar side panel hinge between a folded position on the door and a deployed position in which the planar side panel and the upper panel extend rearwardly and inwardly, wherein the planar side panel maintains planar shape in the deployed position and the folded position, and wherein in the folded position:

a first panel of the upper panel or the planar side panel is overlaid by the other of the upper panel or the planar side panel, and the upper panel folds along an angled folding hinge line to provide lock rod clearance.

13. The aerodynamic structure of claim 12, wherein the first panel is the upper panel.

14. The aerodynamic structure of claim 12, further comprising a framework coupled to the door and the first panel.

15. The aerodynamic device of claim 14, wherein the framework and the first panel rotate away from the door when transitioning from the folded position orientation to the deployed position, and wherein the first panel pushes the other of the upper panel or the planar side panel into the deployed position.

16. The aerodynamic device of claim 14, wherein the aerodynamic device further comprises a lower panel, and wherein the lower panel is coupled to the framework to allow for simultaneous movement with the first panel.

17. The aerodynamic device of claim 14, wherein the framework comprises at least a pair of horizontal arms, at least one vertical arm, at least one cable assembly, and two or more rotating joints.

18. An aerodynamic device for a rear portion of a cargo body comprising:

an upper panel;

a planar side panel; and a framework comprising at least a pair of horizontal members, at least one vertical member, and at least one cable assembly, wherein the planar side panel is coupled only to the framework and to a door of the cargo body, wherein the upper panel is coupled only to the framework and to the door of the cargo body;

wherein the upper panel and the planar side panel are adapted to have a deployed orientation and a retracted orientation, wherein the planar side panel maintains planar shape in the deployed orientation and the retracted orientation, wherein in the retracted orientation, a first panel of the upper panel or the planar side panel is overlaid by the other of the upper panel or the planar side panel, and wherein in the deployed orientation, the upper panel and the planar side panel taper rearwardly.

19. The aerodynamic device of claim 18, wherein the aerodynamic device further comprises a lower panel, and wherein the lower panel is coupled to the framework to allow for simultaneous movement with the upper panel.

* * * * *